US007888863B2

United States Patent

(12) United States Patent
Shin et al.

(10) Patent No.: US 7,888,863 B2
(45) Date of Patent: Feb. 15, 2011

(54) ORGANIC ELECTROLUMINESCENT COMPOUNDS AND ORGANIC ELECTROLUMINESCENT DEVICE USING THE SAME

(75) Inventors: Hyo Nim Shin, Seoul (KR); Young Jun Cho, Seoul (KR); Hyuck Joo Kwon, Seoul (KR); Bong Ok Kim, Seoul (KR); Sung Min Kim, Seoul (KR); Seung Soo Yoon, Seoul (KR)

(73) Assignee: Gracel Display Inc., Seoul (KR)

( * ) Notice: Subject to any disclaimer, the term of this patent is extended or adjusted under 35 U.S.C. 154(b) by 134 days.

(21) Appl. No.: 12/383,763

(22) Filed: Mar. 26, 2009

(65) Prior Publication Data

US 2009/0260686 A1 Oct. 22, 2009

(30) Foreign Application Priority Data

Mar. 28, 2008 (KR) ..................... 10-2008-0028848

(51) Int. Cl.
*H01L 31/04* (2006.01)
*H01J 1/63* (2006.01)
*C07D 221/08* (2006.01)

(52) U.S. Cl. ......................... 313/504; 546/26; 546/101; 136/257; 313/506; 257/102; 257/103; 257/E51.049; 428/690

(58) Field of Classification Search ................. 136/257; 546/26, 61, 101; 428/690; 313/504, 506; 257/102, 103, E21.049
See application file for complete search history.

(56) References Cited

U.S. PATENT DOCUMENTS 5,061,569 A 10/1991 VanSlyke et al.

(Continued)

FOREIGN PATENT DOCUMENTS

EP 1 167 488 4/2007

(Continued)

OTHER PUBLICATIONS

STN Structure Search Report (Sep. 21, 2010).*

(Continued)

*Primary Examiner*—David Wu
*Assistant Examiner*—Vu A Nguyen
(74) *Attorney, Agent, or Firm*—Edwin Oh

(57) ABSTRACT

The present invention relates to novel organic electroluminescent compounds, and organic electroluminescent devices employing the same as electroluminescent material. Specifically, the organic electroluminescent compounds according to the invention are characterized in that they are represented by Chemical Formula (1):

Chemical Formula 1

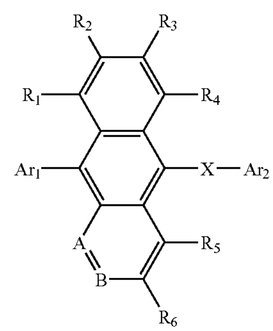

wherein, A and B independently represent $CR_7$ or N, provided that both A and B cannot be $CR_7$ or N at the same time; and X is O or S.

9 Claims, 1 Drawing Sheet

U.S. PATENT DOCUMENTS

| | | | |
|---|---|---|---|
| 5,077,142 | A | 12/1991 | Sakon et al. |
| 5,702,887 | A | 12/1997 | Law et al. |
| 5,759,444 | A | 6/1998 | Enokida et al. |
| 5,858,563 | A | 1/1999 | Sano et al. |
| 5,935,721 | A | 8/1999 | Tan et al. |
| 5,989,737 | A | 11/1999 | Xie et al. |
| 6,203,933 | B1 | 3/2001 | Nakaya et al. |
| 6,465,115 | B2 | 10/2002 | Shi et al. |
| 6,515,182 | B2 | 2/2003 | Hosokawa et al. |
| 6,534,199 | B1 | 3/2003 | Hosokawa et al. |
| 6,713,192 | B2 | 3/2004 | Fukuoka et al. |
| 6,951,693 | B2 | 10/2005 | Hosokawa et al. |
| 7,252,894 | B2 | 8/2007 | Yu et al. |
| 2004/0161633 | A1 | 8/2004 | Seo et al. |
| 2005/0064233 | A1 | 3/2005 | Matsuura et al. |
| 2005/0211958 | A1 | 9/2005 | Conley et al. |
| 2006/0033421 | A1 | 2/2006 | Matsuura et al. |
| 2006/0043858 | A1 | 3/2006 | Ikeda et al. |
| 2006/0046097 | A1 | 3/2006 | Kim et al. |
| 2006/0110622 | A1 | 5/2006 | Uchida et al. |
| 2006/0204783 | A1 | 9/2006 | Conley et al. |
| 2006/0269782 | A1 | 11/2006 | Liao et al. |
| 2007/0087222 | A1 | 4/2007 | Kim et al. |
| 2007/0092759 | A1 | 4/2007 | Begley et al. |
| 2007/0152568 | A1 | 7/2007 | Lai et al. |

FOREIGN PATENT DOCUMENTS

| | | |
|---|---|---|
| JP | 1996-012600 | 1/1996 |
| JP | 2001-052870 | 2/2001 |
| JP | 2004-059535 | 2/2004 |
| JP | 2004-091334 | 3/2004 |
| JP | 2004-095850 | 3/2004 |
| WO | WO 2007/105917 | 9/2007 |

OTHER PUBLICATIONS

Krapcho et al., J. Heterocyclic Chem., 35 (1998), 669-674.*

European Search Report of corresponding European Application No. 09 15 4954, Jun. 25, 2009.

Tuchinda, P., et al, “An azaanthracene alkaloid from *Polyalthia suberosa*”, Phytochemistry, vol. 53, No. 8, Apr. 1, 2000, pp. 1079-1082.

* cited by examiner

ORGANIC ELECTROLUMINESCENT COMPOUNDS AND ORGANIC ELECTROLUMINESCENT DEVICE USING THE SAME

FIELD OF THE INVENTION

The present invention relates to novel organic electroluminescent compounds, and organic electroluminescent devices employing the same as electroluminescent material. Specifically, the organic electroluminescent compounds according to the present invention are represented by Chemical Formula (1):

Chemical Formula 1

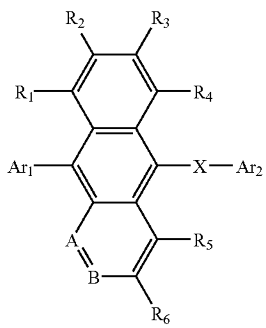

wherein, A and B independently represent $CR_7$ or N, provided that both A and B cannot be $CR_7$ or N at the same time; and X is O or S.

BACKGROUND OF THE INVENTION

Three electroluminescent materials (for red, green and blue) are employed to realize a full-colored OLED display. The important issue is to develop red, green and blue electroluminescent materials with high efficiency and long life in order to enhance the overall feature of the organic electroluminescent (EL) devices. From the aspect of function, the EL materials are classified into host materials and dopant materials. It is generally known that a device structure having the most excellent EL properties can be fabricated with an EL layer prepared by doping a dopant to a host. Recently, development of an organic EL device with high efficiency and long life comes to the fore as an urgent subject, and particularly urgent is development of a material with far better EL properties as compared to conventional EL materials as considering EL properties required for a medium to large sized OLED panel. From this point of view, development of host material is one of the most important issues to be settled. The desired properties for the host material (serving as a solvent and energy conveyer in solid state) are high purity and appropriate molecular weight to enable vapor-deposition in vacuo. In addition, glass transition temperature and thermal decomposition temperature should be high enough to ensure thermal stability. Further, the host material should have high electrochemical stability for providing long life. It is to be easy to form an amorphous thin film, with high adhesiveness to other adjacent materials but without interlayer migration.

In the meanwhile, for blue materials, a number of materials have been developed and commercialized since the development of diphenylvinyl-biphenyl (DPVBi) (Compound a) by Idemitsu-Kosan. In addition to the blue material system from Idemitsu-Kosan, dinaphthylanthracene (DNA) (Compound b), tetra(t-butyl)perylene (Compound c) system or the like have been known. However, extensive research and development should be performed with respect to these materials. The distryl compound system of Idemitsu-Kosan, which is known to have highest efficiency up to now, has 6 lm/W of power efficiency and beneficial device lifetime of more than 30,000 hr. However, when it is applied to a full-colored display, the lifetime is merely several thousand hours, owing to decrease of color purity over operation time. In case of blue electroluminescence, it becomes advantageous from the aspect of the luminous efficiency, if the electroluminescent wavelength is shifted a little toward longer wavelength. However, it is not easy to apply the material to a display of high quality because of unsatisfactory color purity in blue. Furthermore, the research and development of such materials are urgent because of the problems in color purity, efficiency and thermal stability.

Compound a

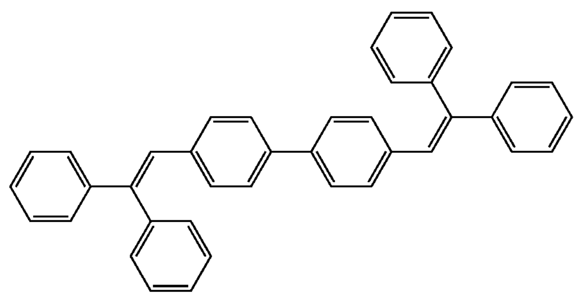

Compound b

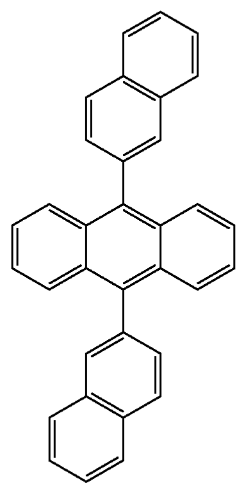

Compound c

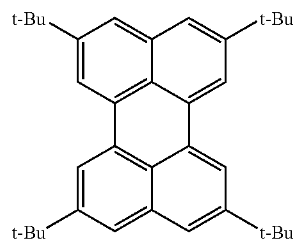

In order to develop a host material with high efficiency and long life, compounds based on different backbones have been disclosed, such as dispiro-prolene-anthracene (TBSA), terspirofluorene (TSF) and bitriphenylene (BTP). These compounds, however, did not result in color purity and luminous efficiency at a sufficient level.

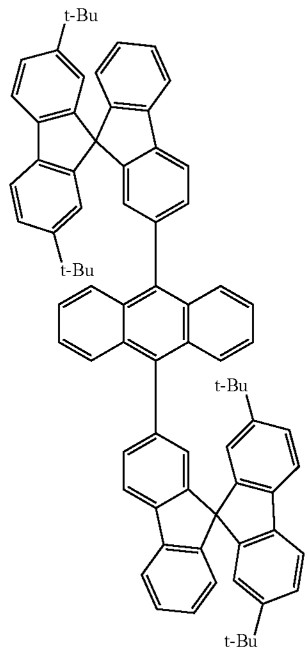

TBSA

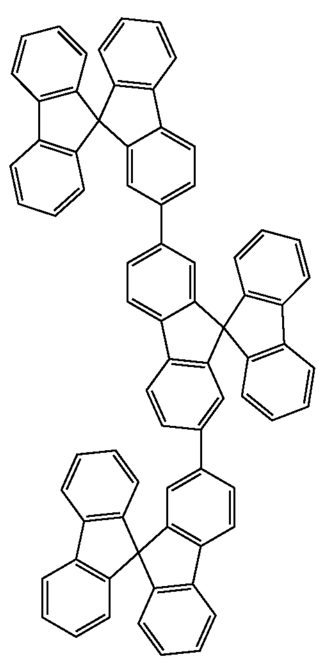

TSF

-continued

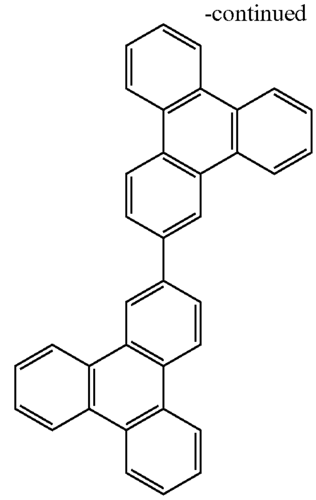

BTP

The compound TBSA as reported by Gyeongsang National University and Samsung SDI (Kwon, S. K. et al., Advanced Materials, 2001, 13, 1690; Japanese Patent Laid-Open JP 2002121547), showed luminous efficiency of 3 cd/A at 7.7 V, and relatively good color coordinate of (0.15, 0.11), but it was applied as a material for single layer, being inappropriate for practical use. The compound TSF reported by Taiwan National University (Wu, C.-C. et al., Advanced Materials, 2004, 16, 61; US Patent Publication US 2005040392) showed relatively good external quantum efficiency of 5.3%, but it was still inappropriate for practical use. The compound BTP reported by Chingwha National University of Taiwan (Cheng, C.-H. et al., Advanced Materials, 2002, 14, 1409; US Patent Publication US 2004076852) showed luminous efficiency of 2.76 cd/A and relatively good color coordinate of (0.16, 0.14), but this was still insufficient for practical use.

As described above, conventional materials are constituted of a single layer, not forming a host-dopant thin layer, and is difficult to be used practically from the aspect of color purity and efficiency. There are not enough data reliable, with respect to its long life.

In the meanwhile, according to a patent application of Mitsui Chemicals (Japan) (US Patent Publication U.S. Pat. No. 7,166,240), the compounds shown below have the absorption spectra at 390 to 430 nm, with luminous efficiency of 4.6 cd/A. However, on the basis of these data, the compounds with above absorption wavelength range, electroluminescence of greenish blue color is anticipated, and the Patent Publication indicates the color as bluish green color.

Particularly, embodiment of pure blue color is impossible with the symmetrical structure of the Patent Publication, and the material, which cannot provide pure blue luminescence, is inadequate to be practically applied to a full-colored display.

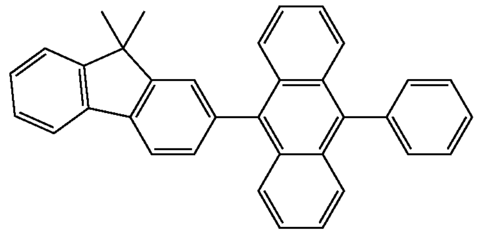

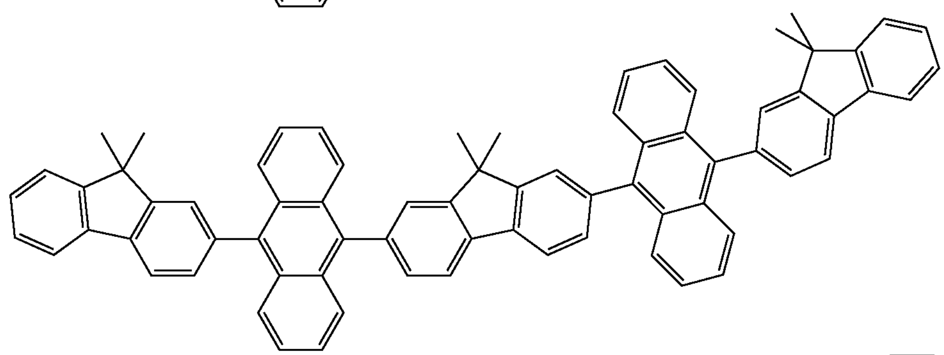

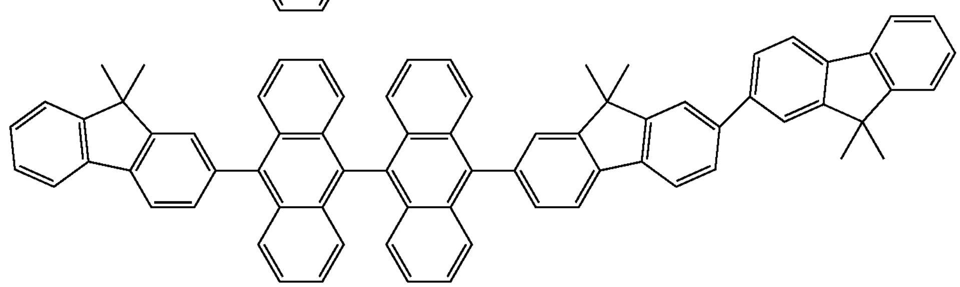

SUMMARY OF THE INVENTION

With intensive efforts to overcome the problems of conventional techniques as described above, the present inventors have invented novel electroluminescent compounds to realize an organic electroluminescent device having excellent luminous efficiency and surprisingly improved lifetime.

The object of the present invention is to provide organic electroluminescent compounds having the backbone to give more excellent luminous efficiency, longer device life and appropriate color coordinate, as compared to those of conventional host materials, with overcoming disadvantages of them.

Another object of the invention is to provide organic electroluminescent devices of high efficiency and long life, which employ said organic electroluminescent compounds as electroluminescent material.

Still another object of the invention is to provide organic solar cells comprising said organic electroluminescent compounds.

Thus, the present invention relates to organic electroluminescent compounds represented by Chemical Formula (1), and organic electroluminescent devices comprising the same. Since the organic electroluminescent compounds according to the invention have good luminous efficiency and excellent color purity and life property of material, OLED's having very good operation life can be manufactured therefrom:

Chemical Formula 1

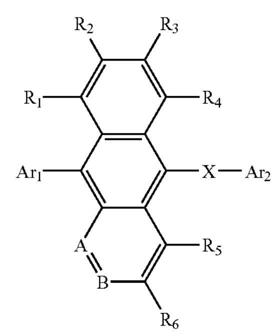

In Chemical Formula (1), A and B independently represent $CR_7$ or N, provided that both A and B cannot be $CR_7$ or N at the same time;

X is O or S;

$R_1$ through $R_7$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60) arylsilyl, tri(C6-C60)arylsilyl, adamantyl, (C7-C60)bicycloalkyl, (C2-C60)alkenyl, (C2-C60)alkynyl, (C1-C60) alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkoxycarbonyl, carboxyl, nitro or hydroxyl, or $R_3$ and $R_4$ or $R_5$ and $R_6$ may be linked via (C3-C60)alkylene or (C3-C60)alkenylene to form a fused ring; the alkylene or alkenylene may be further substituted by one or more substituent(s) selected from deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri (C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60) alkoxycarbonyl, carboxyl, nitro and hydroxyl;

$Ar_1$ and $Ar_2$ independently represent (C6-C60)aryl, (C3-C60)heteroaryl, 5- or 6-membered heterocycloalkyl containing one or more heteroatom(s) selected from N, O and S, (C3-C60)cycloalkyl, adamantyl, (C7-C60)bicycloalkyl, or a substituent selected from the following structures:

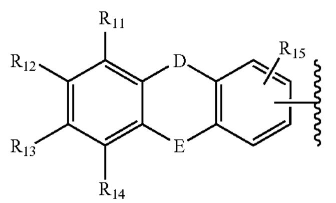

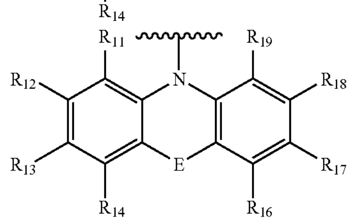

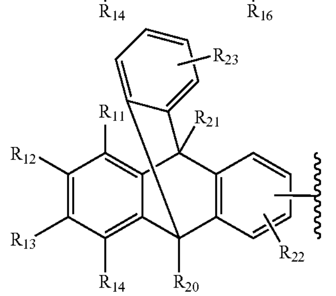

wherein, $R_{11}$ through $R_{23}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60) arylamino, (C6-C60)ar(C1-C60)alkyl, (C6-C60)aryloxy, (C6-C60)arylthio, (C1-C60)alkoxycarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, or a monocyclic or polycyclic aromatic ring;

D and E independently represent a chemical bond, —$(CR_{31}R_{32})_a$—, —$N(R_{33})$—, —S—, —O—, —$Si(R_{34})(R_{35})$—, —$P(R_{36})$—, —C(=O)—, —$B(R_{37})$—, —$In(R_{38})$—, —Se—, —$Ge(R_{39})(R_{40})$—, —$Sn(R_{41})(R_{42})$—, —$Ga(R_{43})$— or —$(R_{44})C{=}C(R_{45})$—;

$R_{31}$ through $R_{45}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60) arylsilyl, tri(C6-C60)arylsilyl, adamantyl, (C7-C60)bicycloalkyl, (C2-C60)alkenyl, (C2-C60)alkynyl, (C1-C60) alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkoxycarbonyl, carboxyl, nitro or hydroxyl, or $R_{31}$, and $R_{32}$, $R_{34}$ and $R_{35}$, $R_{39}$ and $R_{40}$, $R_{41}$ and $R_{42}$ or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_1$ through $R_7$, $Ar_1$, $Ar_2$, $R_{11}$ through $R_{23}$ and $R_{31}$ through $R_{45}$ may be further substituted by deuterium, halogen, (C1-C60) alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60) alkylsilyl, di(C1-C60)alkyl(C6-C60)arylsilyl, tri(C6-C60) arylsilyl, adamantyl, (C7-C60)bicycloalkyl, (C2-C60)alkenyl, (C2-C60)alkynyl, (C1-C60)alkoxy, cyano, (C1-C60) alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; and a is an integer from 1 to 4.

DETAILED DESCRIPTION OF THE INVENTION

Figure 1:
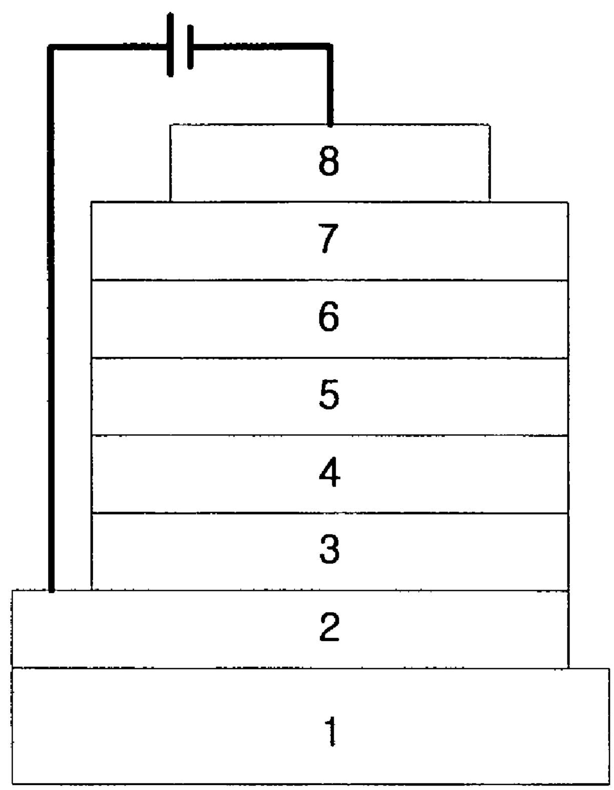
FIG. 1 is a cross-sectional view of an OLED.

Referring now to the Drawings, FIG. 1 illustrates a cross-sectional view of an OLED of the present invention comprising a Glass 1, Transparent electrode 2, Hole injecting layer 3, Hole transport layer 4, Electroluminescent layer 5, Electron transport layer 6, Electron injecting layer 7 and Al cathode 8.

The term "alkyl" includes saturated linear or branched monovalent hydrocarbon radicals consisting only of carbon atoms and hydrogen atoms, or combinations thereof. The term "alkoxy" means —O-alkyl groups, wherein the "alkyl" is defined as above.

The term "aryl" described herein means an organic radical derived from aromatic hydrocarbon via elimination of one hydrogen atom. Each ring suitably comprises a monocyclic or fused ring system containing from 4 to 7, preferably from 5 to 6 cyclic atoms. Further, "aryl" includes the structures wherein more than one aryls are bonded via chemical bond(s). Specific examples include phenyl, naphthyl, biphenyl, anthryl, indenyl, fluorenyl, phenanthryl, triphenylenyl, pyrenyl, perylenyl, chrysenyl, naphthacenyl and fluoranthenyl, but they are not restricted thereto.

The naphthyl of the compounds according to the invention may be 1-naphthyl or 2-naphthyl; the anthryl may be 1-anthryl, 2-anthryl or 9-anthryl; and the fluorenyl may be 1-fluorenyl, 2-fluorenyl, 3-fluorenyl, 4-fluorenyl or 9-fluorenyl.

The term "heteroaryl" described herein means an aryl group containing from 1 to 4 heteroatom(s) selected from N, O and S for the aromatic cyclic backbone atoms, and carbon atom(s) for remaining aromatic cyclic backbone atoms. The heteroaryl may be a 5- or 6-membered monocyclic heteroaryl or a polycyclic heteroaryl which is fused with one or more benzene ring(s), and may be partially saturated. Further, "heteroaryl" includes the structures wherein more than one heteroaryls are bonded via chemical bond(s). The heteroaryl groups may include divalent aryl groups of which the heteroatoms are oxidized or quarternized to form N-oxides, quaternary salts, or the like. Specific examples include monocyclic heteroaryl groups such as furyl, thiophenyl, pyrrolyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl; polycyclic heteroaryl groups such as benzofuranyl, benzothiophenyl, isobenzofuranyl, benzimidazolyl, benzothiazolyl, benzisothiazolyl, benzisoxazolyl, benzoxazolyl, isoindolyl, indolyl, indazolyl, benzothiadiazolyl, quinolyl, isoquinolyl, cinnolinyl, quinazolinyl, quinoxalinyl, carbazolyl, phenanthridinyl and benzodioxolyl; and corresponding N-oxides (for example, pyridyl N-oxide, quinolyl N-oxide) and quaternary salts thereof; but they are not restricted thereto.

The substituents comprising "(C1-C60)alkyl" moiety described herein may contain 1 to 60 carbon atoms, 1 to 20 carbon atoms, or 1 to 10 carbon atoms. The substituents comprising "(C6-C60)aryl" moiety may contain 6 to 60 carbon atoms, 6 to 20 carbon atoms, or 6 to 12 carbon atoms. The substituents comprising "(C3-C60)heteroaryl" moiety may contain 3 to 60 carbon atoms, 4 to 20 carbon atoms, or 4 to 12 carbon atoms. The substituents comprising "(C3-C60)cycloalkyl" moiety may contain 3 to 60 carbon atoms, 3 to 20 carbon atoms, or 3 to 7 carbon atoms. The substituents comprising "(C2-C60)alkenyl or alkynyl" moiety may contain 2 to 60 carbon atoms, 2 to 20 carbon atoms, or 2 to 10 carbon atoms.

The organic electroluminescent compound according to the invention may be exemplified by the compounds represented by one of Chemical Formulas (2) to (4):

Chemical Formula 2

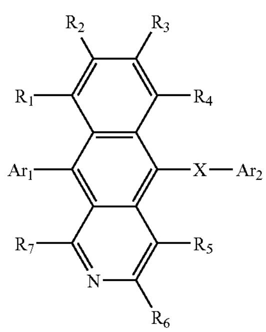

Chemical Formula 3

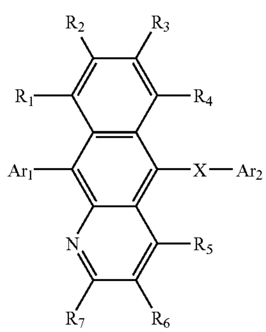

-continued

Chemical Formula 4

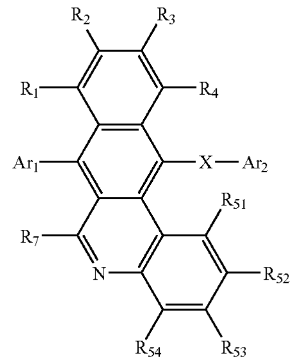

wherein, $Ar_1$, $Ar_2$, X and $R_1$ through $R_7$ are defined as in Chemical Formula (1); and $R_{51}$ through $R_{54}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_{52}$ and $R_{53}$ may be linked via (C3-C60)alkylene or (C3-C60)alkenylene with or without a fused ring to form an alicyclic ring, or a monocyclic or polycyclic aromatic ring.

In the chemical formulas, $R_1$ through $R_7$ independently represent hydrogen, deuterium, chloro, fluoro, methyl, ethyl, n-propyl, i-propyl, n-butyl, i-butyl, t-butyl, n-pentyl, i-pentyl, n-hexyl, n-heptyl, n-octyl, 2-ethylhexyl, n-nonyl, decyl, dodecyl, hexadecyl, benzyl, trifluoromethyl, perfluoroethyl, trifluoroethyl, perfluoropropyl, perfluorobutyl, methoxy, ethoxy, n-propoxy, i-propoxy, n-butoxy, i-butoxy, t-butoxy, n-pentoxy, i-pentoxy, n-hexyloxy, n-heptoxy, cyclopropyl, cyclobutyl, cyclopentyl, cyclohexyl, cycloheptyl, cyclooctyl, cyclononyl, cyclodecyl, morpholino, thiomorpholino, phenyl, naphthyl, biphenyl, fluorenyl, phenanthryl, anthryl, fluoranthenyl, triphenylenyl, pyrenyl, chrysenyl, naphthacenyl, perylenyl, spirobifluorenyl, pyridyl, pyrrolyl, furanyl, thiophenyl, imidazolyl, benzimidazolyl, pyrazinyl, pyrimidinyl, pyridazinyl, quinolyl, triazinyl, benzofuranyl, benzothiophenyl, pyrazolyl, indolyl, carbazolyl, thiazolyl, oxazolyl, benzothiazolyl, benzoxazolyl, phenanthrolinyl, trimethylsilyl, triethylsilyl, tripropylsilyl, tri(t-butyl)silyl, t-butyldimethylsilyl, dimethylphenylsilyl, triphenylsilyl, adamantyl, bicyclo[2.2.1]heptyl, bicyclo[2.2.2]octyl, bicyclo[3.2.1]octyl, bicyclo[5.2.0]nonyl, bicyclo[4.2.2]decyl, bicyclo[2.2.2]octyl, 4-pentylbicyclo[2.2.2]octyl, ethenyl, phenylethenyl, ethynyl, phenylethynyl, cyano, dimethylamino, diphenylamino, monomethylamino, monophenylamino, phenyloxy, phenylthio, methoxycarbonyl, ethoxycarbonyl, t-butoxycarbonyl, carboxyl, nitro or hydroxyl.

In the formulas, $Ar_1$ and $Ar_2$ are independently selected from the following structures, but they are not restricted thereto:

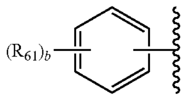
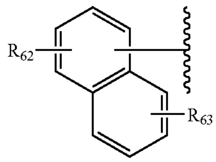
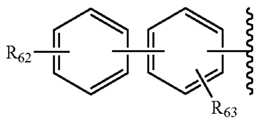
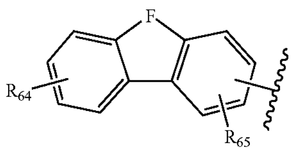
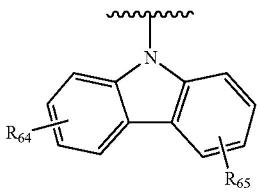
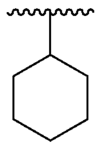
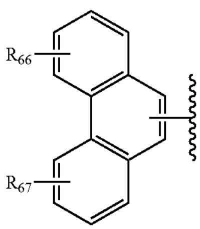
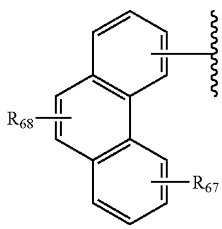
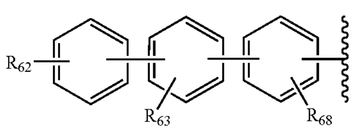
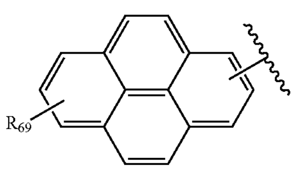
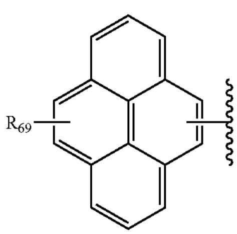
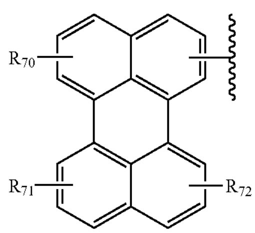
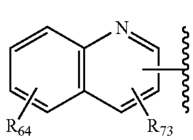
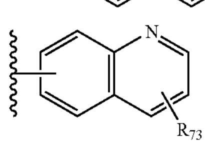
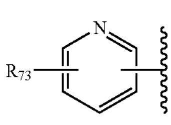
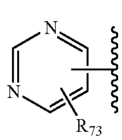
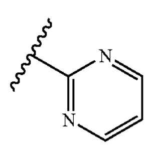
-continued
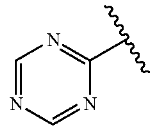
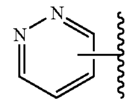
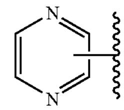
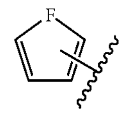
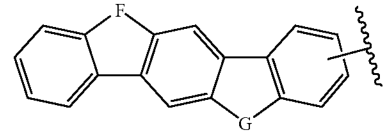
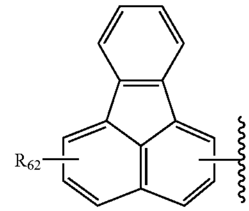
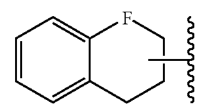
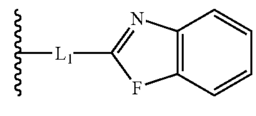
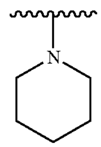
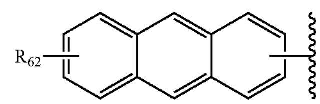
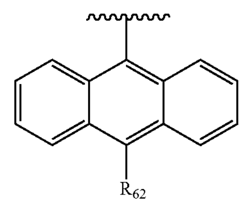
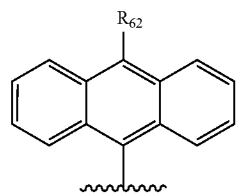
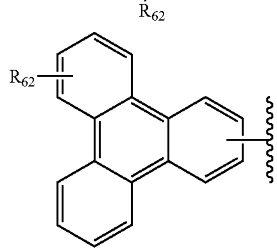
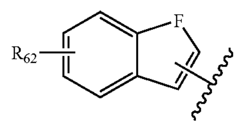
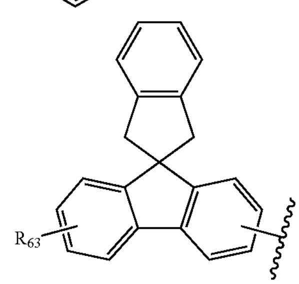
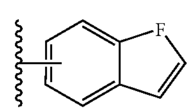
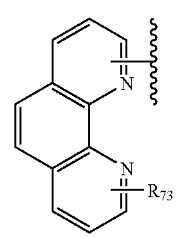
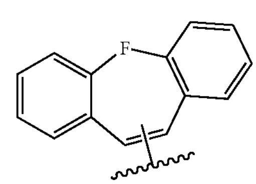

-continued

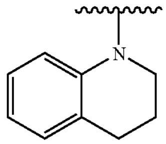

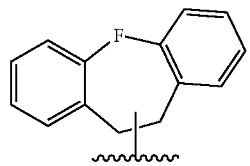

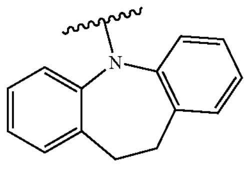

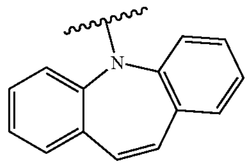

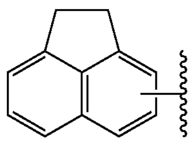
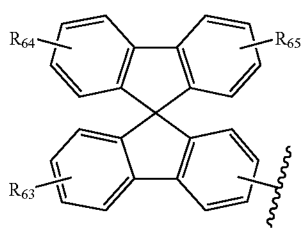

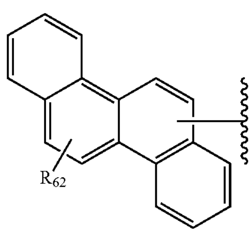

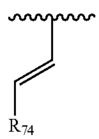

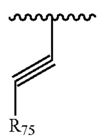

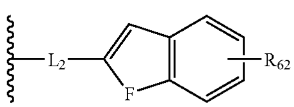

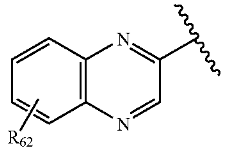

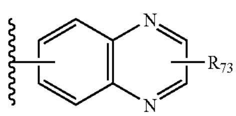

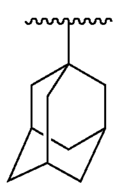
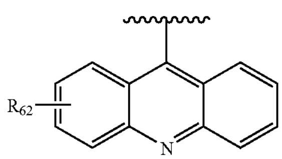

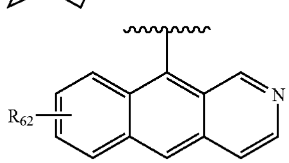

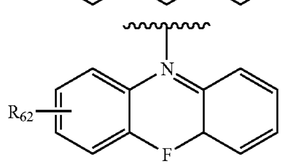

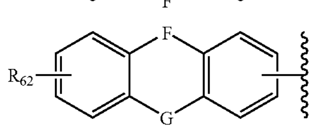

-continued

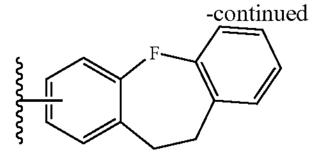

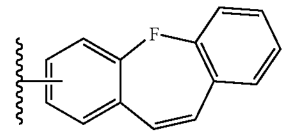

wherein, $R_{61}$ through $R_{75}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60) arylamino, (C6-C60)ar(C1-C60)alkyl, (C6-C60)aryloxy, (C6-C60)arylthio, (C1-C60)alkoxycarbonyl, carboxyl, nitro or hydroxyl; the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_{61}$ through $R_{75}$ may be further substituted by deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri (C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60) alkoxycarbonyl, carboxyl, nitro or hydroxyl;

$L_1$ and $L_2$ independently represent a chemical bond, (C6-C60)arylene or (C3-C60)heteroarylene; the arylene or heteroarylene of $L_1$ and $L_2$ may be further substituted by one or more substituent(s) selected from deuterium, (C1-C60)alkyl, halogen, cyano, (C1-C60)alkoxy, (C3-C60)cycloalkyl, (C6-C60)aryl, (C3-C60)heteroaryl, adamantyl, (C7-C60)bicycloalkyl, cyano, (C1-C60)alkylamino, (C6-C60)arylamino, (C6-C60)ar(C1-C60)alkyl, (C6-C60)aryloxy, (C6-C60) arylthio, (C1-C60)alkoxycarbonyl, carboxyl, nitro, hydroxyl, tri(C1-C30)alkylsilyl, di(C1-C30)alkyl(C6-C30)arylsilyl and tri(C6-C30)arylsilyl;

F and G independently represent a chemical bond, —$(CR_{81})(R_{82})$—, —$N(R_{83})$—, —S—, —O—, —Si $(R_{84})(R_{85})$—, —$P(R_{86})$—, —C(═O)—, —$B(R_{87})$—, —In $(R_{88})$—, —Se—, —$Ge(R_{89})(R_{90})$—Sn $(R_{91})(R_{92})$— or —$Ga(R_{93})$—;

$R_{81}$ through $R_{93}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60) arylsilyl, tri(C6-C60)arylsilyl, adamantyl, (C7-C60)bicycloalkyl, (C2-C60)alkenyl, (C2-C60)alkynyl, (C1-C60) alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkoxycarbonyl, carboxyl, nitro or hydroxyl; or $R_{81}$ and $R_{82}$, $R_{84}$ and $R_{85}$, $R_{89}$ and $R_{90}$, or $R_{91}$ and $R_{92}$ may be linked via (C3-C60)alkylene or (C3-C60) alkenylene with or without a fused ring to form an alicyclic ring, or a monocyclic or polycyclic aromatic ring; and b is an integer from 1 to 5.
More specifically, $Ar_1$ and $Ar_2$ are independently selected from the following structures, but not restricted thereto:
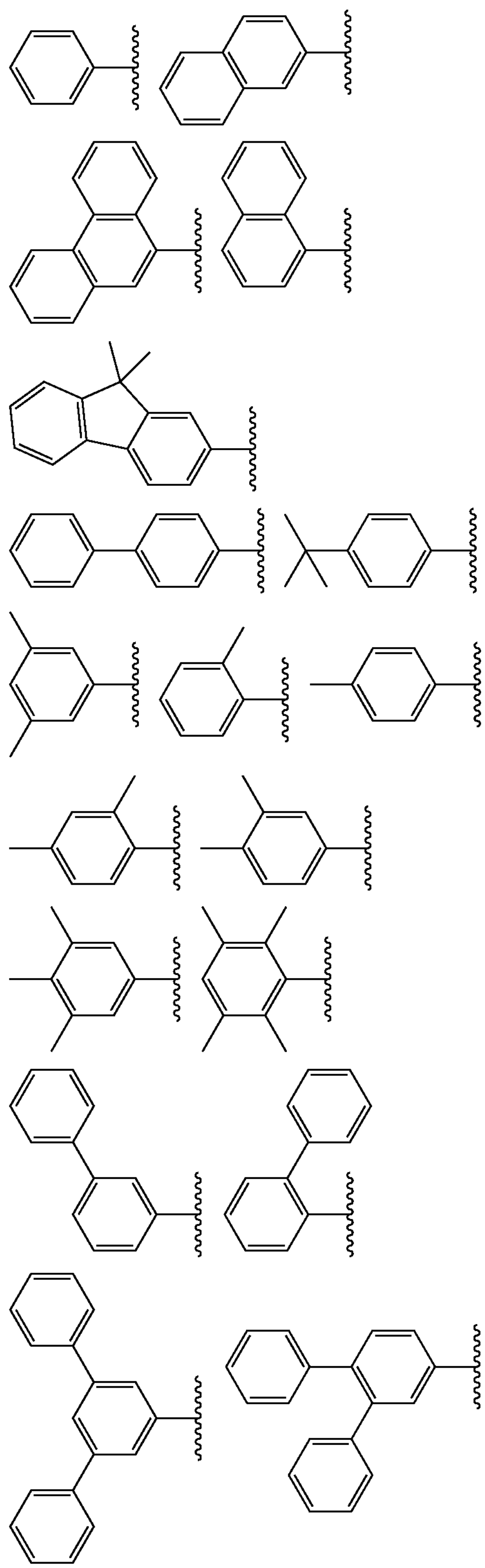
-continued
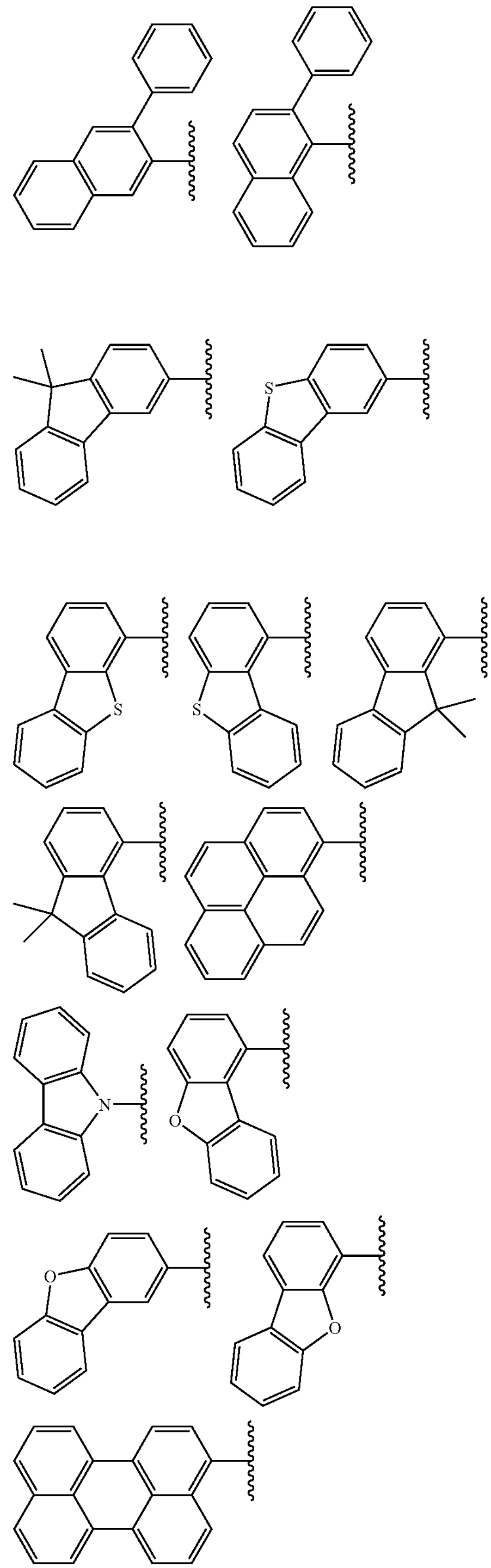

-continued
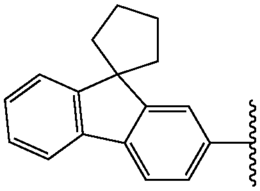
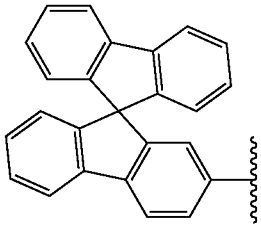
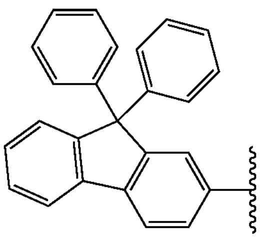
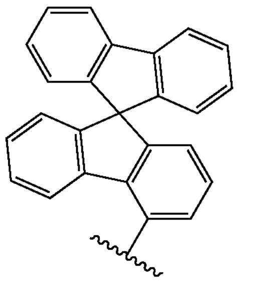
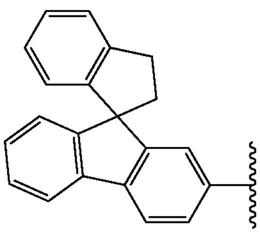
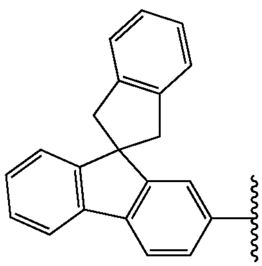
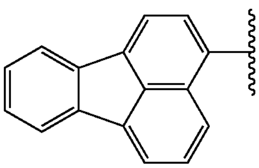
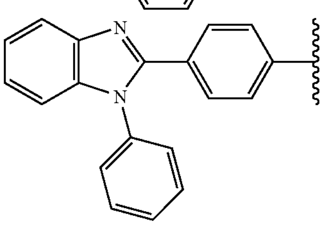
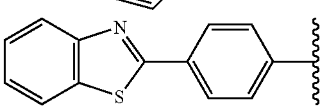
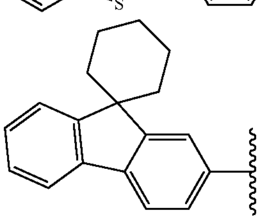
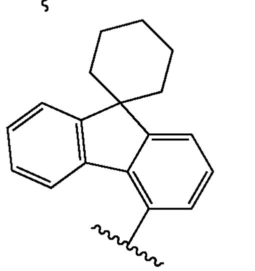
-continued
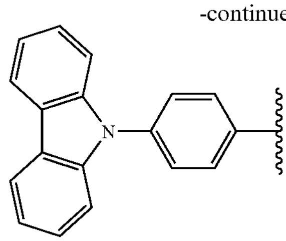
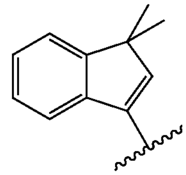
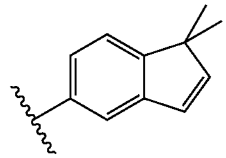
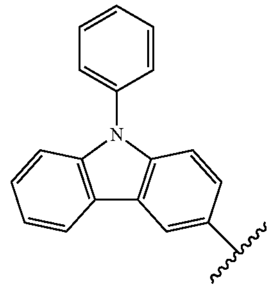
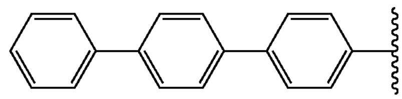
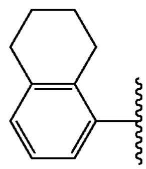
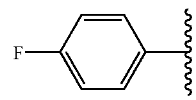
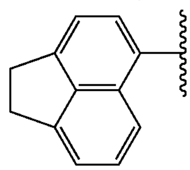
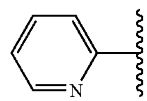
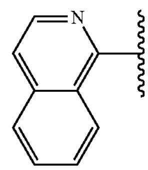
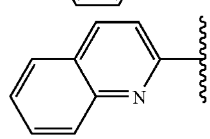
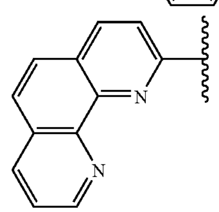
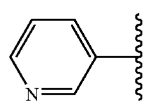
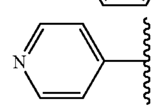
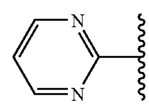
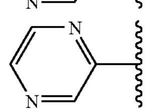
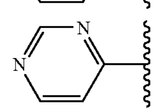
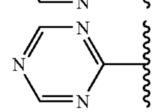
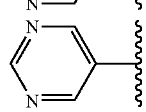
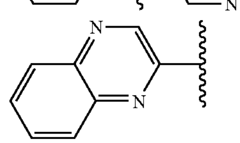
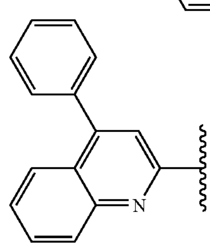
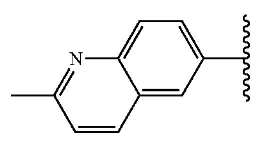

-continued
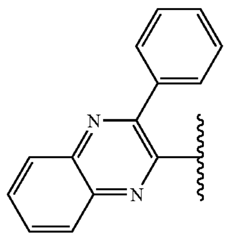
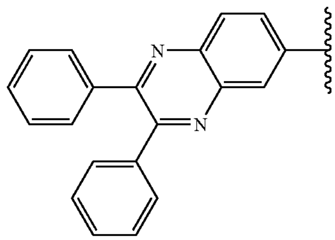
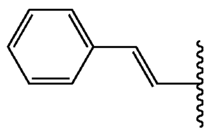
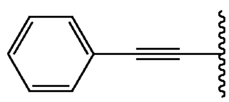
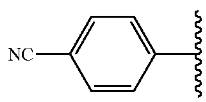
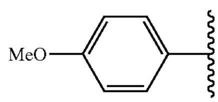
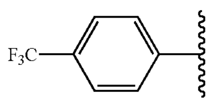
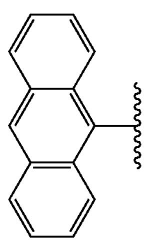
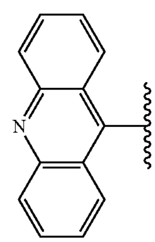
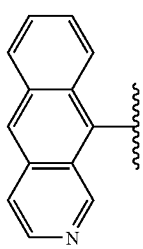
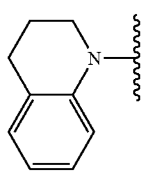
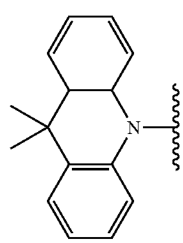
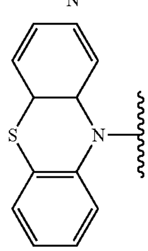
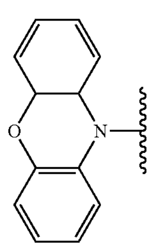
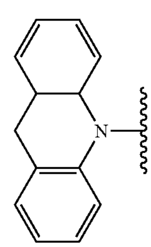
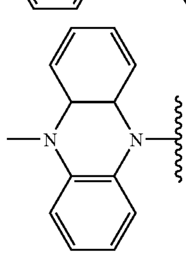
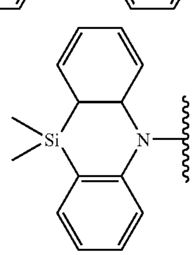
-continued
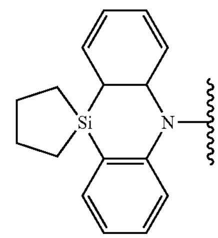
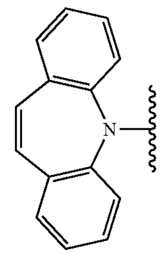
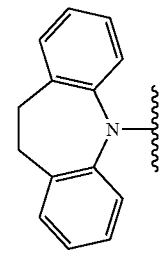
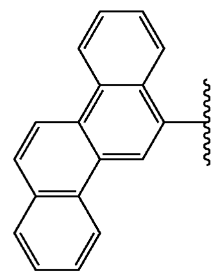
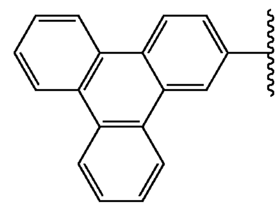
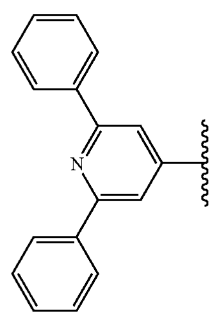
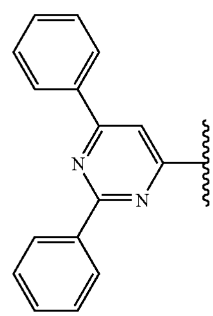
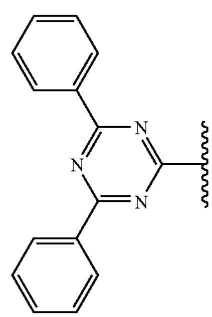
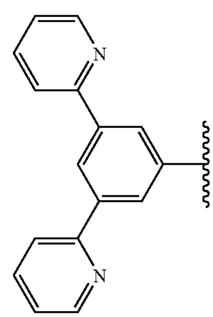
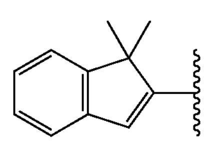
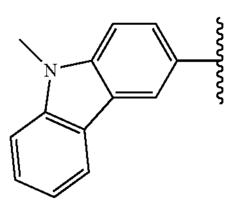
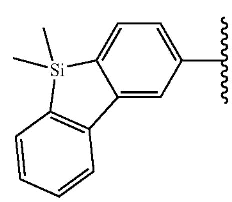
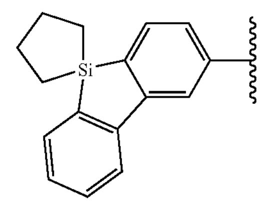

-continued
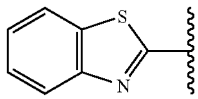
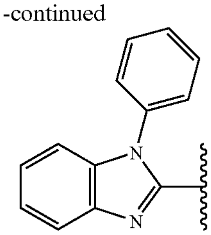
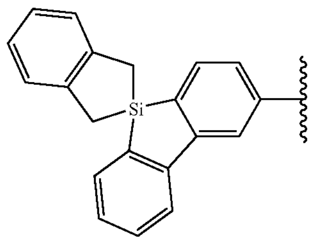
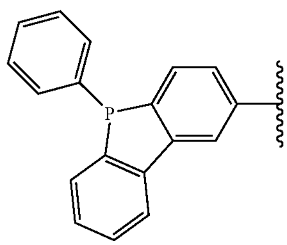
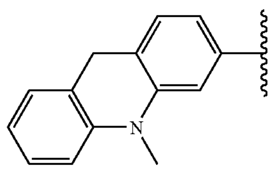
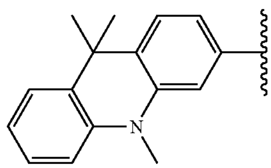
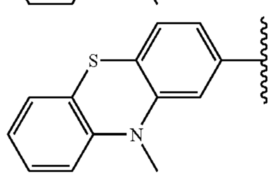
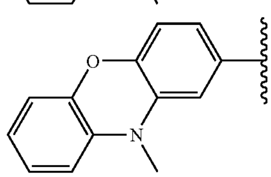
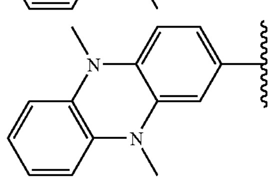
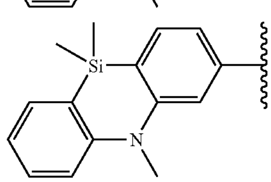
-continued
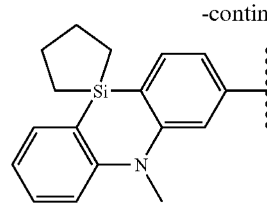
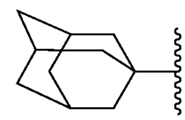
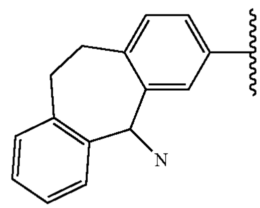
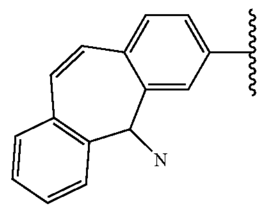
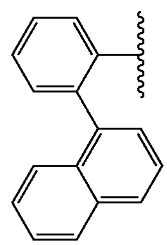
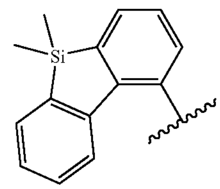
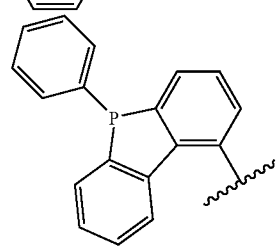
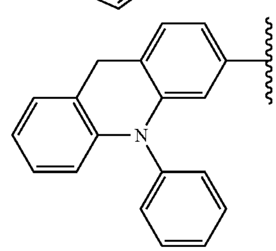
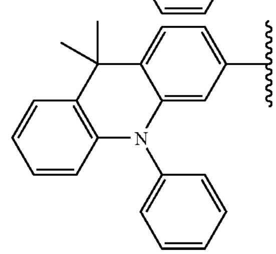
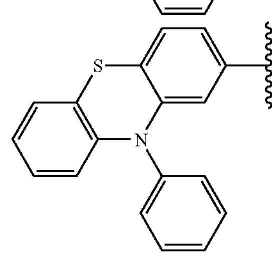

-continued
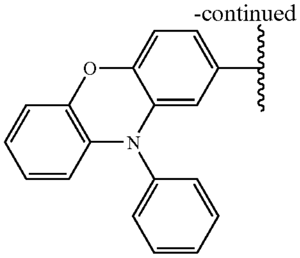
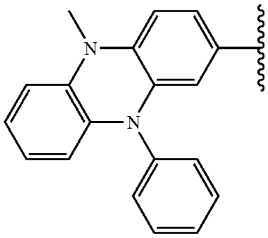
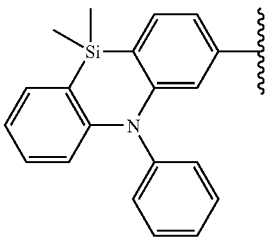
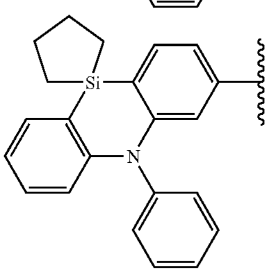
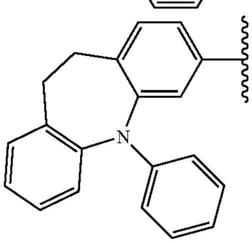
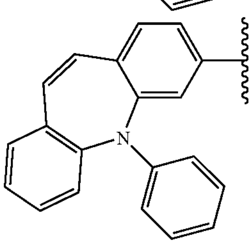
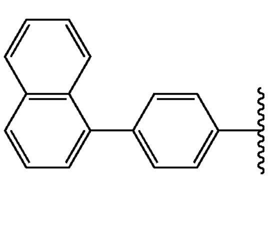
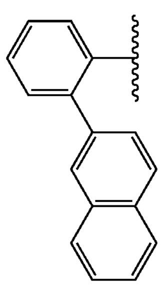
-continued
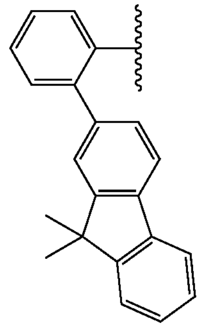
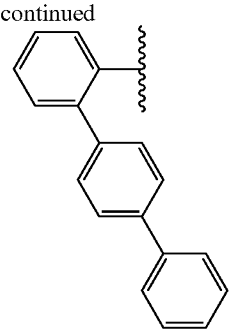
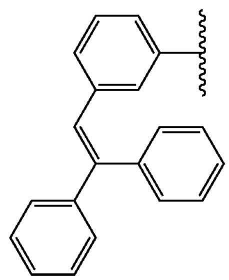
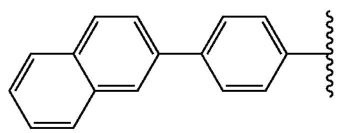
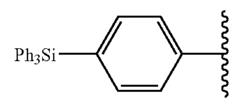
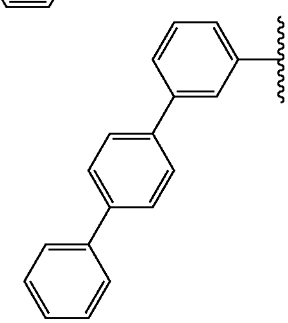
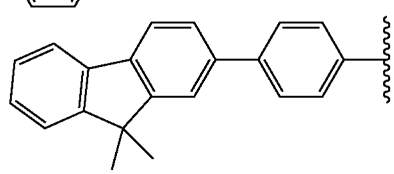
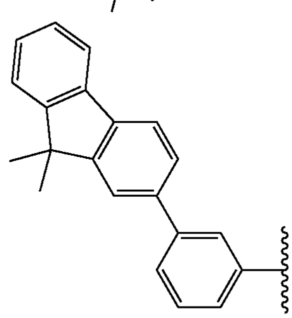

-continued
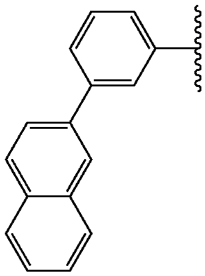
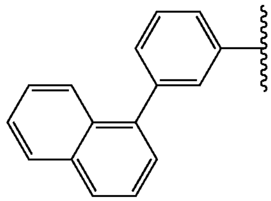
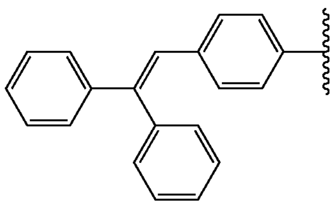
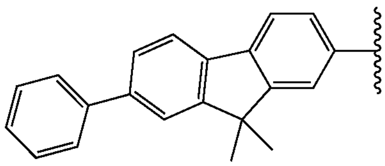
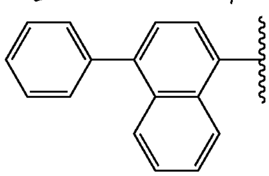
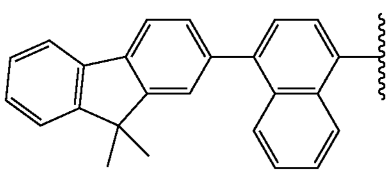
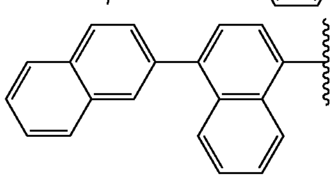
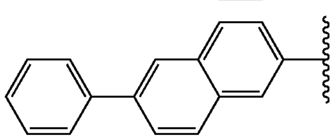
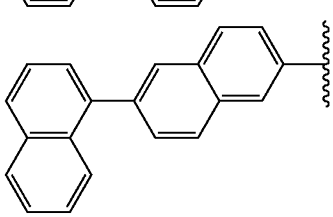
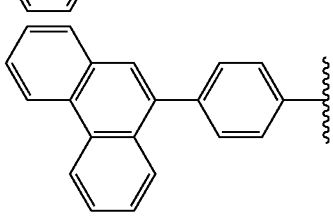
-continued
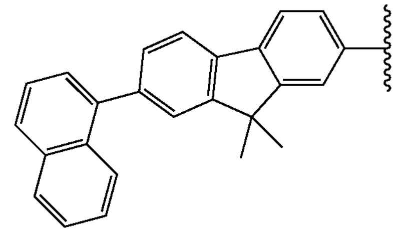
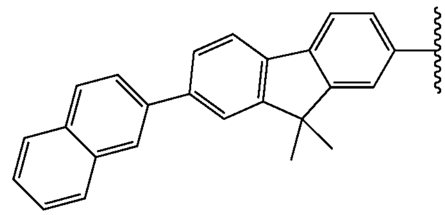
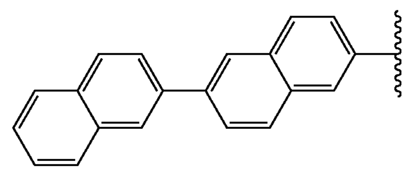
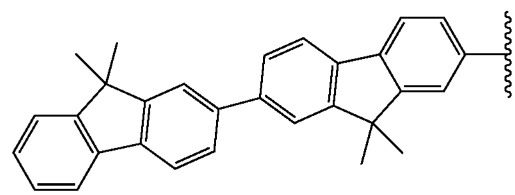
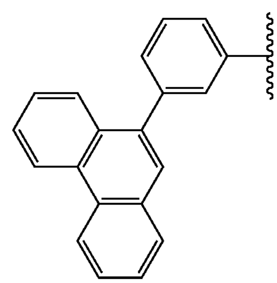
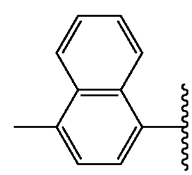
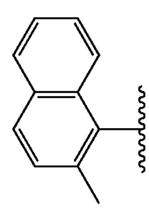
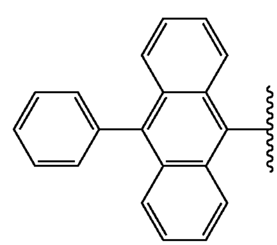
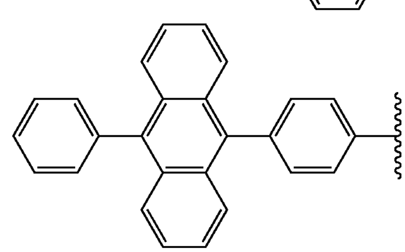
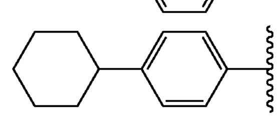
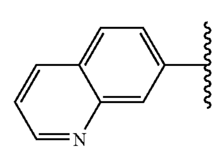

-continued
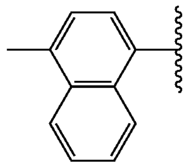
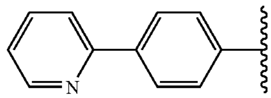
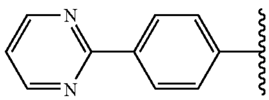
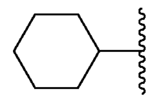
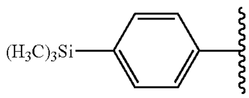
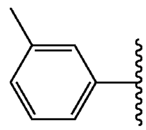
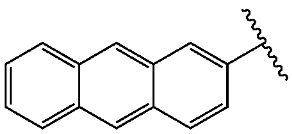
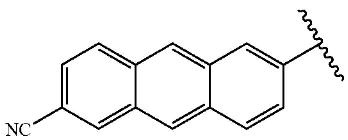
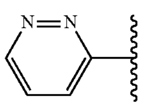
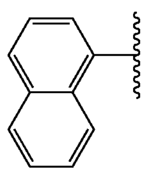
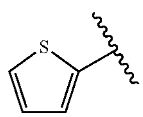
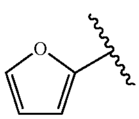
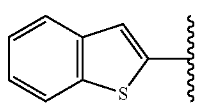
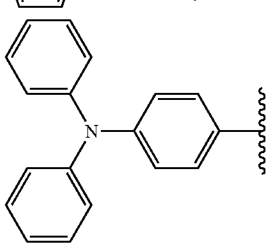
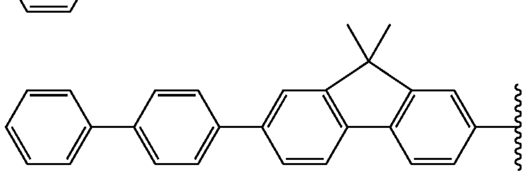
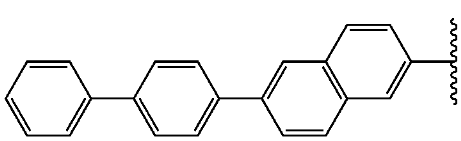
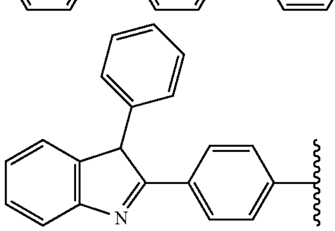
-continued
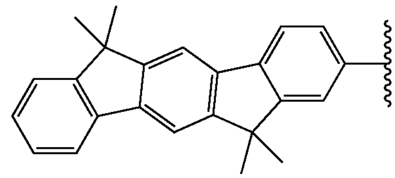
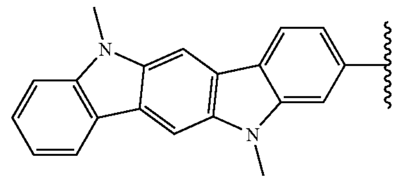
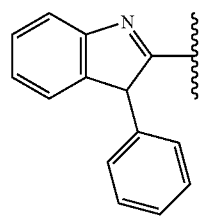
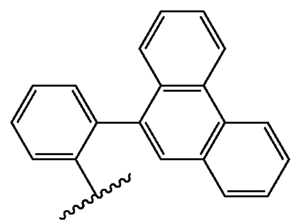
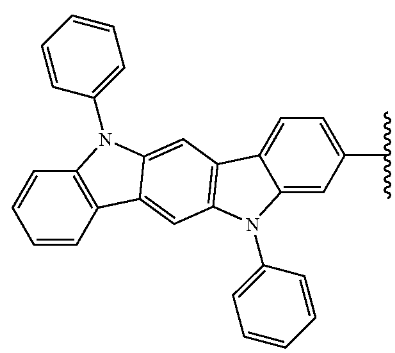
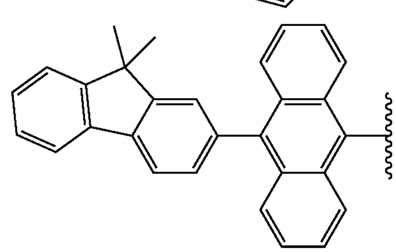
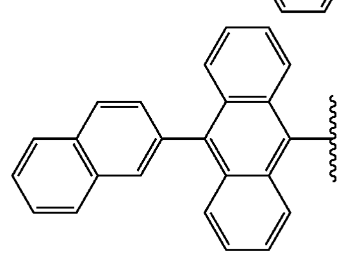

-continued
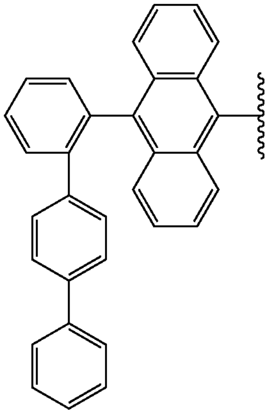
More specifically, the organic electroluminescent compounds according to the present invention can be specifically exemplified by the following compounds, but they are not restricted thereto:
1
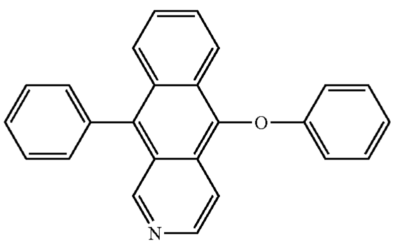
2
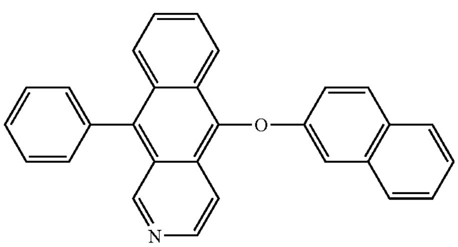
3
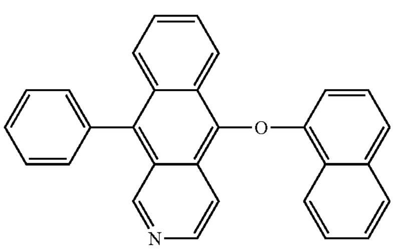
4
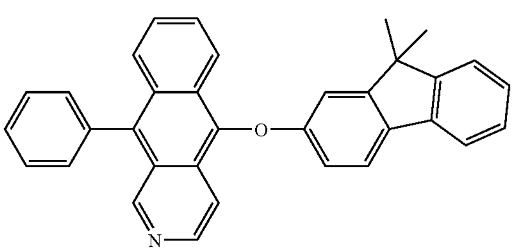
-continued
5
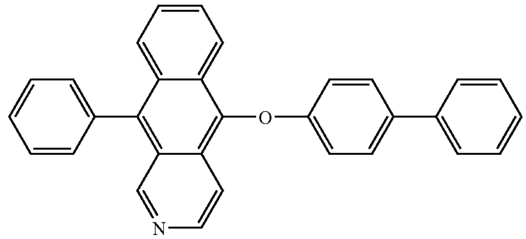
6
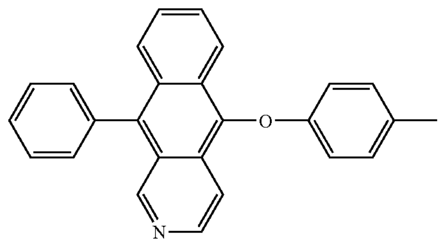
7
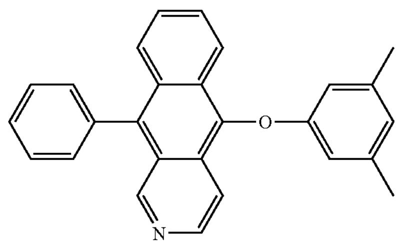
8
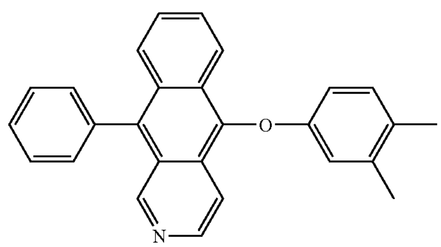
9
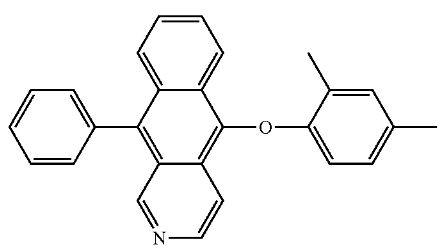
10
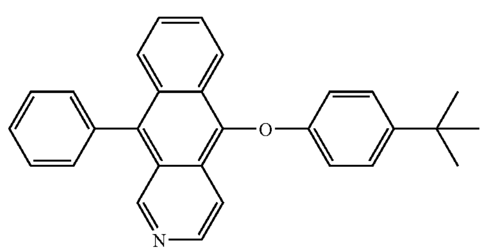

-continued
11
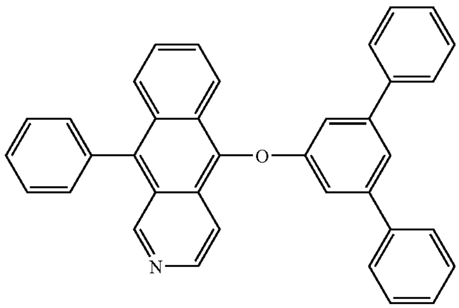
12
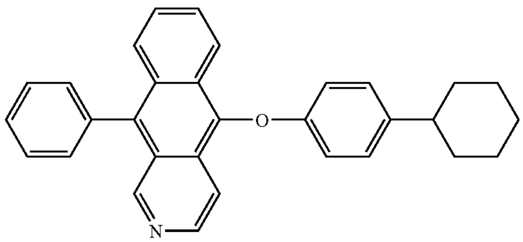
13
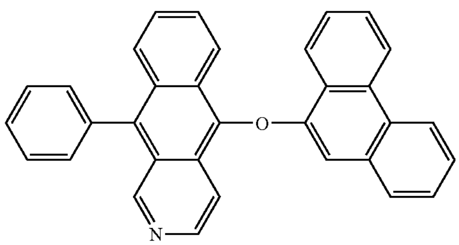
14
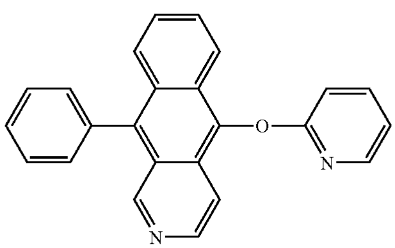
15
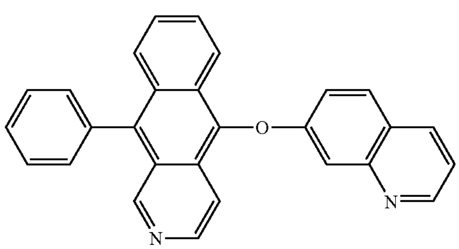
16
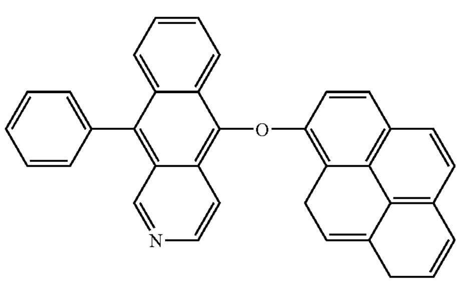
-continued
17
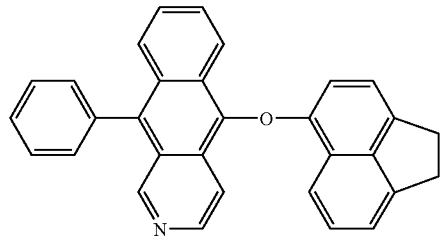
18
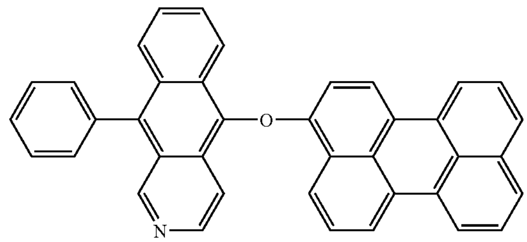
19
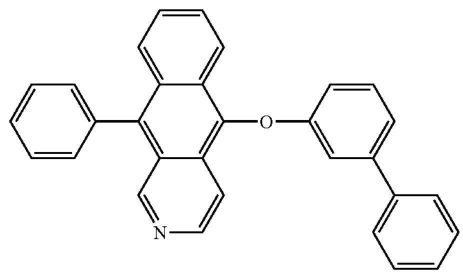
20
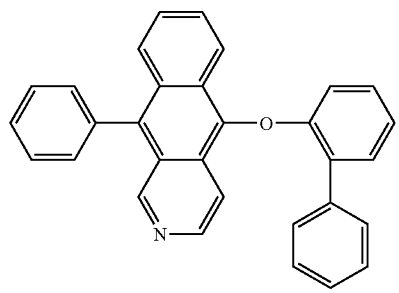
21
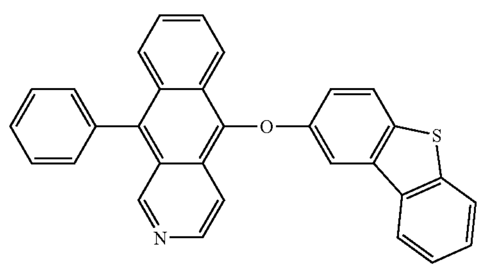
22
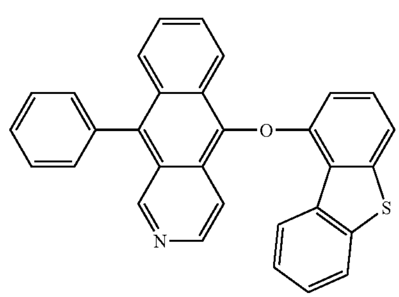

-continued
23
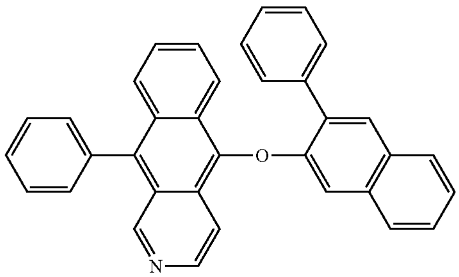
24
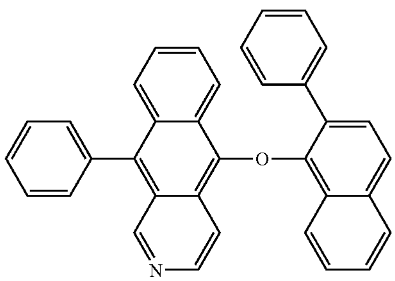
25
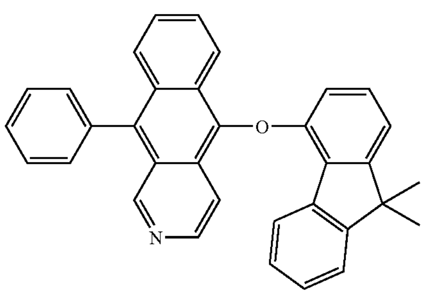
26
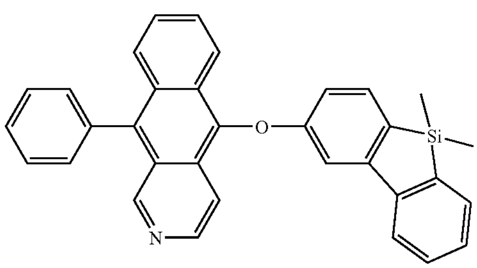
27
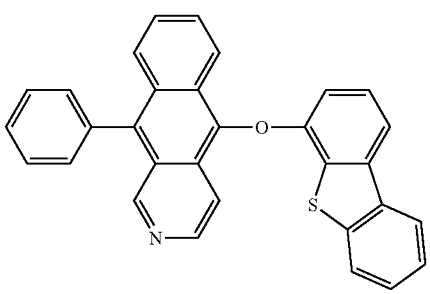
-continued
28
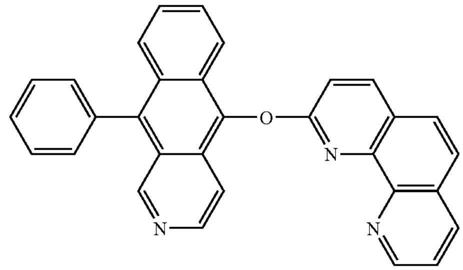
29
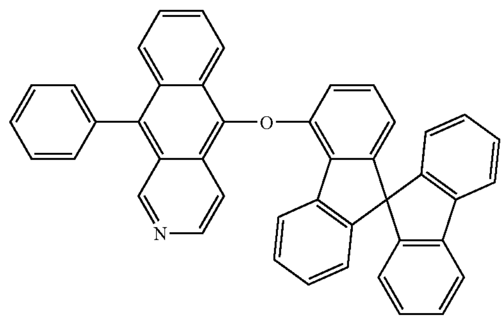
30
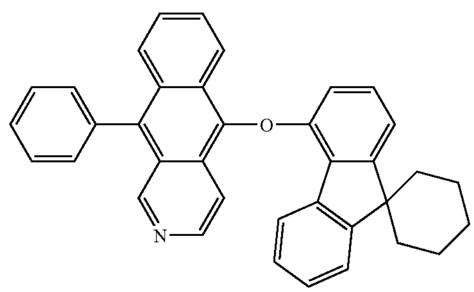
31
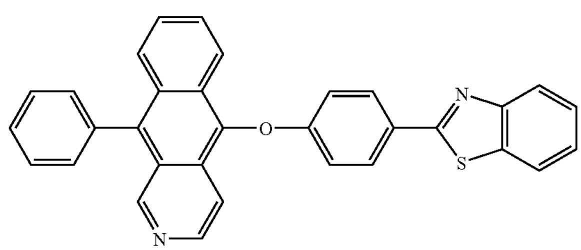
32
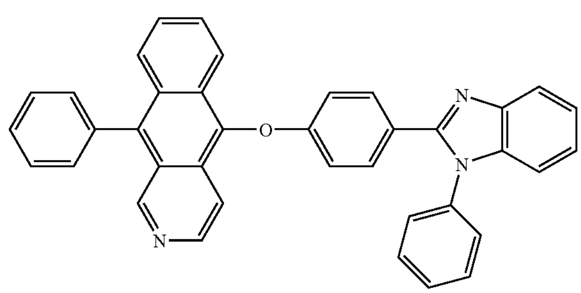

-continued
33
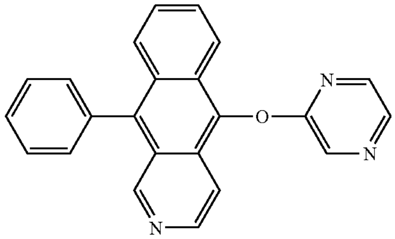
34
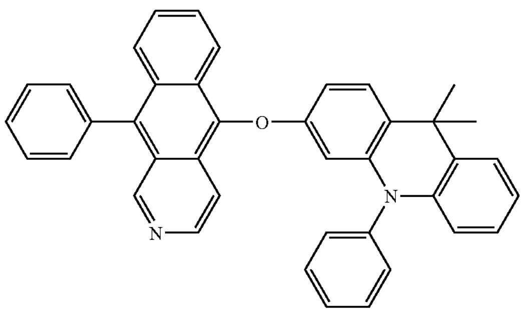
35
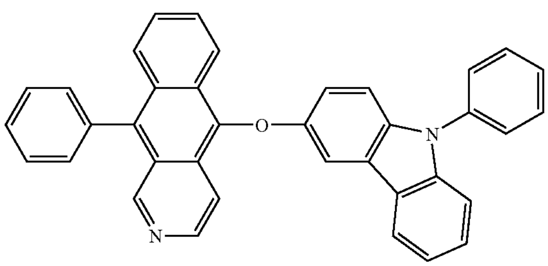
36
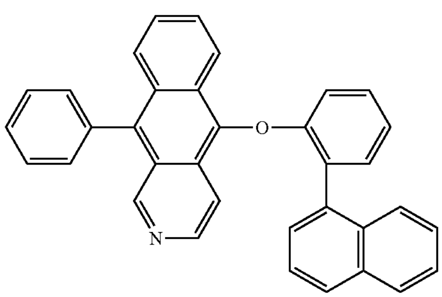
37
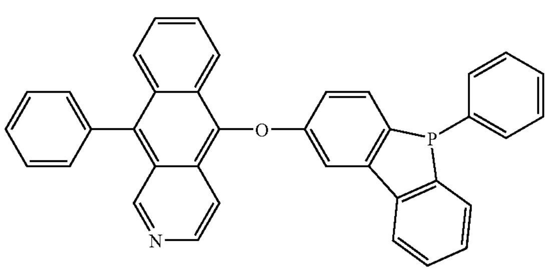
-continued
38
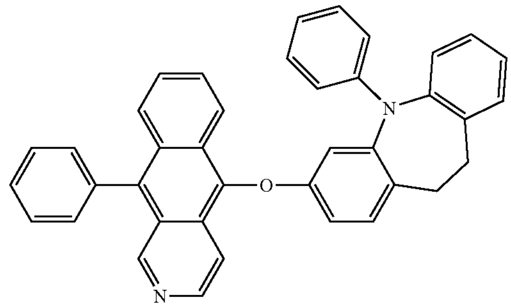
39
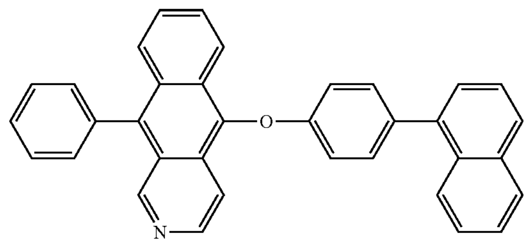
40
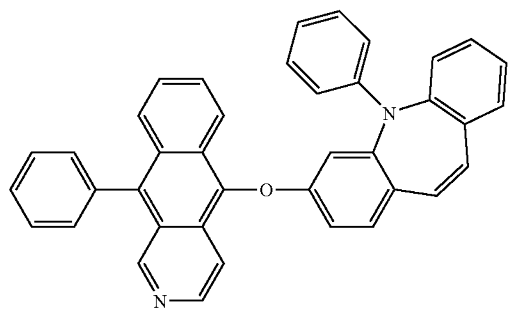
41
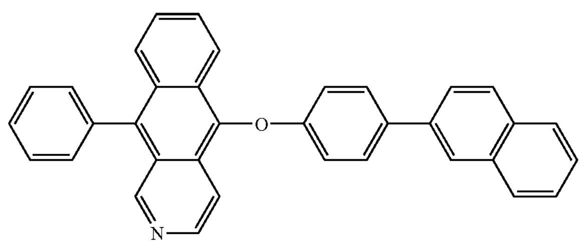
42
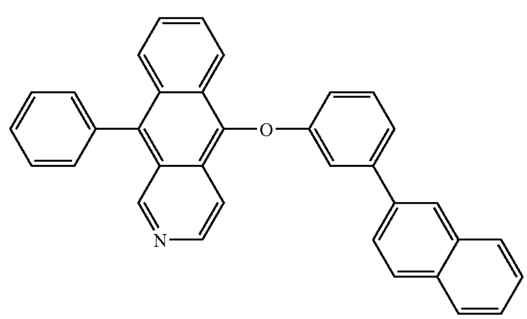

-continued
43
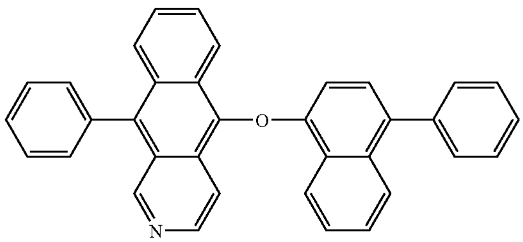
44
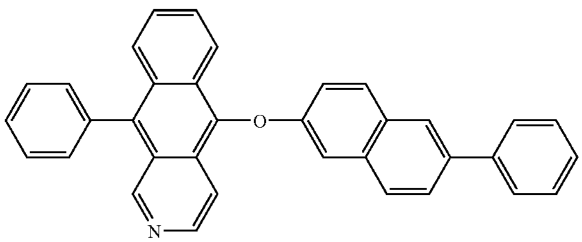
45
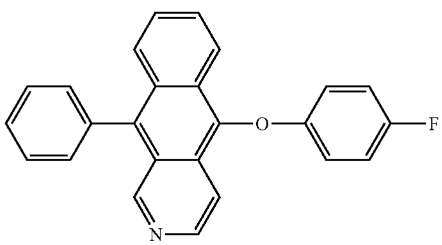
46
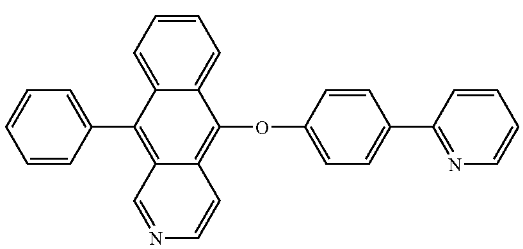
47
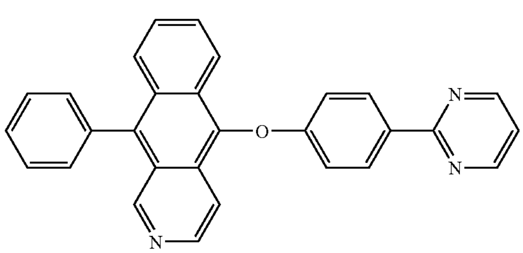
48
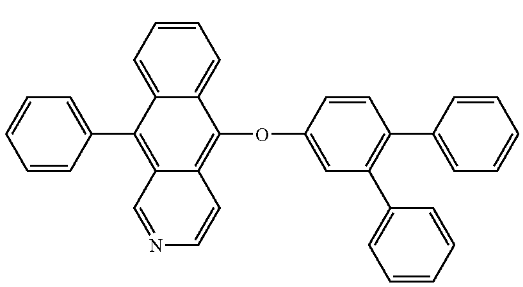
-continued
49
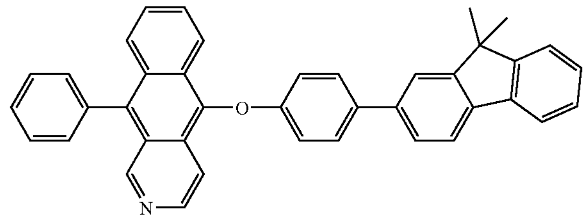
50
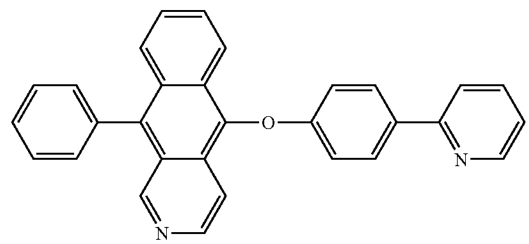
51
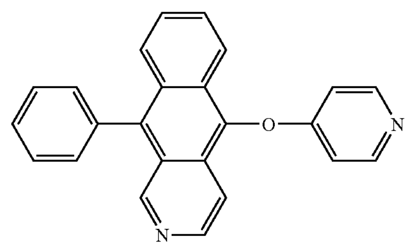
52
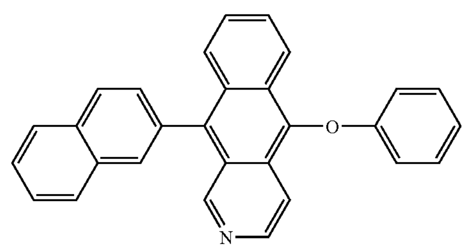
53
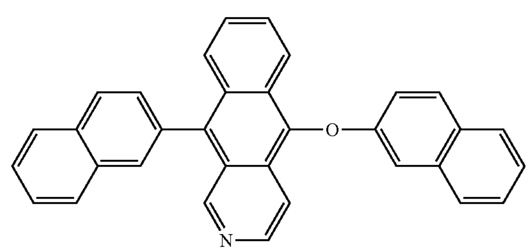
54
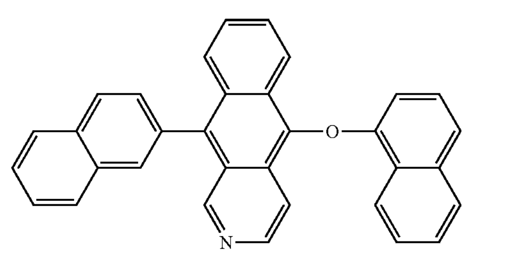

-continued
55
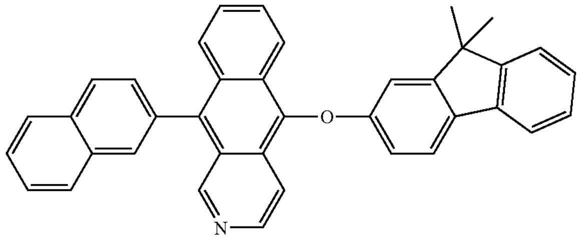
56
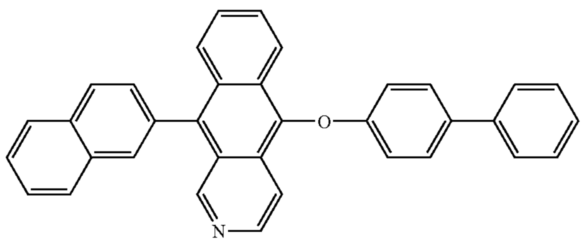
57
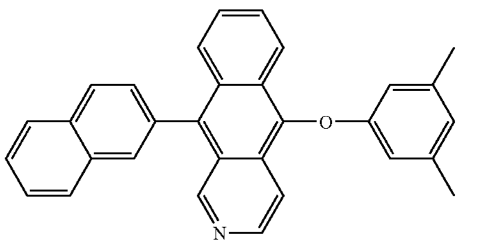
58
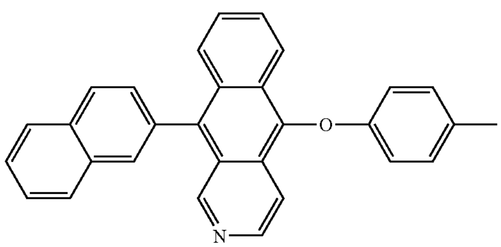
59
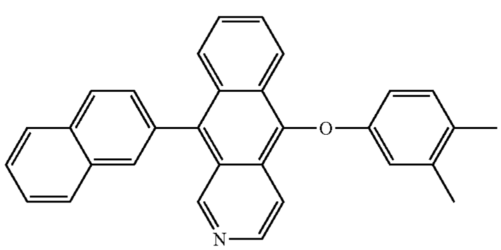
60
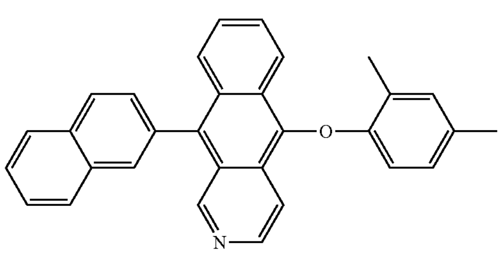
-continued
61
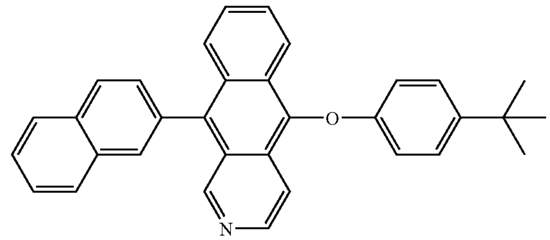
62
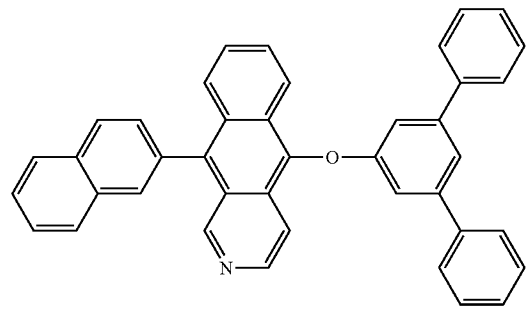
63
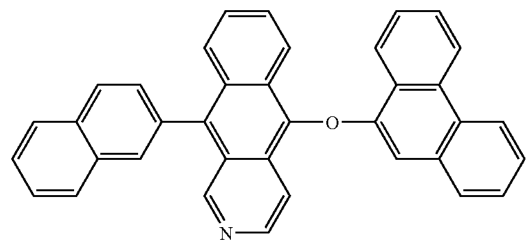
64
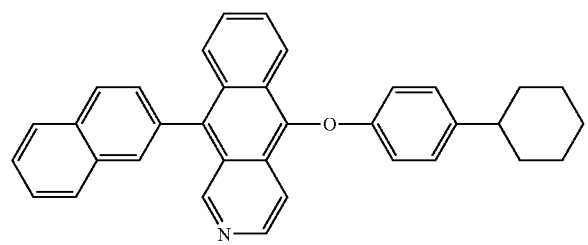
65
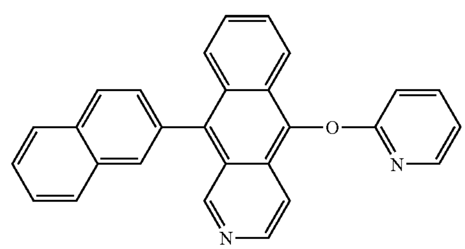
66
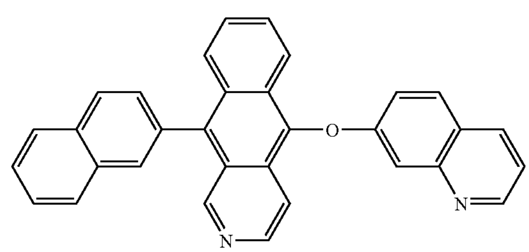

-continued
67
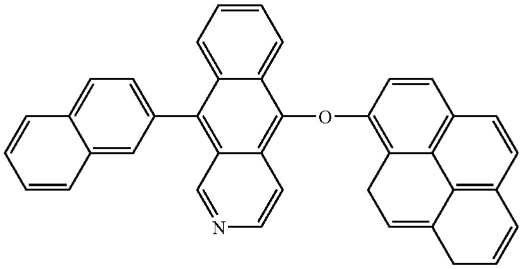
68
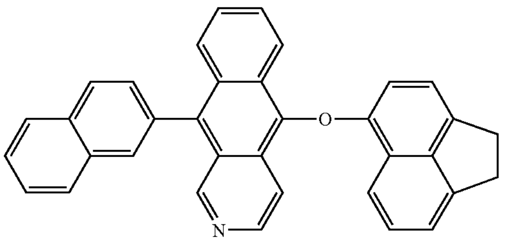
69
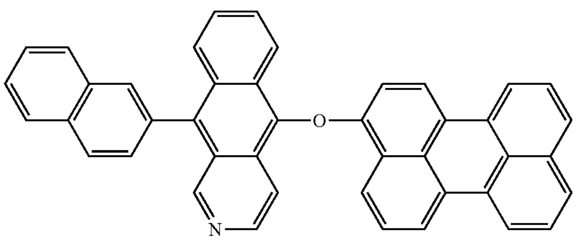
70
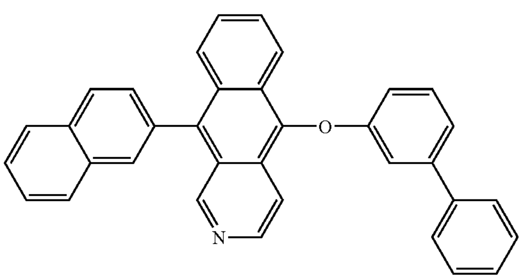
71
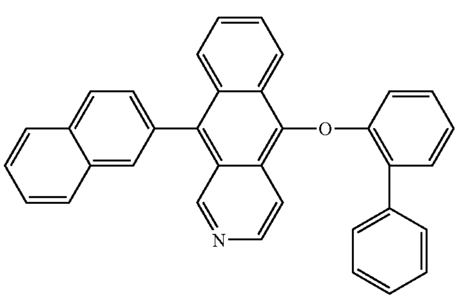
-continued
72
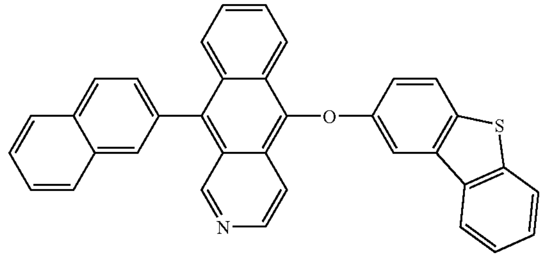
73
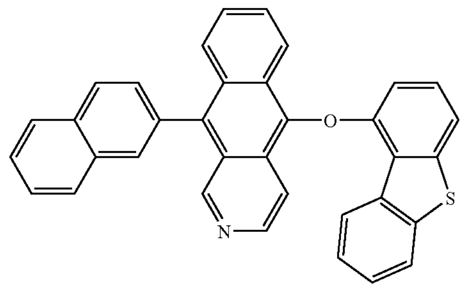
74
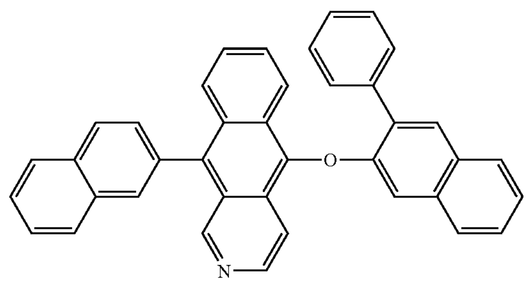
75
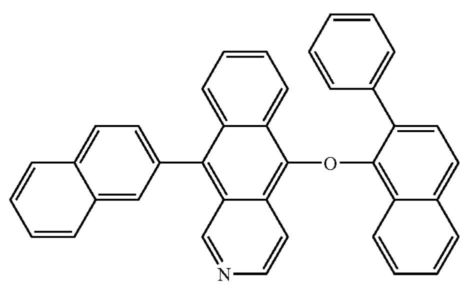
76
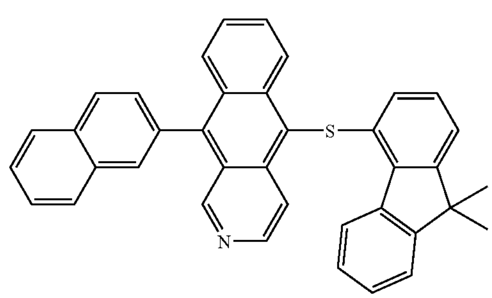

-continued
77
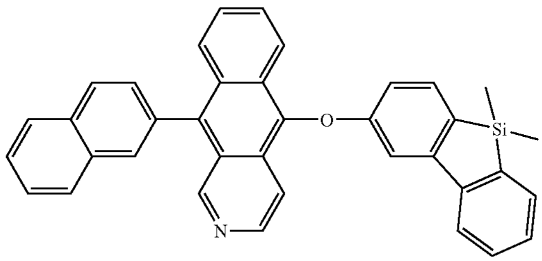
78
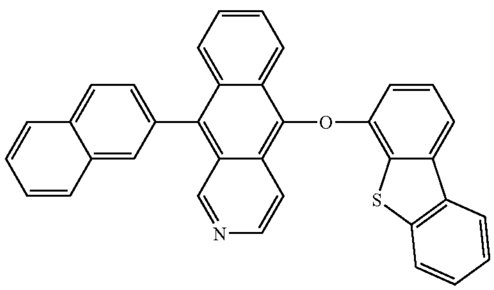
79
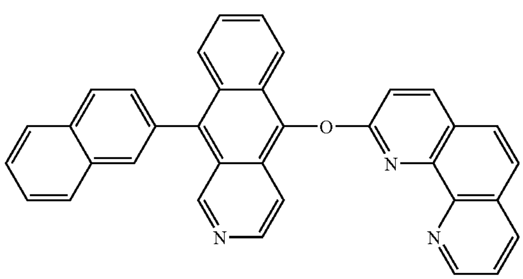
80
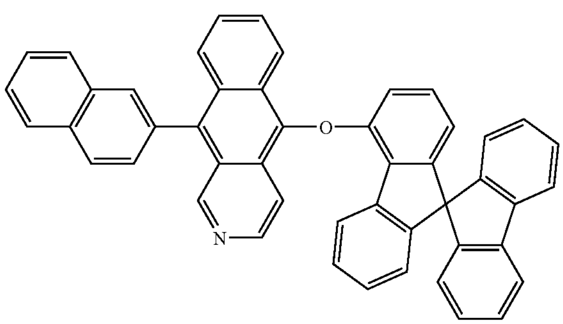
81
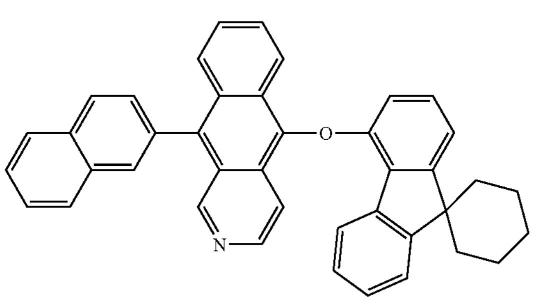
-continued
82
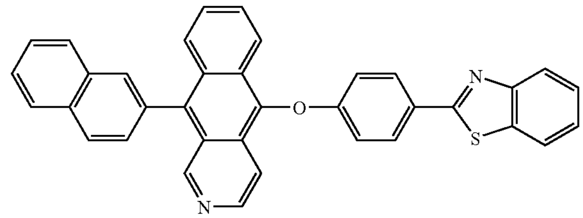
83
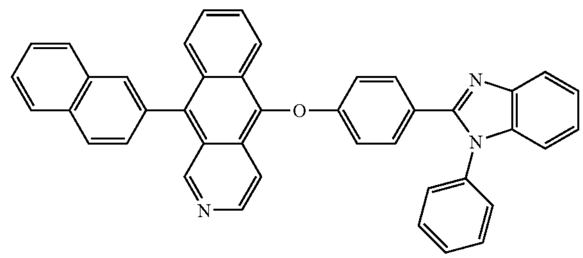
84
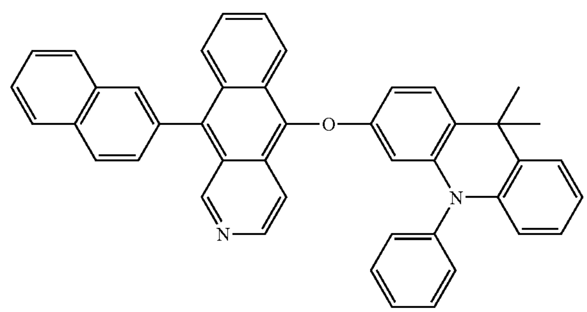
85
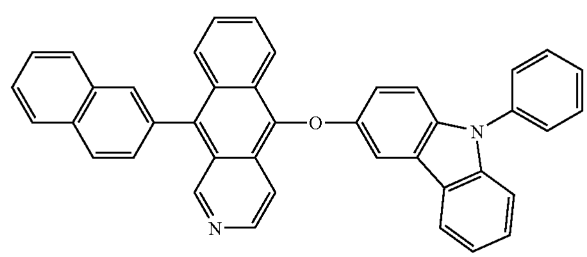
86
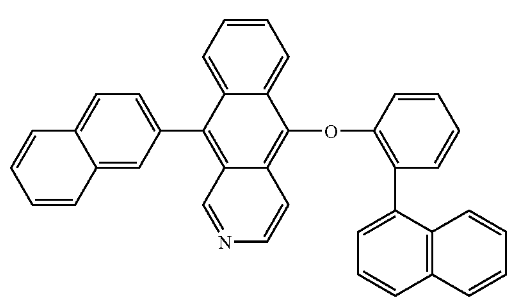

-continued
87
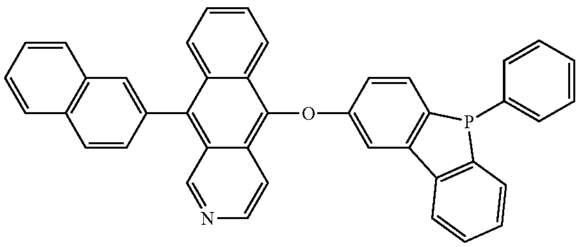
88
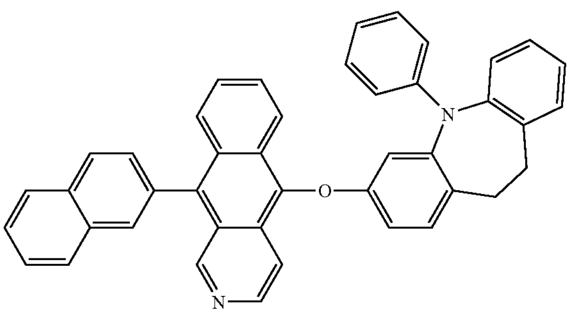
89
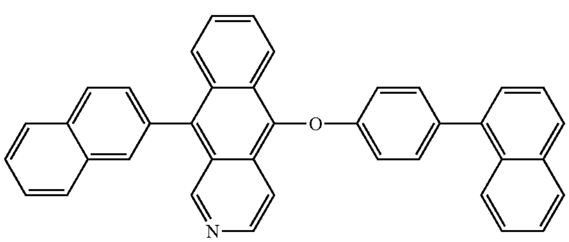
90
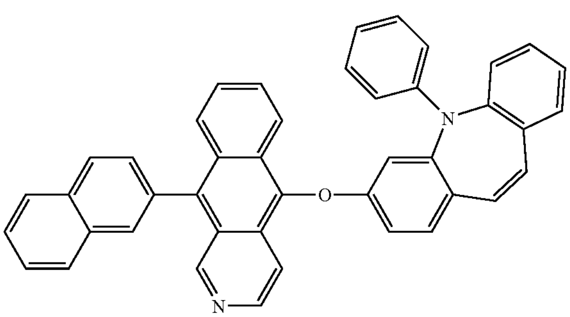
91
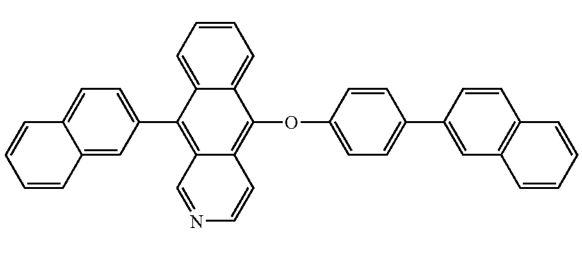
-continued
92
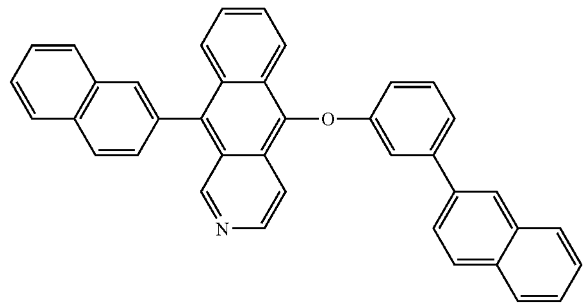
93
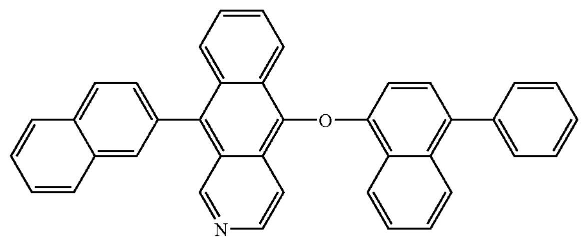
94
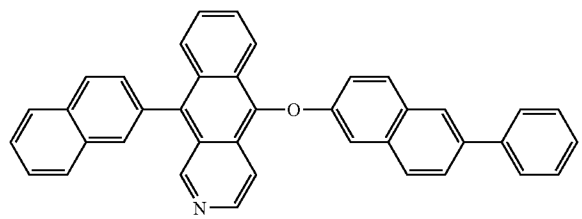
95
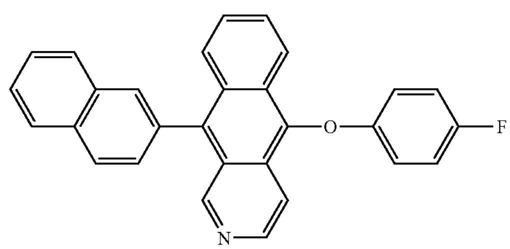
96
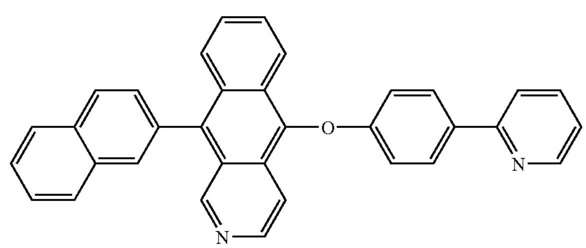
97
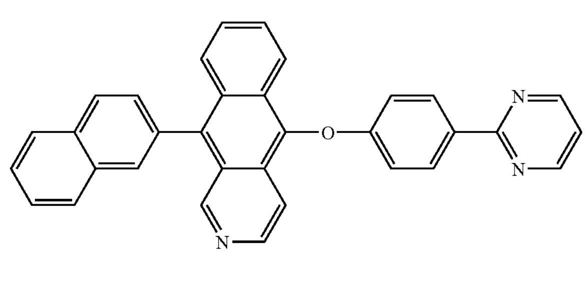

-continued
98
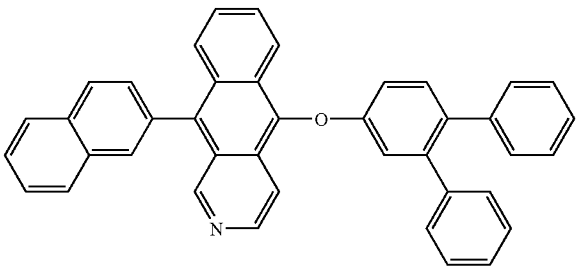
99
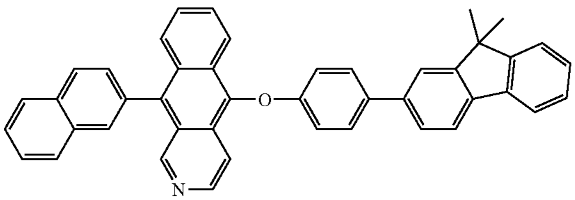
100
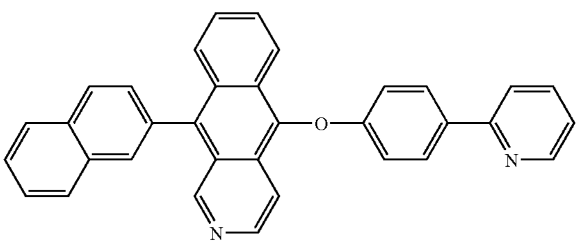
101
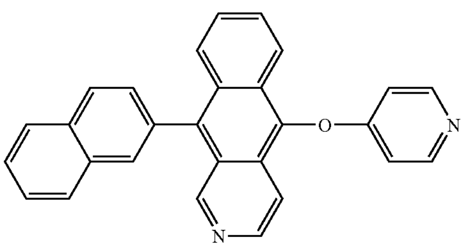
102
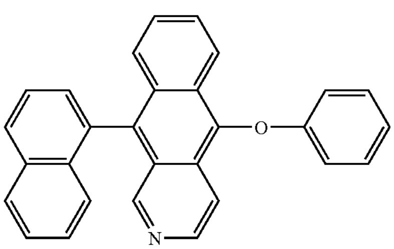
103
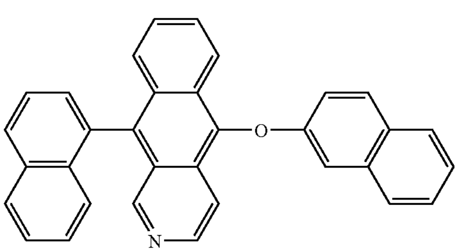
-continued
104
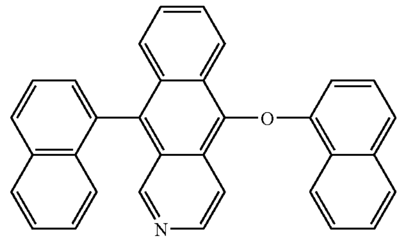
105
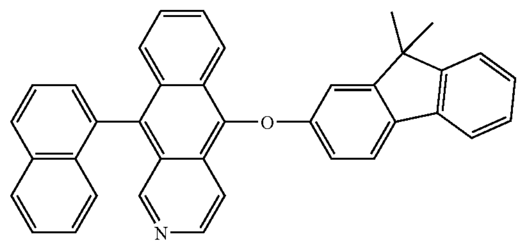
106
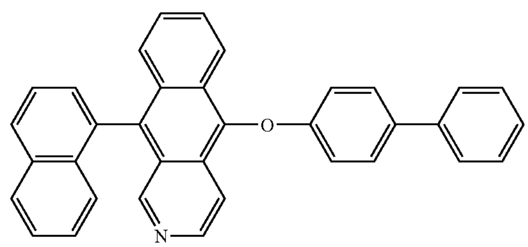
107
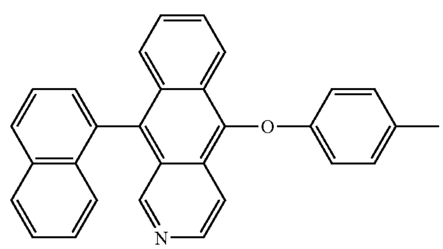
108
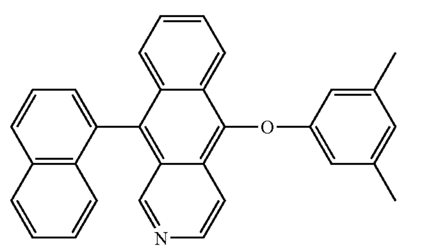
109
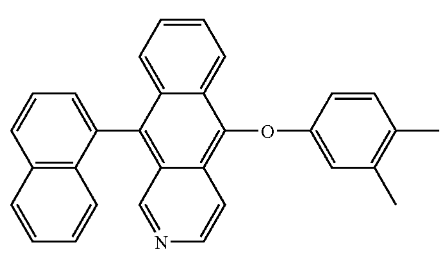

-continued
110
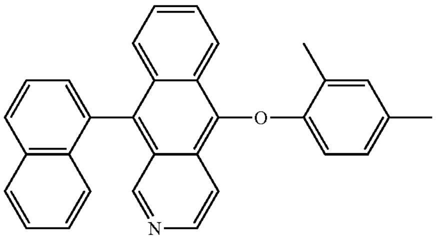
111
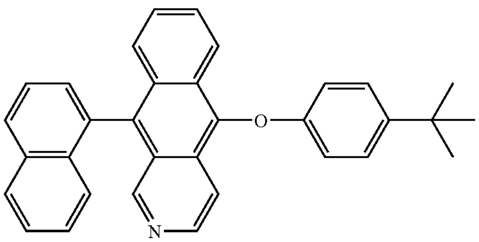
112
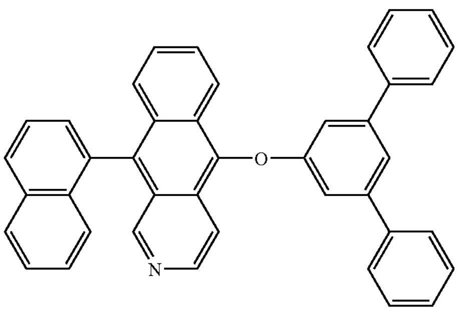
113
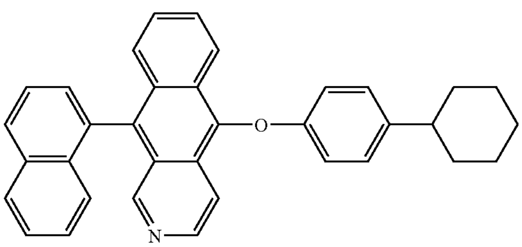
114
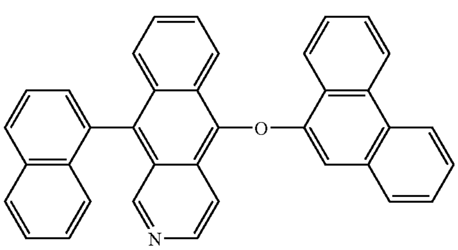
115
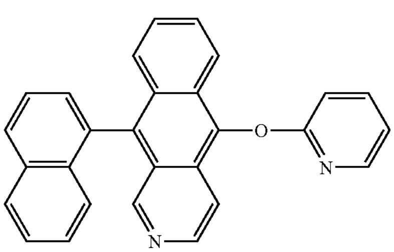
-continued
116
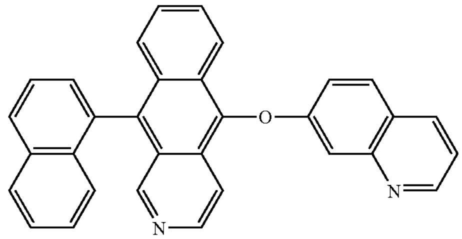
117
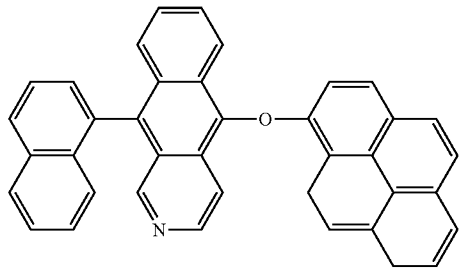
118
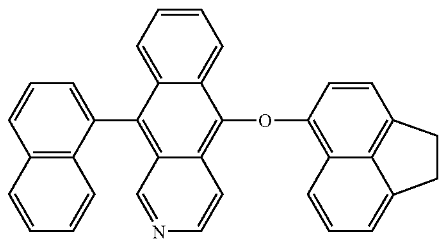
119
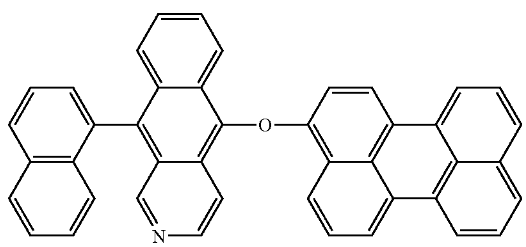
120
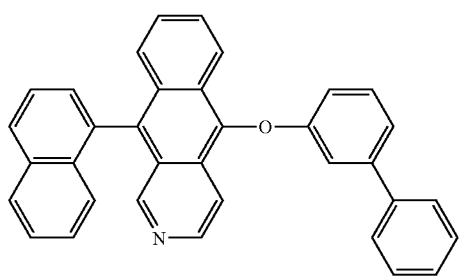
121
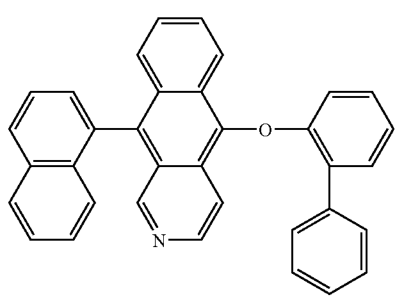

-continued
122
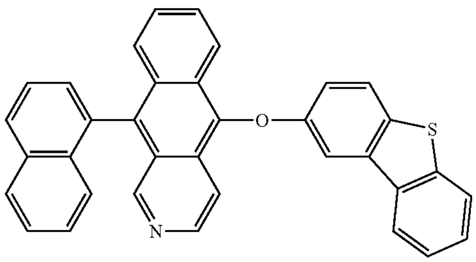
123
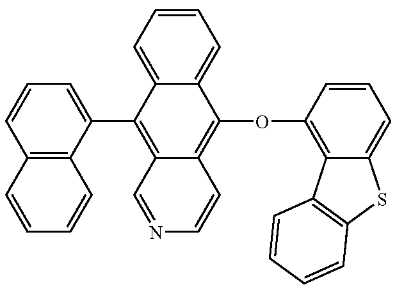
124
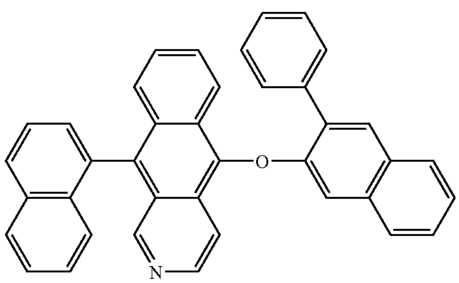
125
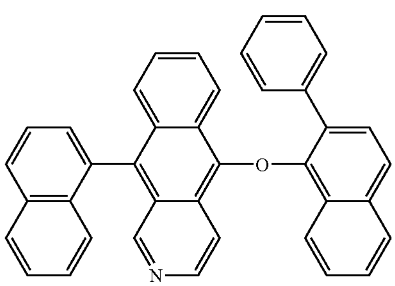
126
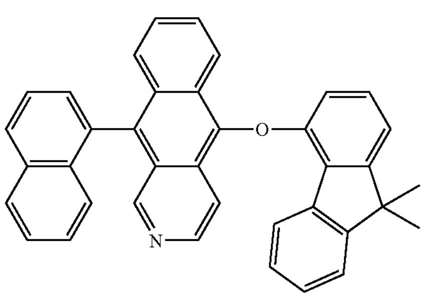
-continued
127
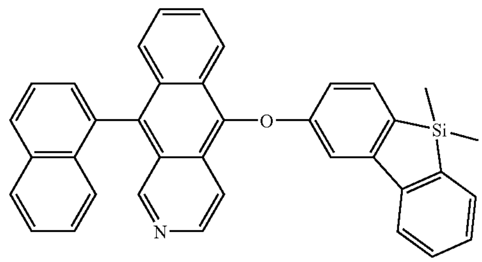
128
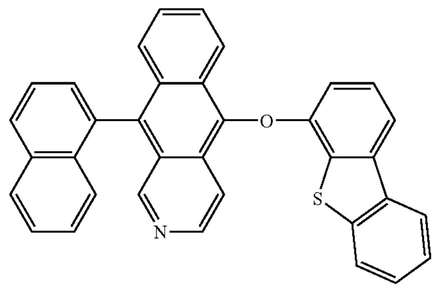
129
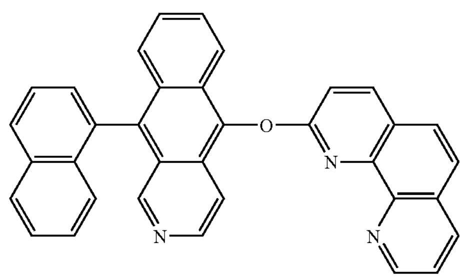
130
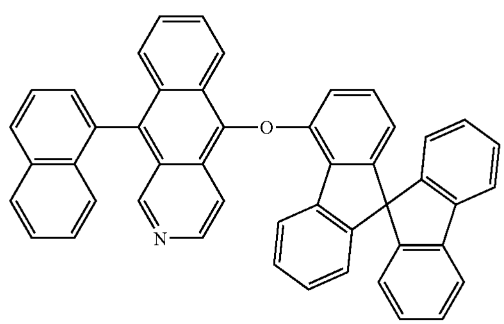
131
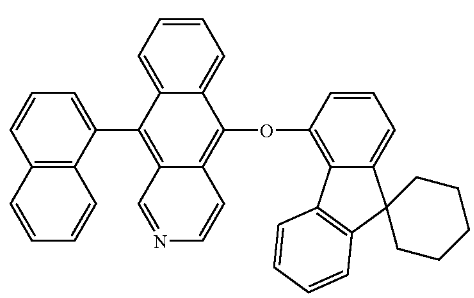

-continued
132
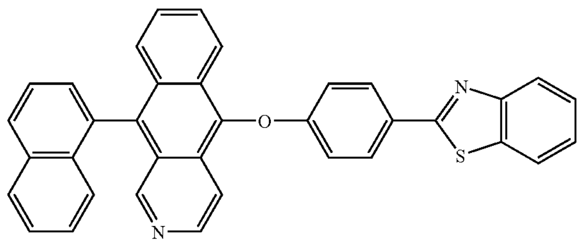
133
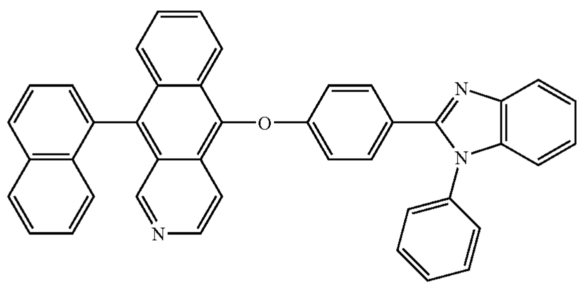
134
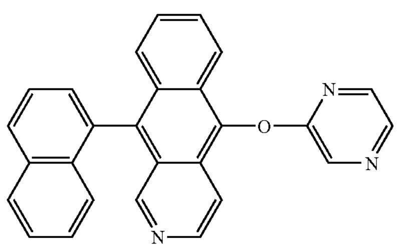
135
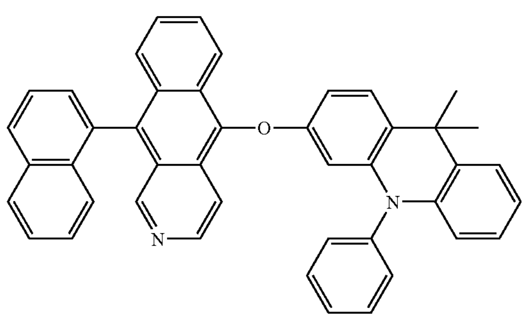
136
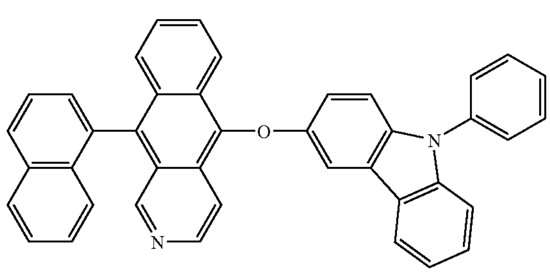
-continued
137
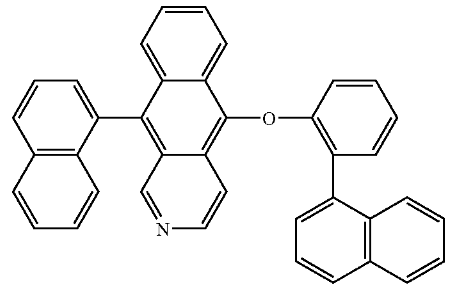
138
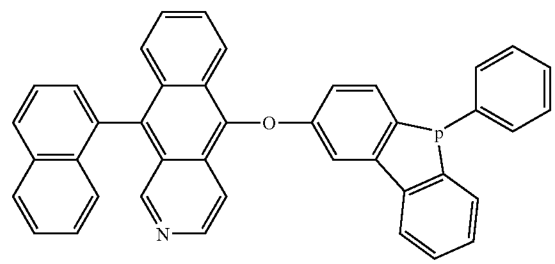
139
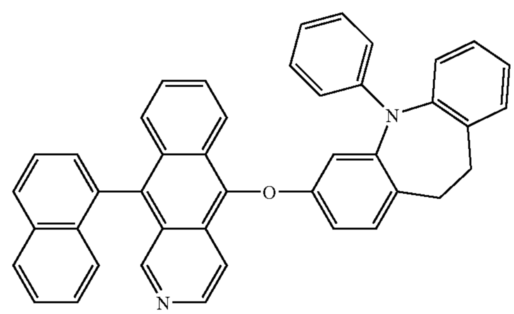
140
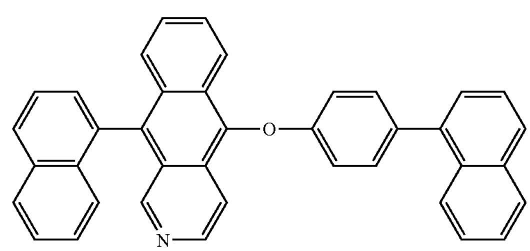
141
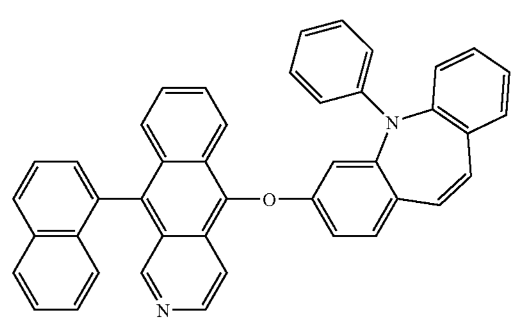

-continued
142
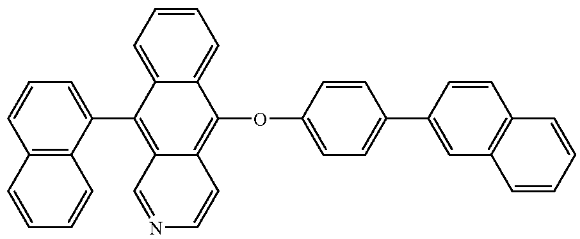
143
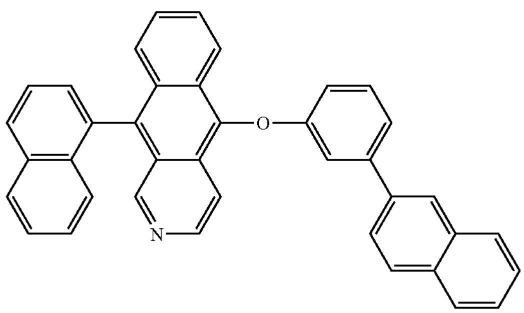
144
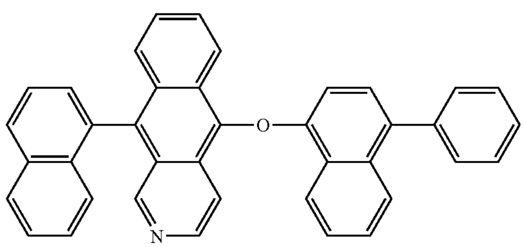
145
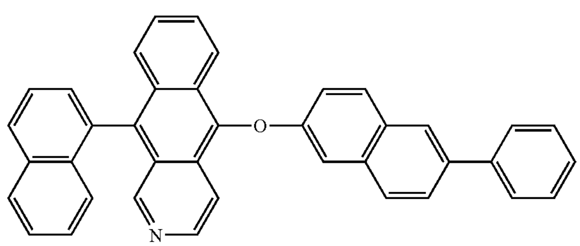
146
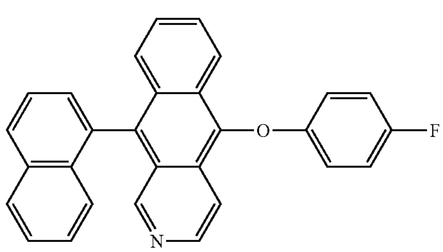
147
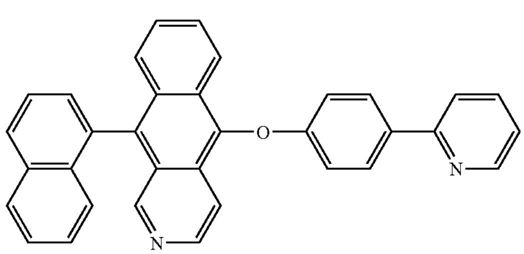
-continued
148
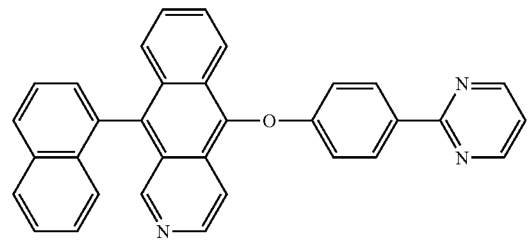
149
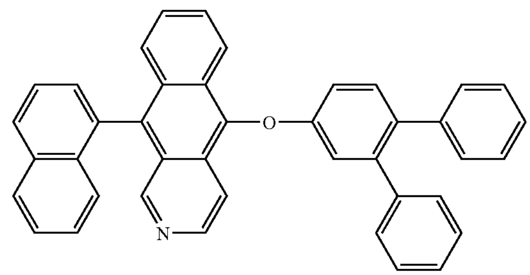
150
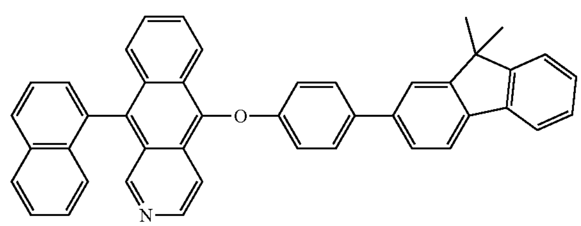
151
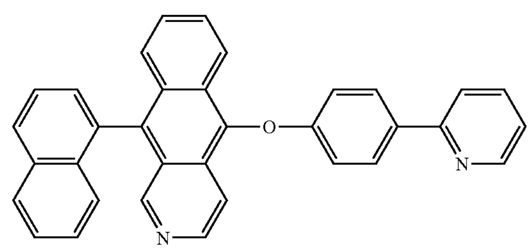
152
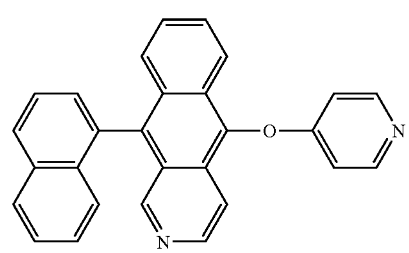
153
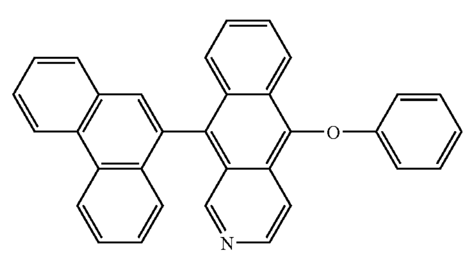

-continued
154
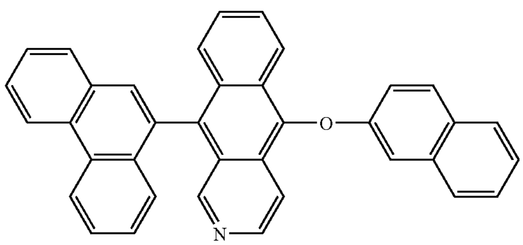
155
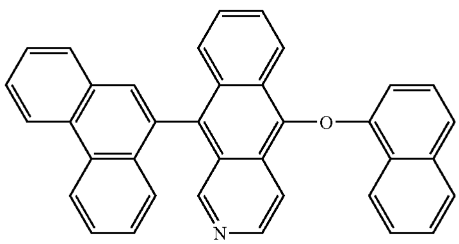
156
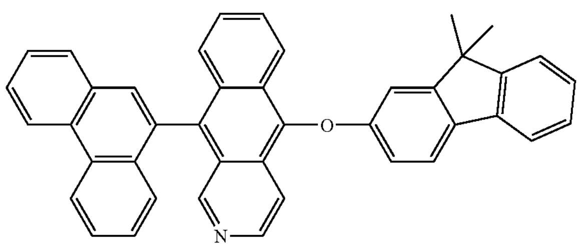
157
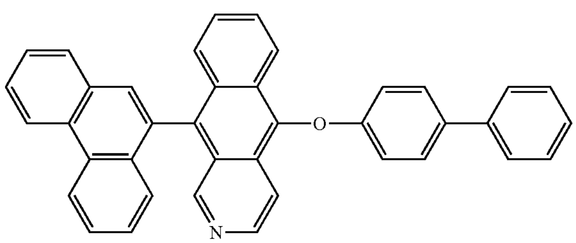
158
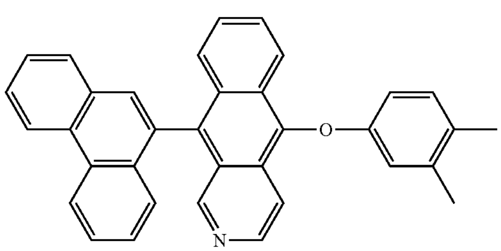
159
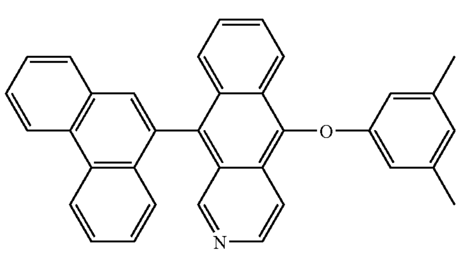
-continued
160
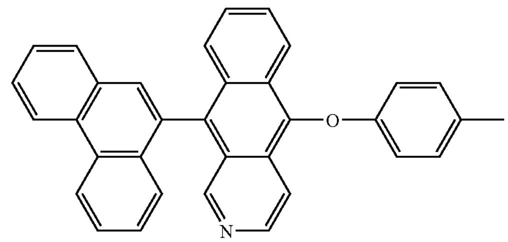
161
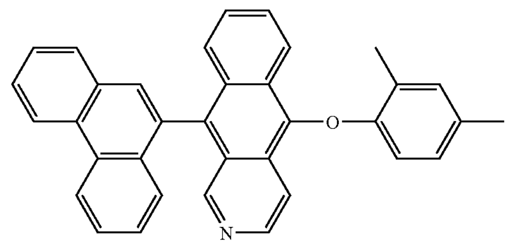
162
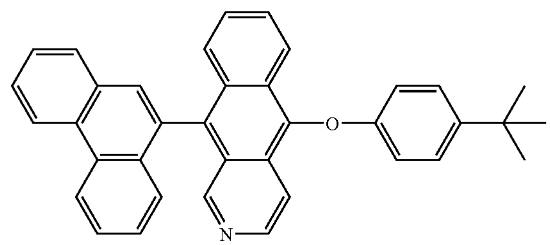
163
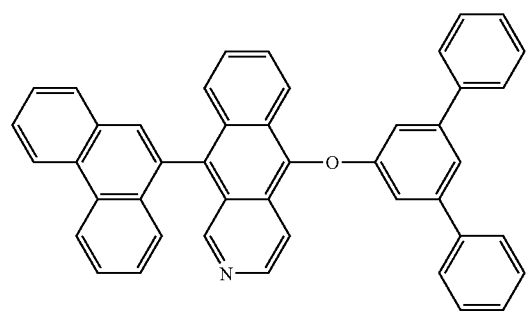
164
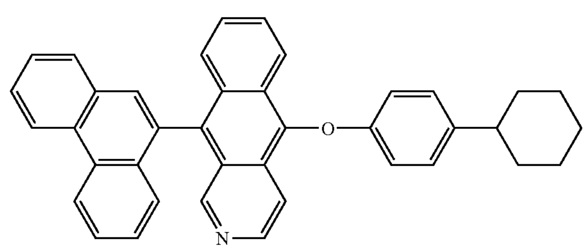
165
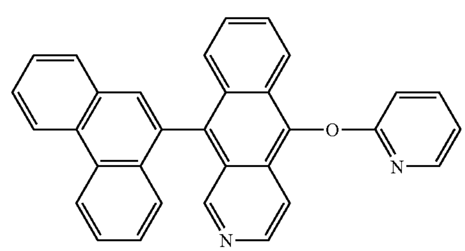

-continued
166
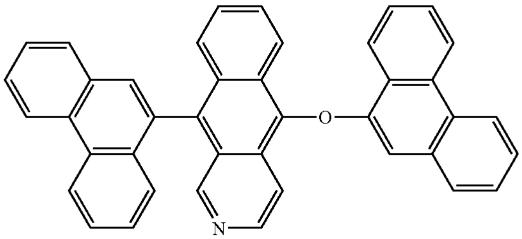
167
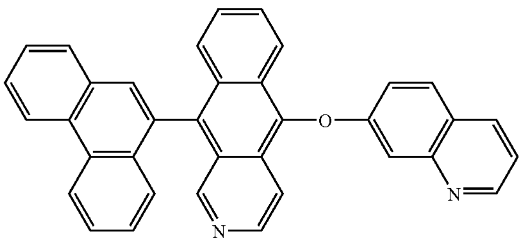
168
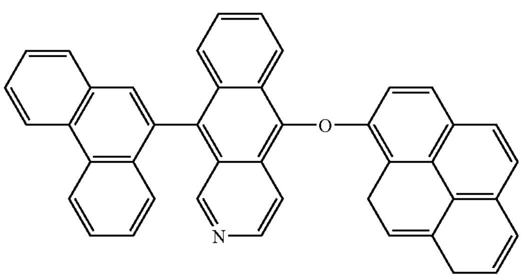
169
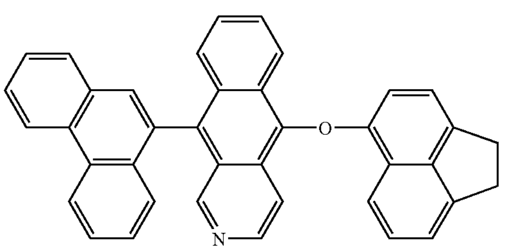
170
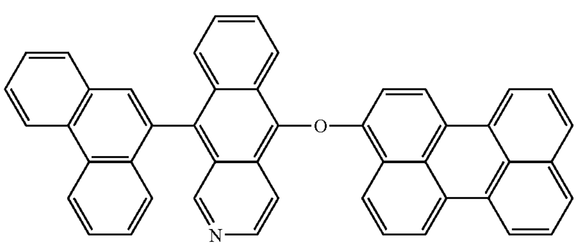
-continued
171
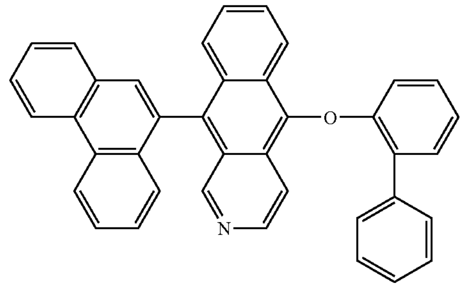
172
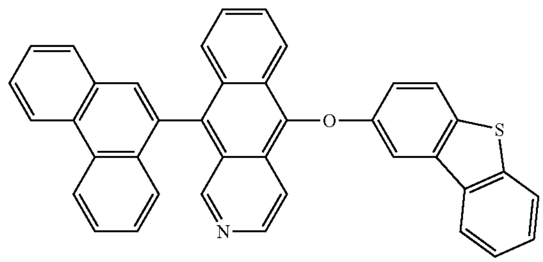
173
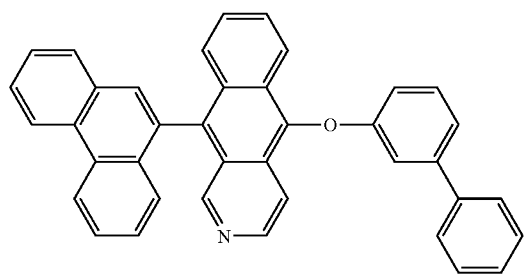
174
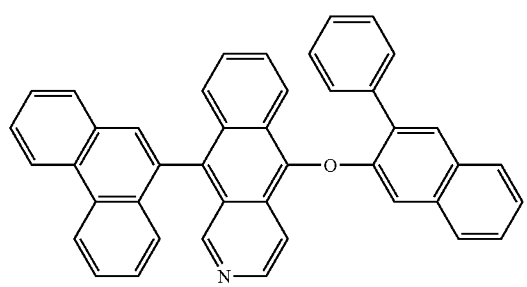
175
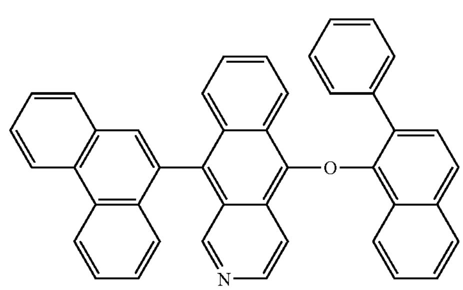

-continued
176
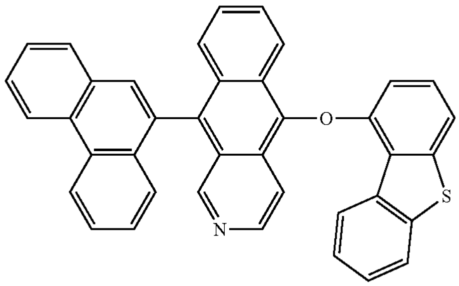
177
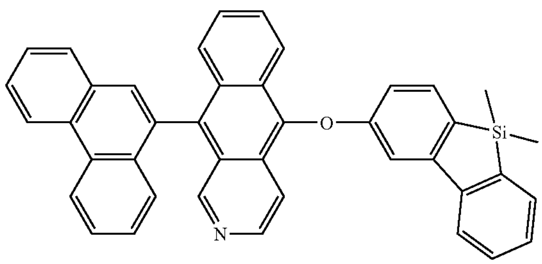
178
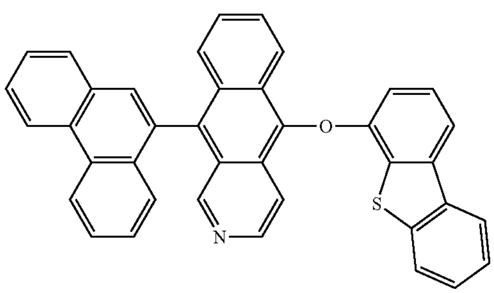
179
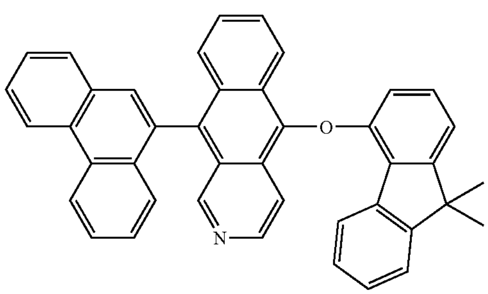
180
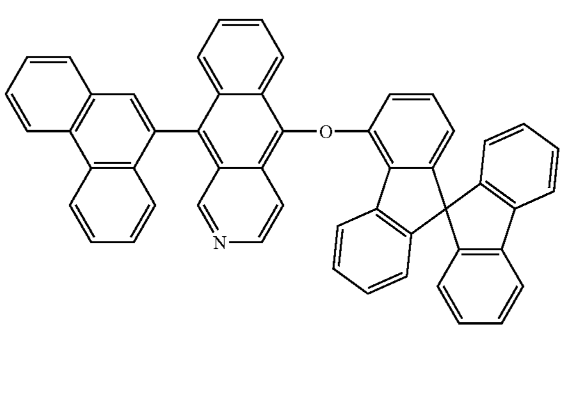
-continued
181
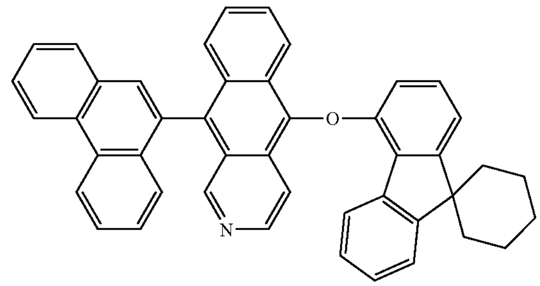
182
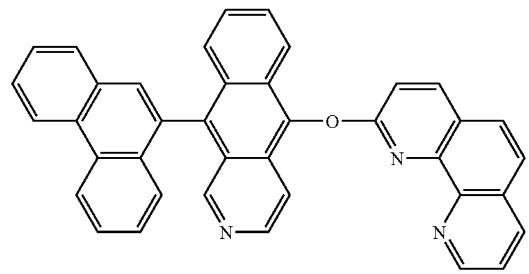
183
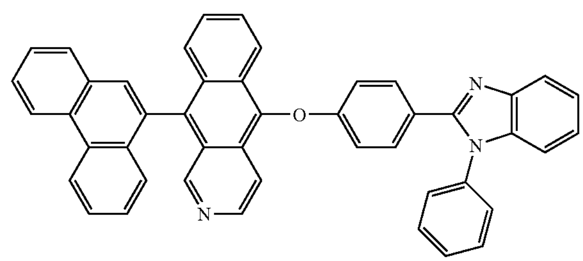
184
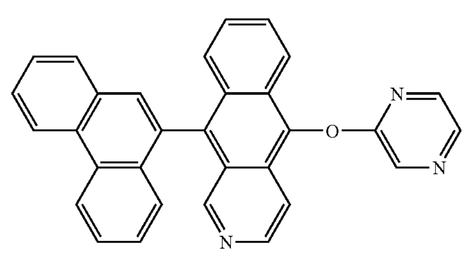
185
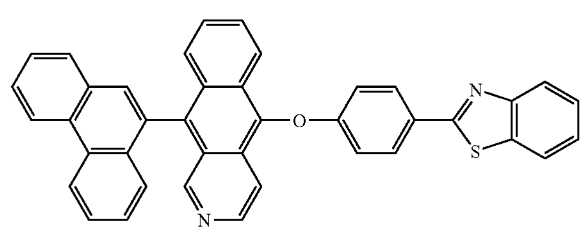

-continued
186
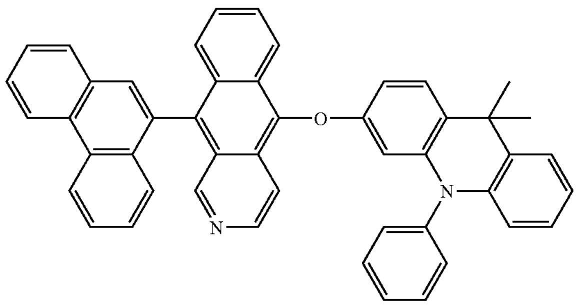
187
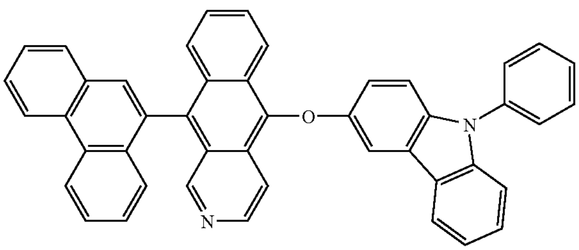
188
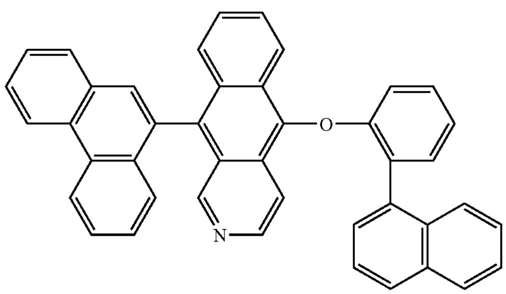
189
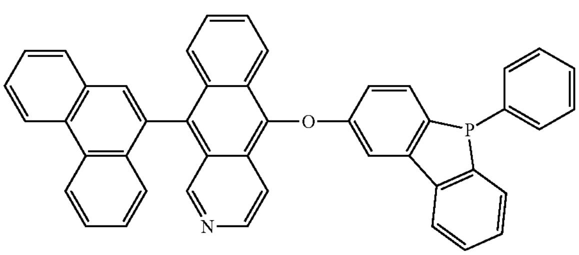
190
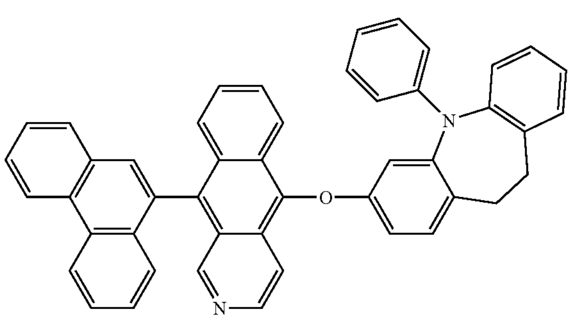
-continued
191
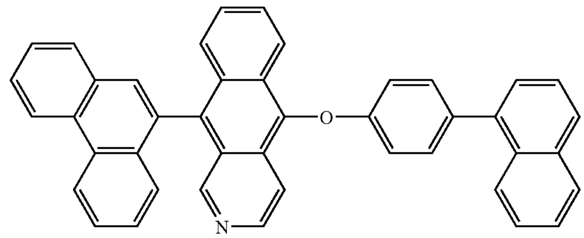
192
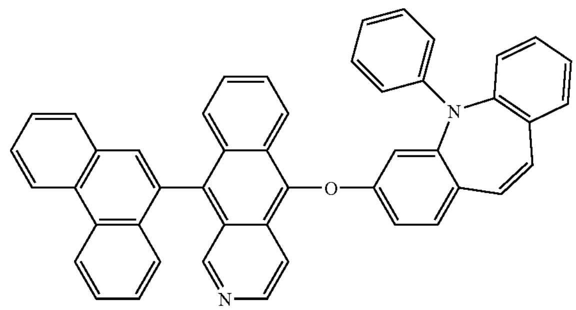
193
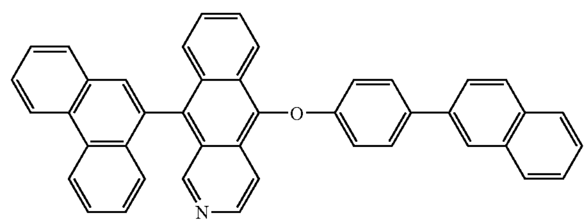
194
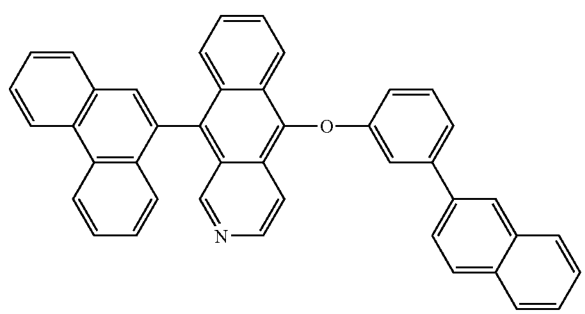
195
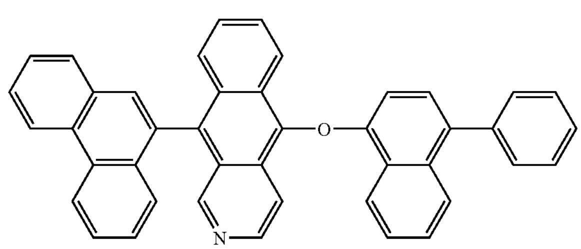

-continued
196
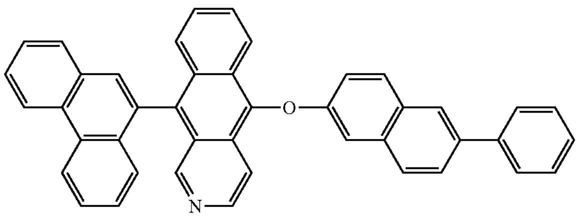
197
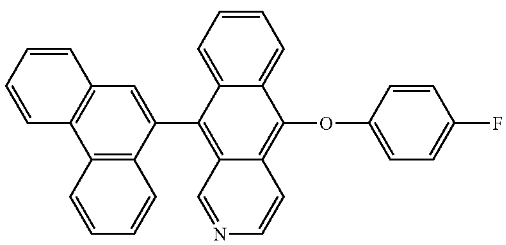
198
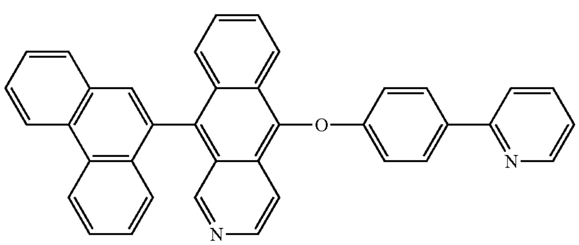
199
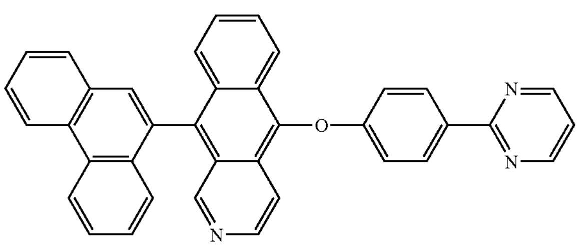
200
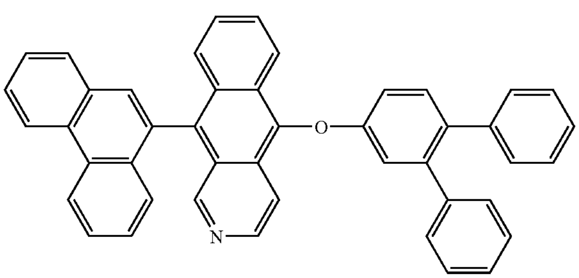
201
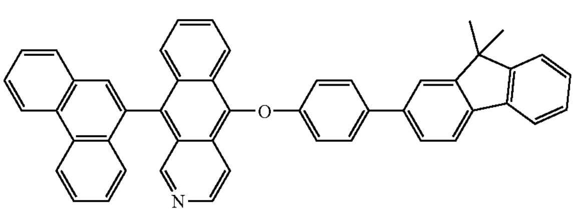
-continued
202
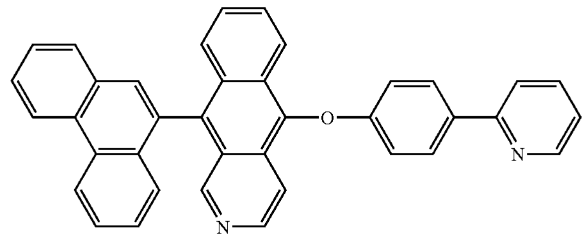
203
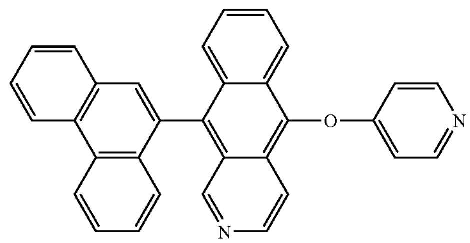
204
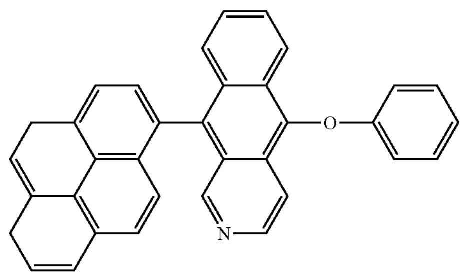
205
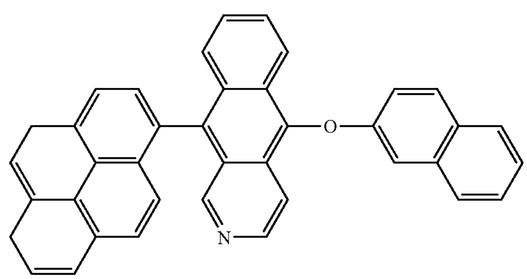
206
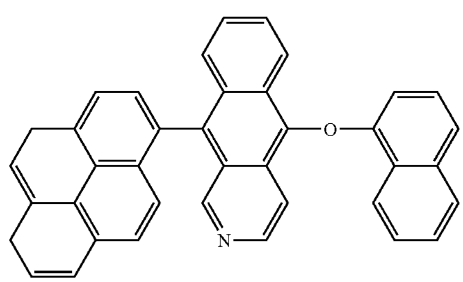
207
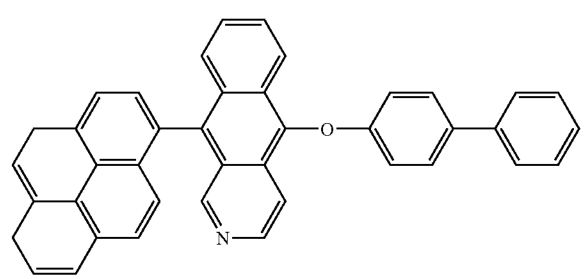

-continued
208
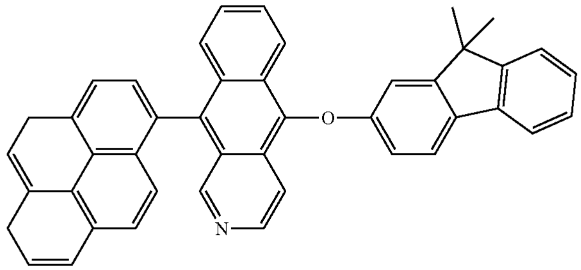
209
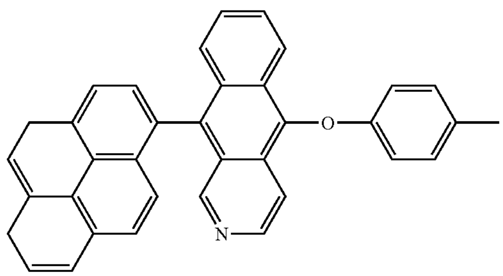
210
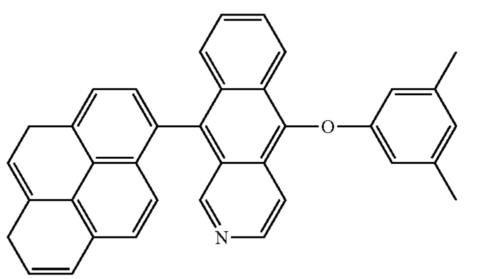
211
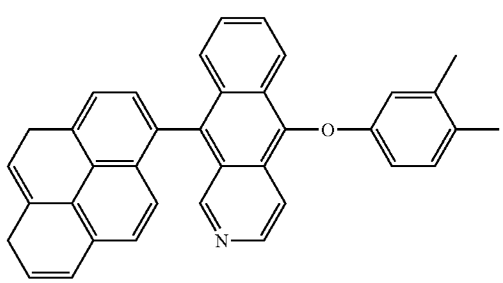
212
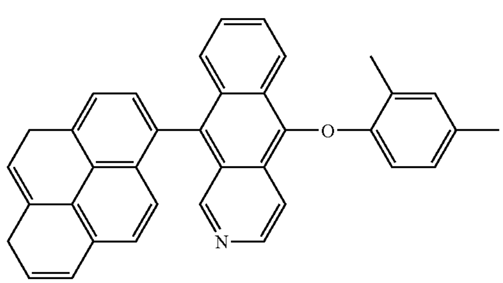
-continued
213
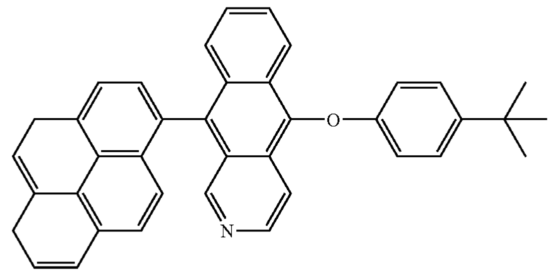
214
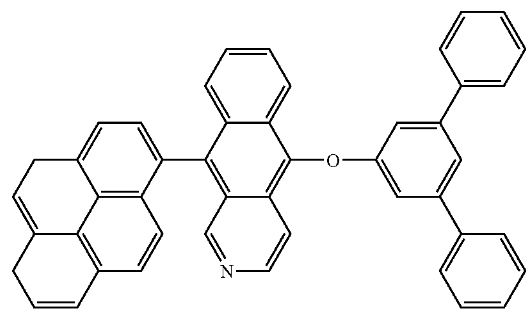
215
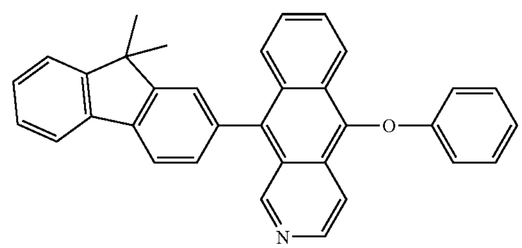
216
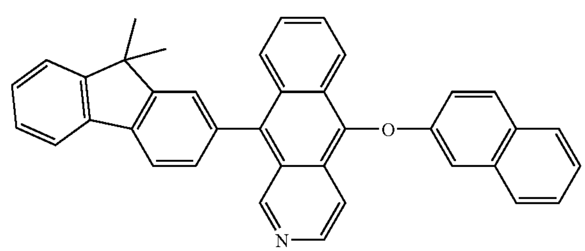
217
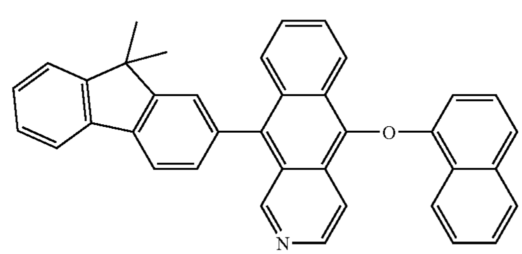

-continued
218
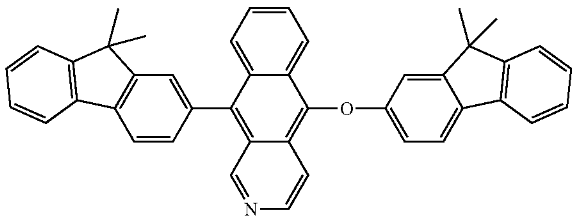
219
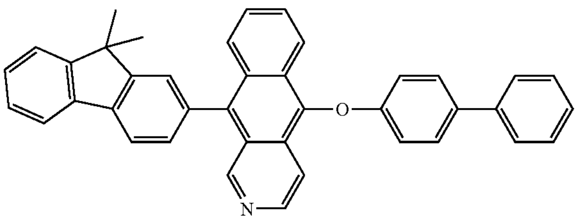
220
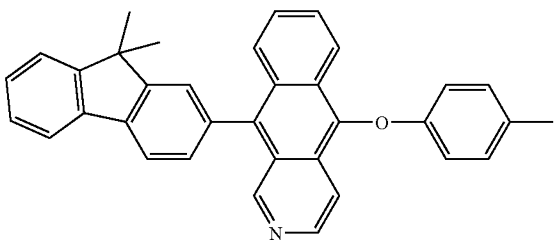
221
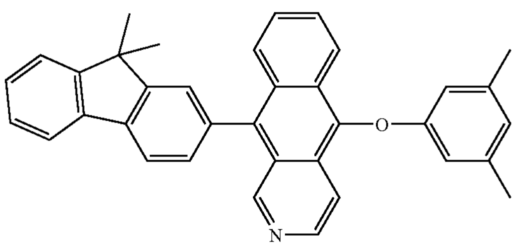
222
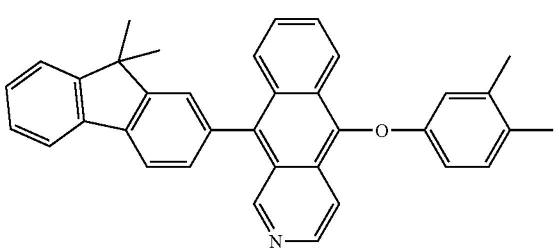
223
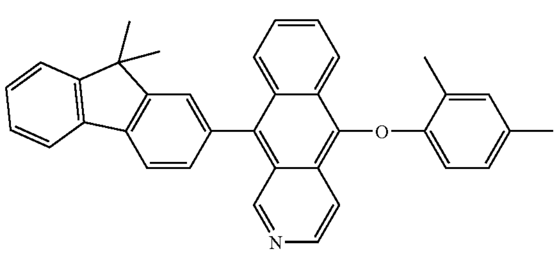
-continued
224
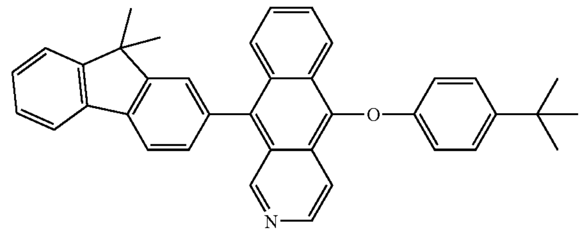
225
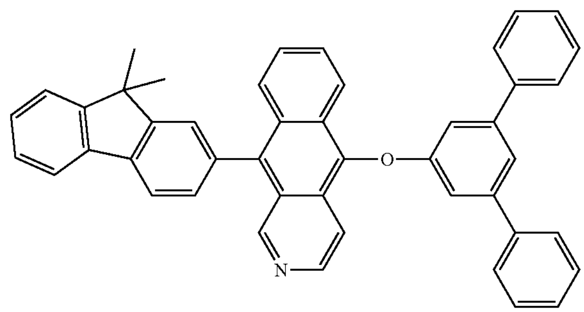
226
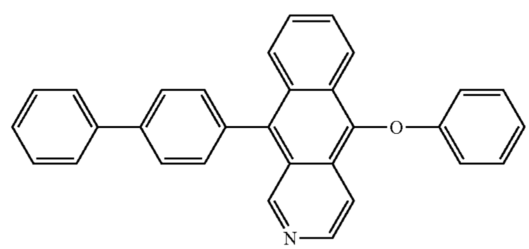
227
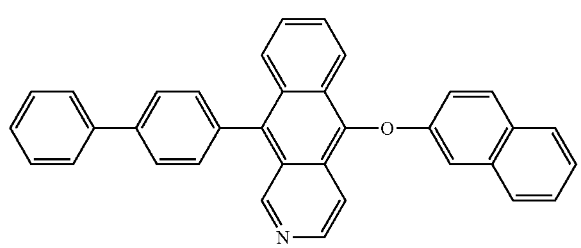
228
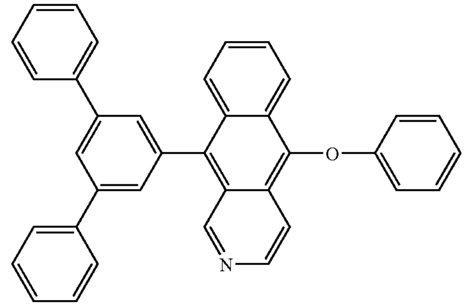

-continued
229
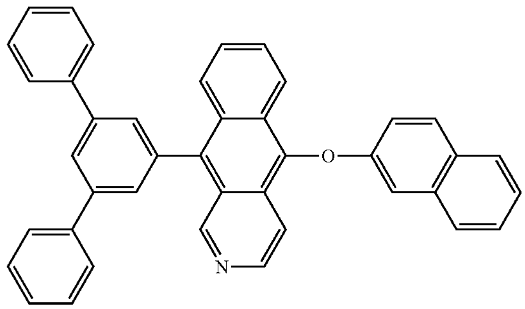
230
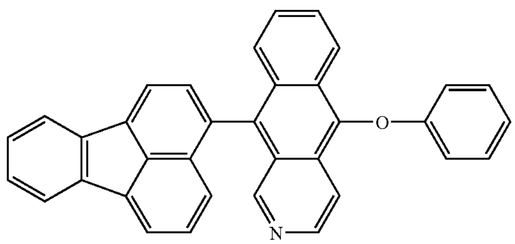
231
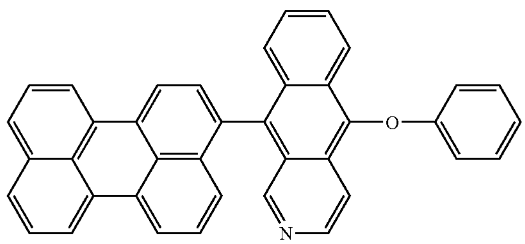
232
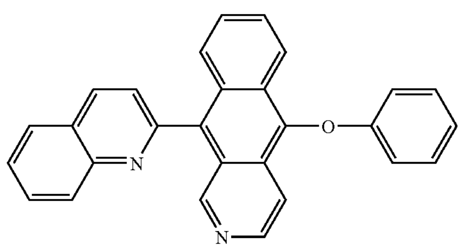
233
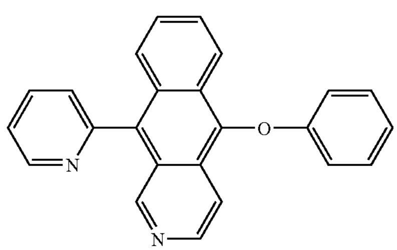
234
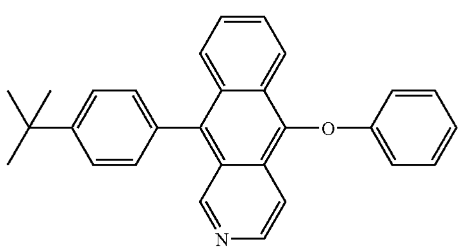
-continued
235
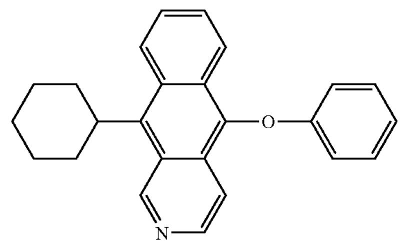
236
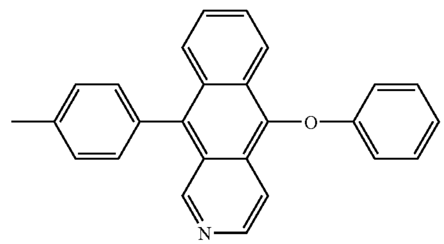
237
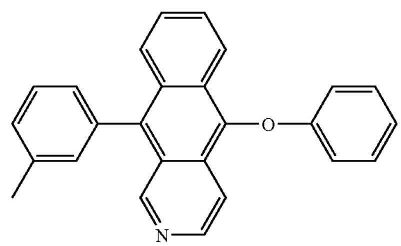
238
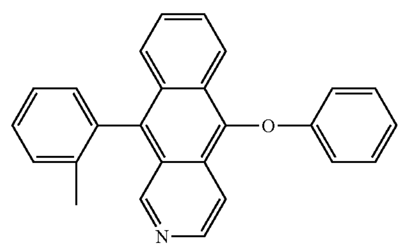
239
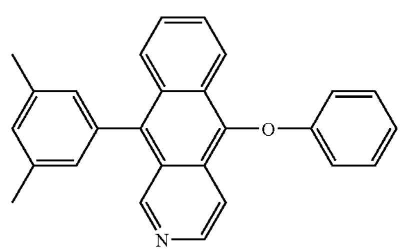
240
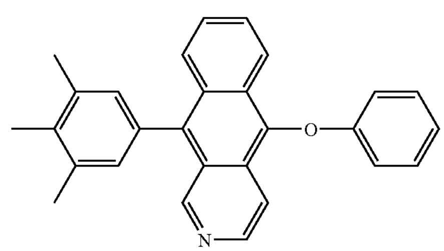

-continued
241
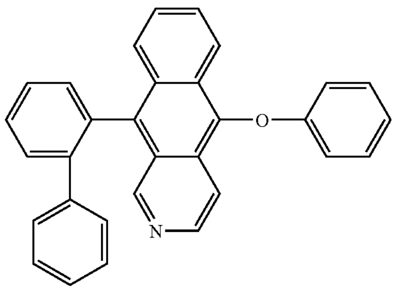
242
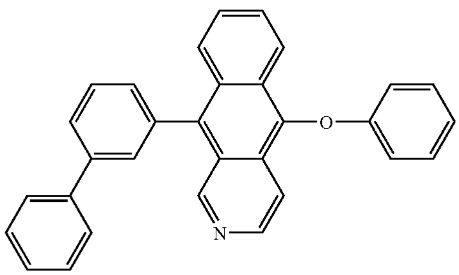
243
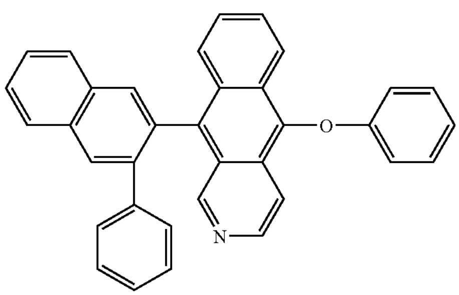
244
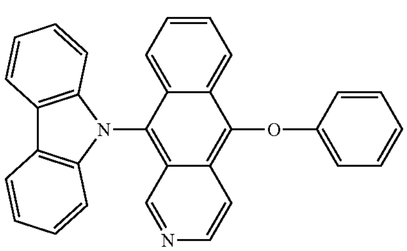
245
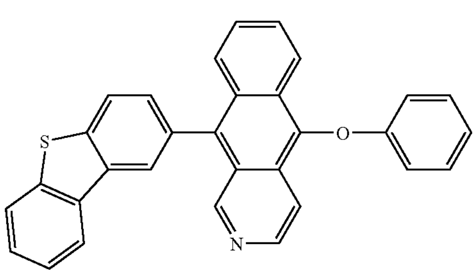
-continued
246
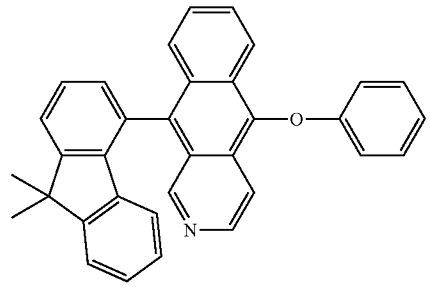
247
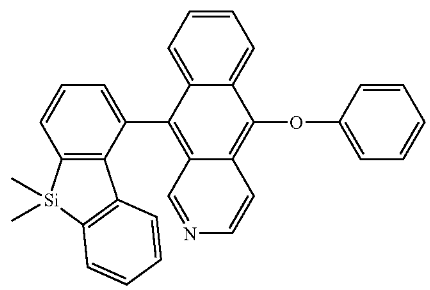
248
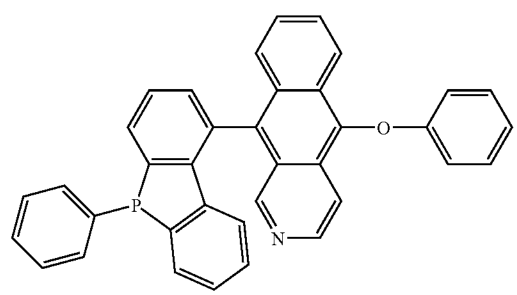
249
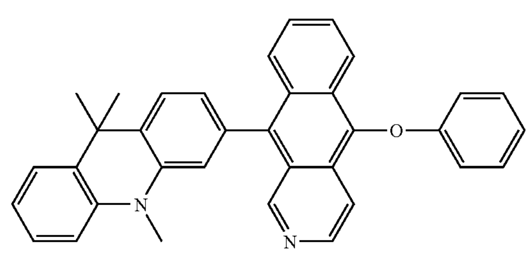
250
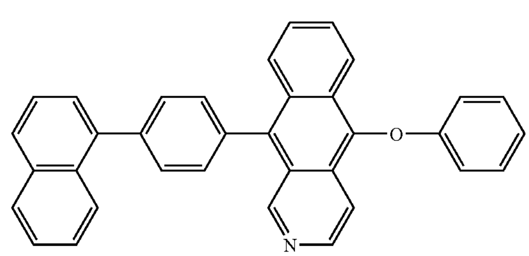

-continued
251
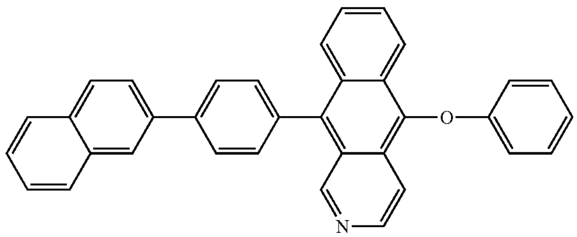
252
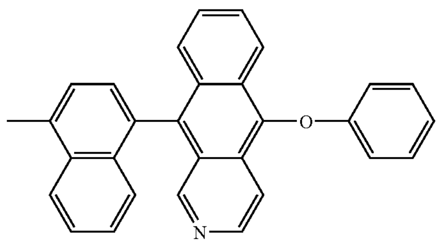
253
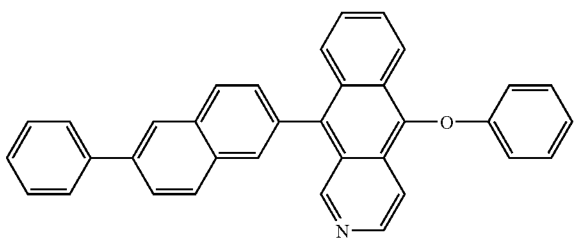
254
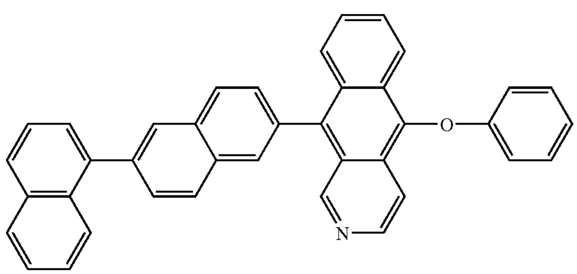
255
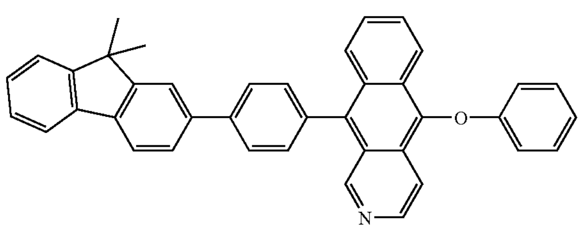
256
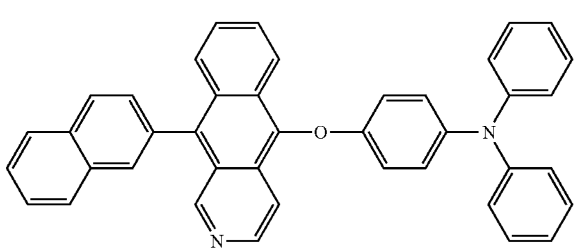
-continued
257
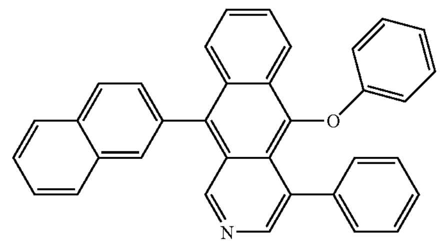
258
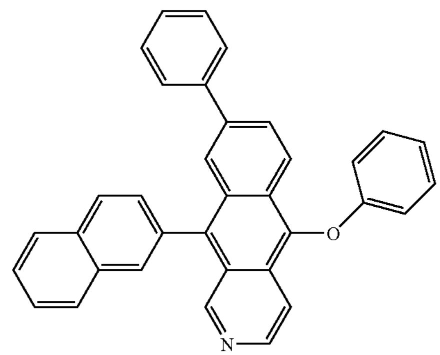
259
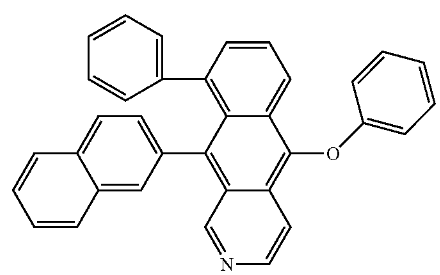
260
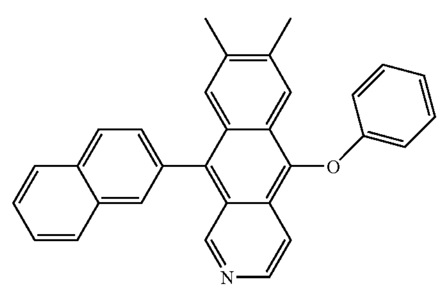
261
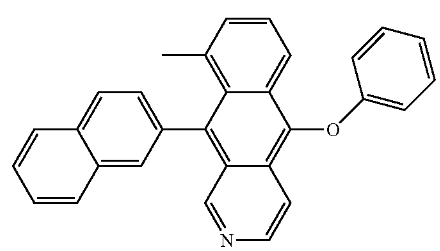

-continued
262
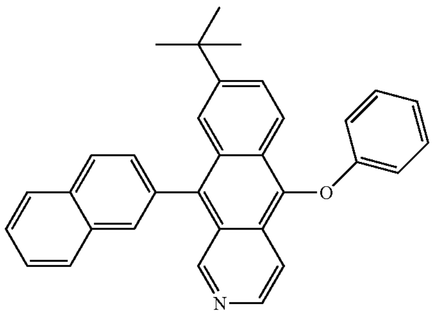
263
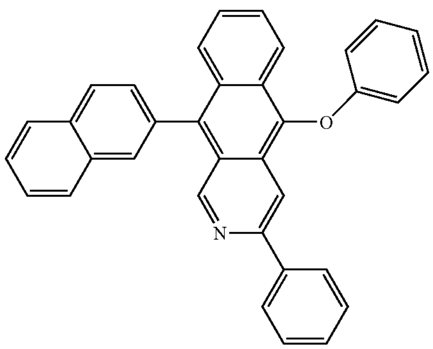
264
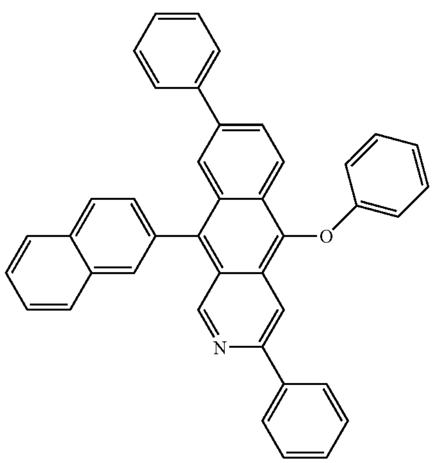
265
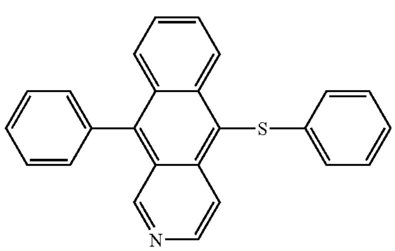
266
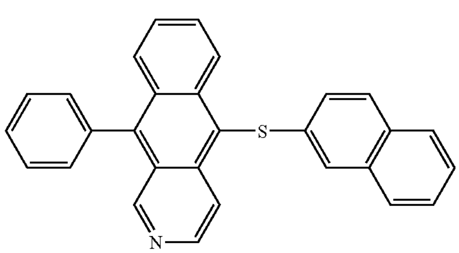
-continued
267
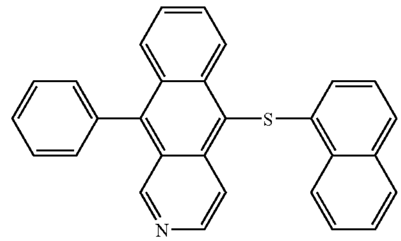
268
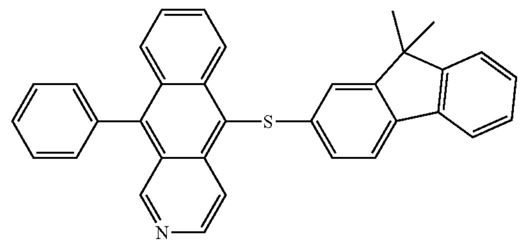
269
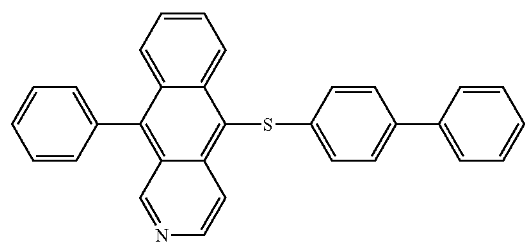
270
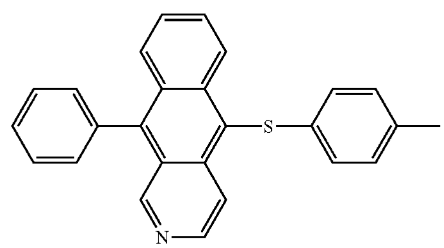
271
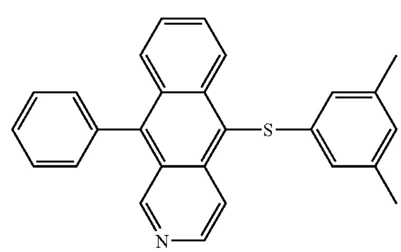
272
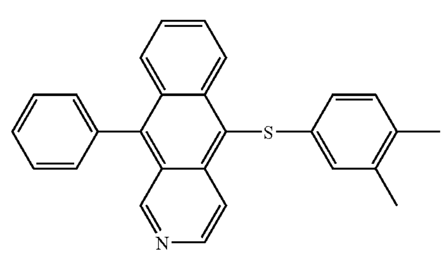

-continued
273
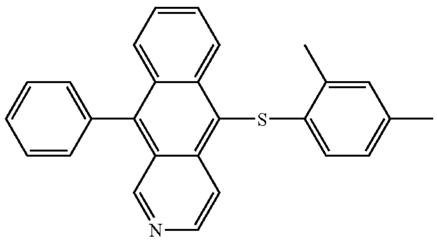
274
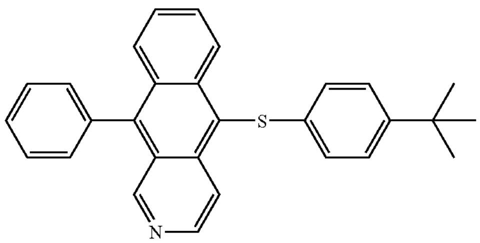
275
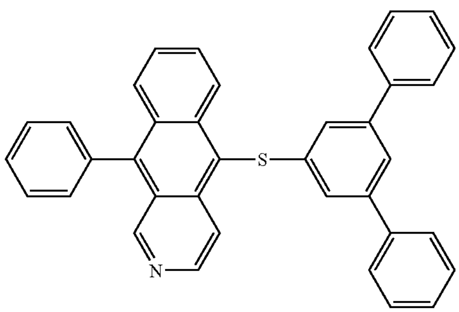
276
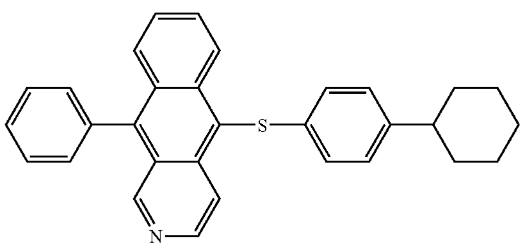
277
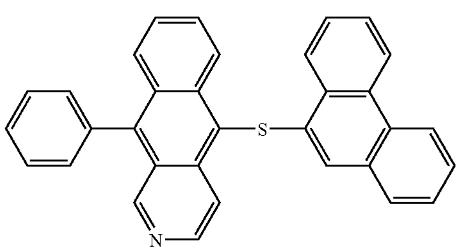
278
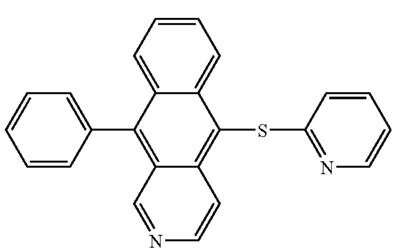
-continued
279
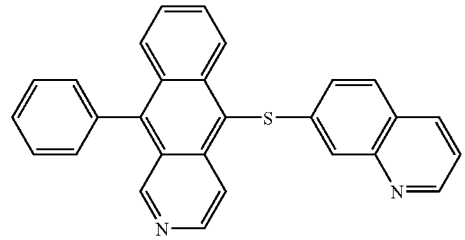
280
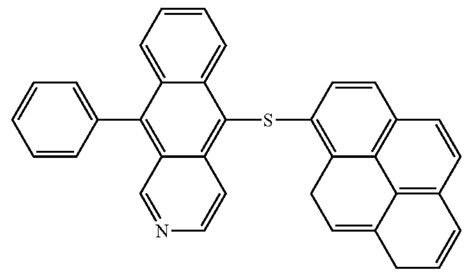
281
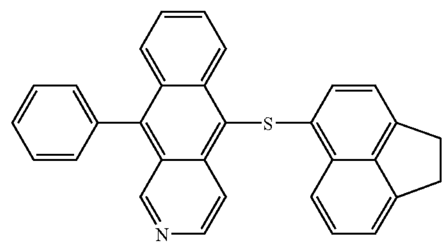
282
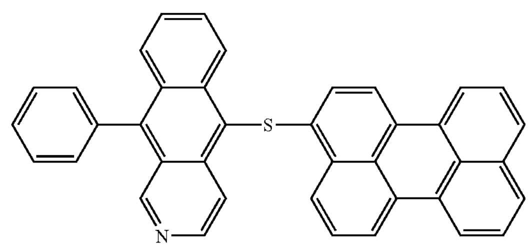
283
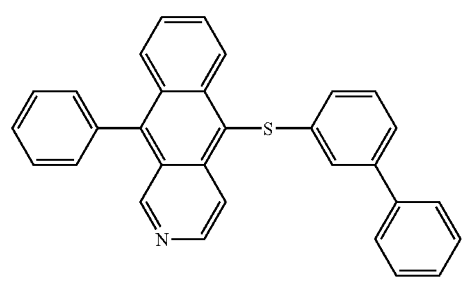
284
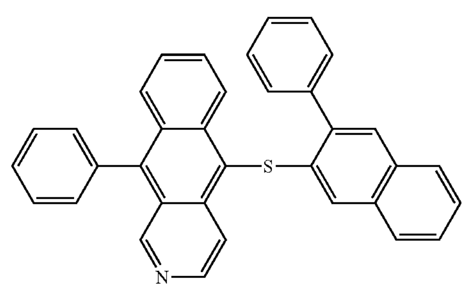

-continued
285
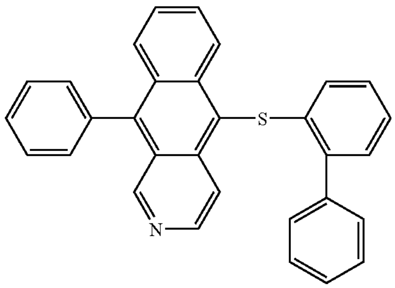
286
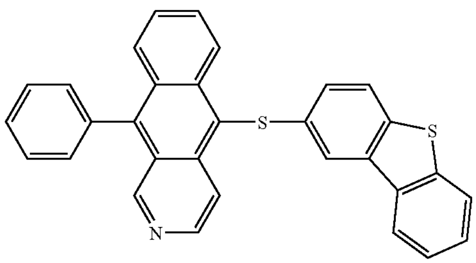
287
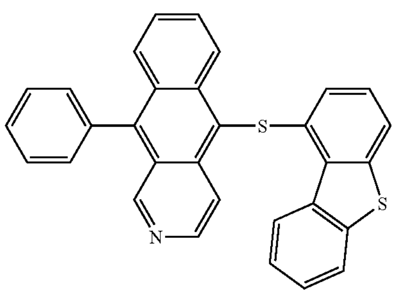
288
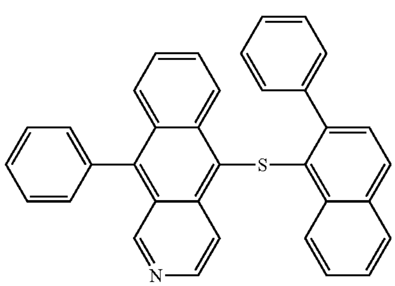
289
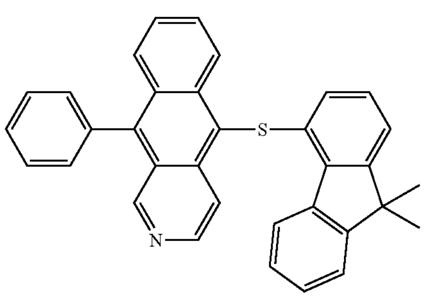
-continued
290
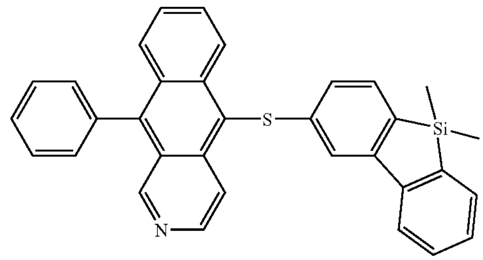
291
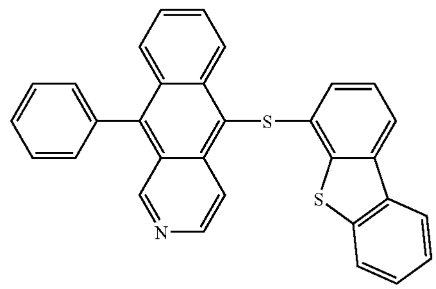
292
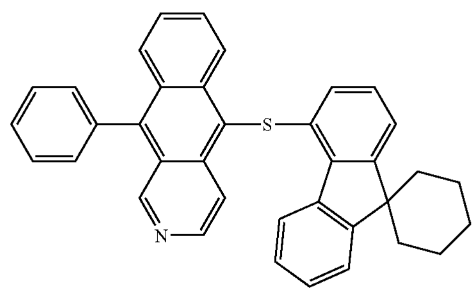
293
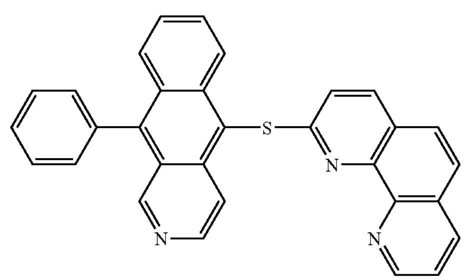
294
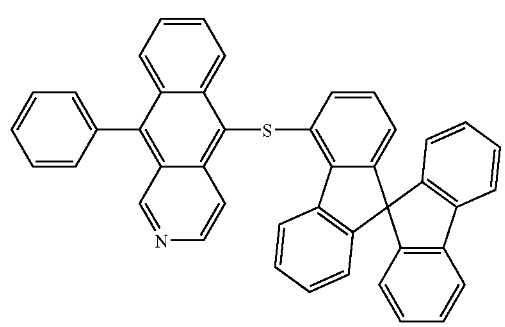

-continued
295
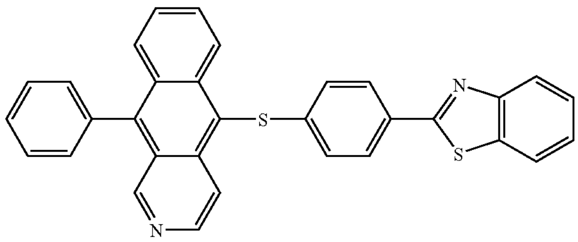
296
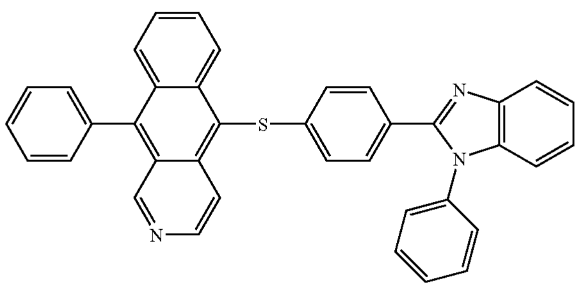
297
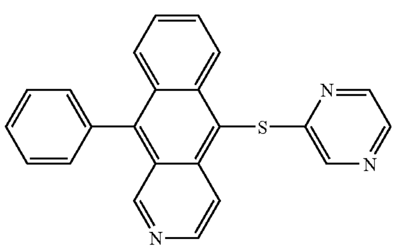
298
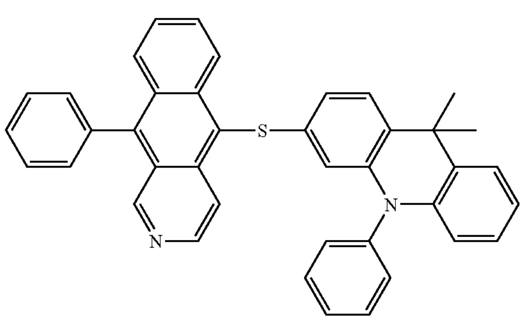
299
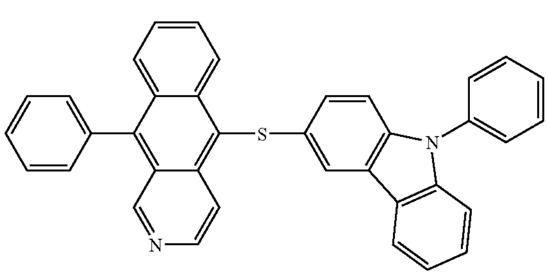
-continued
300
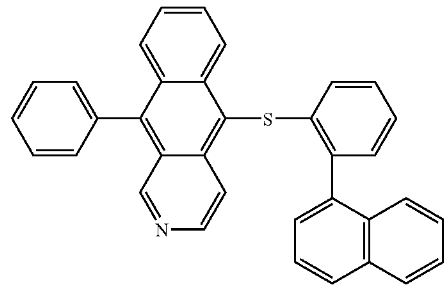
301
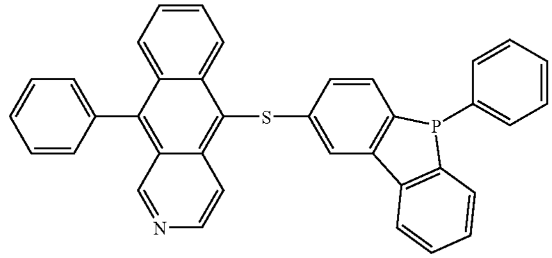
302
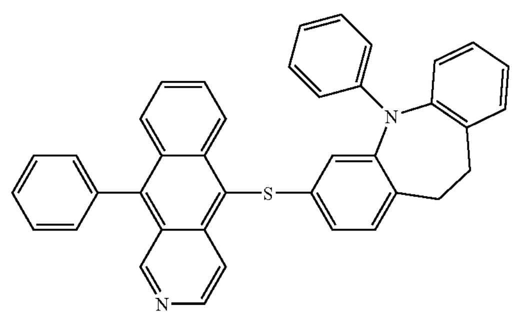
303
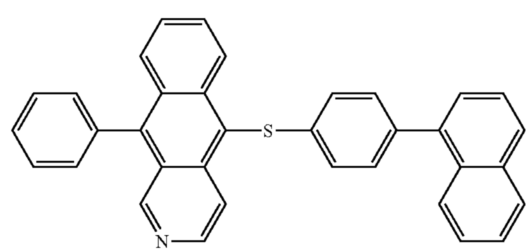
304
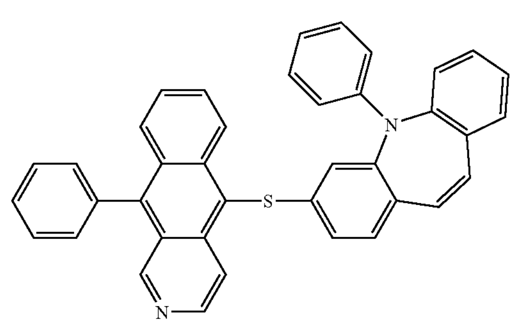

-continued
305
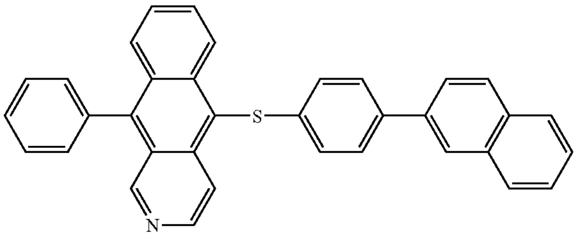
306
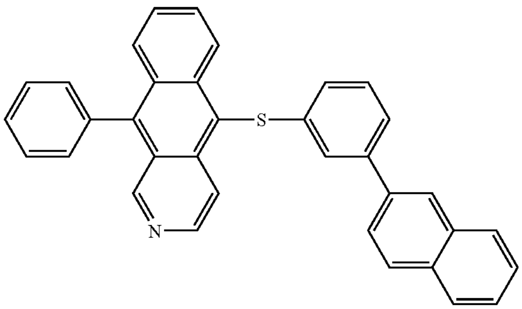
307
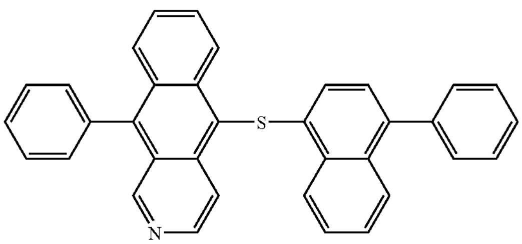
308
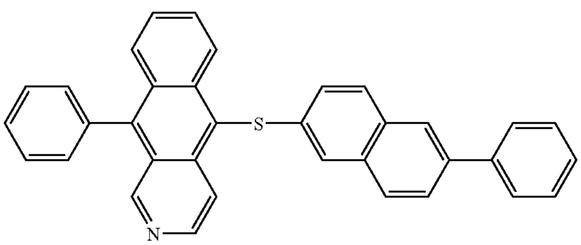
309
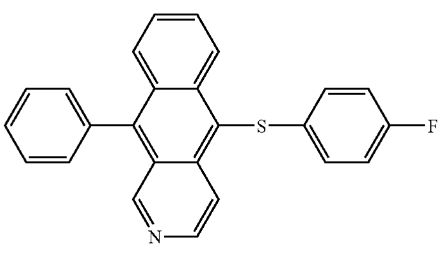
310
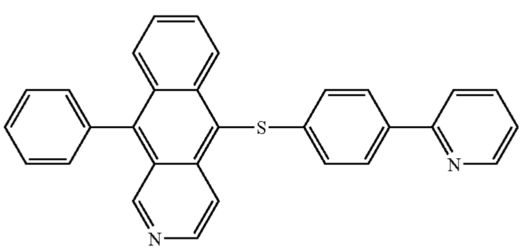
-continued
311
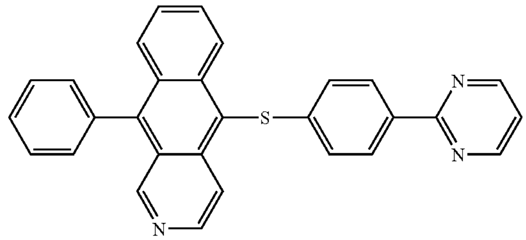
312
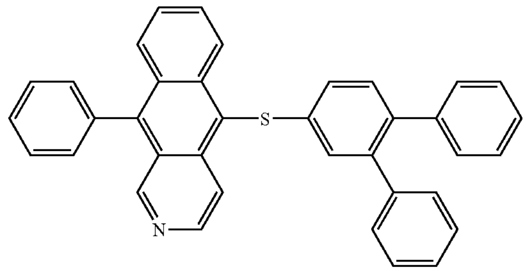
313
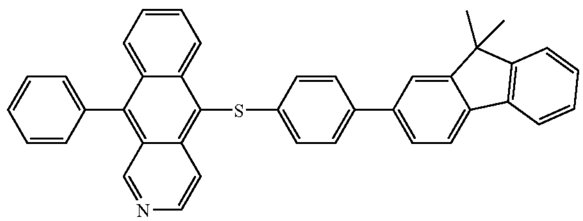
314
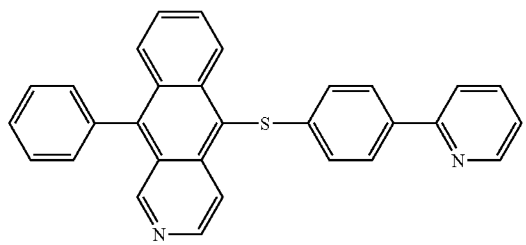
315
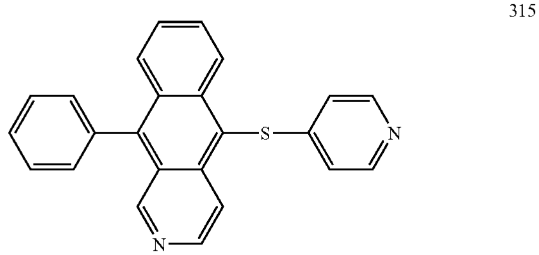
316
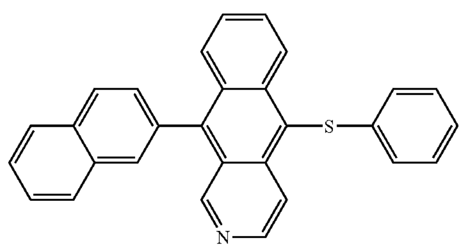

-continued
317
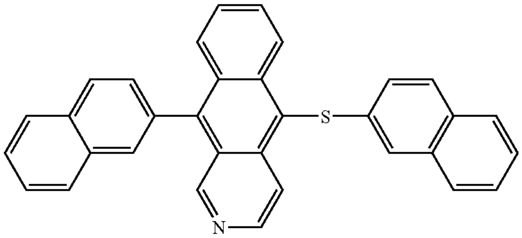
318
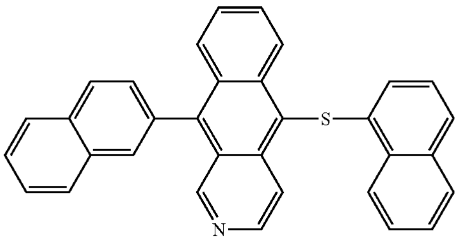
319
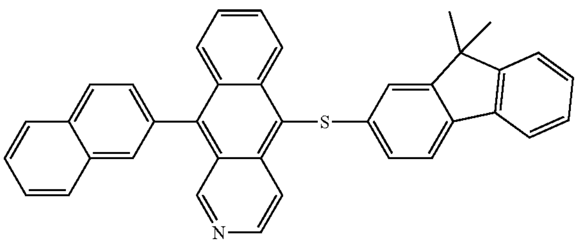
320
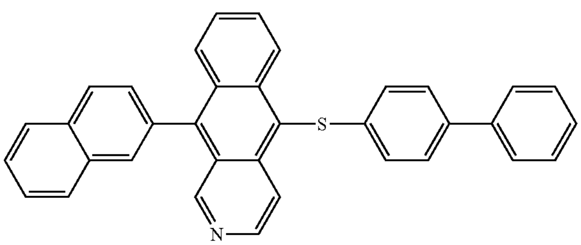
321
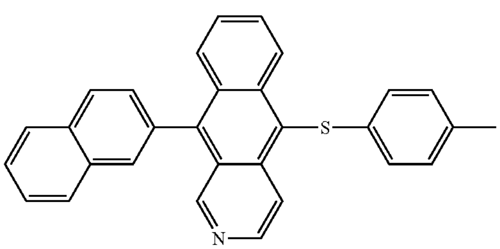
322
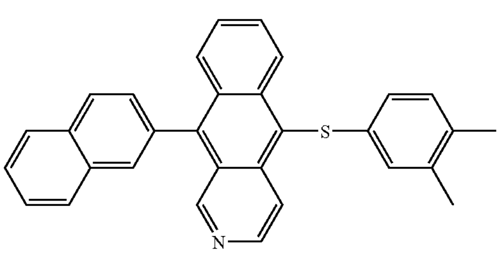
-continued
323
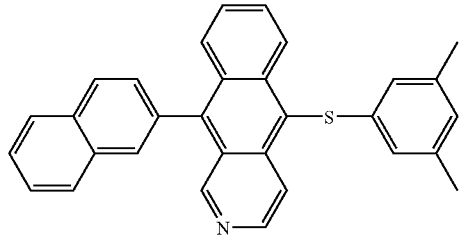
324
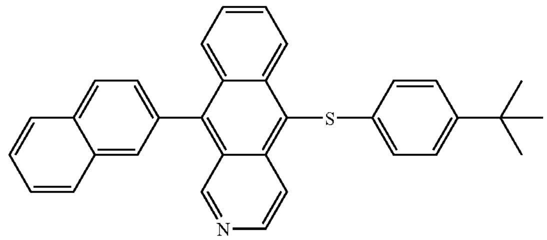
325
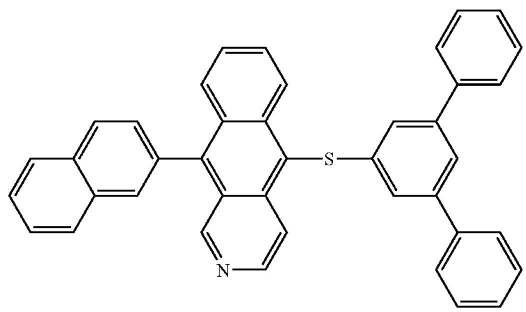
326
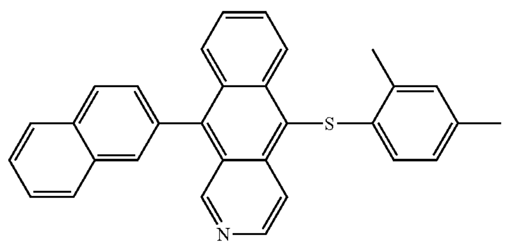
327
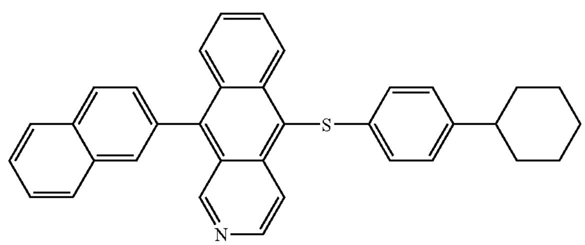
328
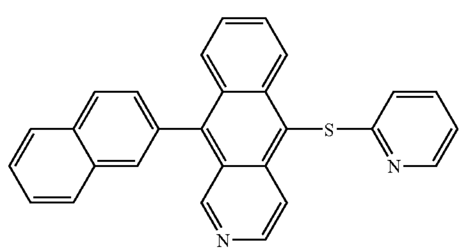

-continued
329
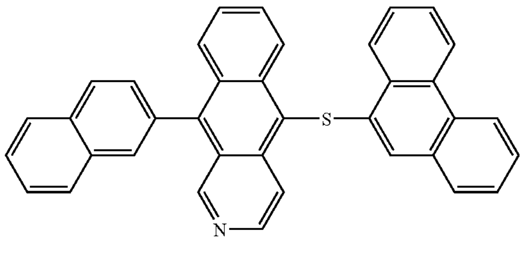
330
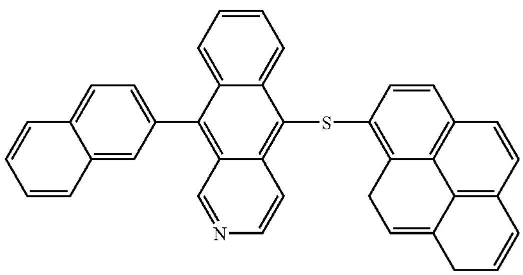
331
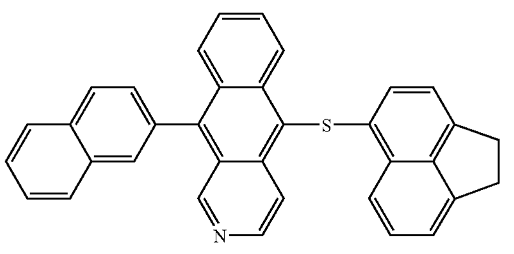
332
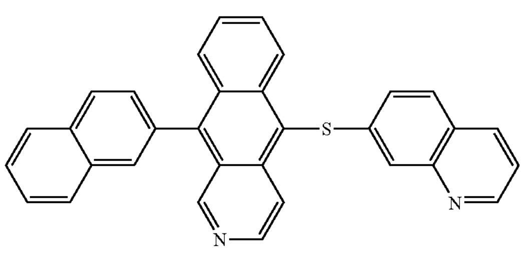
333
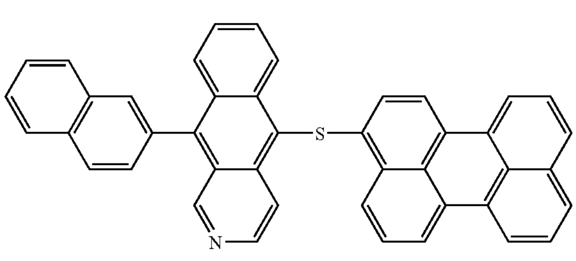
-continued
334
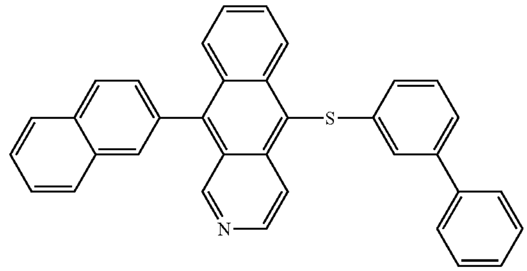
335
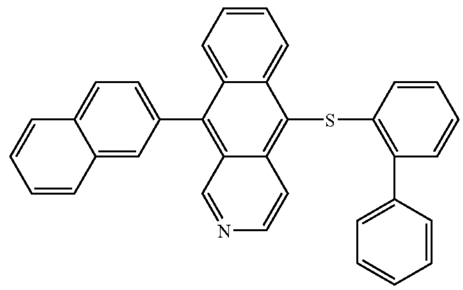
336
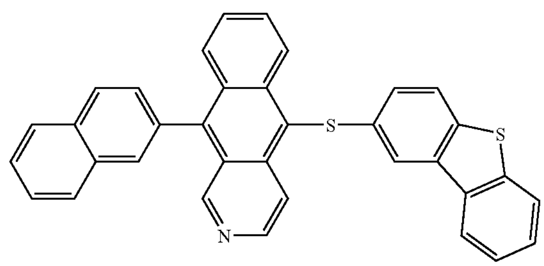
337
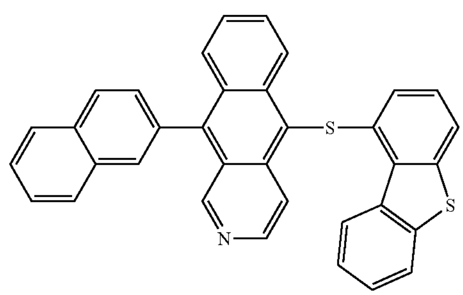
338
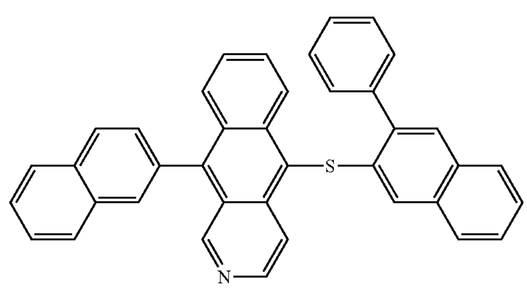

-continued
339
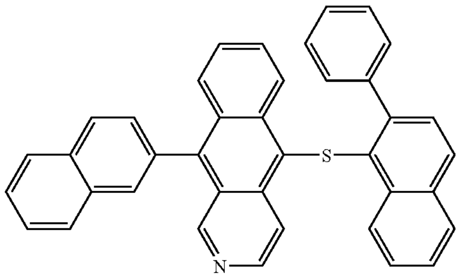
340
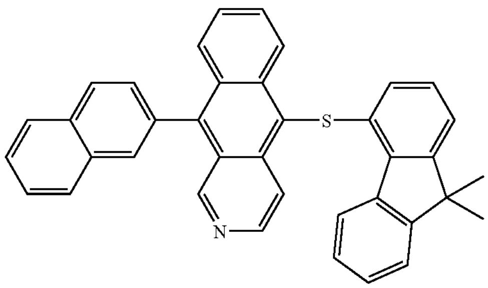
341
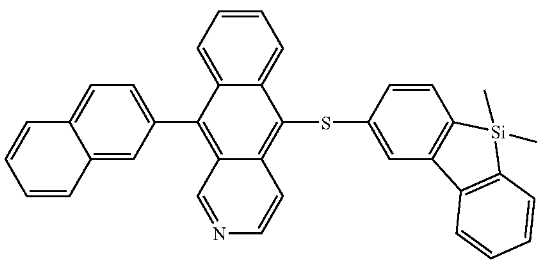
342
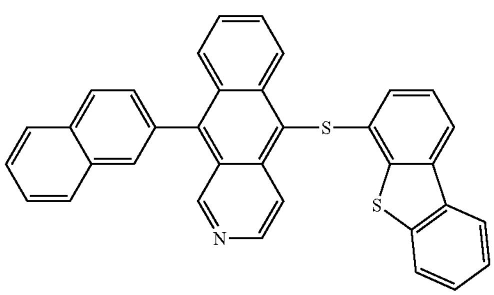
343
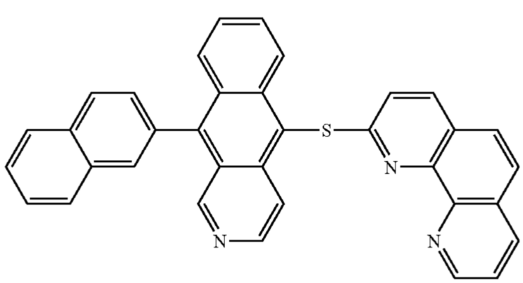
-continued
344
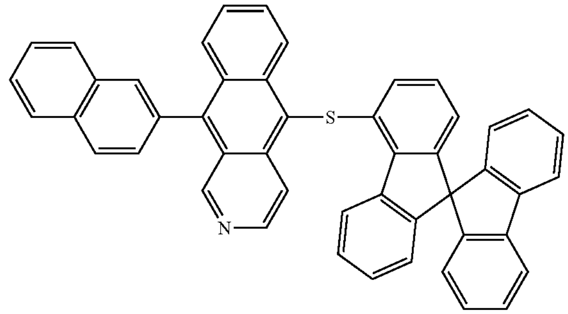
345
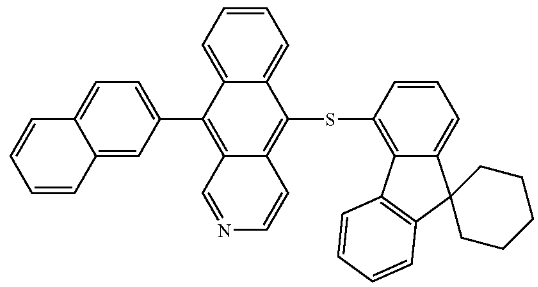
346
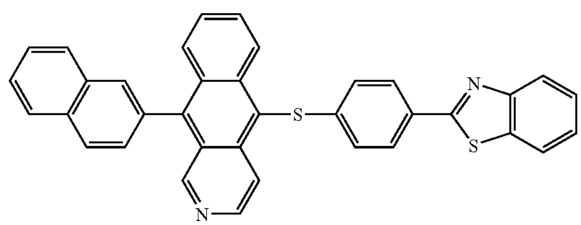
347
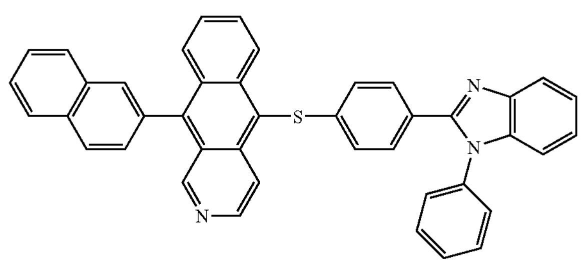
348
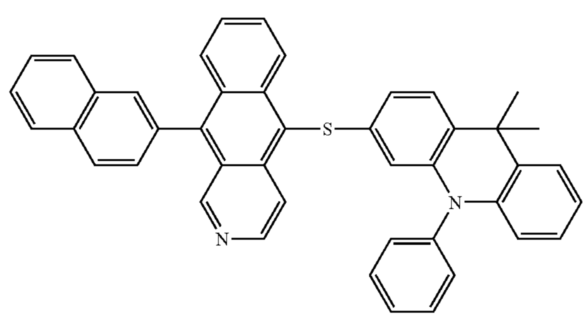

-continued
349
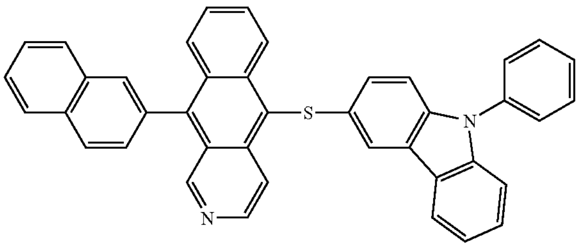
350
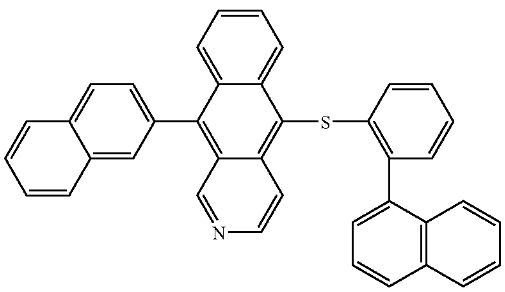
351
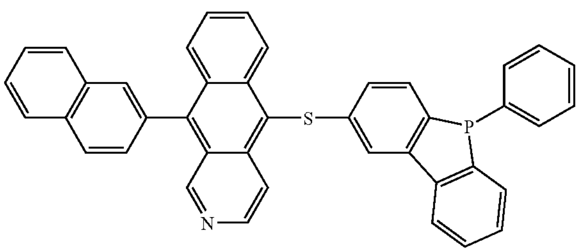
352
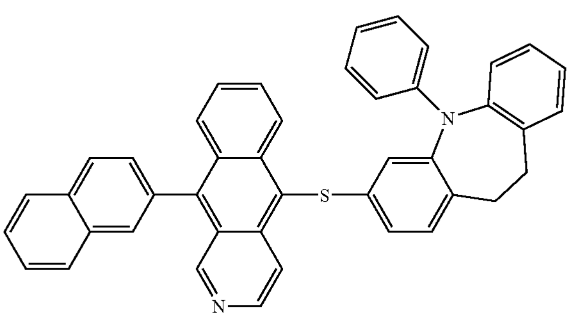
353
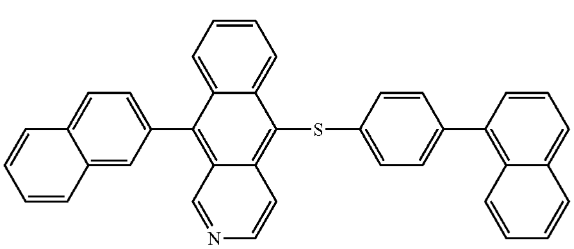
-continued
354
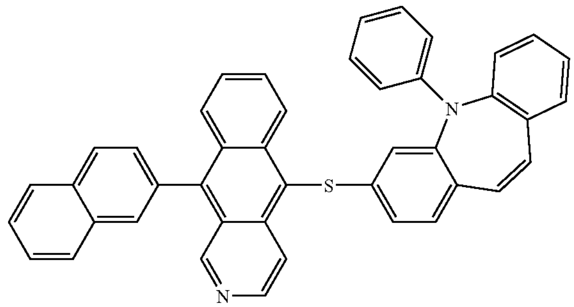
355
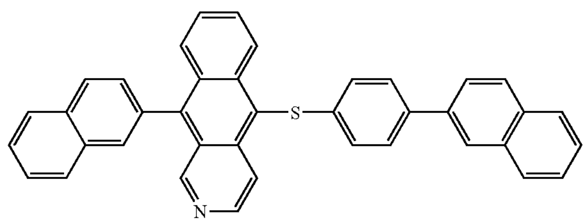
356
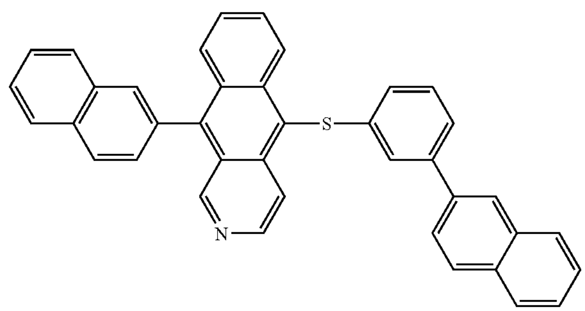
357
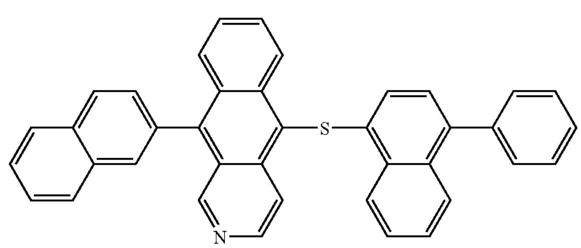
358
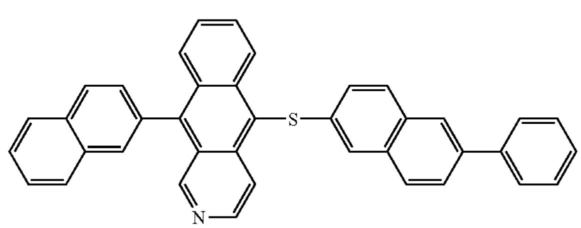

-continued
359
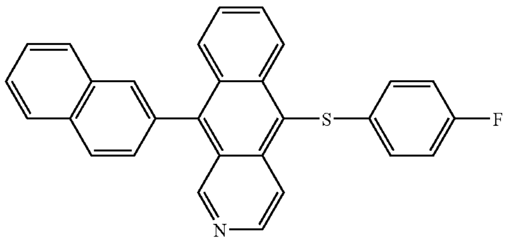
360
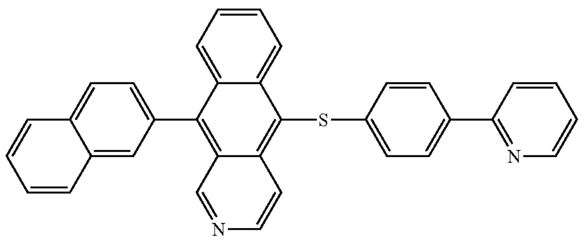
361
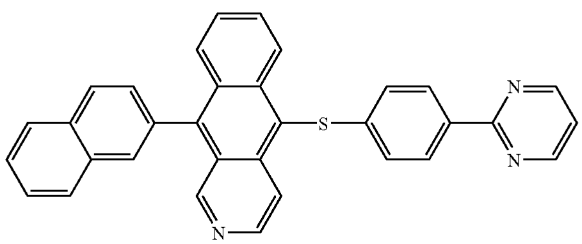
362
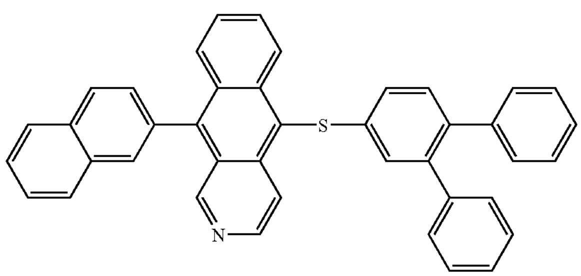
363
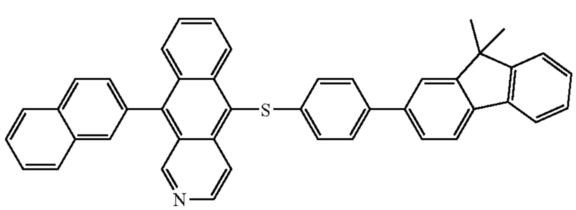
364
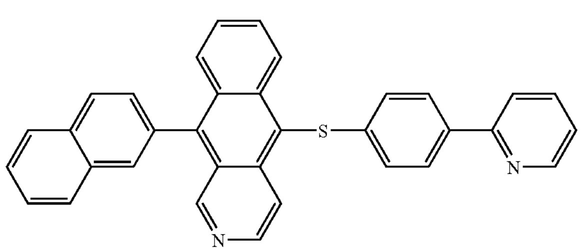
-continued
365
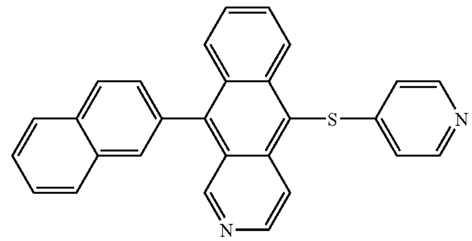
366
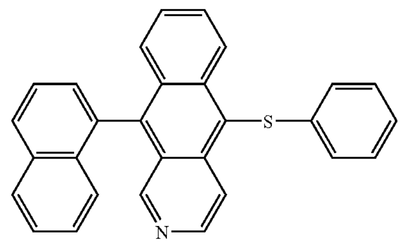
367
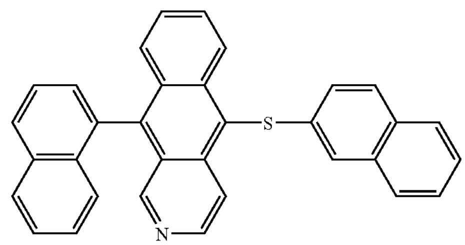
368
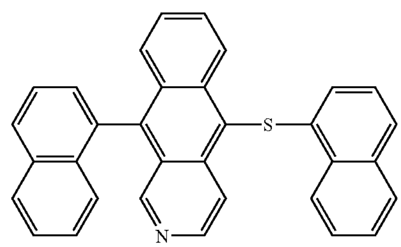
369
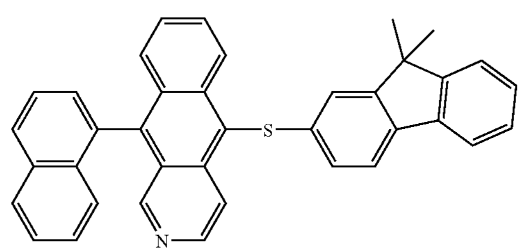
370
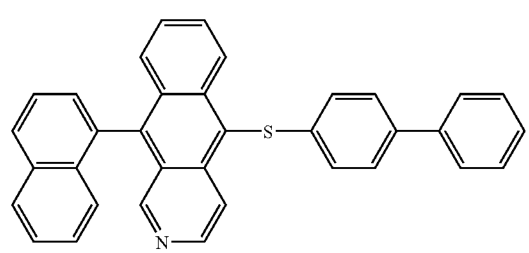

-continued
371
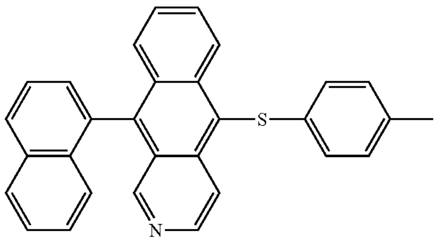
372
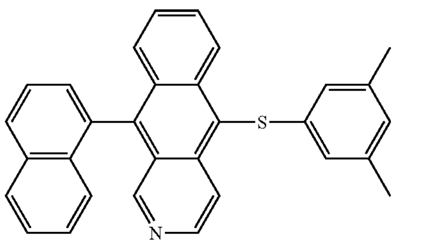
373
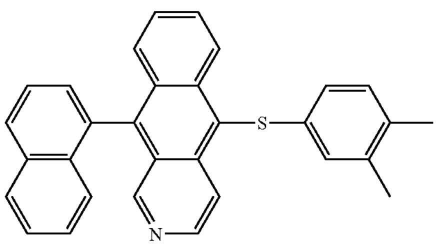
374
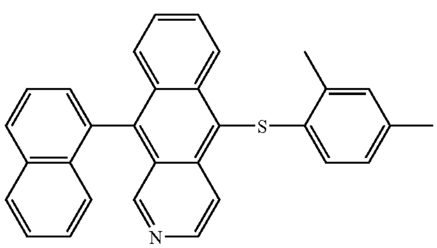
375
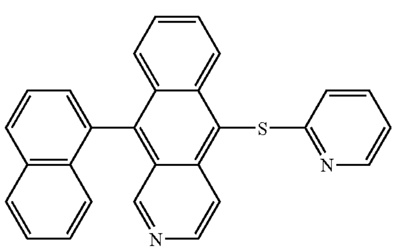
376
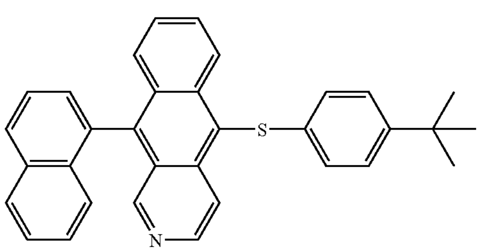
-continued
377
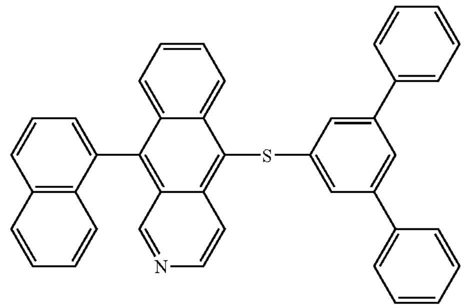
378
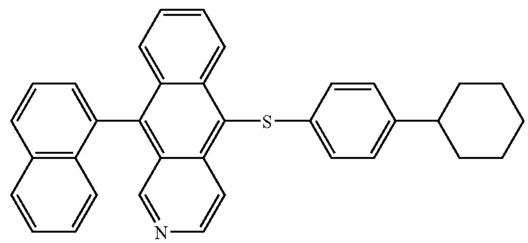
379
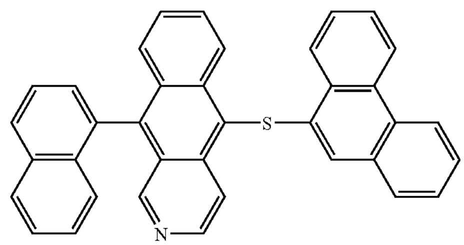
380
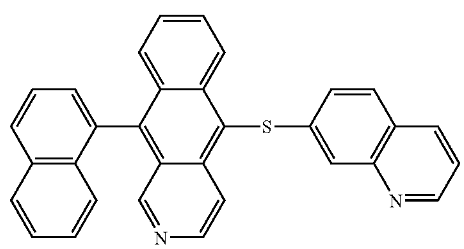
381
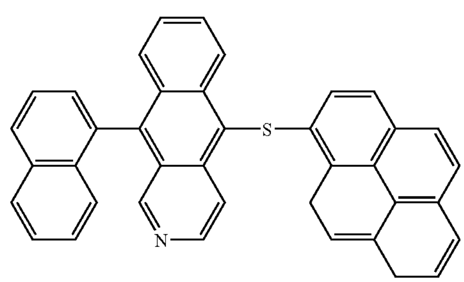
382
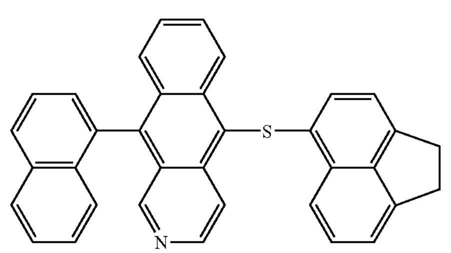

-continued
383
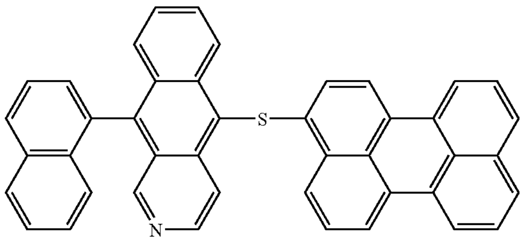
384
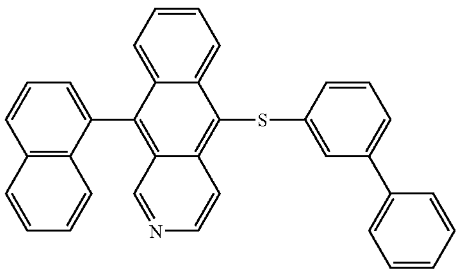
385
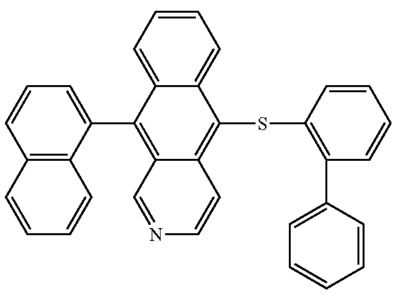
386
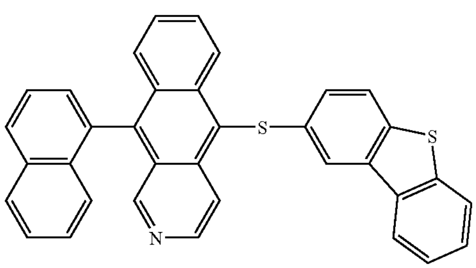
387
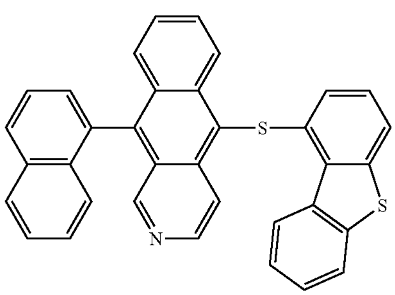
-continued
388
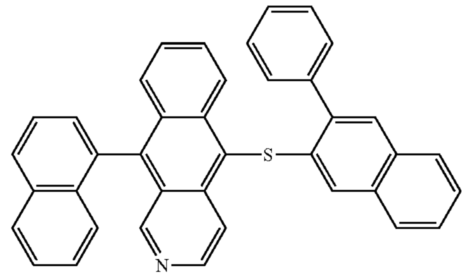
389
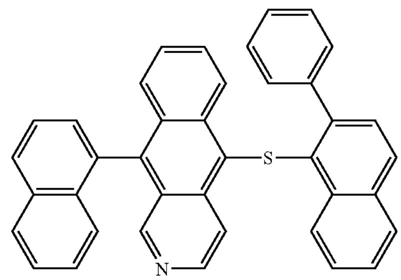
390
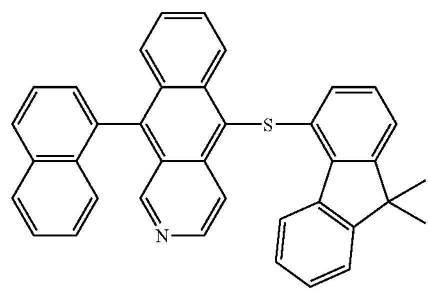
391
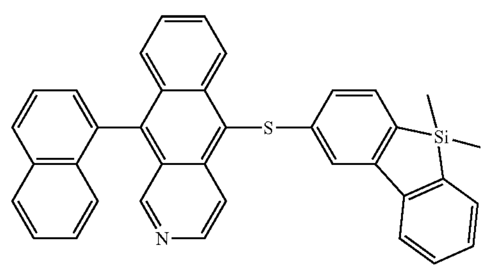
392
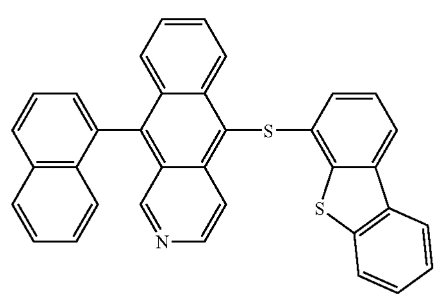

-continued
393
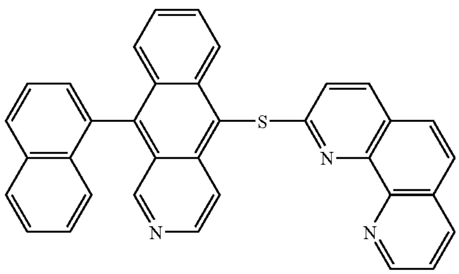
394
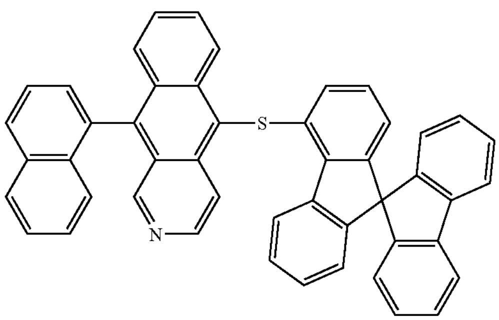
395
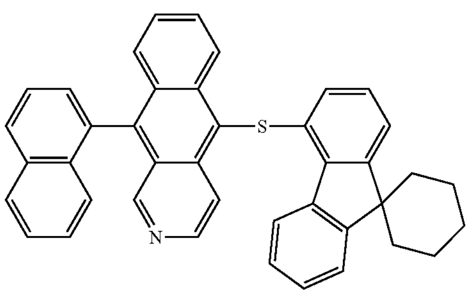
396
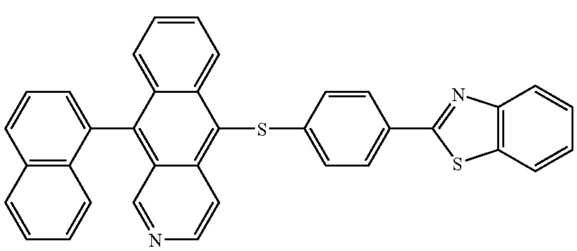
397
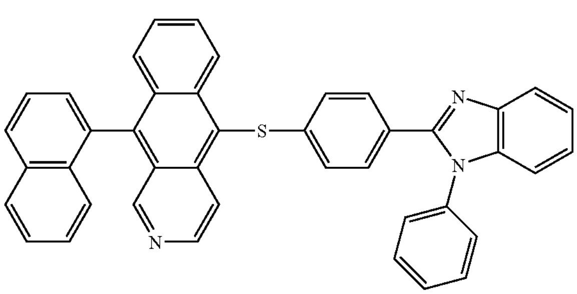
-continued
398
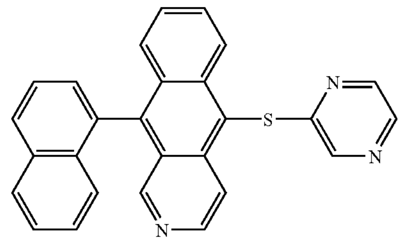
399
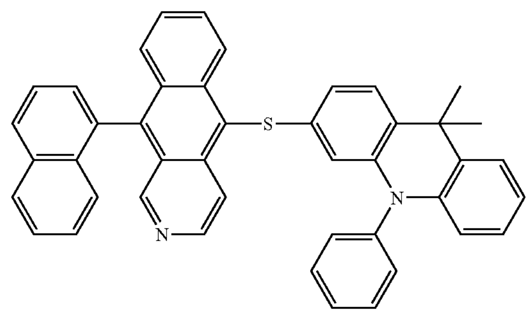
400
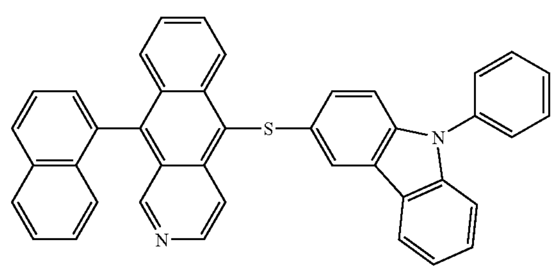
401
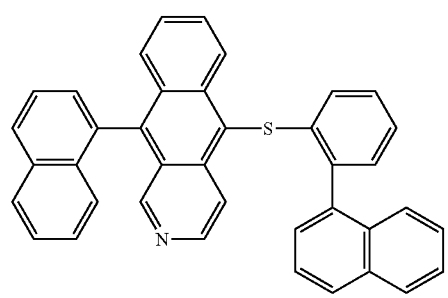
402
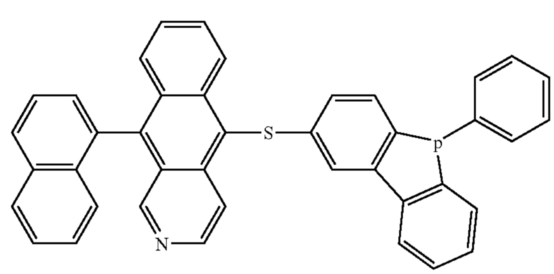

-continued
403
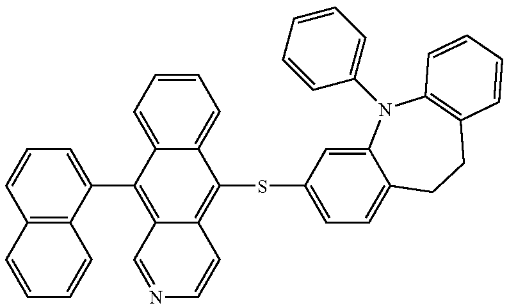
404
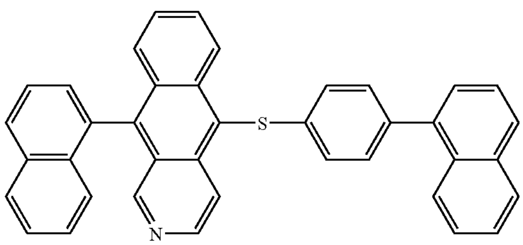
405
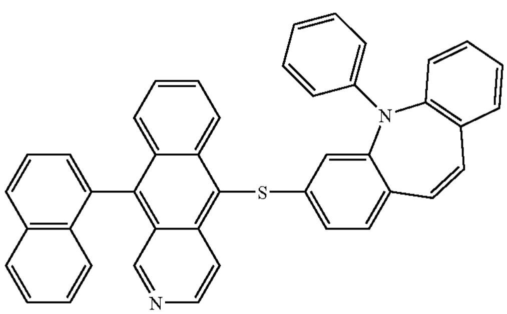
406
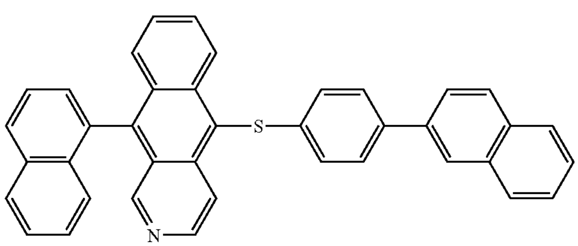
407
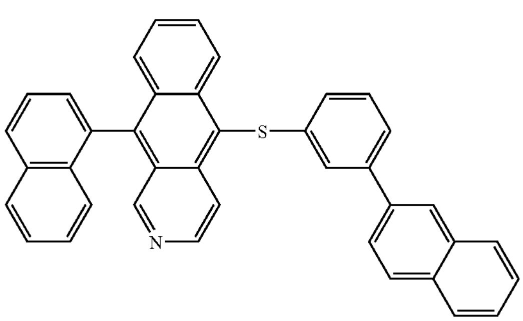
-continued
408
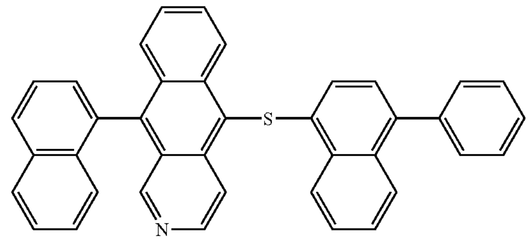
409
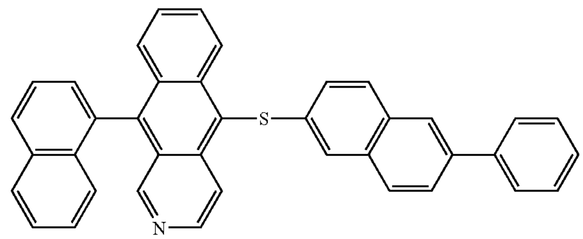
500
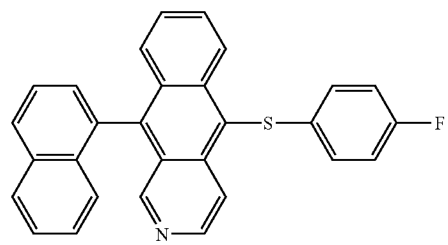
501
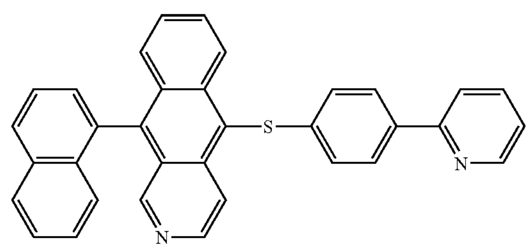
502
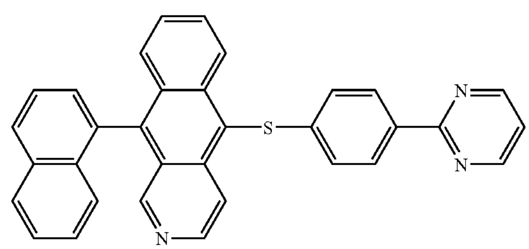
503
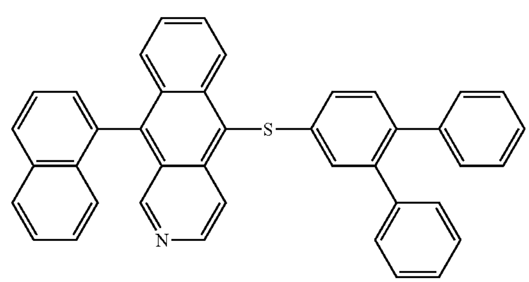

-continued
504
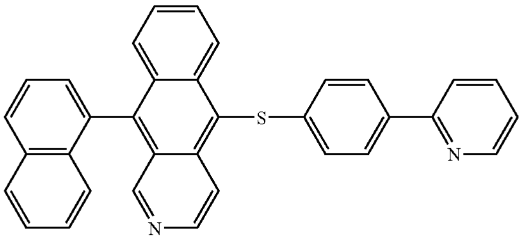
505
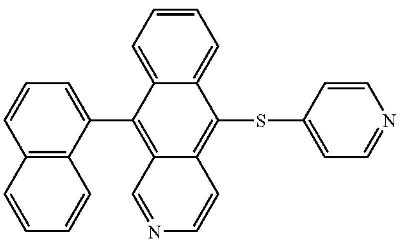
506
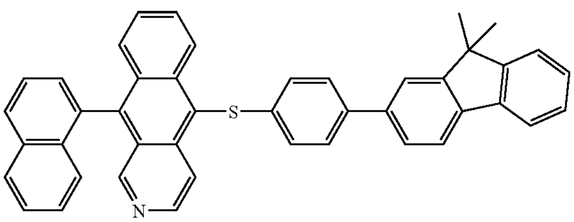
507
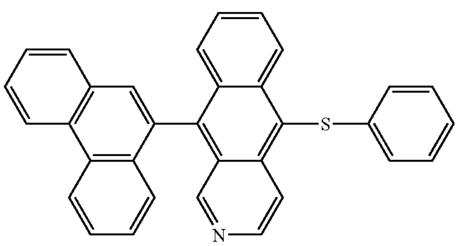
508
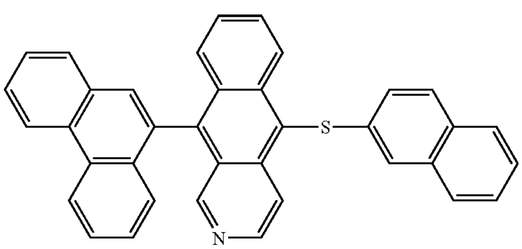
509
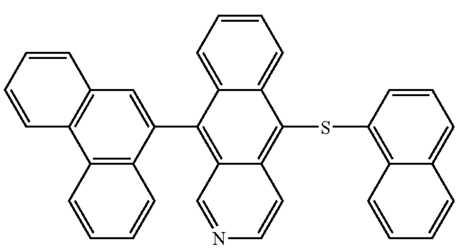
-continued
510
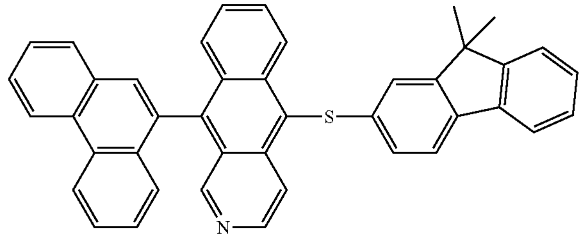
511
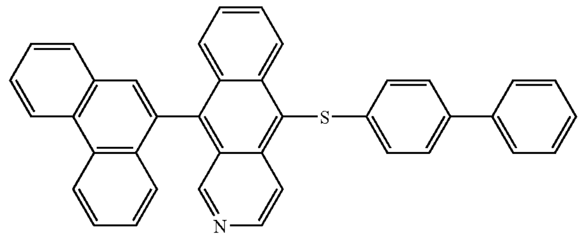
512
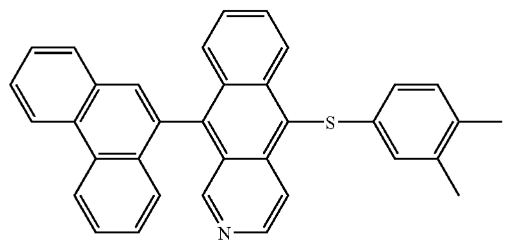
513
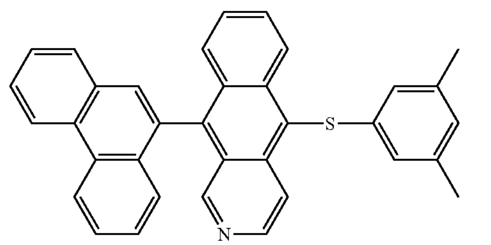
514
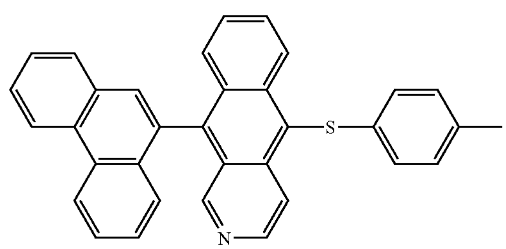
515
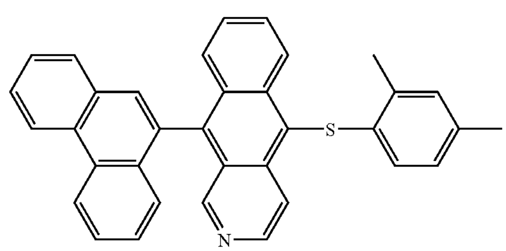

-continued
516
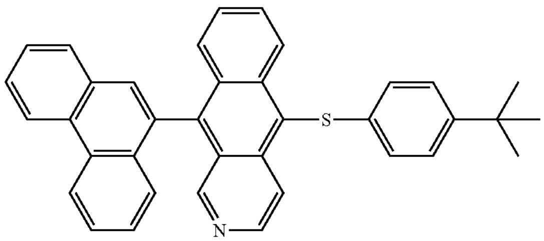
517
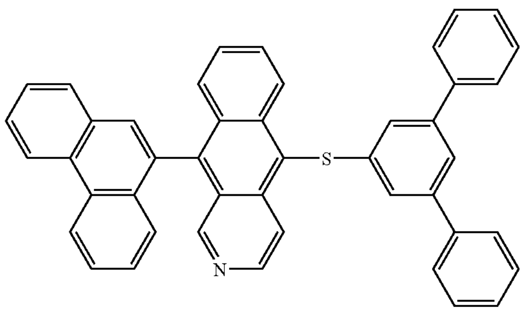
518
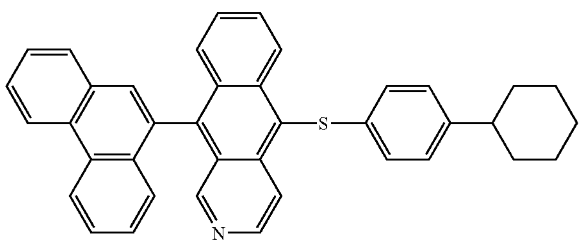
519
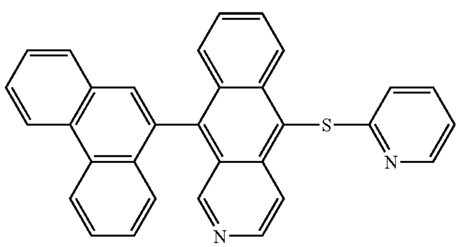
520
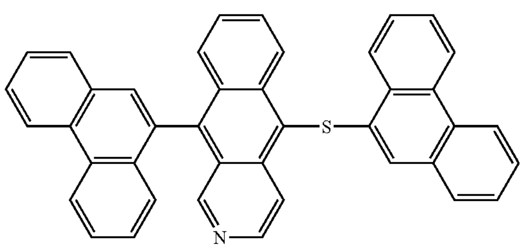
521
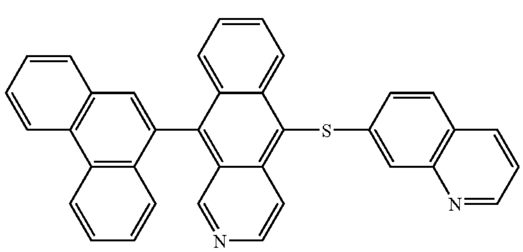
-continued
522
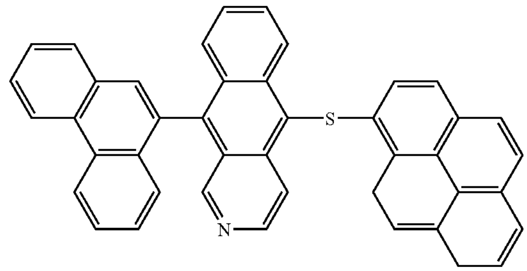
523
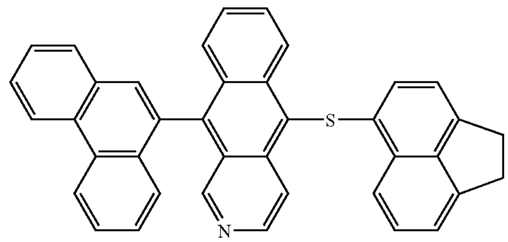
524
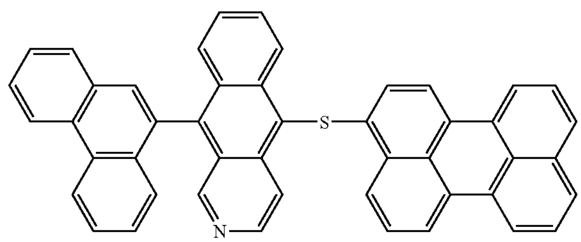
525
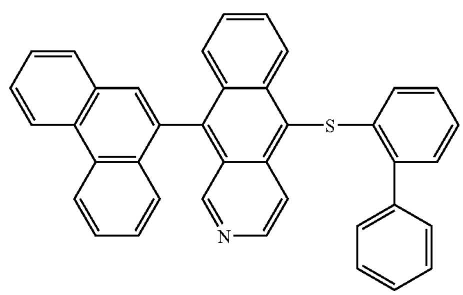
526
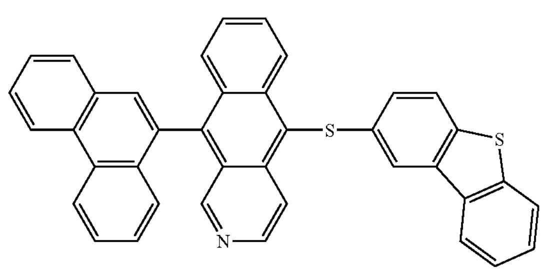

-continued
527
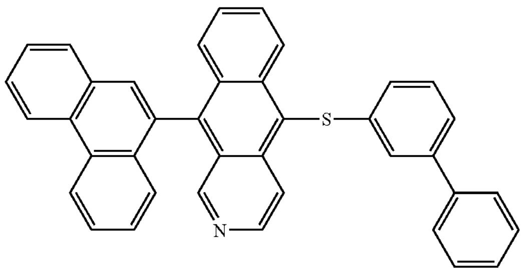
528
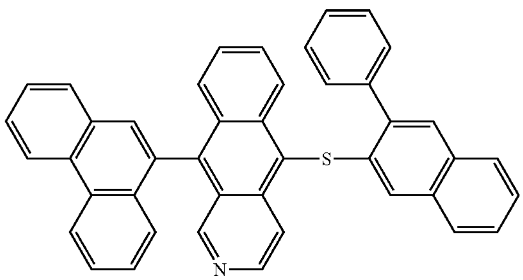
529
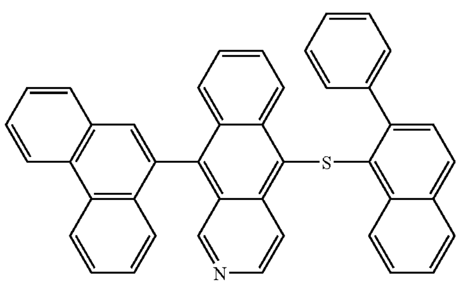
530
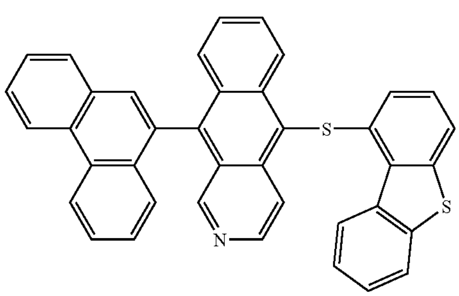
531
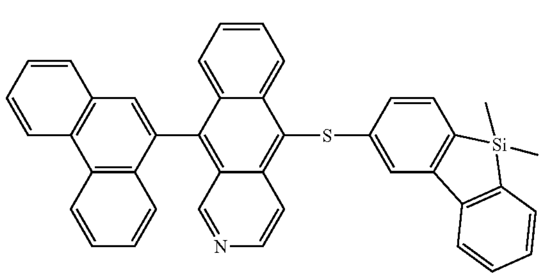
-continued
532
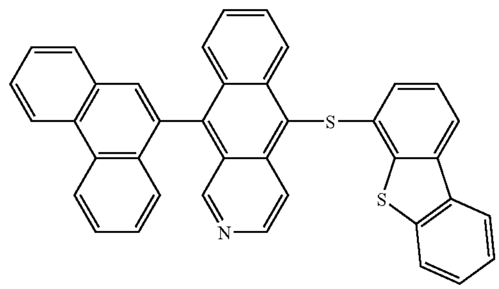
533
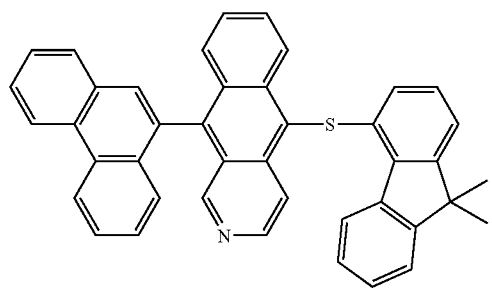
534
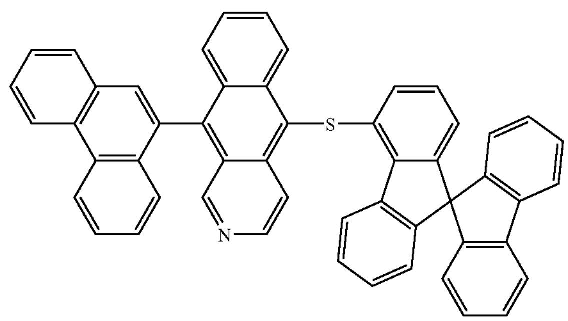
535
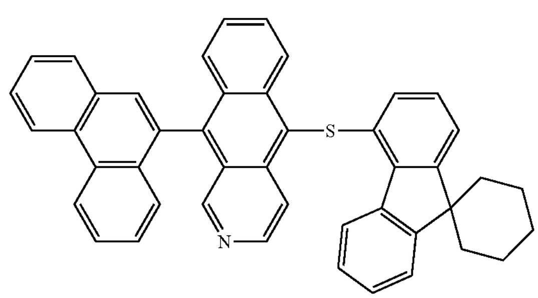
536
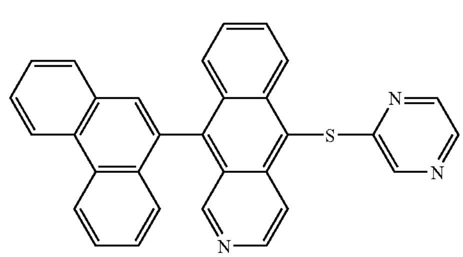

-continued
537
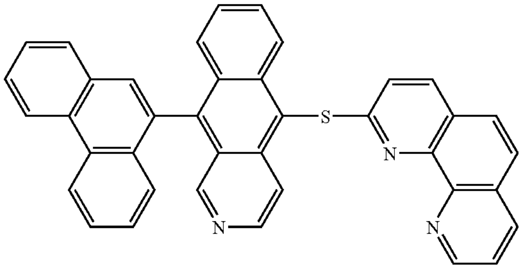
538
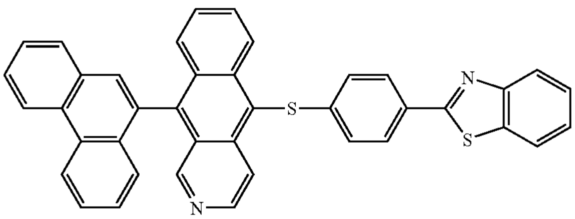
539
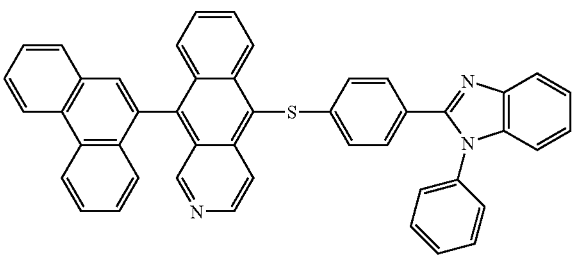
540
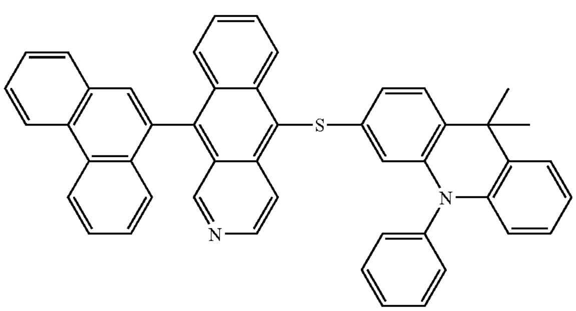
541
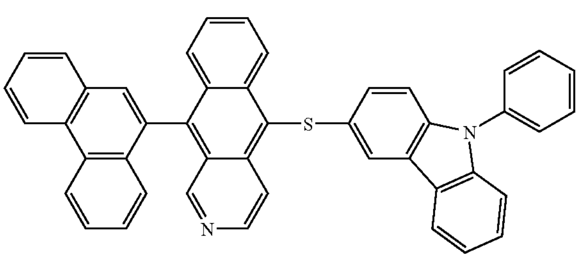
-continued
542
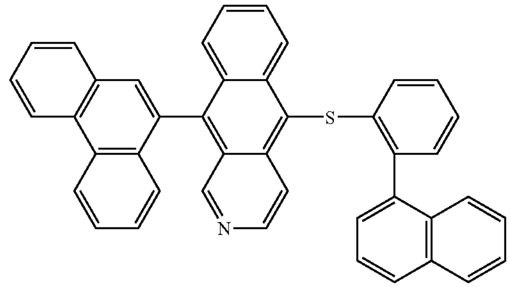
543
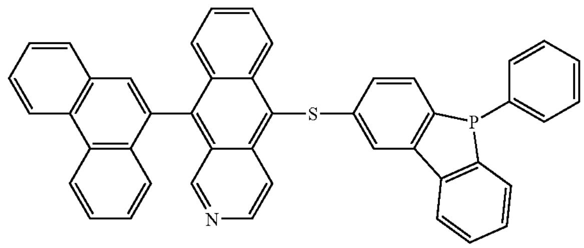
544
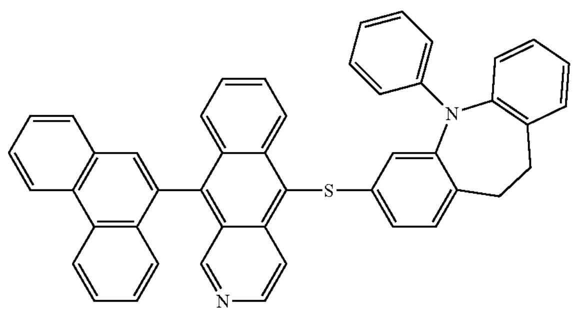
545
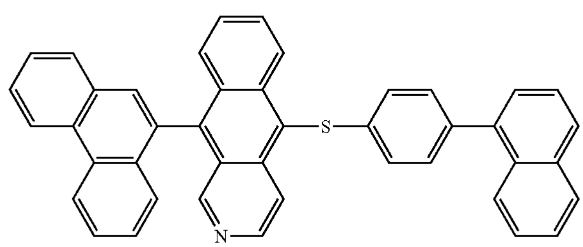
546
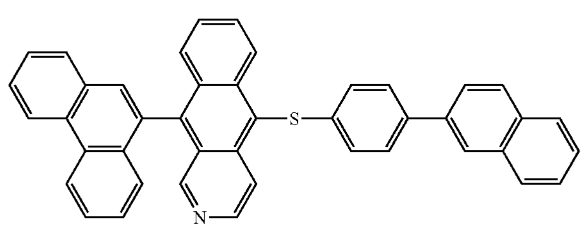

-continued
547
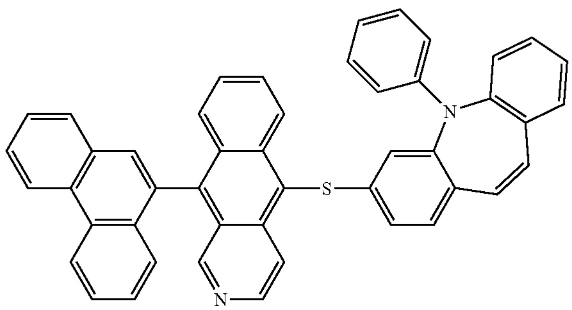
548
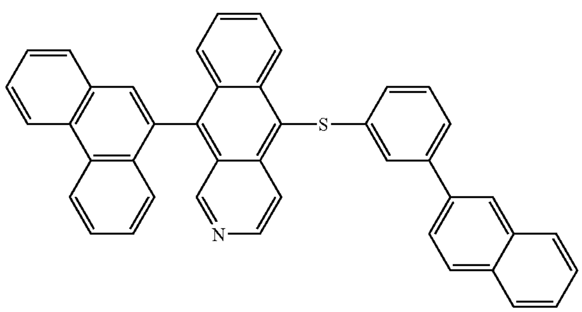
549
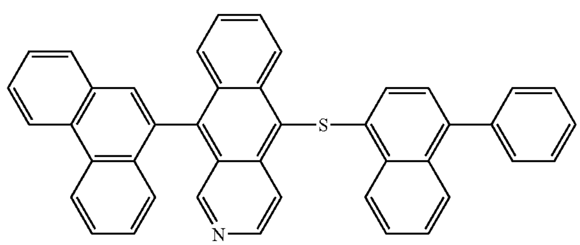
550
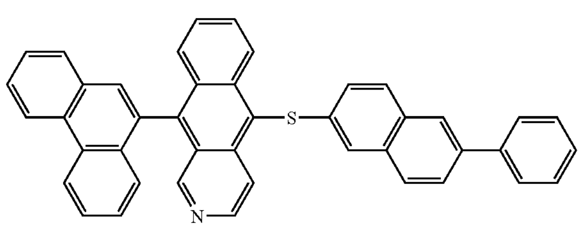
551
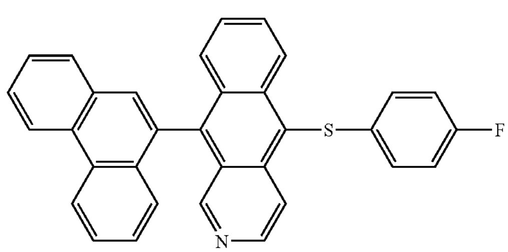
-continued
552
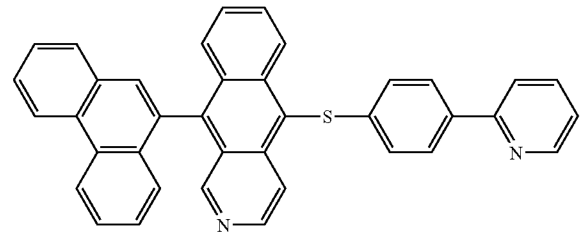
553
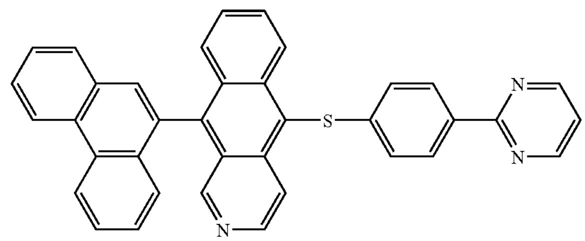
554
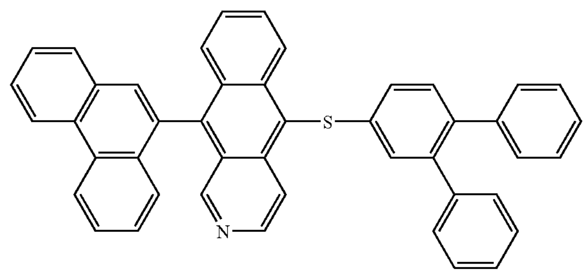
555
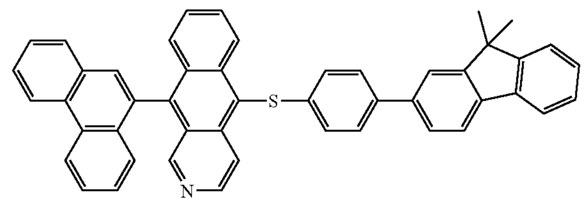
556
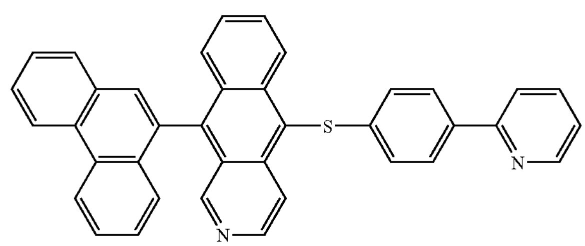
557
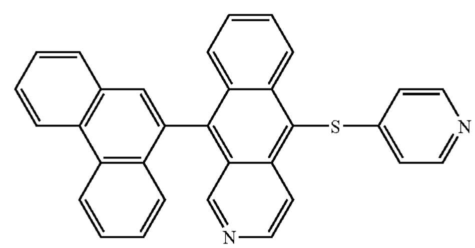

-continued
558
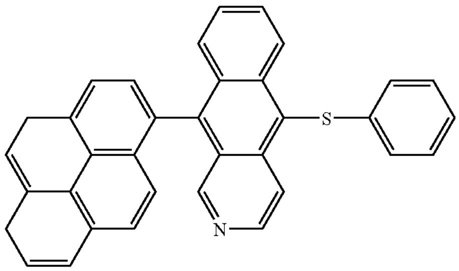
559
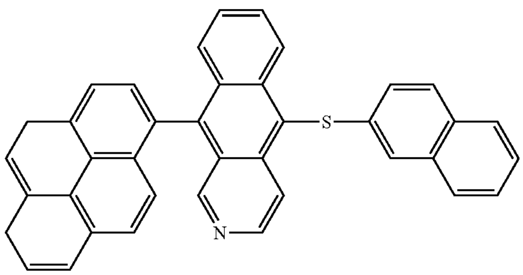
560
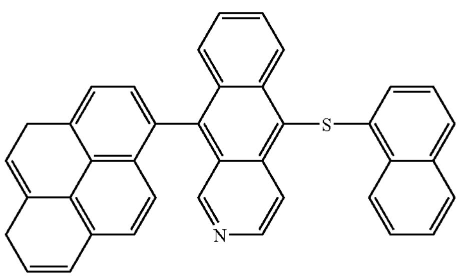
561
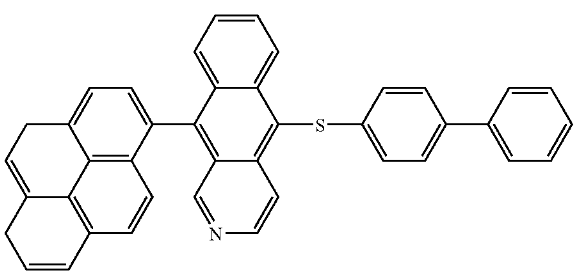
562
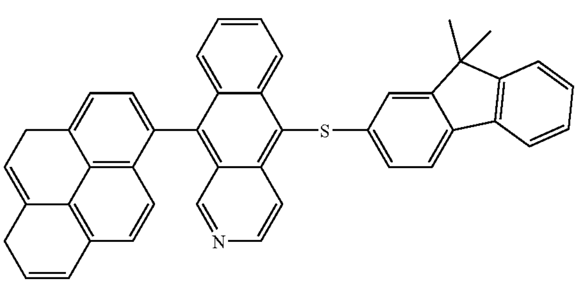
-continued
563
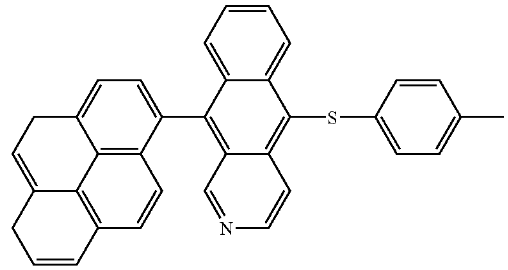
564
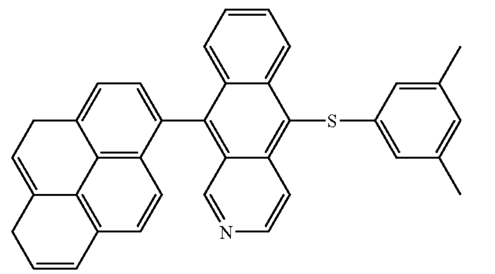
565
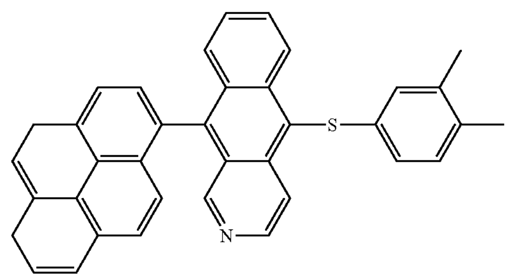
566
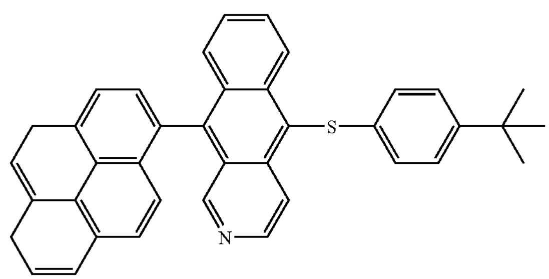
567
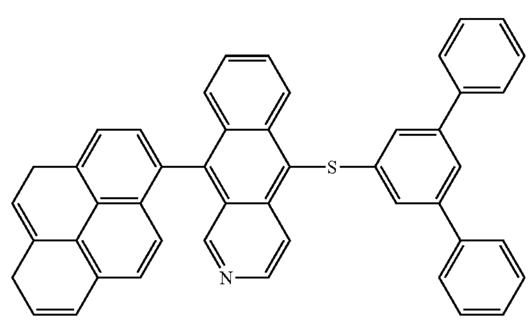

-continued
568
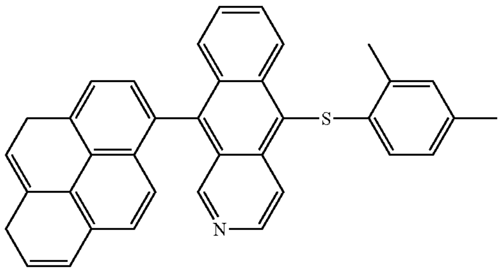
569
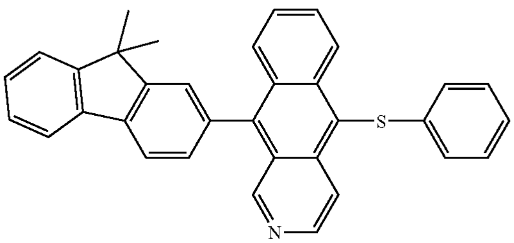
570
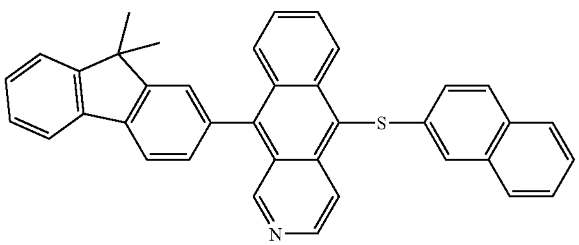
571
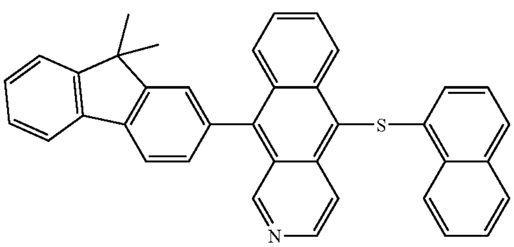
572
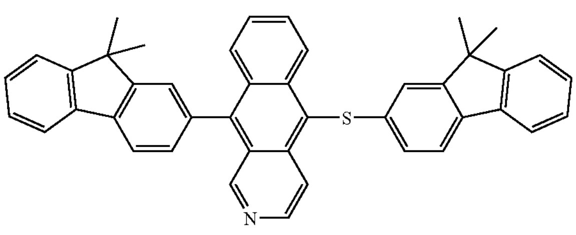
573
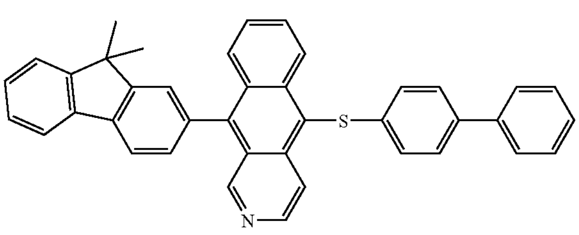
-continued
574
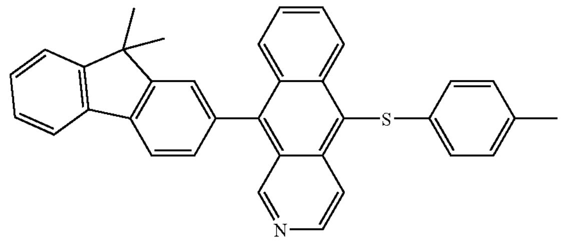
575
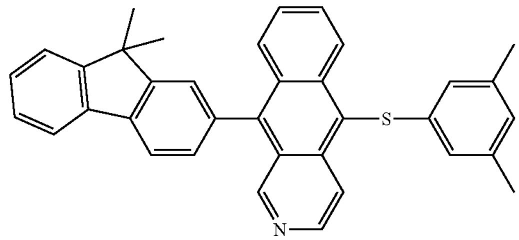
576
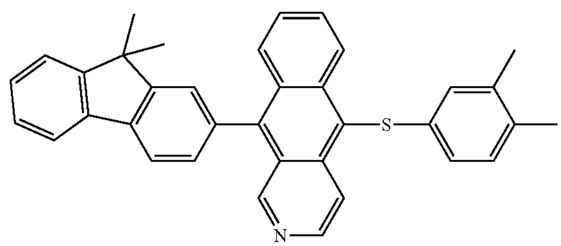
577
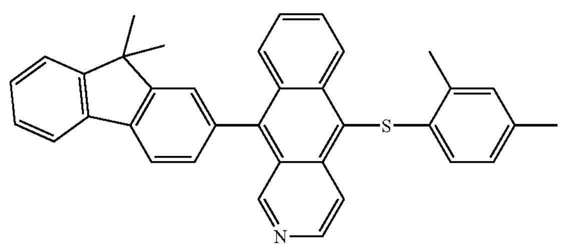
578
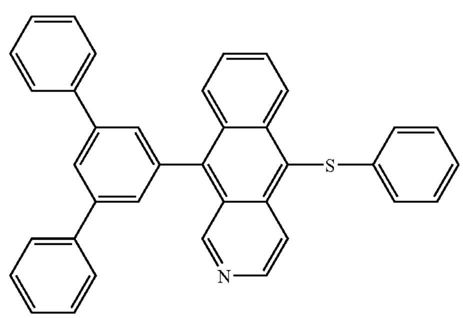
579
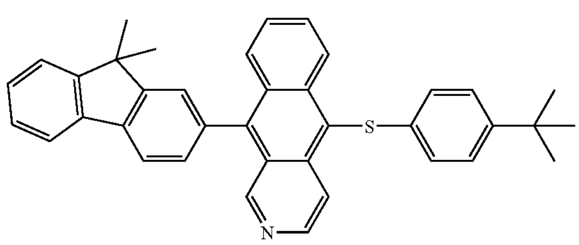

-continued
580
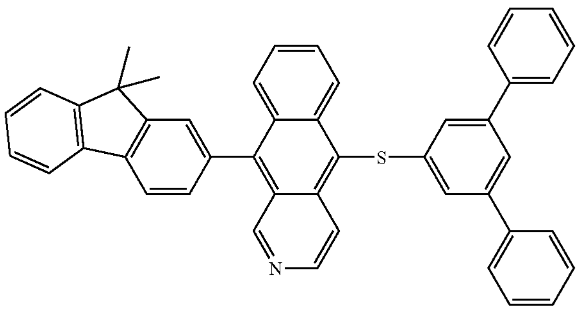
581
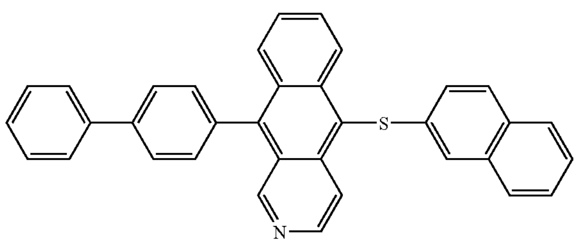
582
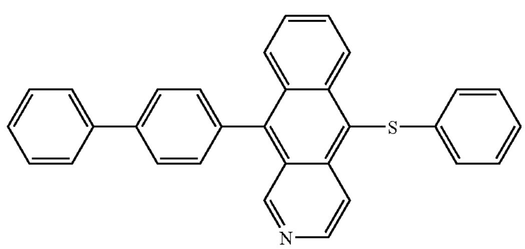
583
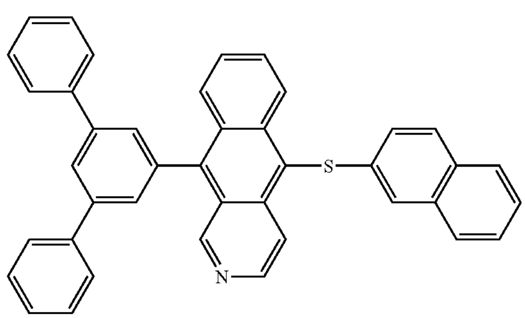
584
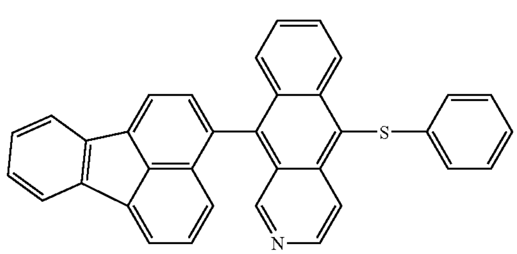
-continued
585
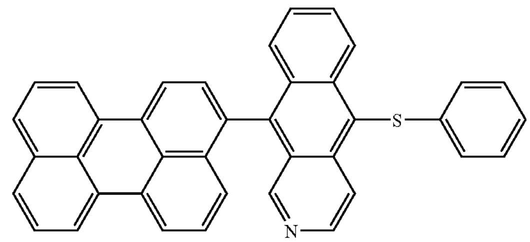
586
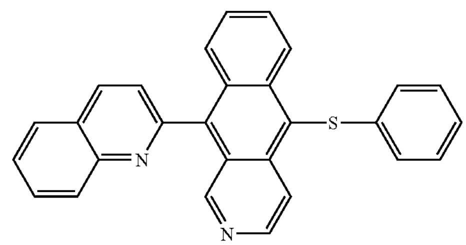
587
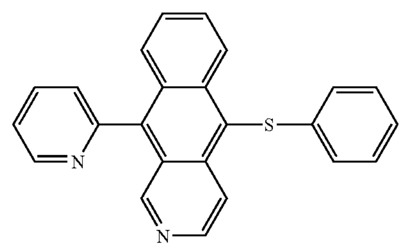
588
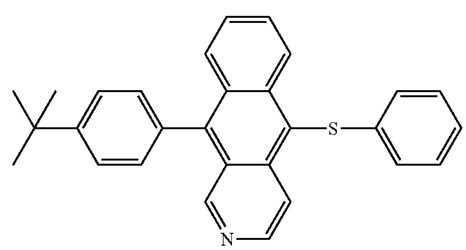
589
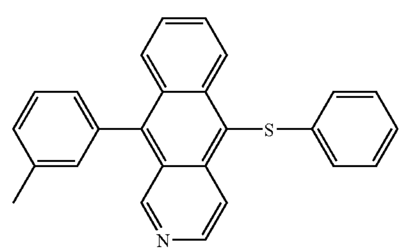
590
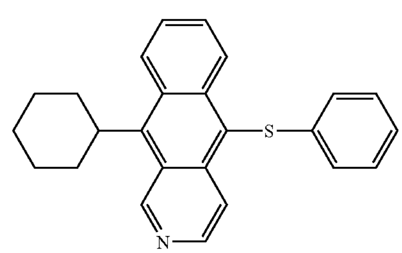

-continued
591
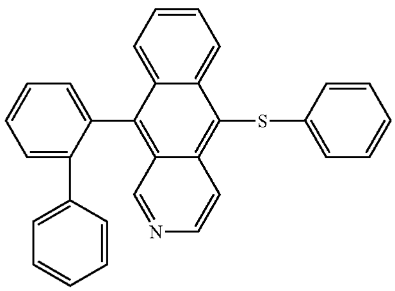
592
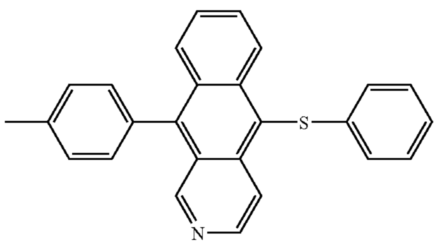
593
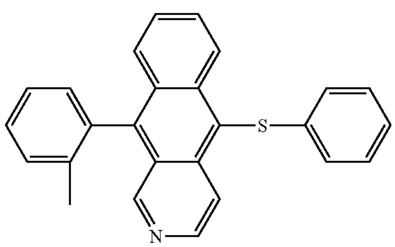
594
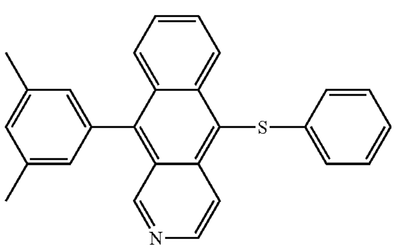
595
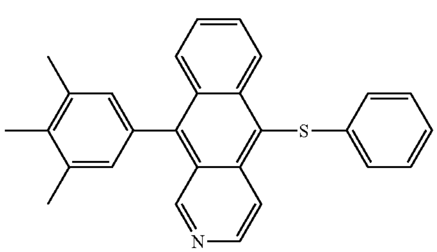
596
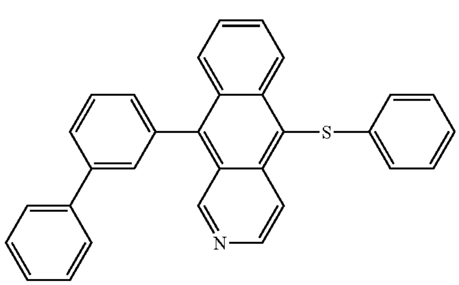
-continued
597
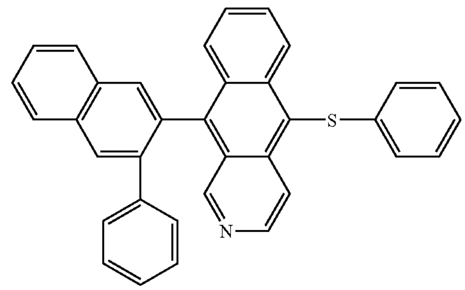
598
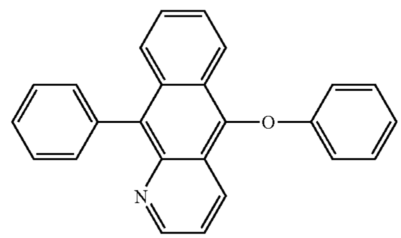
599
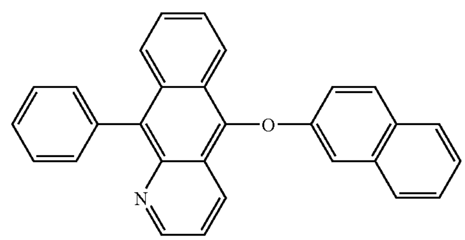
600
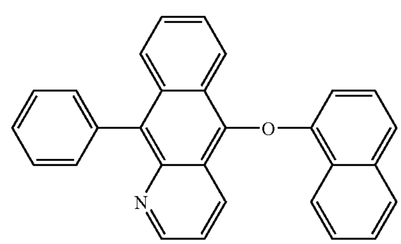
601
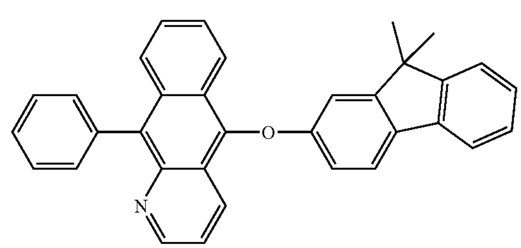
602
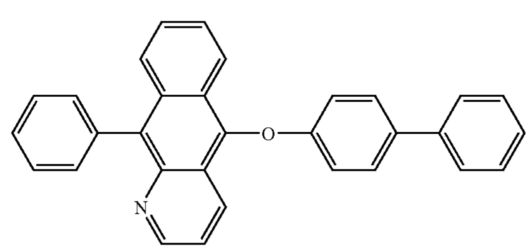

-continued
603
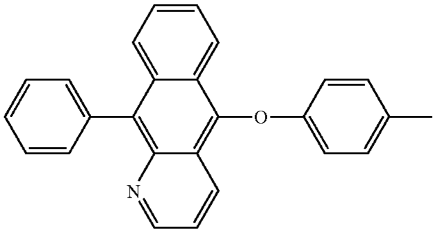
604
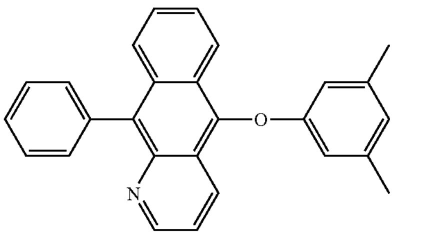
605
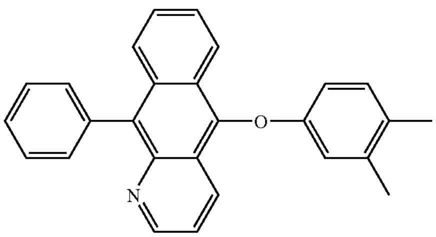
606
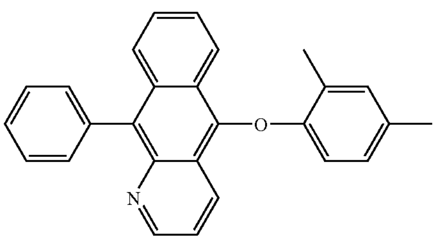
607
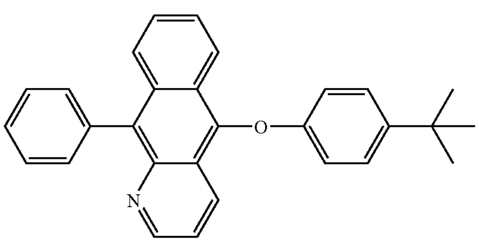
608
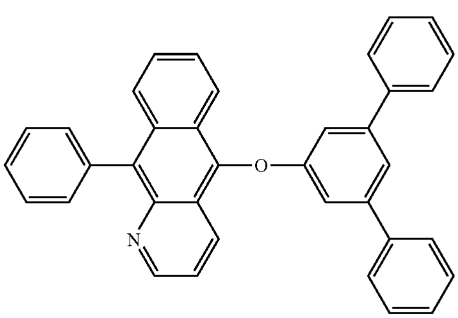
-continued
609
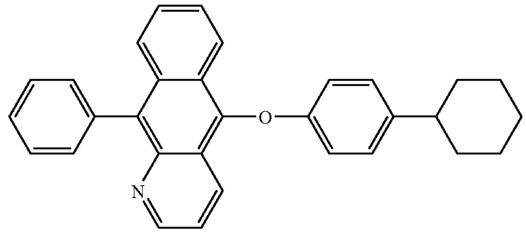
610
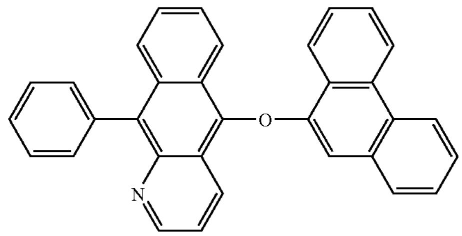
611
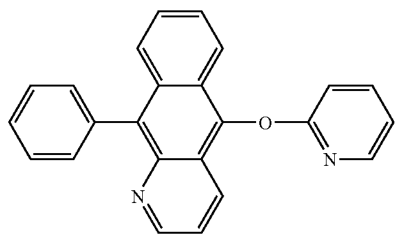
612
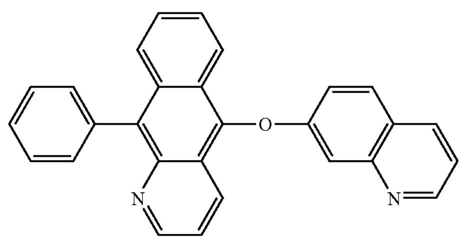
613
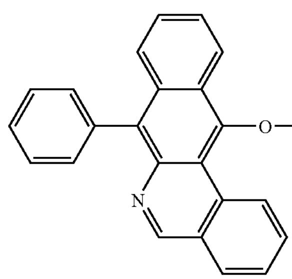
614
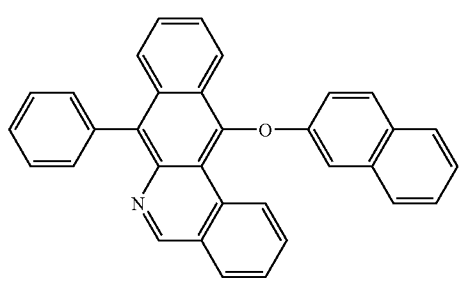

-continued
615
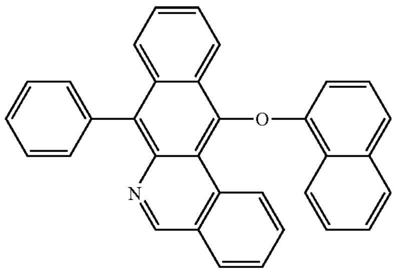
616
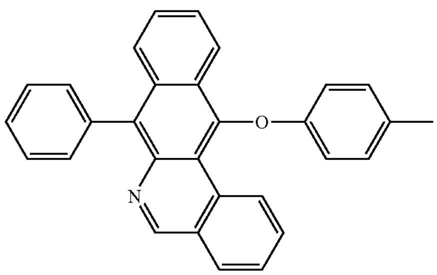
617
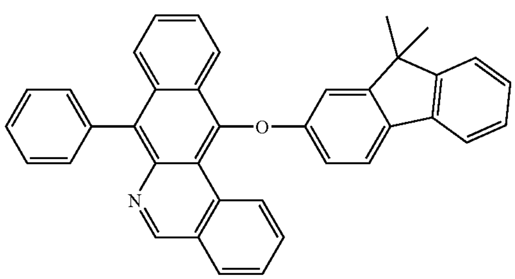
618
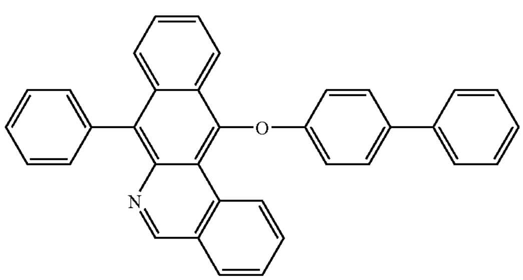
619
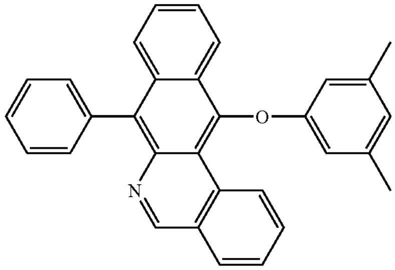
-continued
620
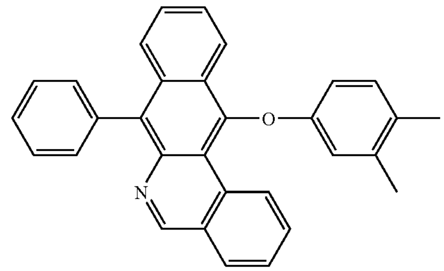
621
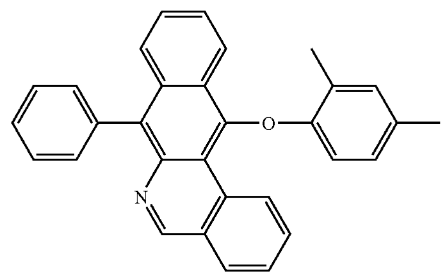
622
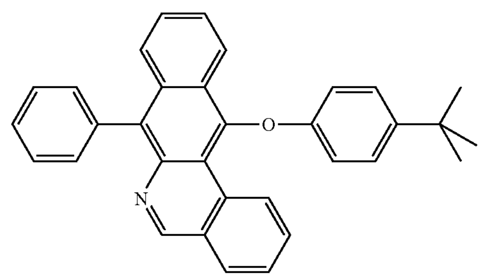
623
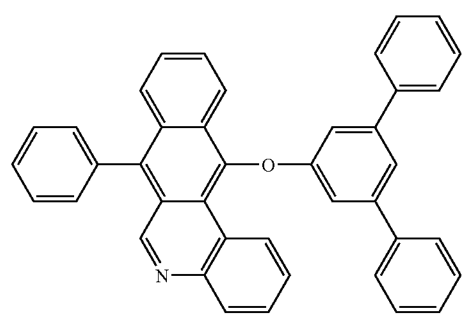
624
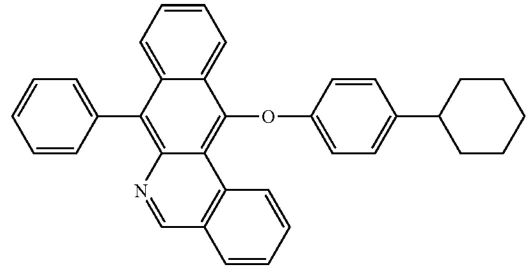

-continued
625
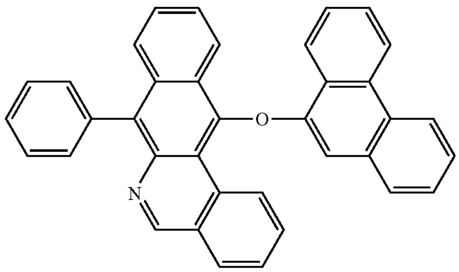
626
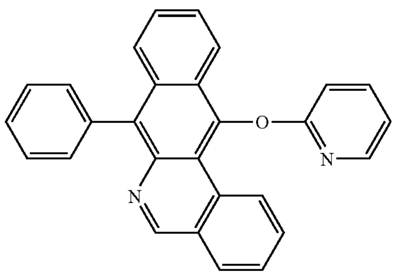
627
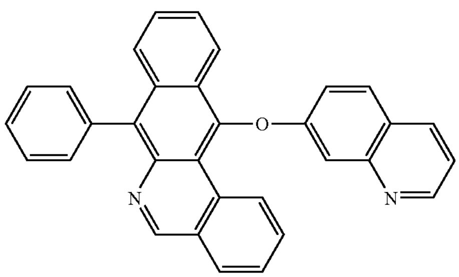
628
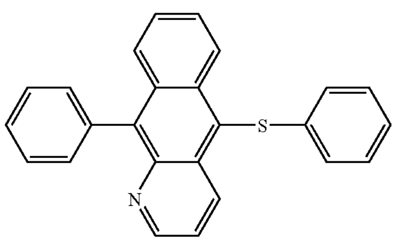
629
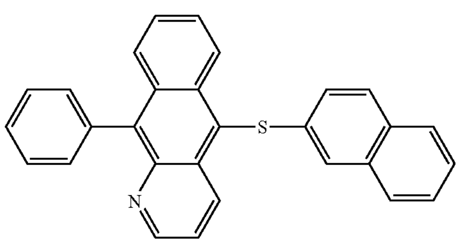
630
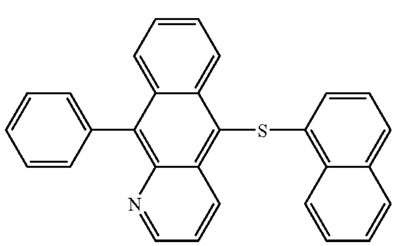
-continued
631
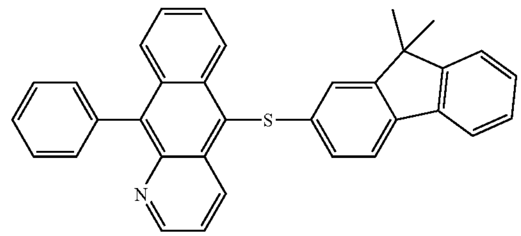
632
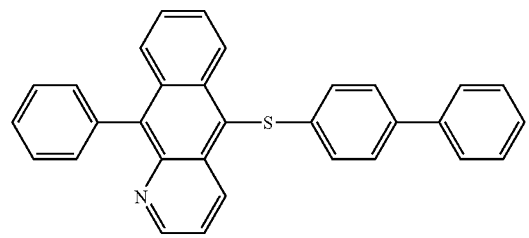
633
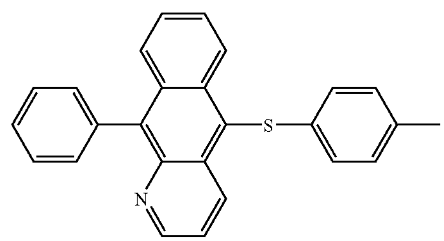
634
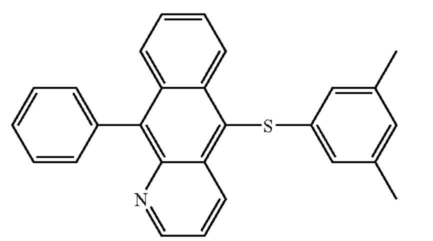
635
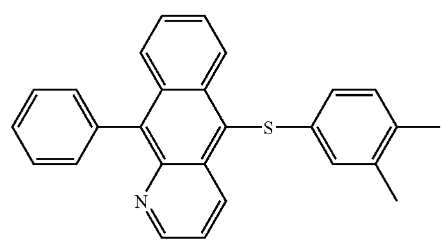
636
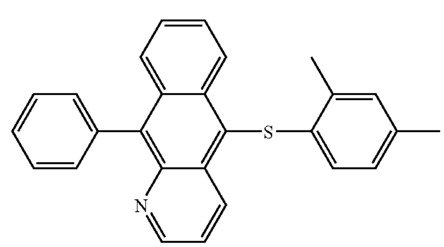

-continued
637
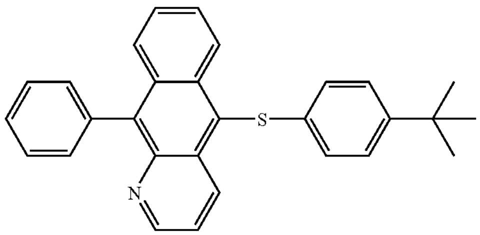
638
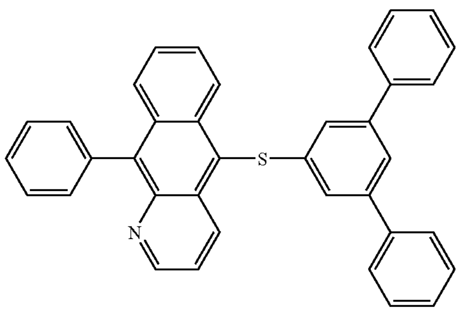
639
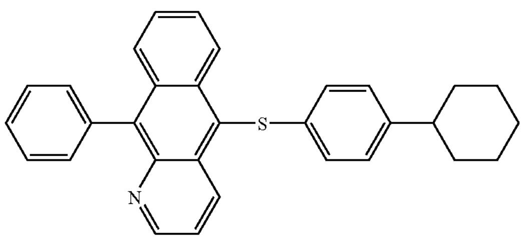
640
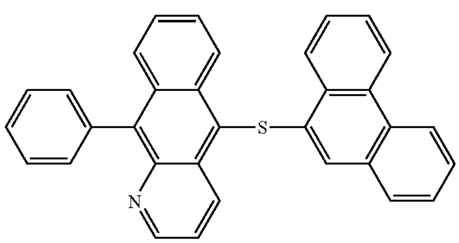
641
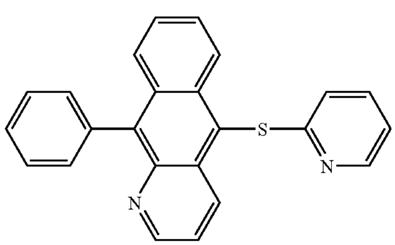
642
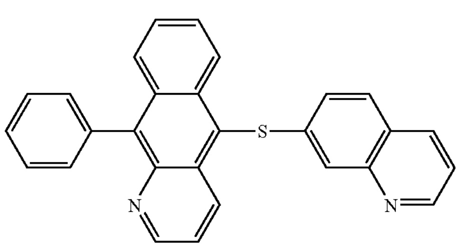
-continued
643
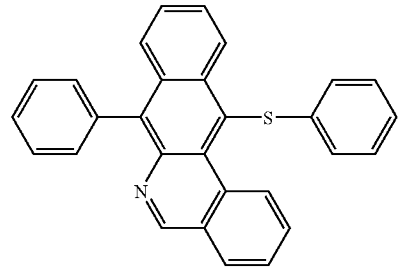
644
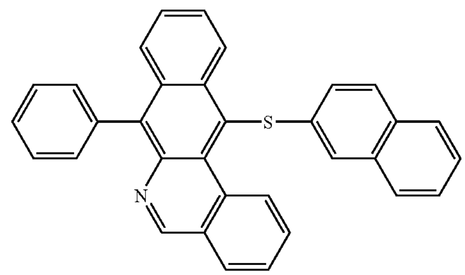
645
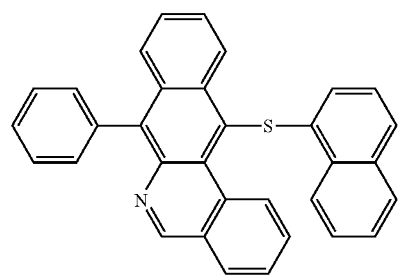
646
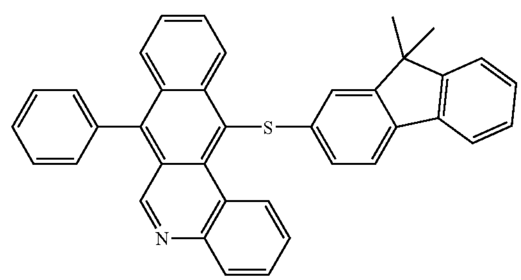
647
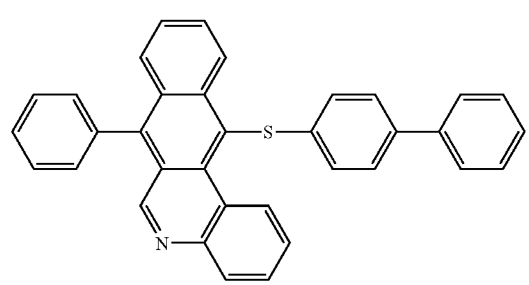

-continued
648
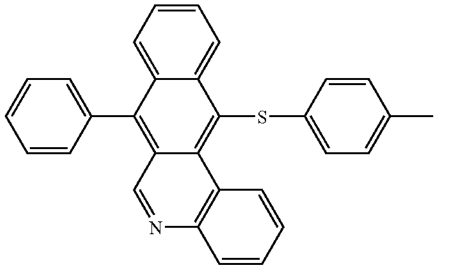
649
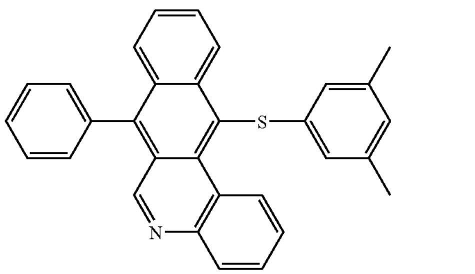
650
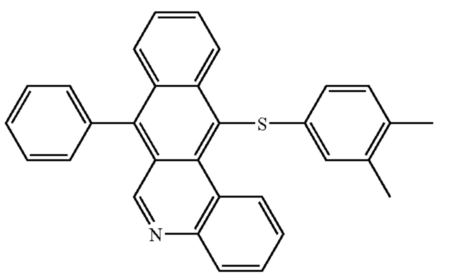
651
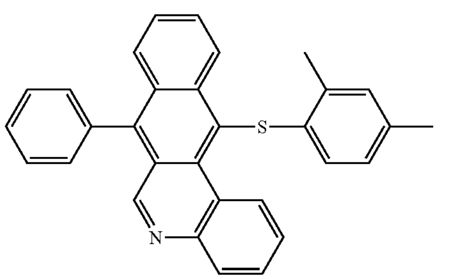
652
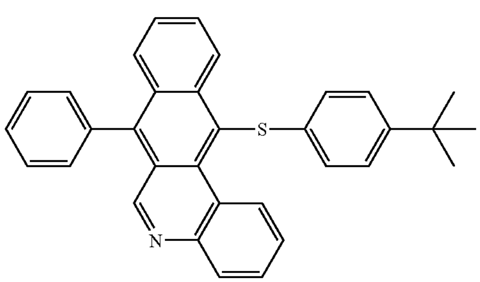
-continued
653
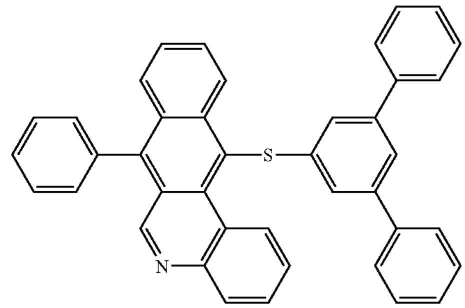
654
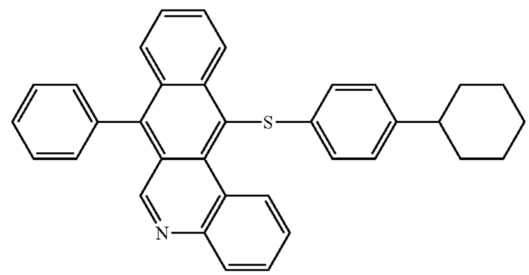
655
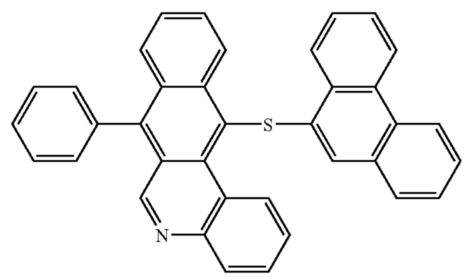
656
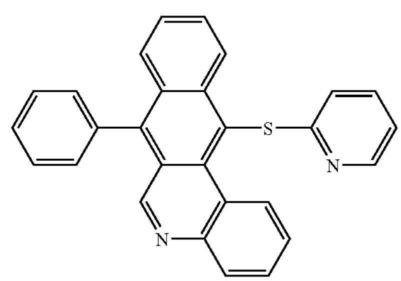
657
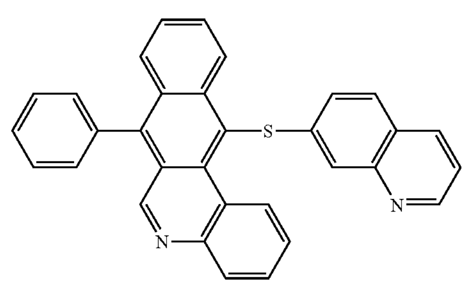

The organic electroluminescent compounds according to the present invention can be prepared as shown by Reaction Scheme (1):

Reaction Scheme 1

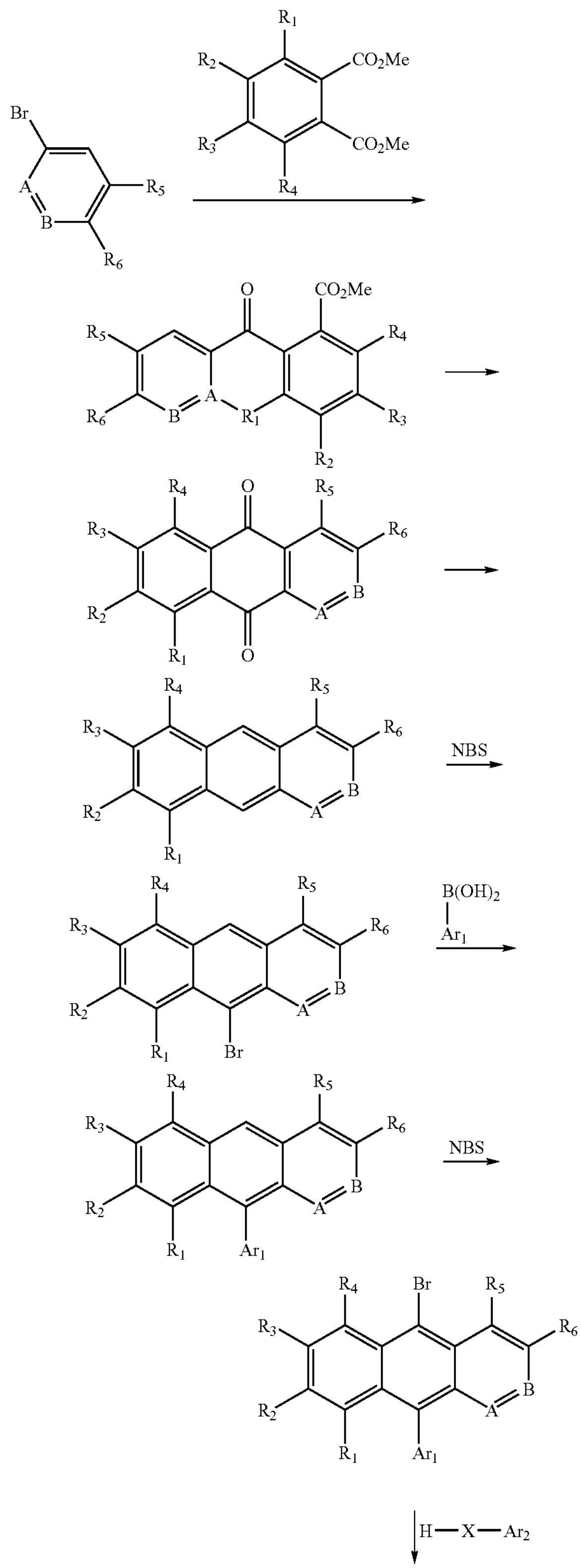

-continued

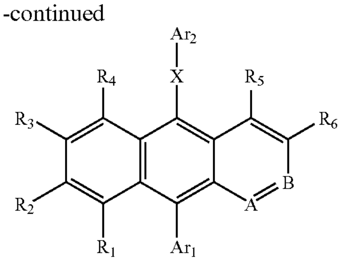

wherein, A, B, X, $Ar_1$, $Ar_2$, and $R_1$ through $R_6$ are defined as in Chemical Formula (1).

The present invention also provides organic solar cells, which comprises one or more organic electroluminescent compound(s) represented by Chemical Formula (1).

The present invention also provides an organic electroluminescent device which is comprised of a first electrode; a second electrode; and at least one organic layer(s) interposed between the first electrode and the second electrode; wherein the organic layer comprises one or more organic electroluminescent compound(s) represented by Chemical Formula (1).

The organic electroluminescent device according to the present invention is characterized in that the organic layer comprises an electroluminescent region, which comprises one or more compound(s) represented by Chemical Formula (1) as electroluminescent host, and one or more dopant(s). The dopant applied to the organic electroluminescent device according to the invention is not particularly restricted, but preferably selected from the compounds represented by one of Chemical Formulas (5) to (7).

Chemical Formula 5

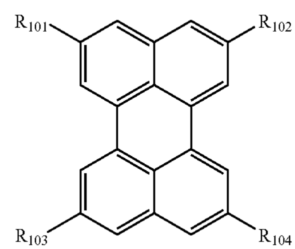

In Chemical Formula (5), $R_{101}$ through $R_{104}$ independently represent hydrogen, deuterium, halogen, (C1-C60)alkyl, (C6-C60)aryl, (C4-C60)heteroaryl, a 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro or hydroxyl, or each of $R_{101}$ through $R_{104}$ may be linked to an adjacent substituent via (C3-C60)alkylene or (C3-C60)alkenylene with or without a fused ring to form an alicyclic ring, or a monocyclic or polycyclic aromatic ring; and the alkyl, alkenyl, alkynyl, cycloalkyl, heterocycloalkyl, aryl, heteroaryl, arylsilyl, alkylsilyl, alkoxy, aryloxy, arylthio, alkylamino, or arylamino of $R_{101}$ through $R_{104}$, or the alicyclic ring, or the monocyclic or polycyclic aromatic ring formed therefrom by linkage to an adjacent substituent via (C3-C60)alkylene or (C3-C60)alkenylene with or without a fused ring may be further substituted by one or more substituent(s) selected from halogen, deuterium, (C1-C60)alkyl, (C6-C60)aryl, (C4-C60)heteroaryl, a 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C1-C60)alkylthio, (C6-C60)arylthio, (C1-C60) alkoxycarbonyl, (C1-C60)alkylcarbonyl, (C6-C60)arylcarbonyl, carboxyl, nitro and hydroxyl.

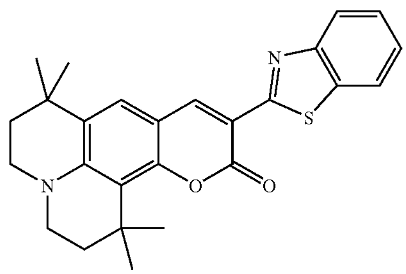

Chemical Formula 7

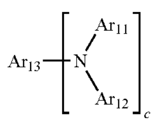

In Chemical Formula (7), $Ar_{11}$ and $Ar_{12}$ independently represent (C1-C60)alkyl, (C6-C60)aryl, (C4-C60)heteroaryl, (C6-C60)arylamino, (C1-C60)alkylamino, a 5- or 6-membered heterocycloalkyl containing one or more heteroatom(s) selected from N, O and S, or (C3-C60)cycloalkyl, or $Ar_{11}$ and $Ar_{12}$ may be linked via (C3-C60)alkylene or (C3-C60)alkenylene with or without a fused ring to form an alicyclic ring, or a monocyclic or polycyclic aromatic ring;

when c is 1, $Ar_{13}$ represents (C6-C60)arylamino, (C6-C60) aryl, (C4-C60)heteroaryl, or a substituent represented by one of the following structural formulas:

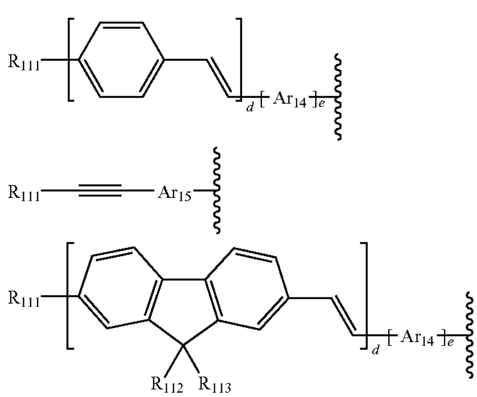

when c is 2, $Ar_{13}$ represents (C6-C60)arylene, (C4-C60) heteroarylene, or a substituent represented by one of the following structural formulas:

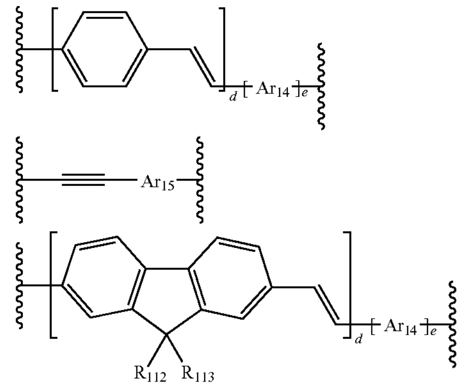

wherein $Ar_{14}$ and $Ar_{15}$ independently represent (C6-C60) arylene or (C4-C60)heteroarylene;

$R_{111}$ through $R_{113}$ independently represent hydrogen, deuterium, (C1-C60)alkyl or (C6-C60)aryl;

d is an integer from 1 to 4, e is an integer of 0 or 1; and the alkyl, aryl, heteroaryl, arylamino, alkylamino, cycloalkyl or heterocycloalkyl of $Ar_{11}$ and $Ar_{12}$; the arylamino, aryl, heteroaryl, arylene or heteroarylene of $Ar_{13}$; the arylene or heteroarylene of $Ar_{14}$ and $Ar_{15}$; or the alkyl or aryl of $R_{111}$ through $R_{113}$ may be further substituted by one or more substituent(s) selected from a group consisting of deuterium, halogen, (C1-C60)alkyl, (C6-C60)aryl, (C4-C60)heteroaryl, a 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60) arylsilyl, tri(C6-C60)arylsilyl, adamantyl, (C7-C60)bicycloalkyl, (C2-C60)alkenyl, (C2-C60)alkynyl, cyano, (C1-C60)alkylamino, (C6-C60)arylamino, (C6-C60)ar(C1-C60) alkyl, (C6-C60)aryloxy, (C1-C60)alkyloxy, (C6-C60) arylthio, (C1-C60)alkylthio, (C1-C60)alkoxycarbonyl, (C1-C60)alkylcarbonyl, (C6-C60)arylcarbonyl, carboxyl, nitro and hydroxyl.

The electroluminescent layer means the layer where electroluminescence occurs, and it may be a single layer or a multi-layer consisting of two or more layers laminated. When a mixture of host-dopant is used according to the constitution of the present invention, noticeable improvement in luminous efficiency by the electroluminescent host according to the present invention could be confirmed. Those results can be achieved by doping concentration of 0.5 to 10% by weight. The host according to the present invention exhibits higher hole and electron conductivity, and excellent stability of the material as compared to other conventional host materials, and provides improved device life as well as luminous efficiency.

Thus, it can be described that use of the compound represented by one of Chemical Formulas (5) to (7) as an electroluminescent dopant significantly supplements electronic drawback of the organic electroluminescent compounds of Chemical Formula (1) according to the present invention.

The dopant compounds represented by one of Chemical Formulas (5) to (7) can be exemplified by the following compounds, but they are not restricted thereto.

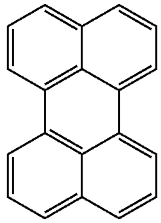
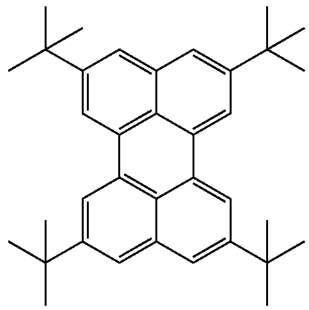
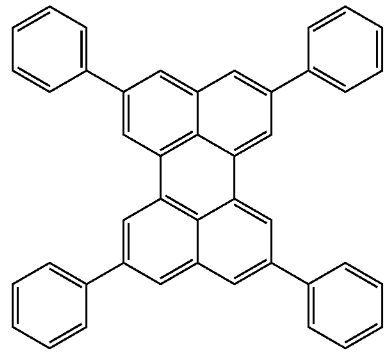
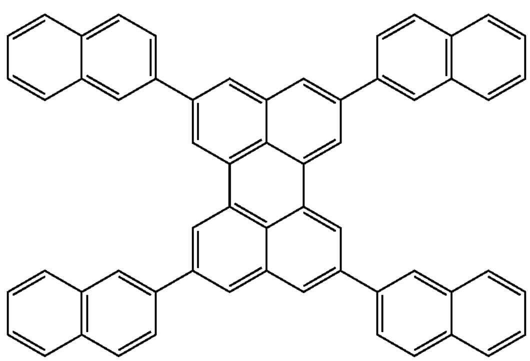
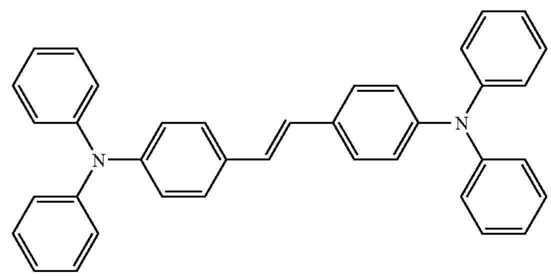
N
N
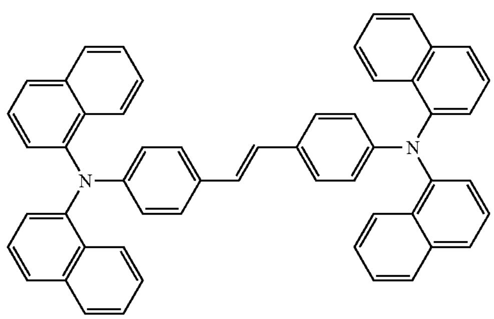
N
N
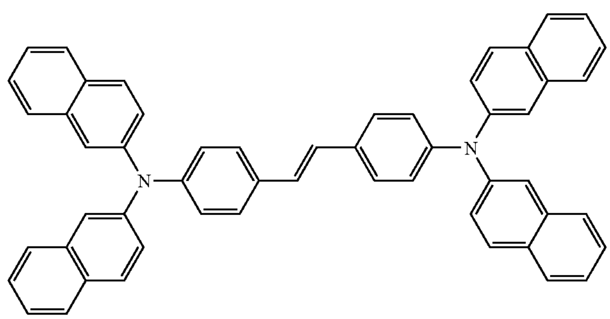
N
N
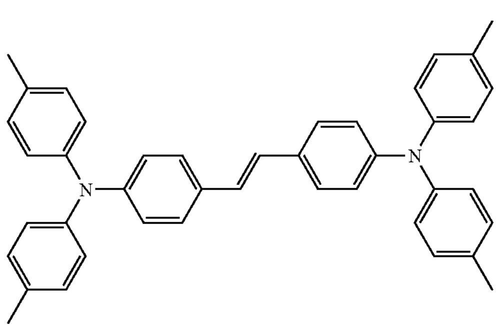
N
N
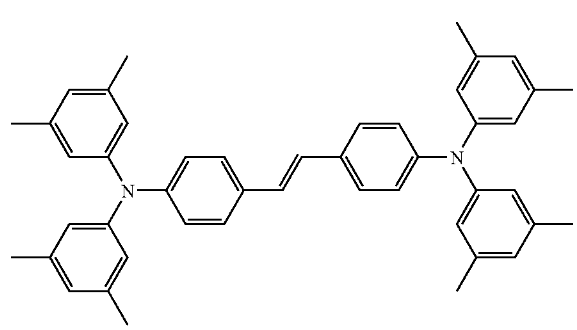
N
N -continued
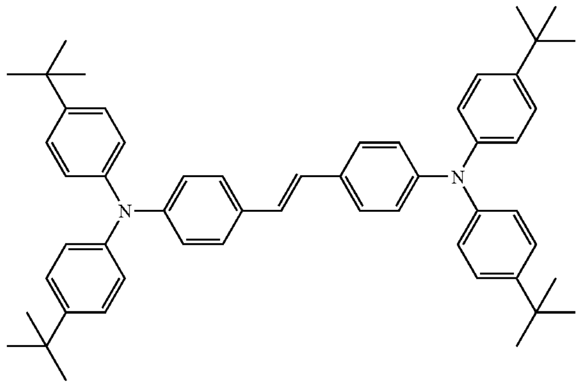
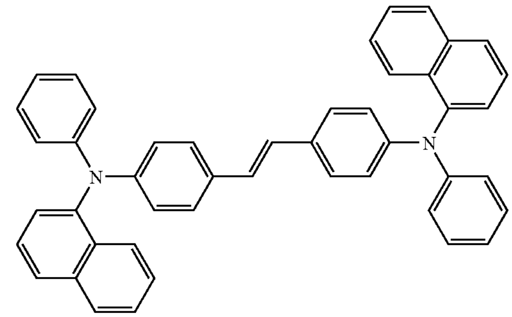
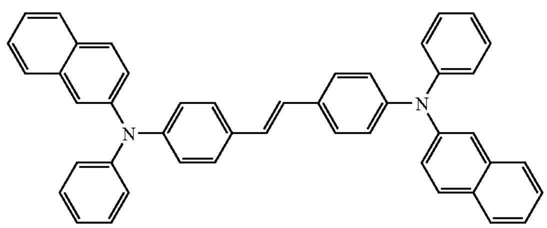
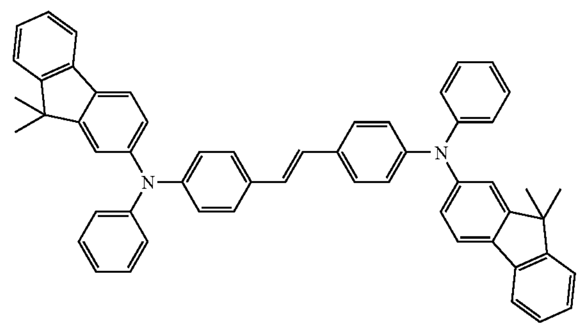
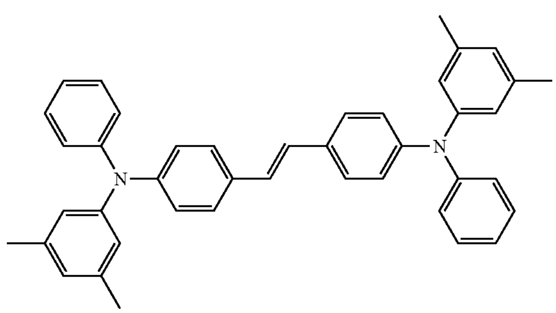
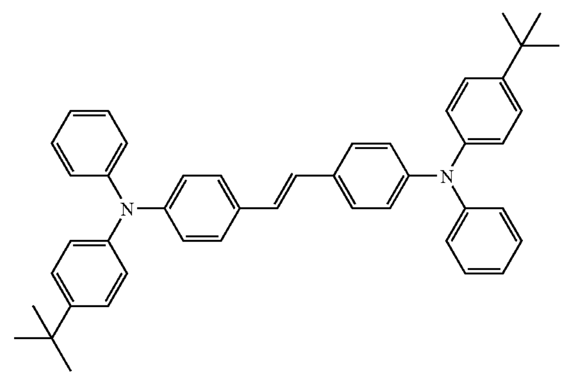
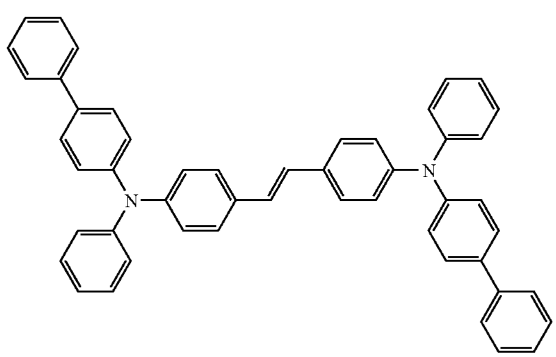
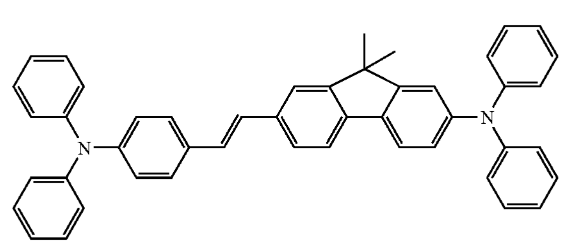
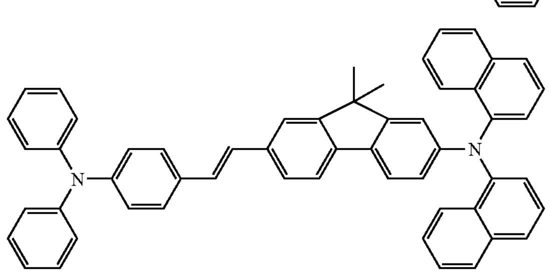
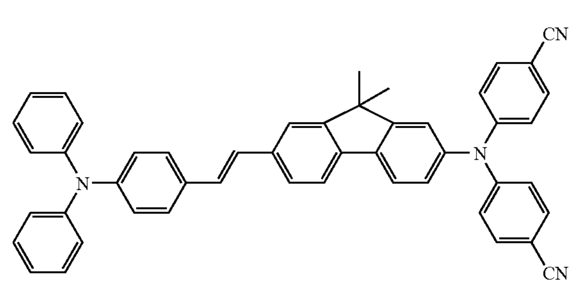

-continued
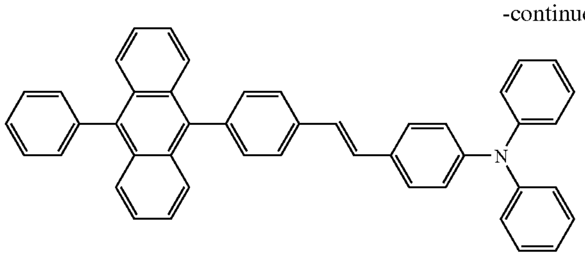
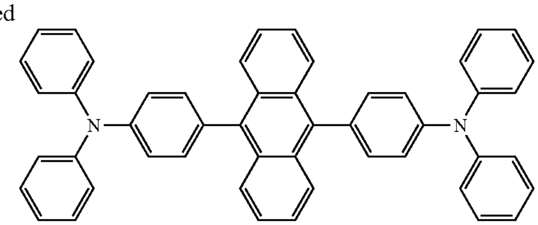
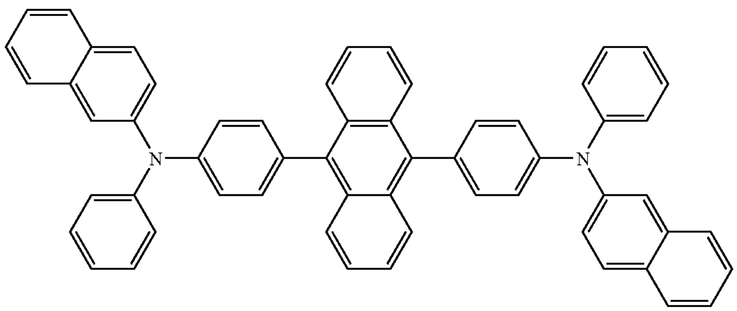
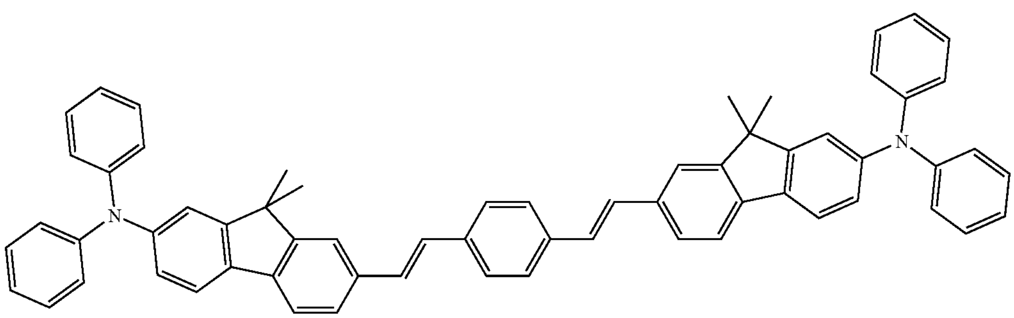
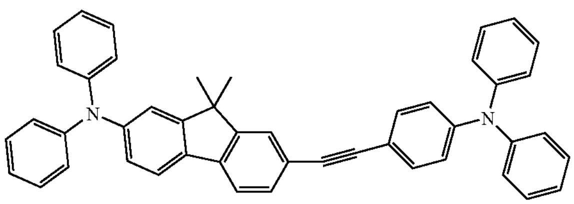
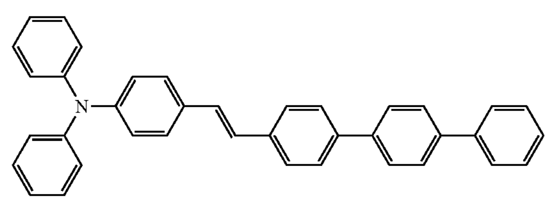
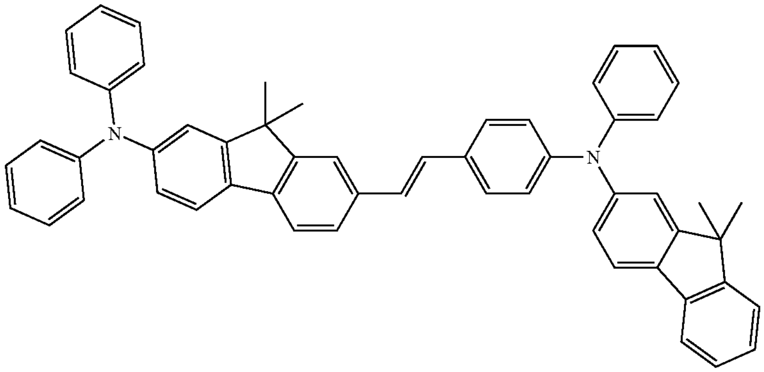

-continued
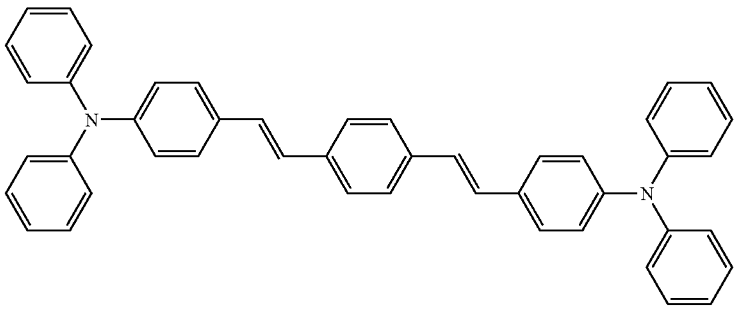
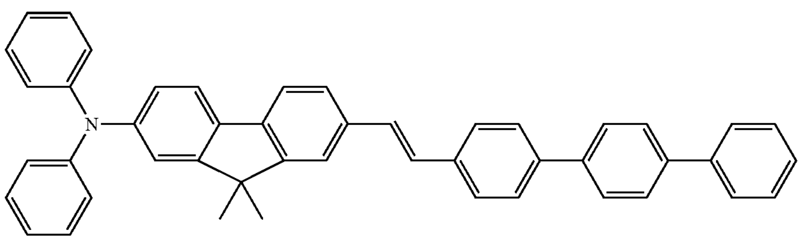
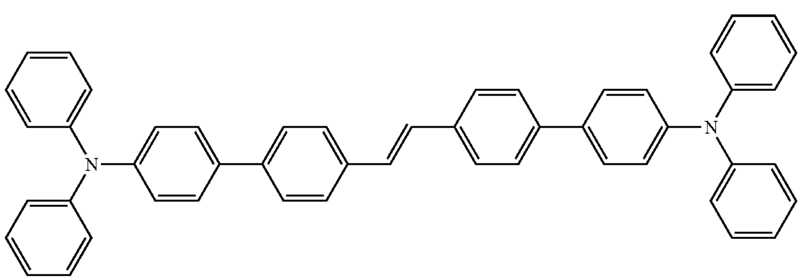
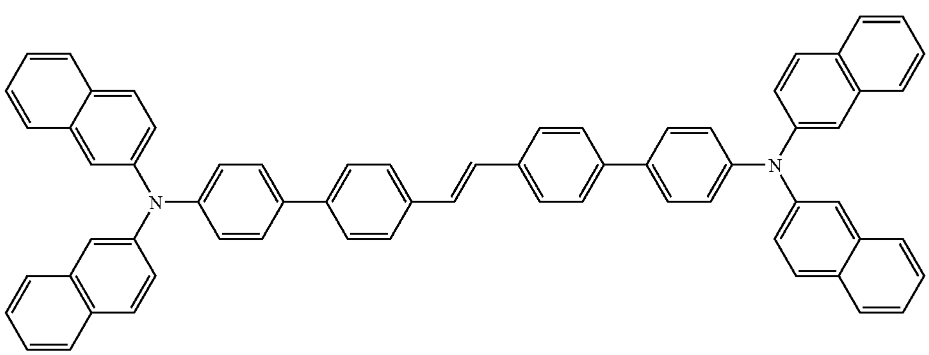
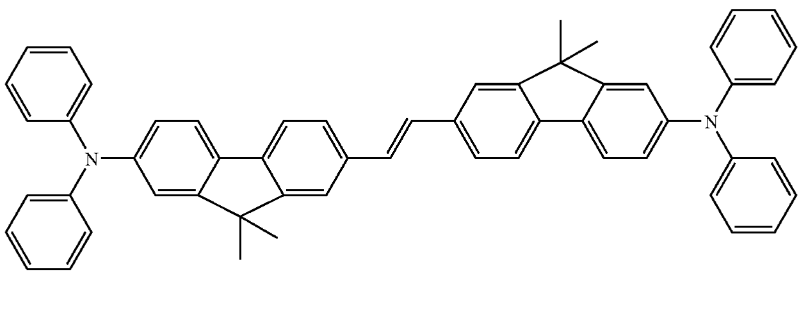

-continued
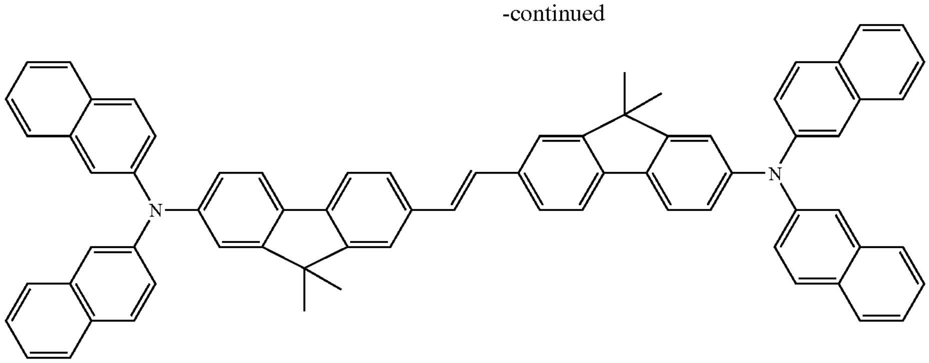
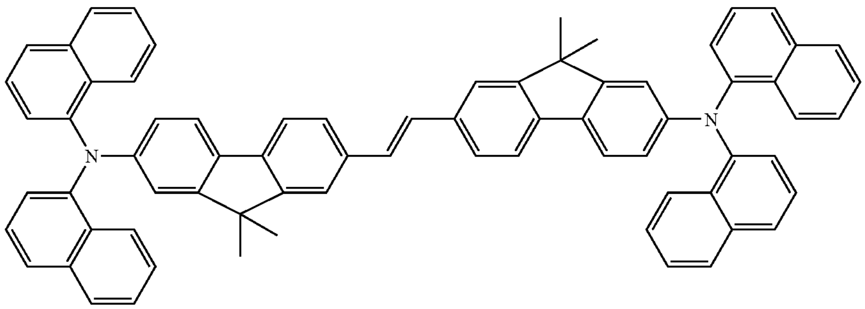
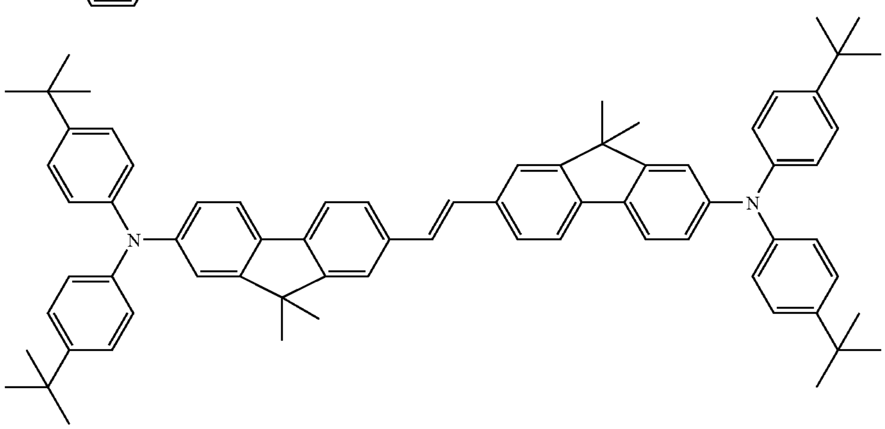
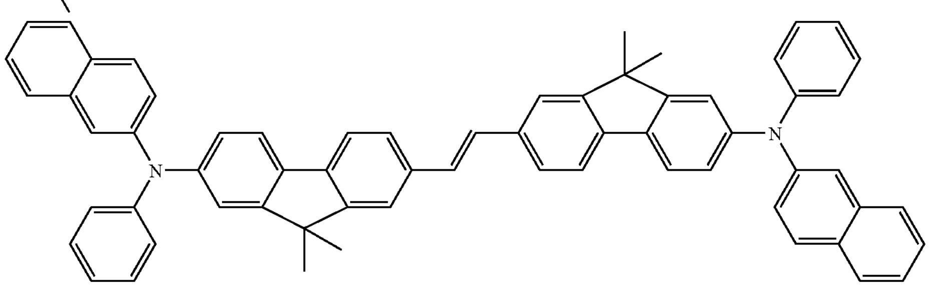
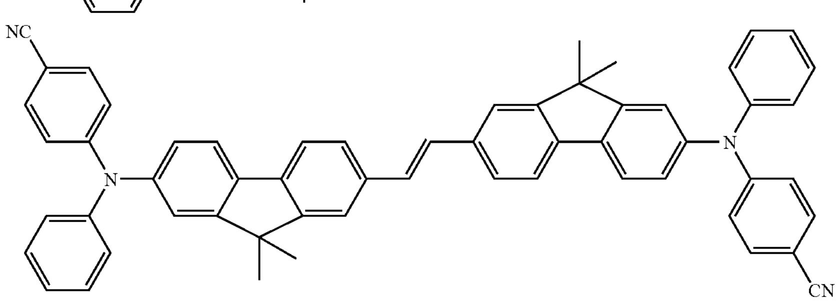

-continued
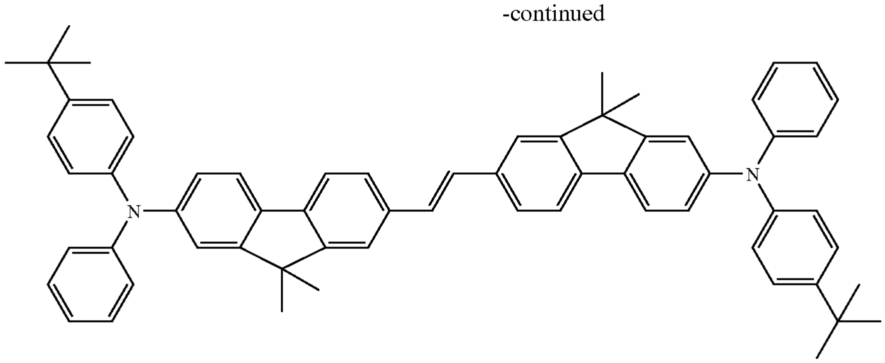
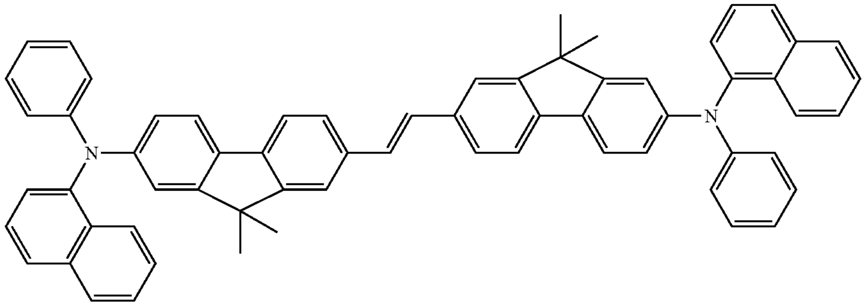
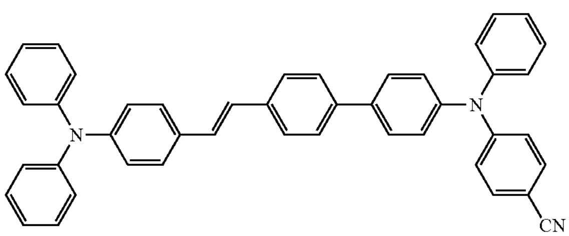
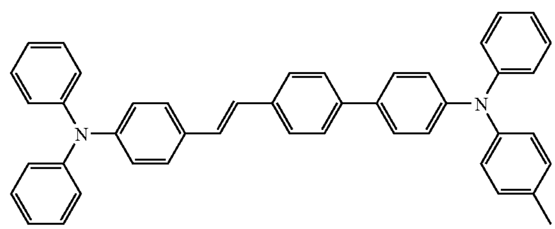
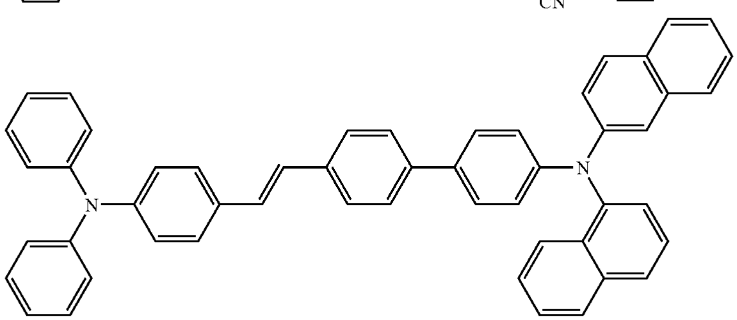
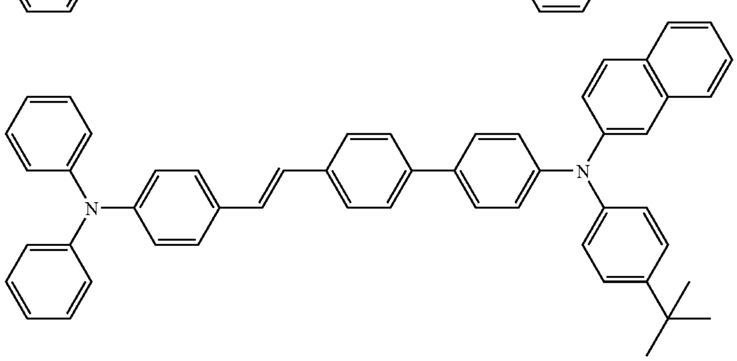

-continued
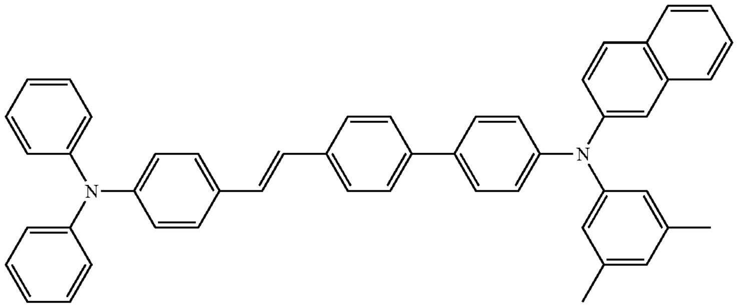
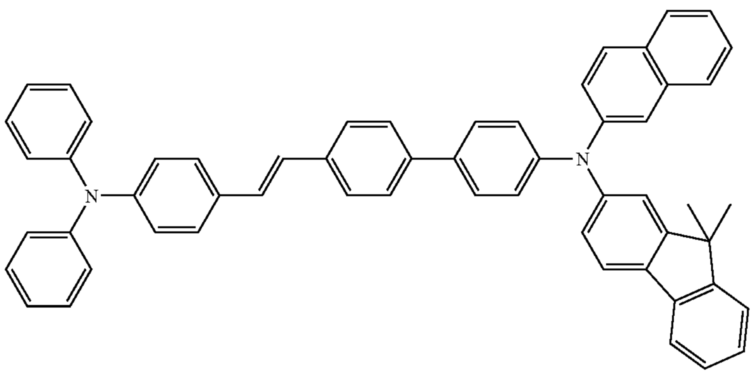
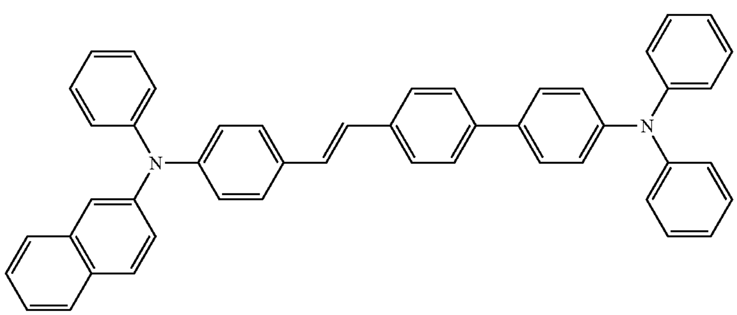
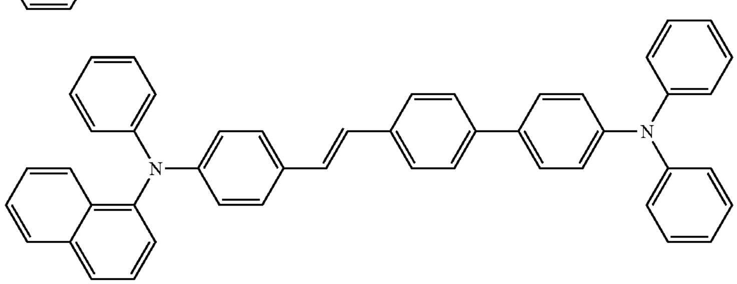
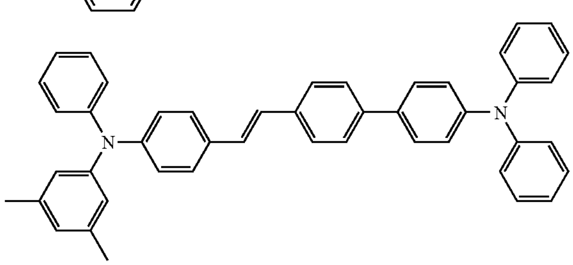
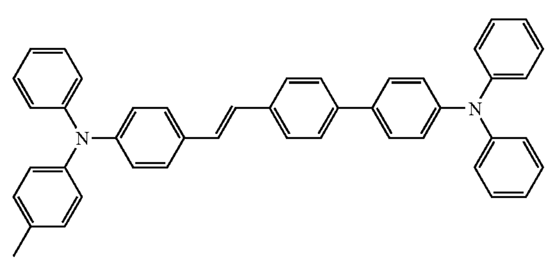

-continued
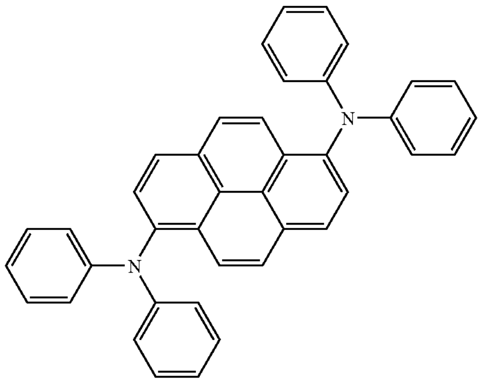
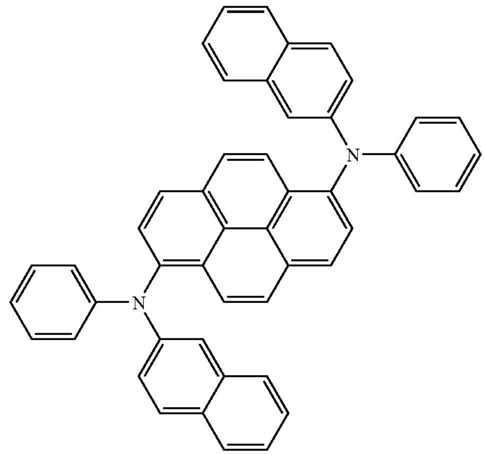
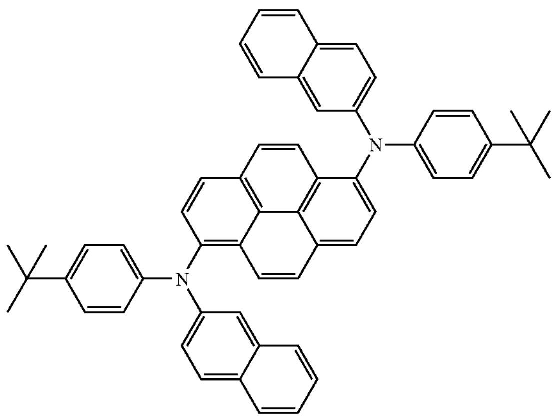
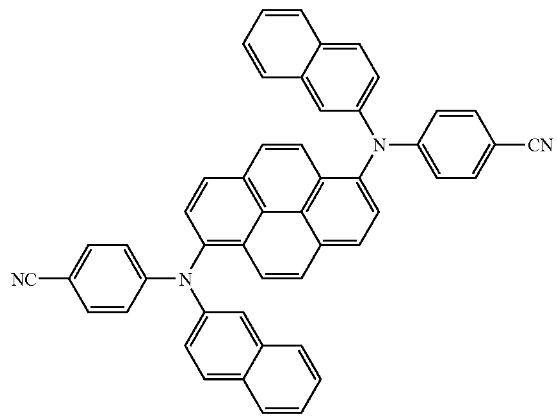
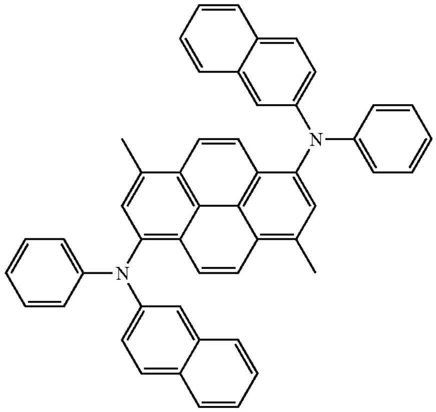
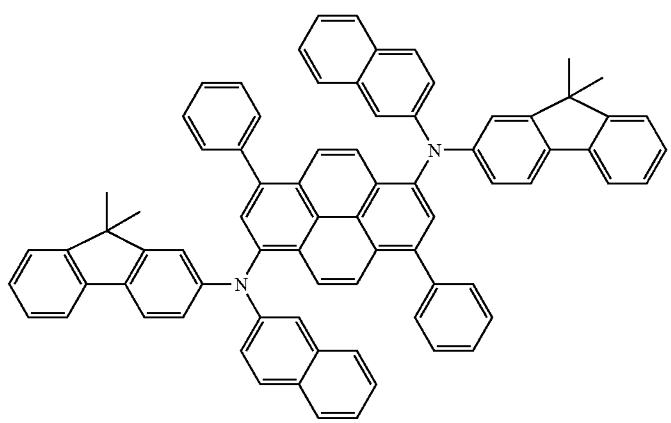

-continued
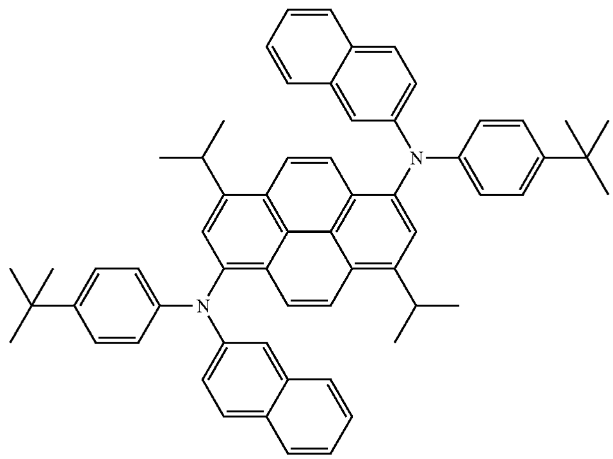
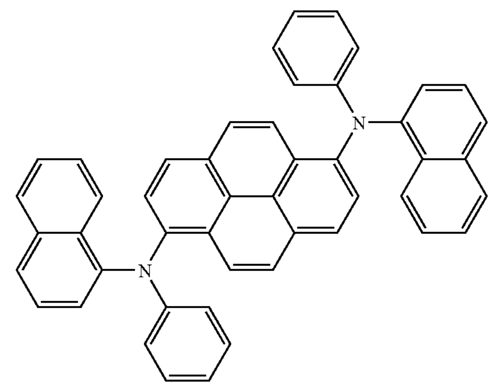
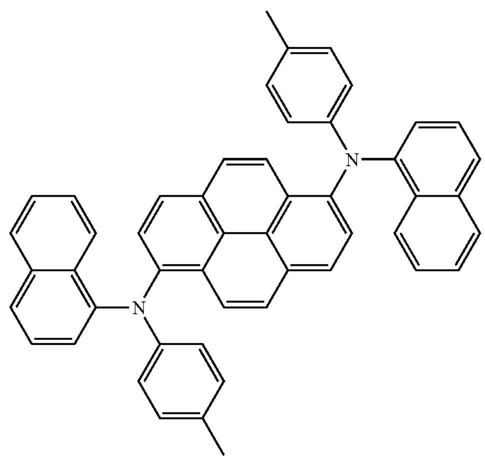
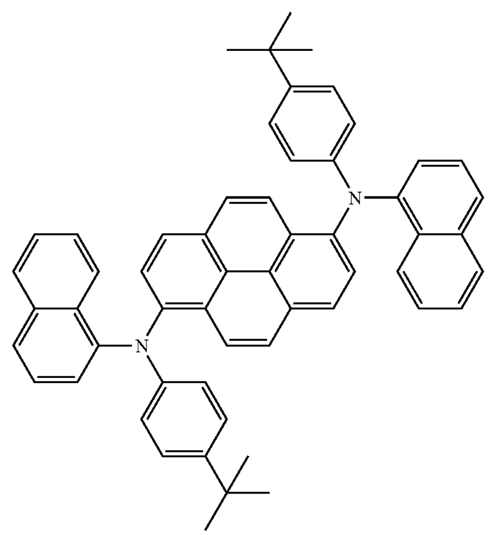
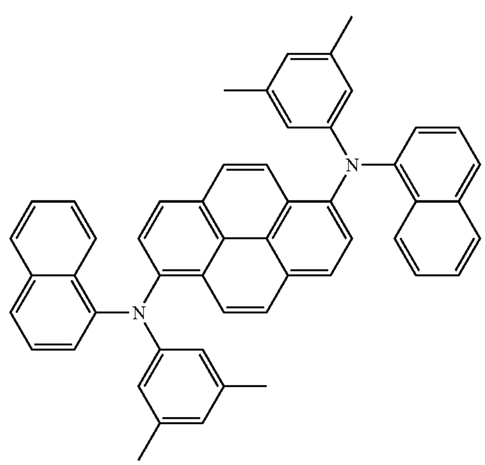
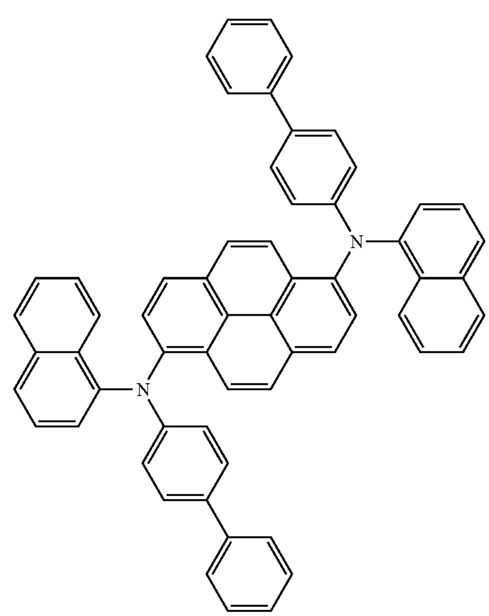

-continued
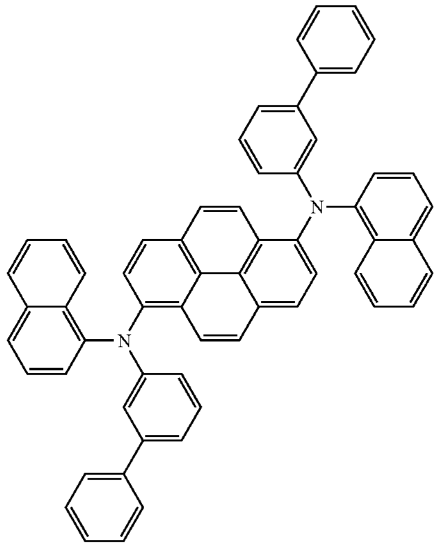
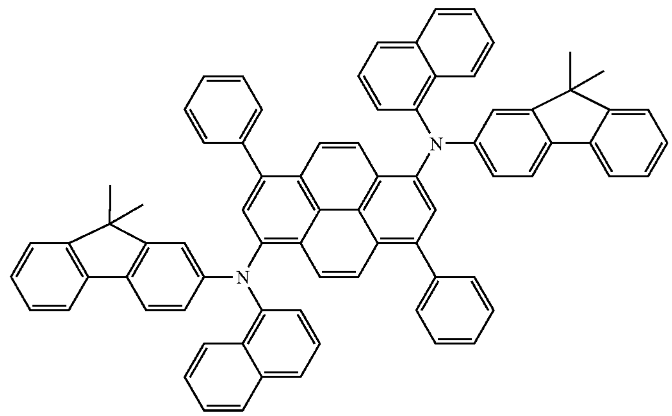
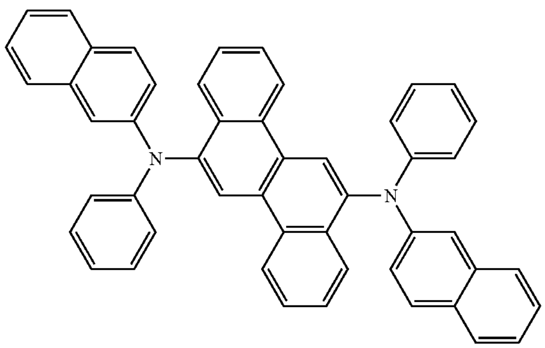
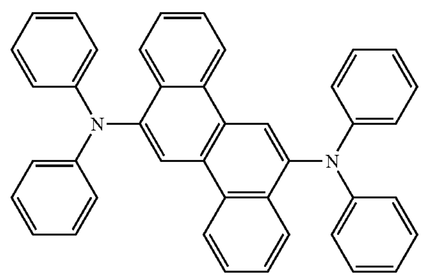
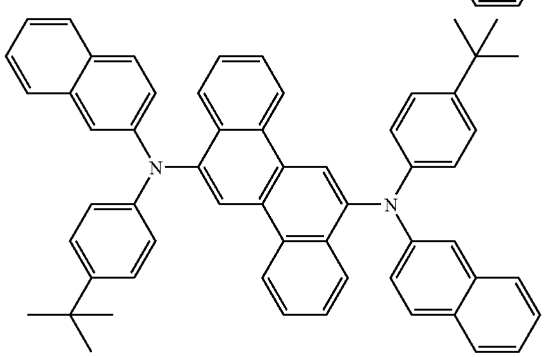
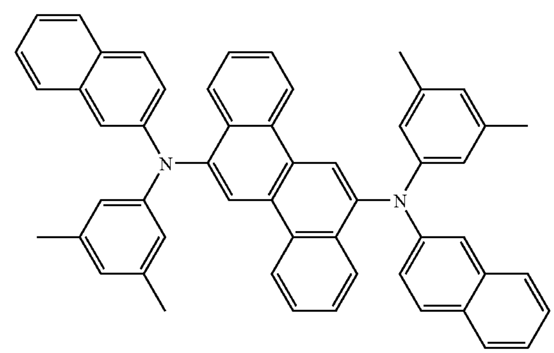
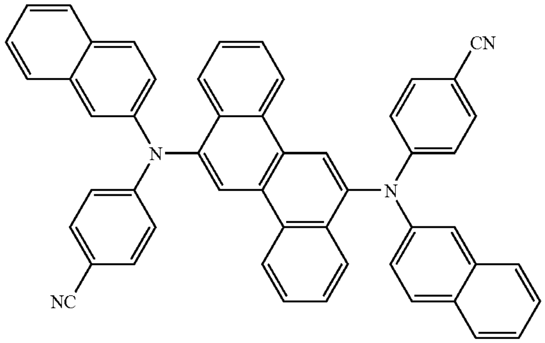
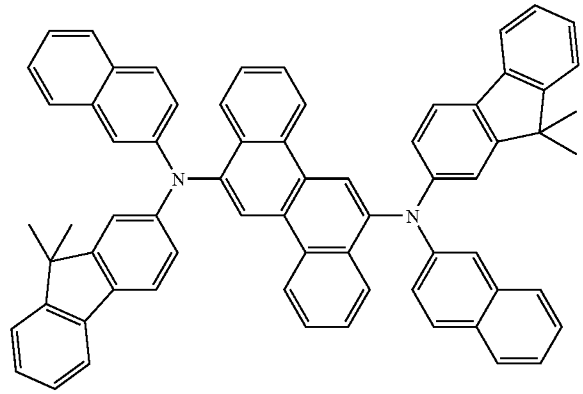

-continued
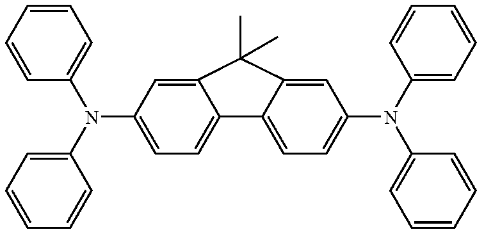
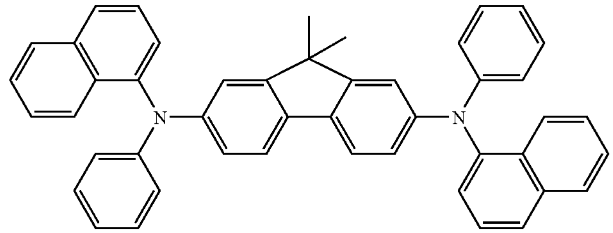
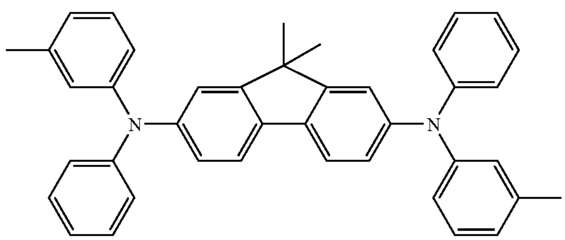
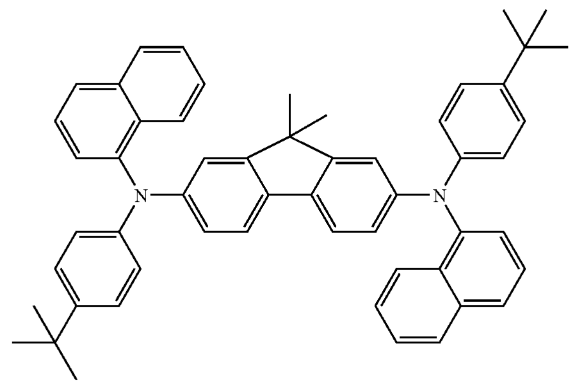
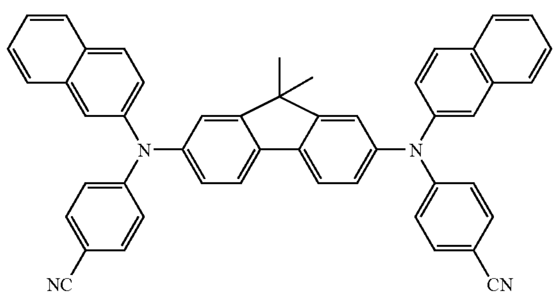
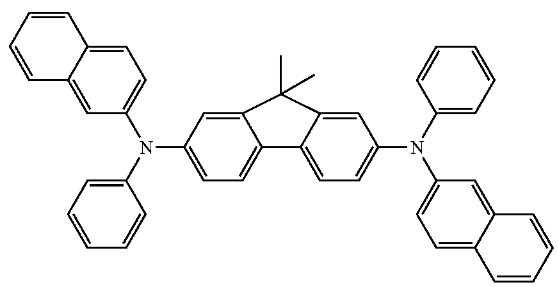
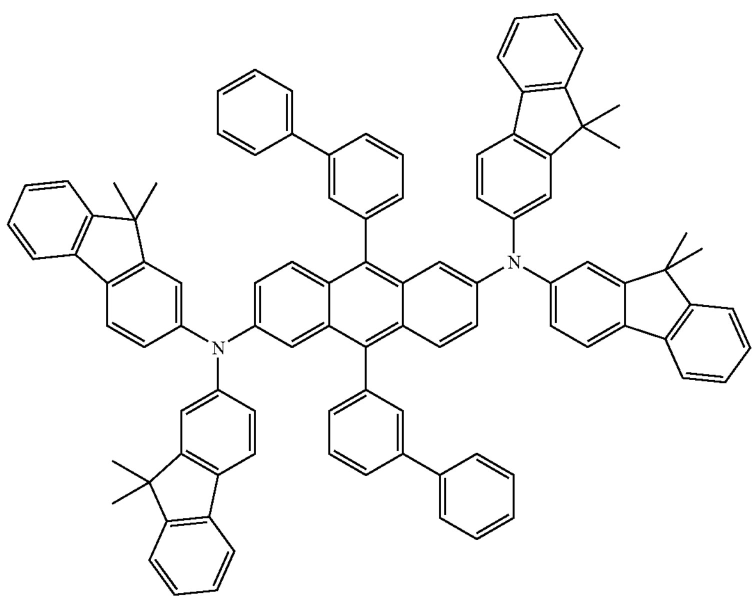

-continued
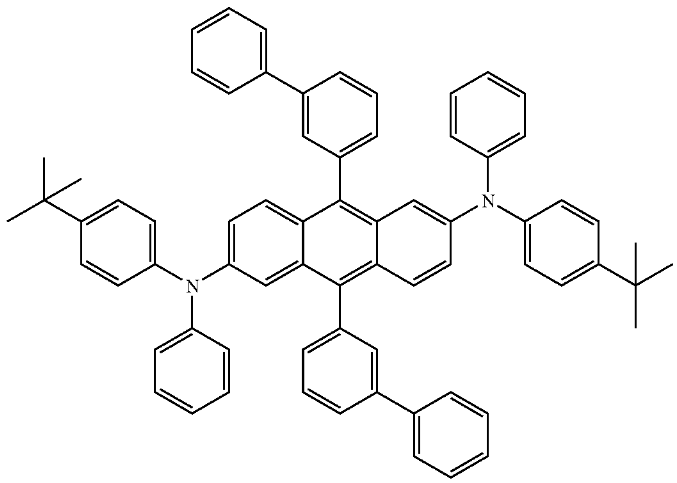
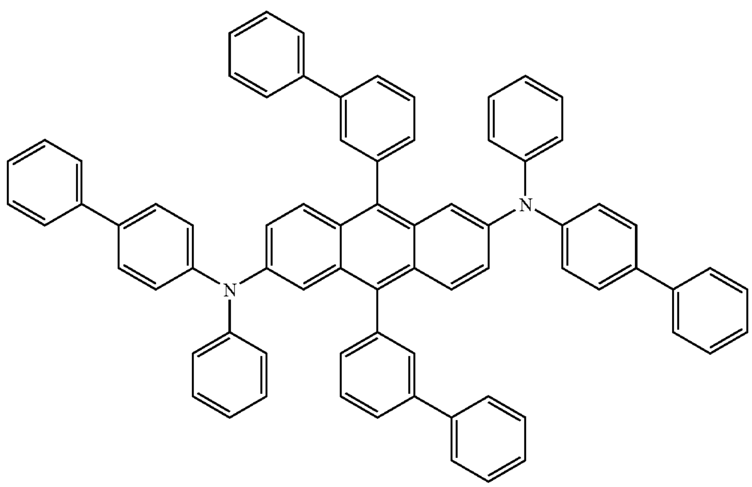
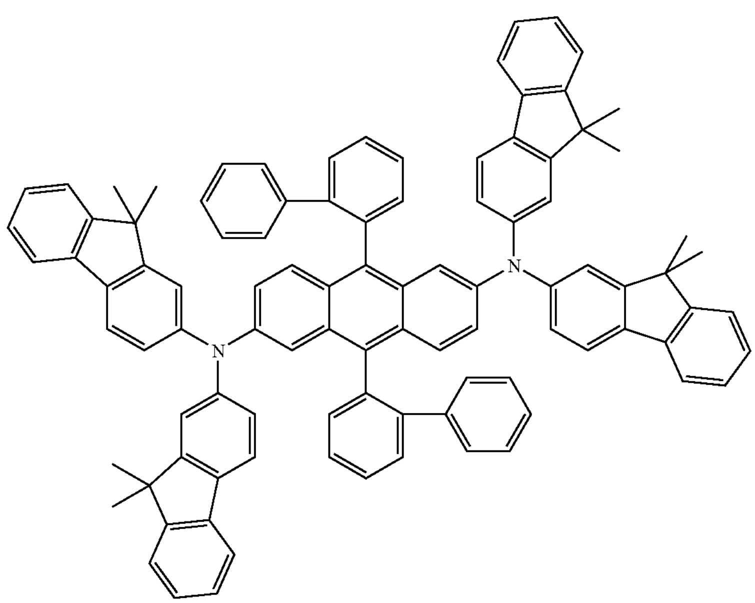

-continued

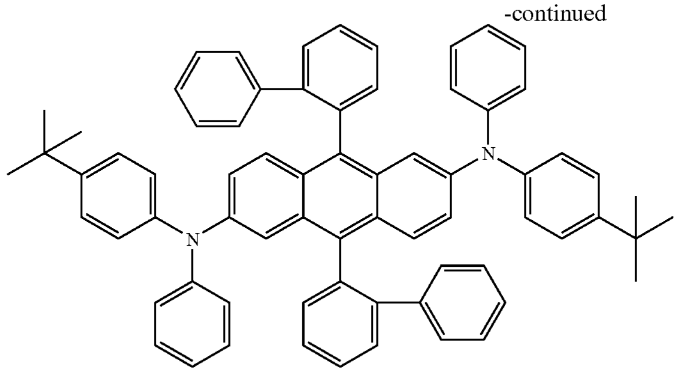

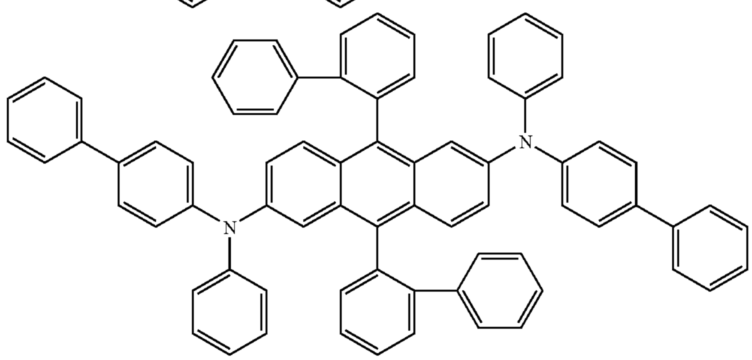

The organic electroluminescent device according to the invention may further comprise one or more compound(s) selected from a group consisting of arylamine compounds and styrylarylamine compounds, as well as the organic electroluminescent compound represented by Chemical Formula (1). Examples of the arylamine or styrylarylamine compounds include the compounds represented by Chemical Formula (8), but they are not restricted thereto:

Chemical Formula 8

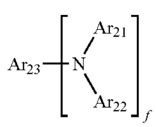

wherein, $Ar_{21}$ and $Ar_{22}$ independently represent (C1-C60) alkyl, (C6-C60)aryl, (C4-C60)heteroaryl, (C6-C60)arylamino, (C1-C60)alkylamino, a 5- or 6-membered heterocycloalkyl containing one or more heteroatom(s) selected from N, O and S, or (C3-C60)cycloalkyl, or $Ar_{21}$ and $Ar_{22}$ may be linked via (C3-C60)alkylene or (C3-C60)alkenylene with or without a fused ring to form an alicyclic ring, or a monocyclic or polycyclic aromatic ring;

when f is 1, $Ar_{23}$ represents (C6-C60)arylamino, (C6-C60) aryl, (C4-C60)heteroaryl, or a substituent represented by one of the following structural formulas:

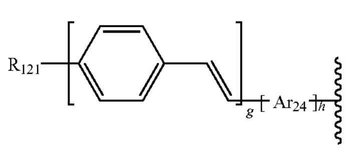

-continued

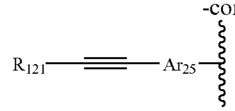

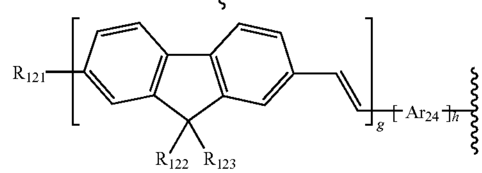

when f is 2, $Ar_{23}$ represents (C6-C60)arylene, (C4-C60) heteroarylene, or a substituent represented by one of the following structural formulas:

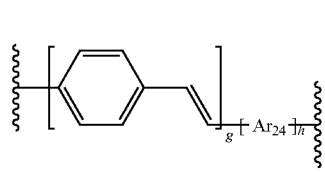

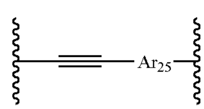

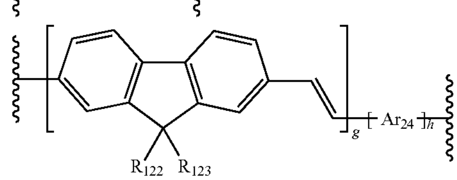

wherein $Ar_{24}$ and $Ar_{25}$ independently represent (C6-C60) arylene or (C4-C60)heteroarylene;

$R_{121}$, $R_{122}$ and $R_{123}$ independently represent hydrogen, deuterium, (C1-C60)alkyl or (C6-C60)aryl;

g is an integer from 1 to 4, h is an integer of 0 or 1; and the alkyl, aryl, heteroaryl, arylamino, alkylamino, cycloalkyl or heterocycloalkyl of $Ar_{21}$ and $Ar_{22}$; the arylamino, aryl, heteroaryl, arylene or heteroarylene of $Ar_{23}$; the arylene or heteroarylene of $Ar_{24}$ and $Ar_{25}$; or the alkyl or aryl of $R_{121}$ through $R_{123}$ may be further substituted by one or more substituent(s) selected from a group consisting of deuterium, halogen, (C1-C60)alkyl, (C6-C60)aryl, (C4-C60)heteroaryl, a 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, cyano, (C1-C60)alkylamino, (C6-C60)arylamino, (C6-C60)ar(C1-C60)alkyl, (C6-C60)aryloxy, (C1-C60)alkyloxy, (C6-C60)arylthio, (C1-C60)alkylthio, (C1-C60)alkoxycarbonyl, (C1-C60)alkylcarbonyl, (C6-C60)arylcarbonyl, carboxyl, nitro and hydroxyl.

The arylamine compounds and styrylarylamine compounds may be more specifically exemplified by the following compounds, but they are not restricted thereto.

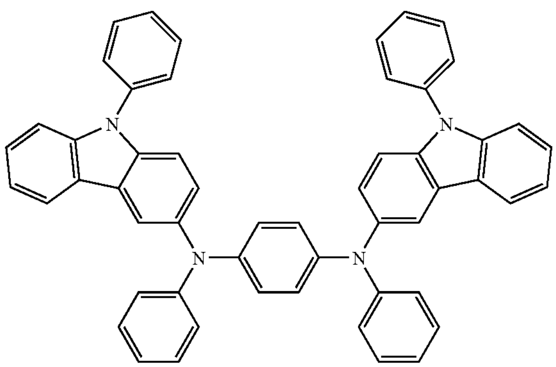
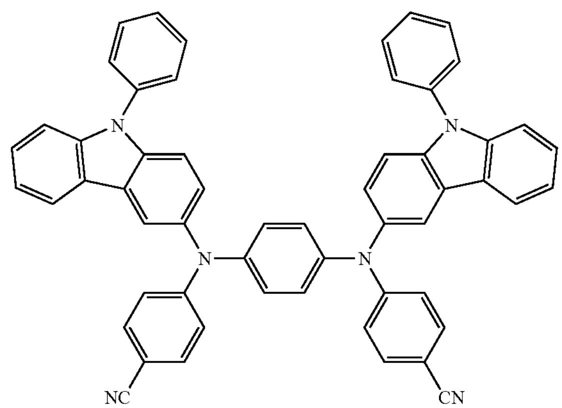

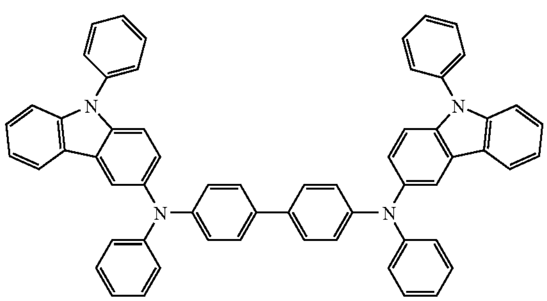
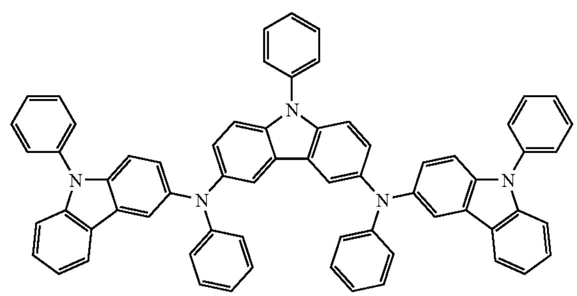
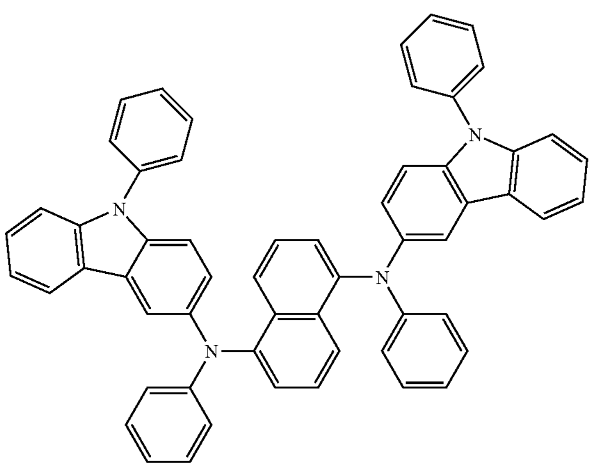
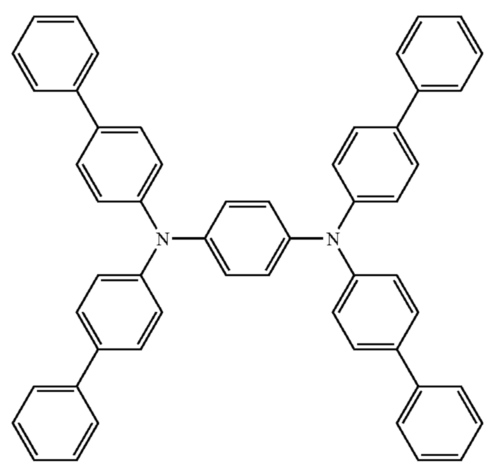

-continued
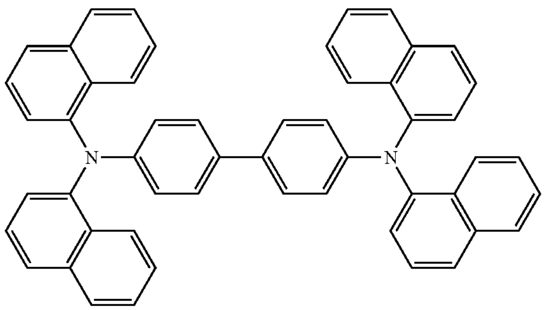
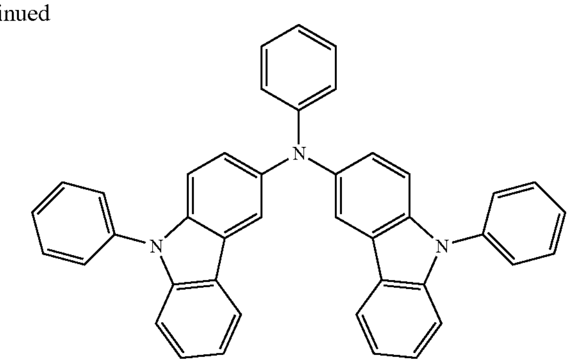
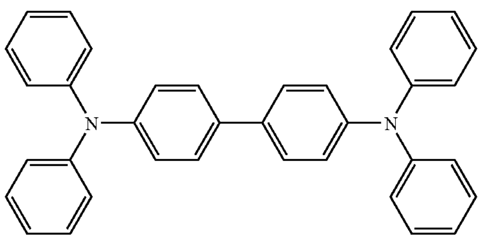
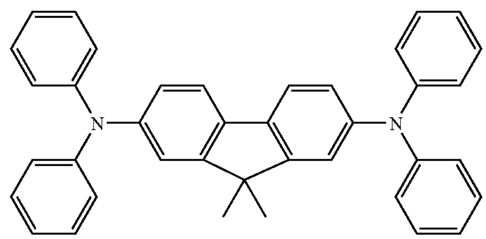
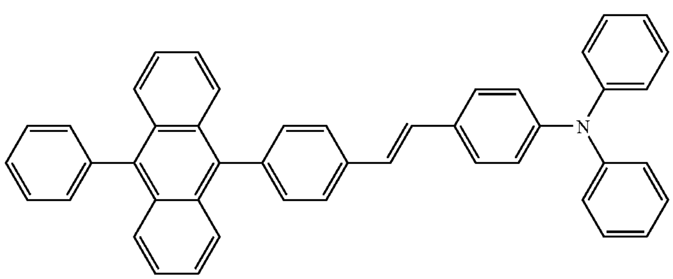
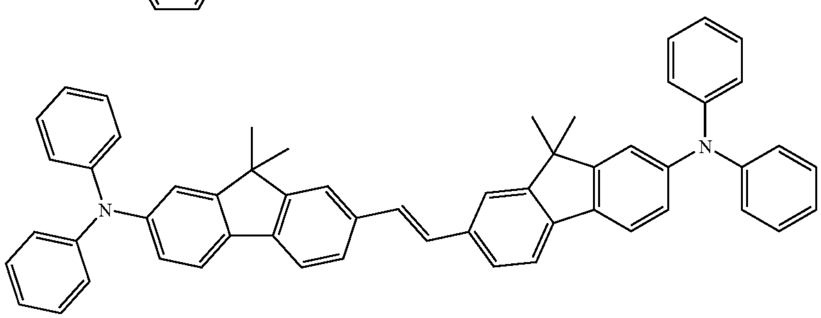
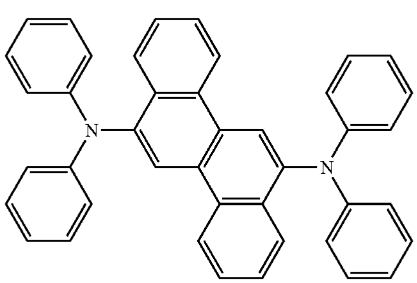
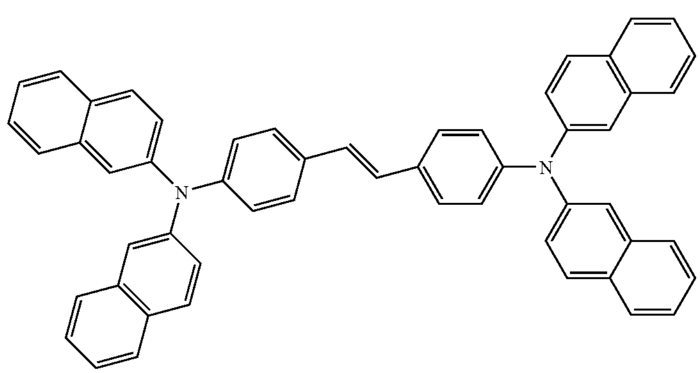

-continued
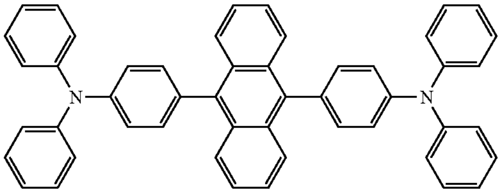
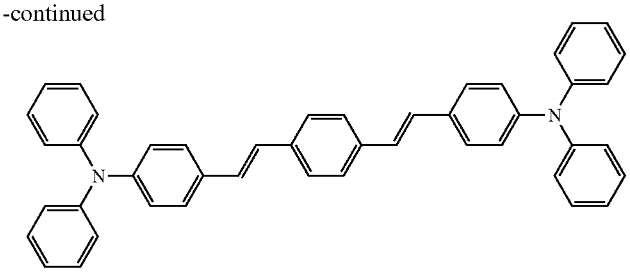
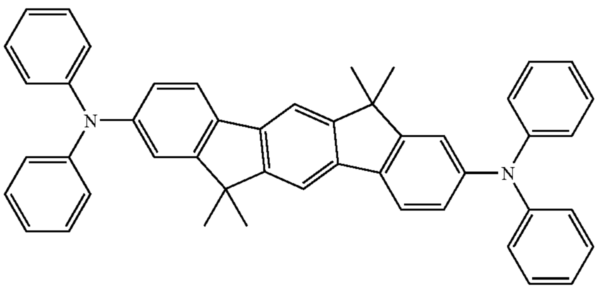
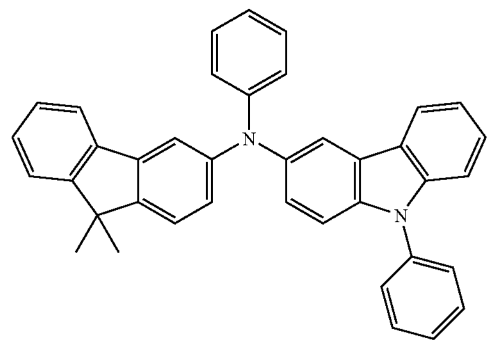
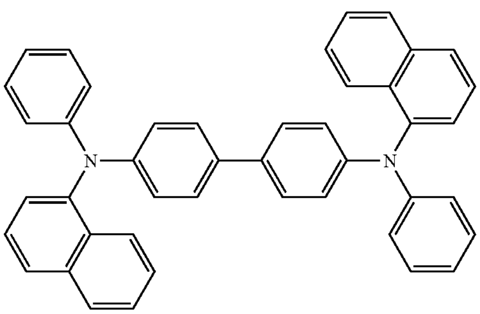
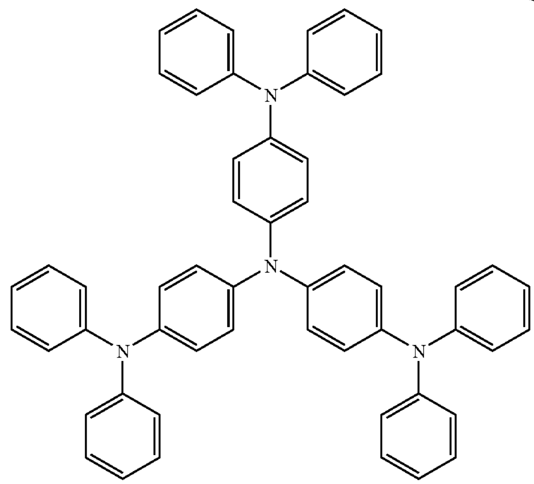
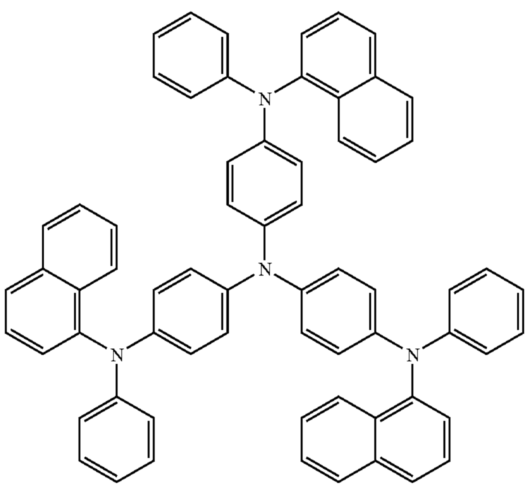
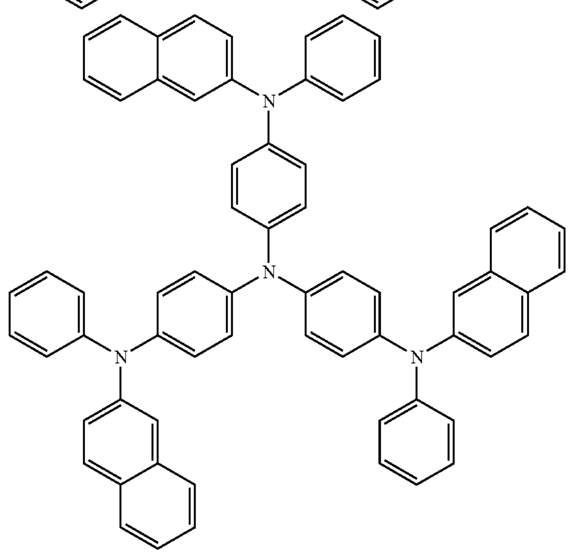

In an organic electroluminescent device according to the present invention, the organic layer may further comprise one or more metal(s) selected from a group consisting of organic metals of Group 1, Group 2, 4$^{th}$ period and 5$^{th}$ period transition metals, lanthanide metals and d-transition elements, as well as the organic electroluminescent compound represented by Chemical Formula (1). The organic layer may comprise a charge generating layer in addition to the electroluminescent layer.

The present invention can realize an organic electroluminescent device having a pixel structure of independent light-emitting mode, which comprises an organic electroluminescent device containing the compound of Chemical Formula (1) as a sub-pixel and one or more sub-pixel(s) comprising one or more metallic compound(s) selected from a group consisting of Ir, Pt, Pd, Rh, Re, Os, Tl, Pb, Bi, In, Sn, Sb, Te, Au and Ag, patterned in parallel at the same time.

Further, the organic electroluminescent device is an organic light-emitting display which further comprises one or more compound(s) selected from compounds having electroluminescent peak of wavelength of not less than 590 nm, as well as said organic electroluminescent compound in the organic layer. Those compounds can be exemplified by the compounds represented by one of Chemical Formulas (9) to (13), but they are not restricted thereto.

$M^1L^3L^4L^5$ Chemical Formula 9

In Chemical Formula (9), $M^1$ is selected from metals of Group 7, 8, 9, 10, 11, 13, 14, 15 and 16 in the Periodic Table of Elements, and ligands $L^3$, $L^4$ and $L^5$ are independently selected from the following structures:

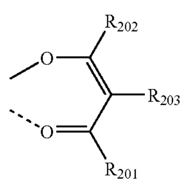
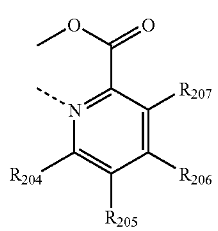
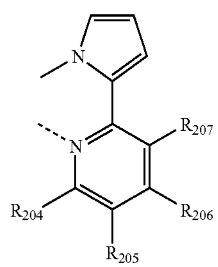
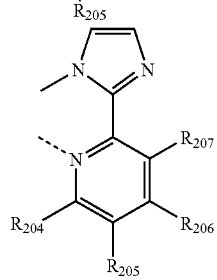
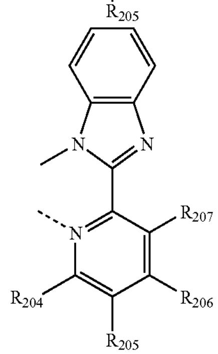
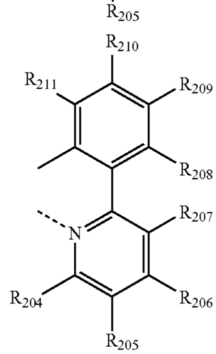

-continued

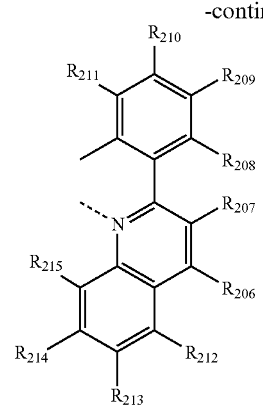
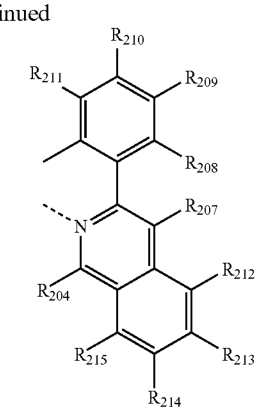
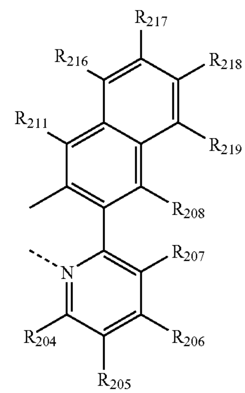
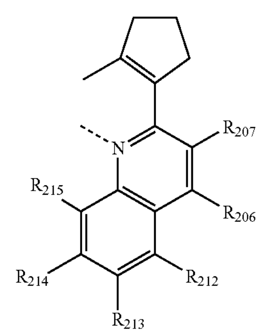
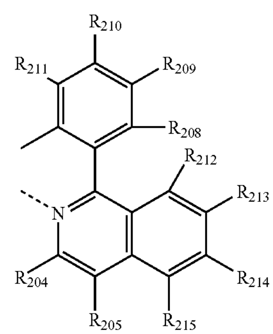
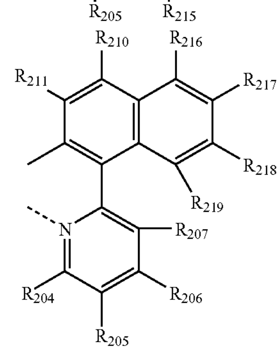

-continued

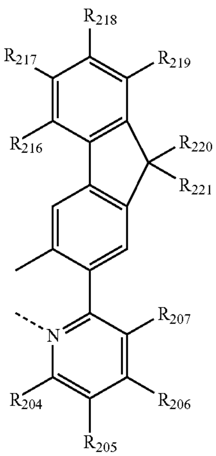
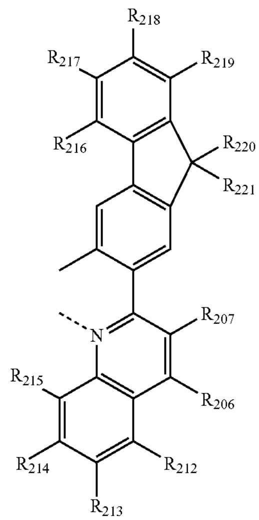
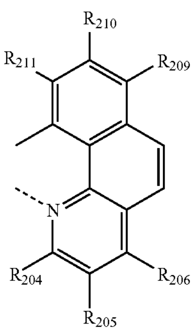
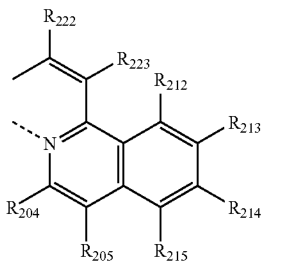
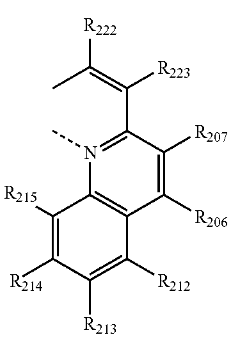
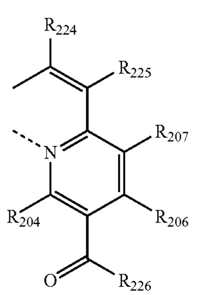
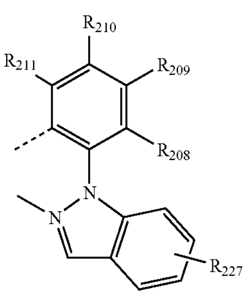
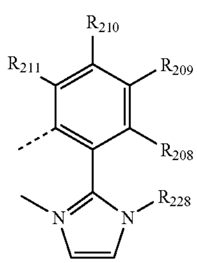

-continued

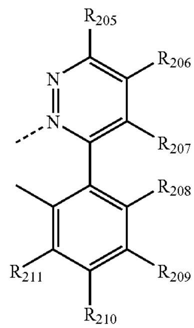
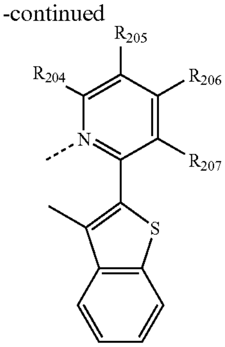
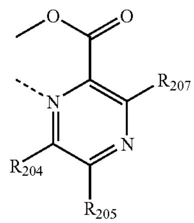
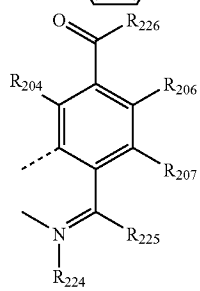
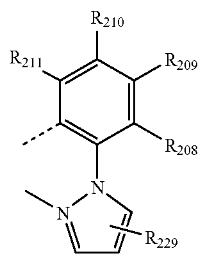
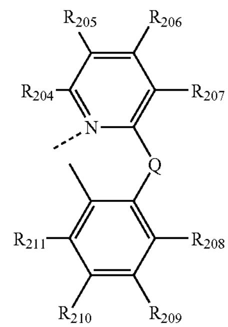

wherein, $R_{201}$ through $R_{203}$ independently represent hydrogen, deuterium, (C1-C60)alkyl with or without halogen substituent(s), (C6-C60)aryl with or without (C1-C60)alkyl substituent(s), or halogen;

$R_{204}$ through $R_{219}$ independently represent hydrogen, deuterium, (C1-C60)alkyl, (C1-C30)alkoxy, (C3-C60)cycloalkyl, (C2-C30)alkenyl, (C6-C60)aryl, mono or di(C1-C30)alkylamino, mono or di(C6-30)arylamino, $SF_5$, tri(C1-C30)alkylsilyl, di(C1-C30)alkyl(C6-C30)arylsilyl, tri(C6-C30)arylsilyl, cyano or halogen, and the alkyl, cycloalkyl, alkenyl or aryl of $R_{204}$ through $R_{219}$ may be further substituted by one or more substituent(s) selected from deuterium, (C1-C60)alkyl, (C6-C60)aryl and halogen;

$R_{220}$ through $R_{223}$ independently represent hydrogen, deuterium, (C1-C60)alkyl with or without halogen substituent(s), (C6-C60)aryl with or without (C1-C60)alkyl substituent(s);

$R_{224}$ and $R_{225}$ independently represent hydrogen, deuterium, (C1-C60)alkyl, (C6-C60)aryl or halogen, or $R_{224}$ and $R_{225}$ may be linked via (C3-C12)alkylene or (C3-C12)alkenylene with or without a fused ring to form an alicyclic ring, or a monocyclic or polycyclic aromatic ring; and the alkyl or aryl of $R_{224}$ and $R_{225}$, or the alicyclic ring, or the monocyclic or polycyclic aromatic ring formed therefrom via (C3-C12) alkylene or (C3-C12)alkenylene with or without a fused ring may be further substituted by one or more substituent(s) selected from deuterium, (C1-C60)alkyl with or without halogen substituent(s), (C1-C30)alkoxy, halogen, tri(C1-C30)alkylsilyl, tri(C6-C30)arylsilyl and (C6-C60)aryl;

$R_{226}$ represents (C1-C60)alkyl, (C6-C60)aryl, (C5-C60) heteroaryl or halogen;

$R_{227}$ through $R_{229}$ independently represent hydrogen, deuterium, (C1-C60)alkyl, (C6-C60)aryl or halogen, and the alkyl or aryl of $R_{226}$ through $R_{229}$ may be further substituted by deuterium, halogen or (C1-C60)alkyl; and Q represents

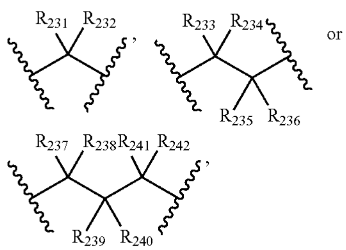

and $R_{231}$ through $R_{242}$ independently represent hydrogen, deuterium, (C1-C60)alkyl with or without halogen substituent(s), (C1-C30)alkoxy, halogen, (C6-C60)aryl, cyano or (C5-C60)cycloalkyl, or each of $R_{231}$ through $R_{242}$ may be linked to an adjacent substituent via alkylene or alkenylene to form a (C5-C7) spiro-ring or (C5-C9) fused ring, or each of them may be linked to $R_{207}$ or $R_{208}$ via alkylene or alkenylene to form a (C5-C7) fused ring.

Chemical Formula 10

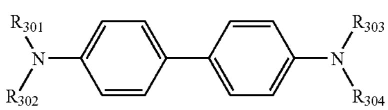

In Chemical Formula (10), $R_{301}$ through $R_{304}$ independently represent (C1-C60)alkyl or (C6-C60)aryl, or each of them may be linked to an adjacent substituent via (C3-C60) alkylene or (C3-C60)alkenylene with or without a fused ring to form an alicyclic ring, or a monocyclic or polycyclic aromatic ring; and the alkyl or aryl of $R_{301}$ through $R_{304}$, or the alicyclic ring, or the monocyclic or polycyclic aromatic ring formed therefrom by linkage via (C3-C60)alkylene or (C3-C60)alkenylene with or without a fused ring may be further substituted by one or more substituent(s) selected from (C1-C60)alkyl with or without halogen substituent(s), (C1-C60) alkoxy, halogen, tri(C1-C60)alkylsilyl, tri(C6-C60)arylsilyl and (C6-C60)aryl.

Chemical Formula 11

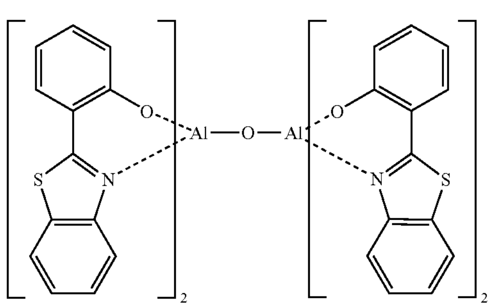

-continued

Chemical Formula 12

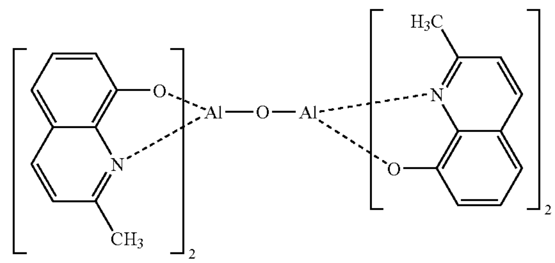

Chemical Formula 13

$L^4L^5M^2(T)_i$

In Chemical Formula (13), the ligands, $L^4$ and $L^5$ are independently selected from the following structures:

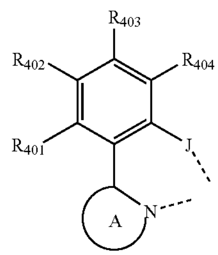

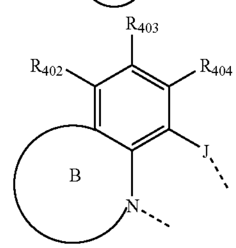

$M^2$ is a bivalent or trivalent metal;

i is 0 when $M^2$ is a bivalent metal, while i is 1 when $M^2$ is a trivalent metal;

T represents (C6-C60)aryloxy or tri(C6-C60)arylsilyl, and the aryloxy and triarylsilyl of T may be further substituted by (C1-C60)alkyl or (C6-C60)aryl;

J represents O, S or Se;

ring A represents oxazole, thiazole, imidazole, oxadiazole, thiadiazole, benzoxazole, benzothiazole, benzimidazole, pyridine or quinoline;

ring B represents pyridine or quinoline, and ring B may be further substituted by deuterium, (C1-C60)alkyl, or phenyl or naphthyl with or without (C1-C60)alkyl substituent(s);

$R_{401}$ through $R_{404}$ independently represent hydrogen, deuterium, (C1-C60)alkyl, halogen, tri(C1-C60)alkylsilyl, tri (C6-C60)arylsilyl or (C6-C60)aryl, or each of them may be linked to an adjacent substituent via (C3-C60)alkylene or (C3-C60)alkenylene to form a fused ring, and the pyridine or quinoline may form a chemical bond with $R_{401}$ to form a fused ring;

ring A or the aryl group of $R_{401}$ through $R_{404}$ may be further substituted by deuterium, (C1-C60)alkyl, halogen, (C1-C60) alkyl with halogen substituent(s), phenyl, naphthyl, tri(C1-C60)alkylsilyl, tri(C6-C60)arylsilyl or amino group.

The compounds having electroluminescent peak of wavelength of not less than 590 nm can be exemplified by the following compounds, but they are not restricted thereto.

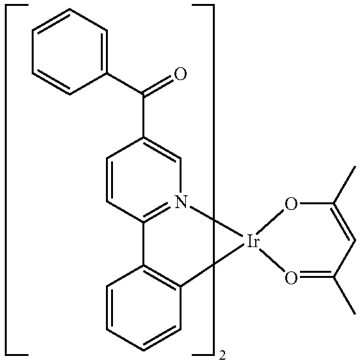
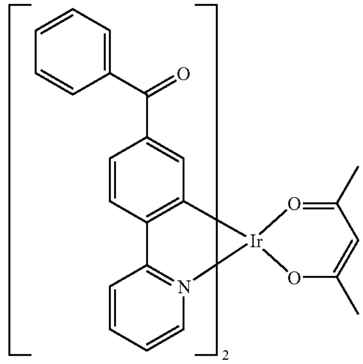
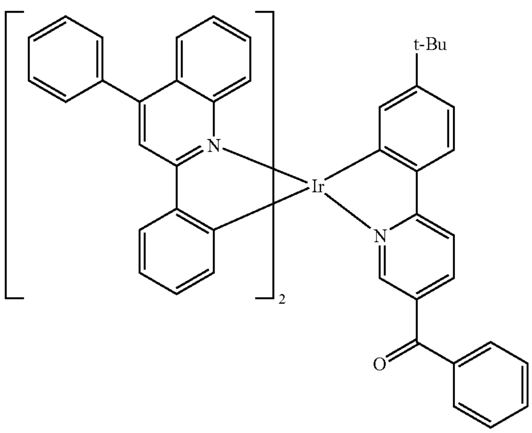
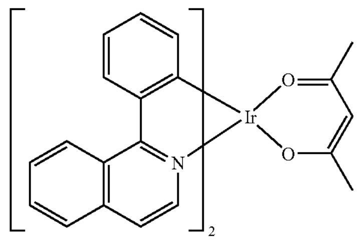
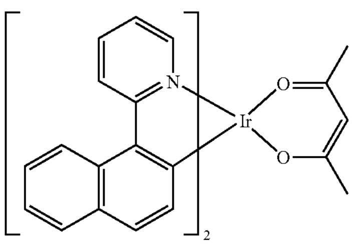
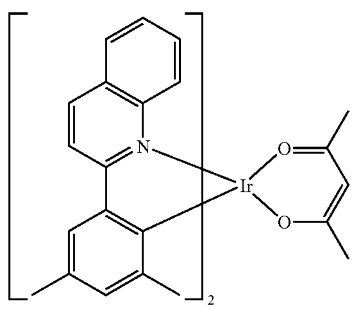
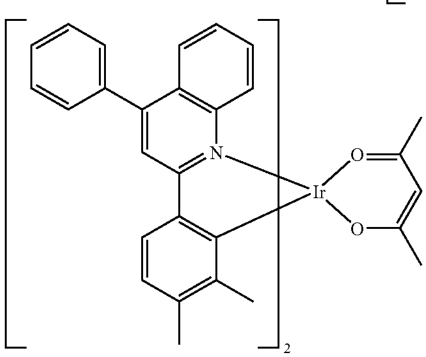
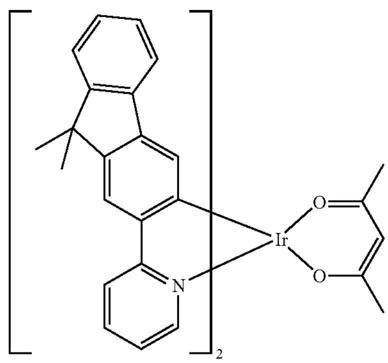

-continued
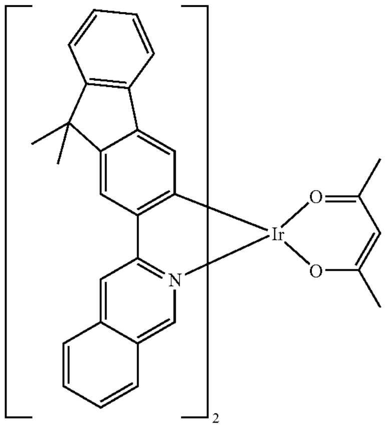
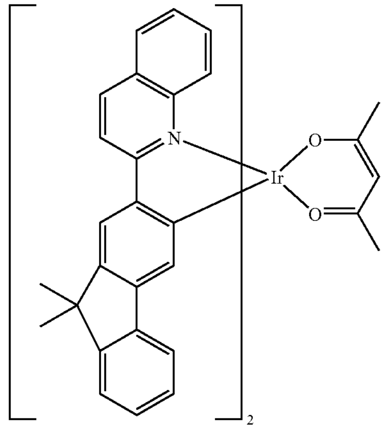
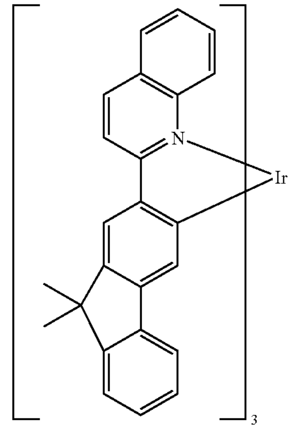
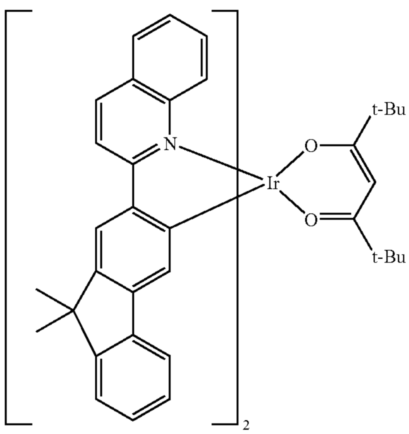
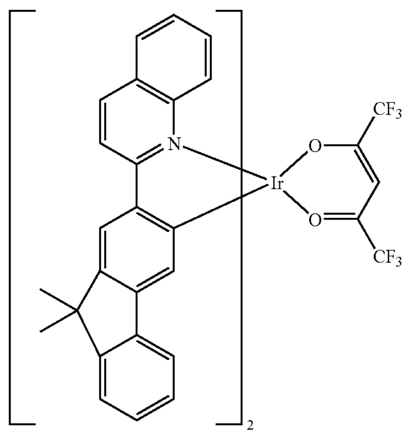
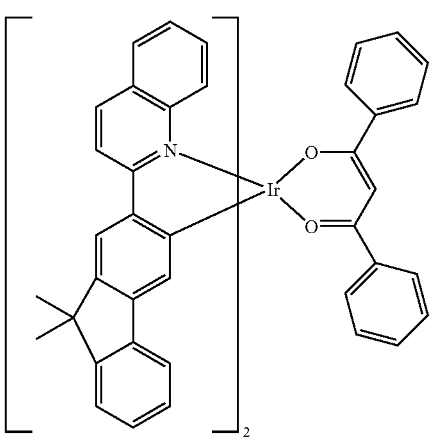
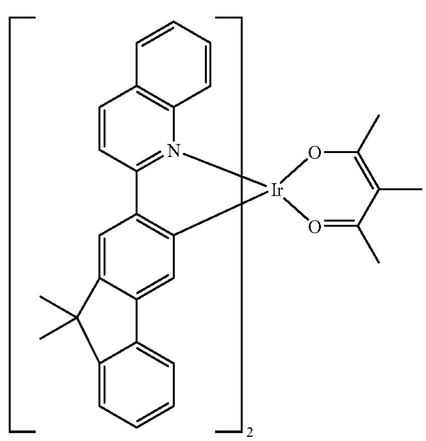

-continued
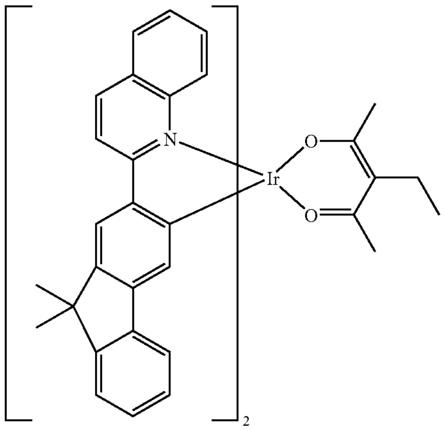
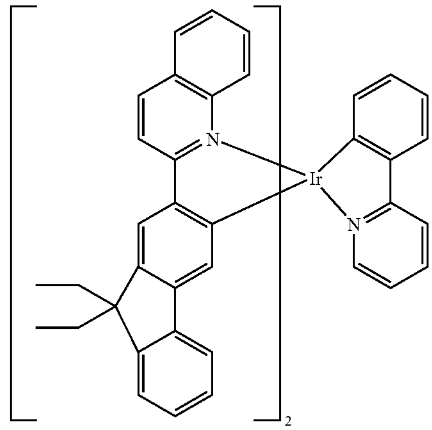
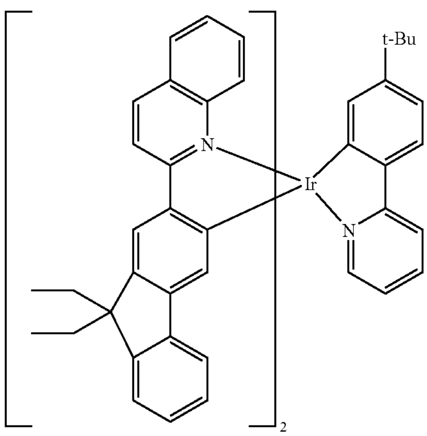
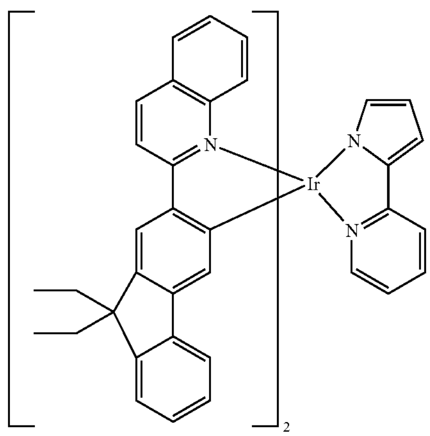
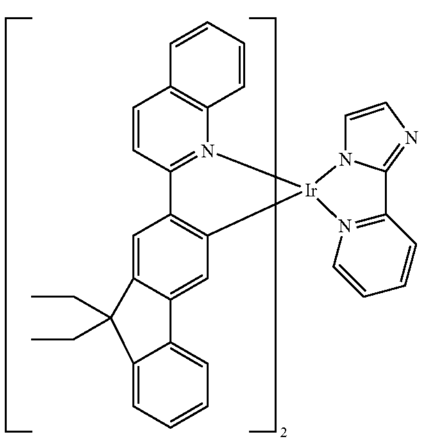
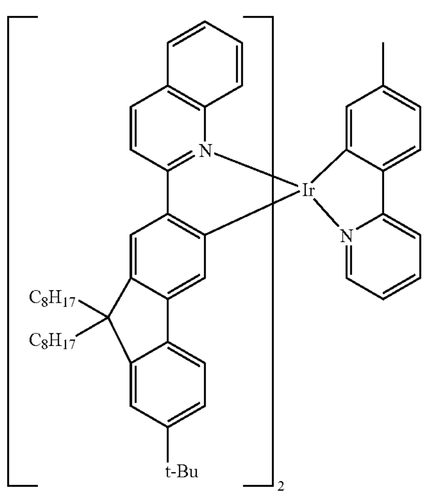

-continued
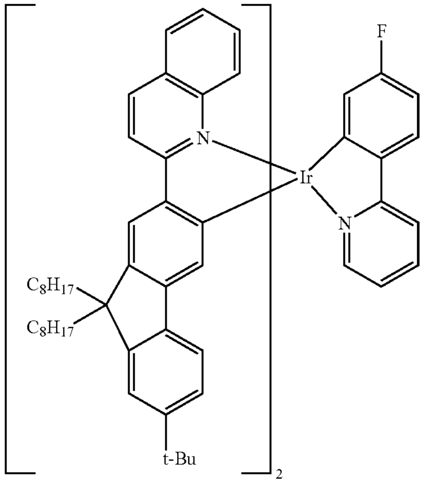
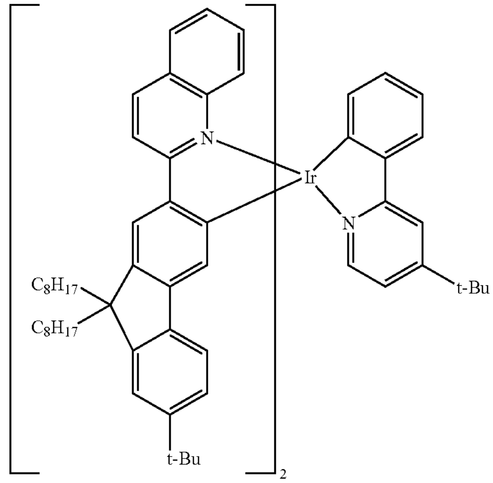
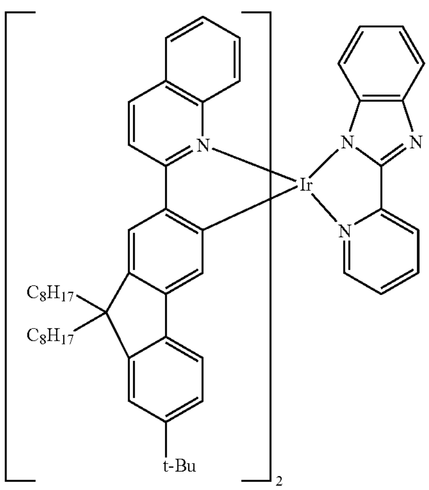
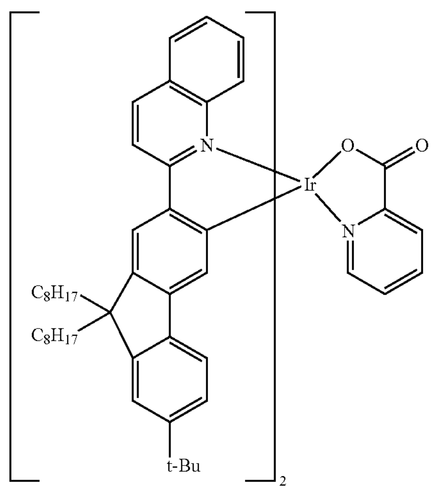
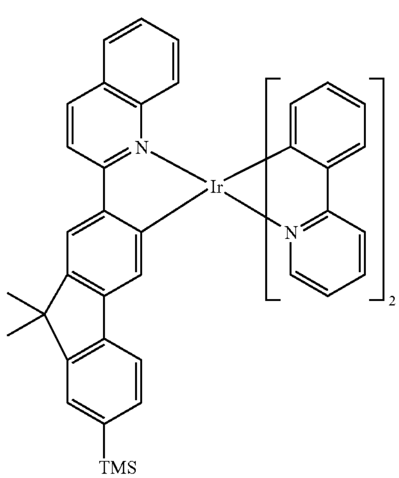
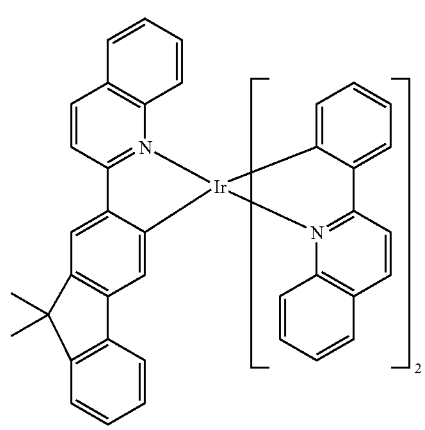

-continued
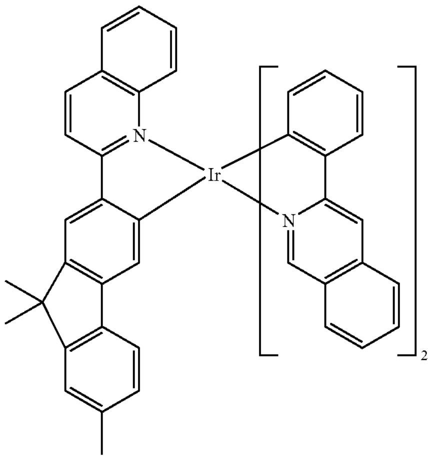
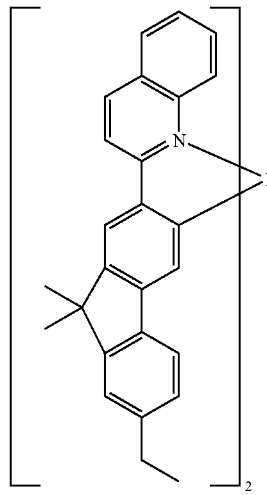
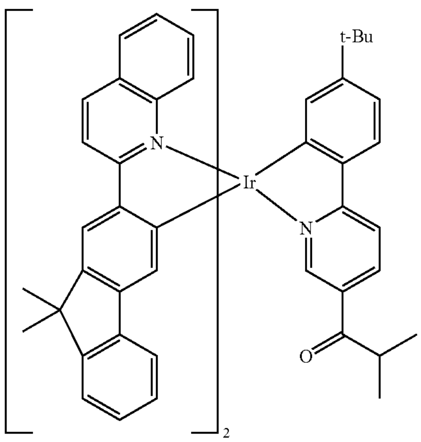
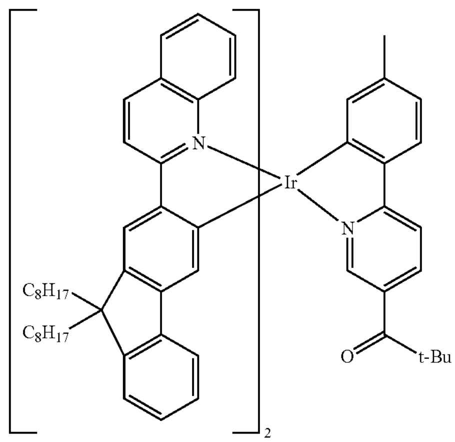
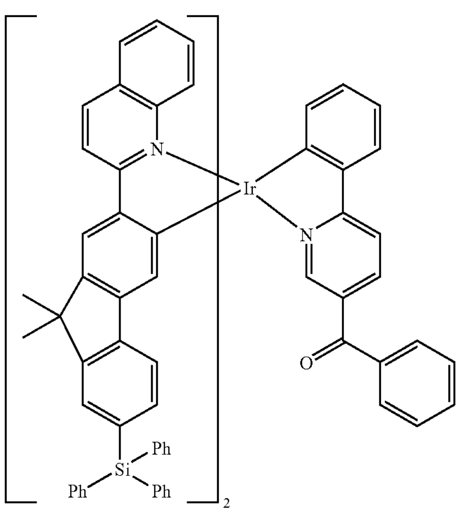
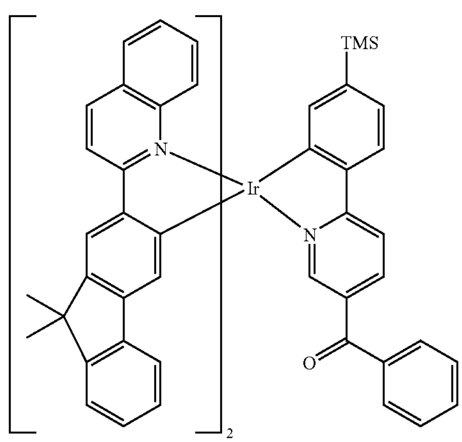

-continued
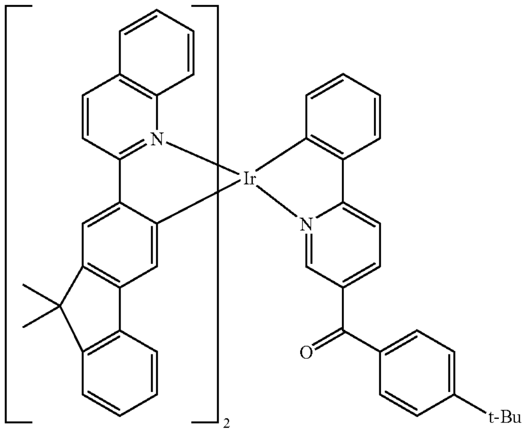
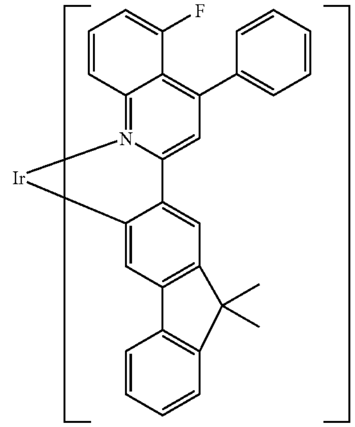
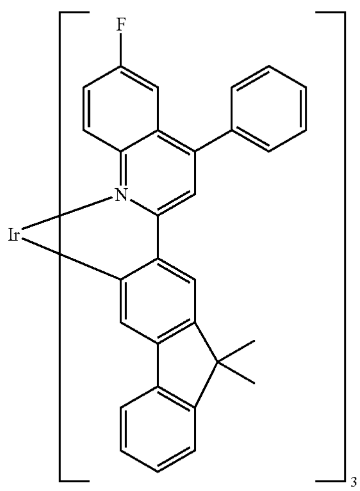
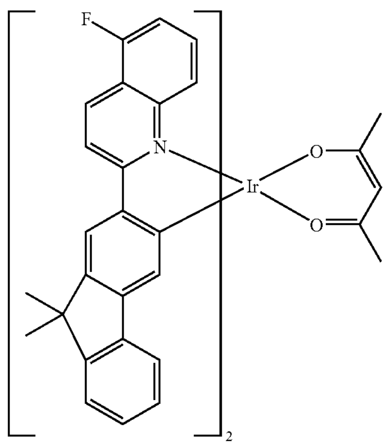
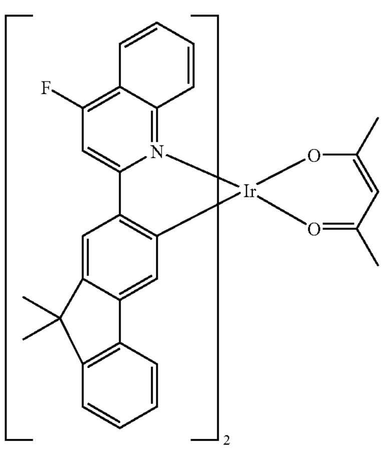
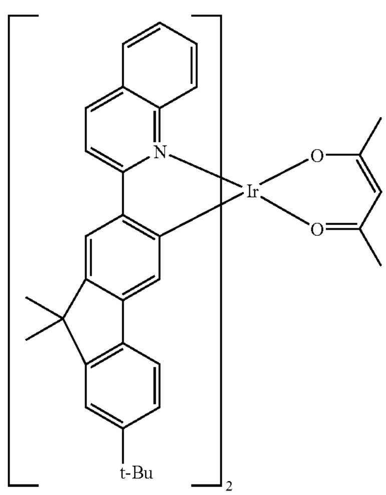

-continued
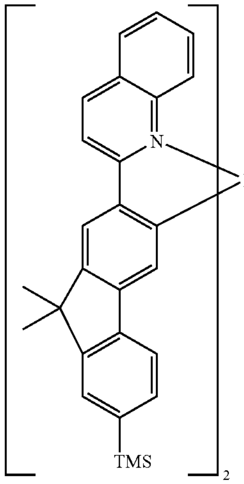
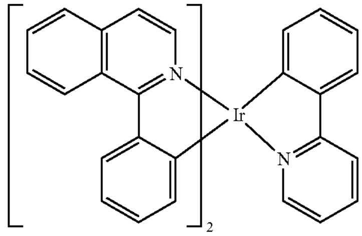
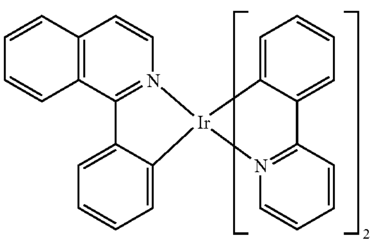
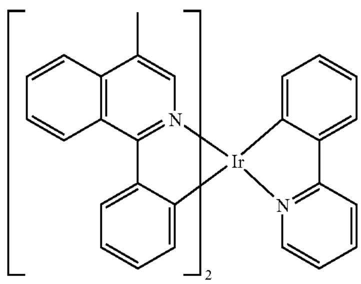
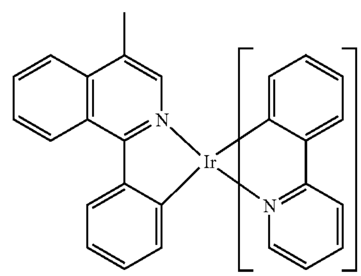
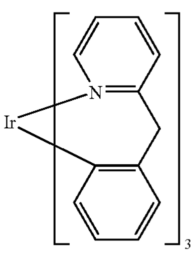
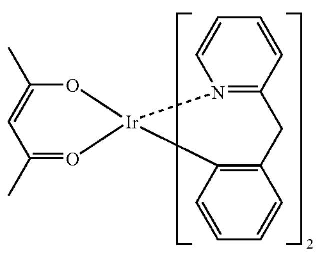
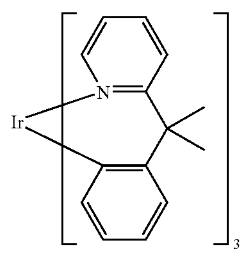
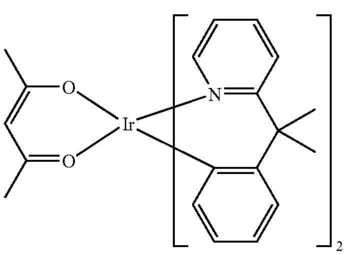
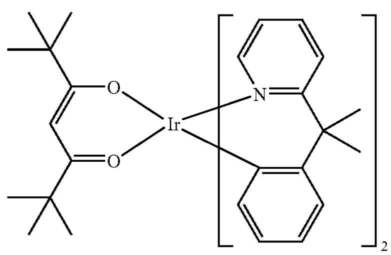
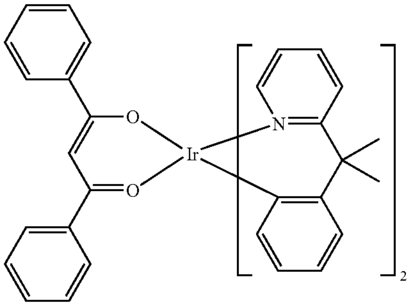
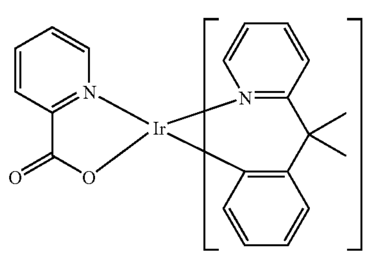

-continued
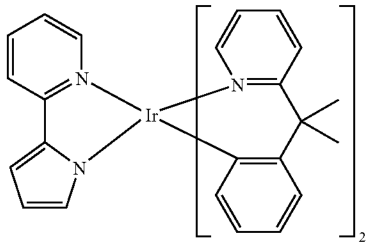
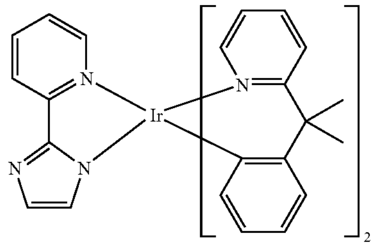
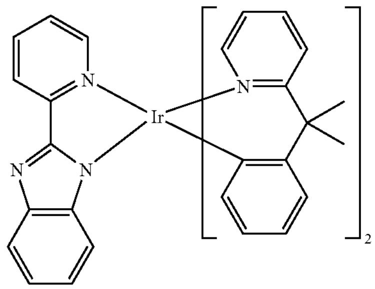
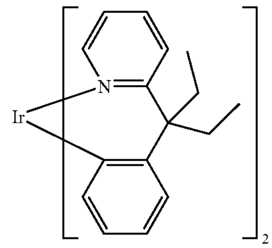
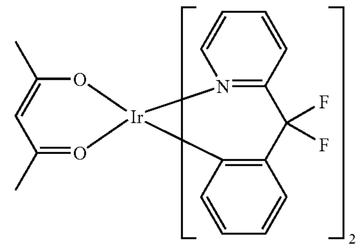
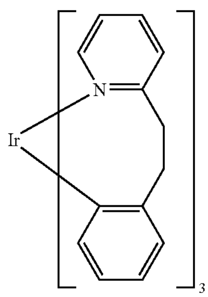
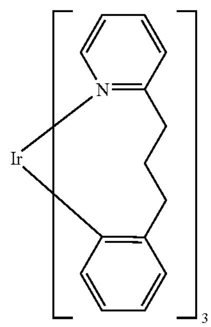
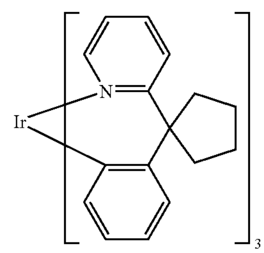
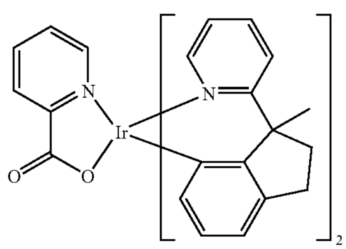
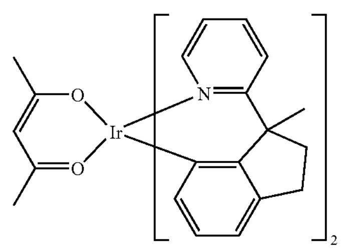
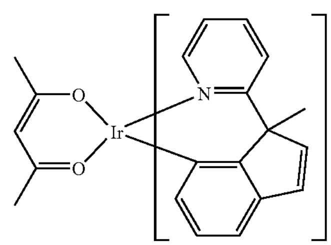
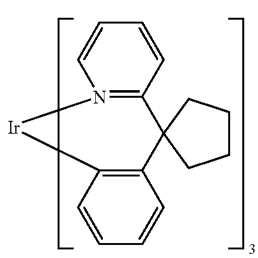
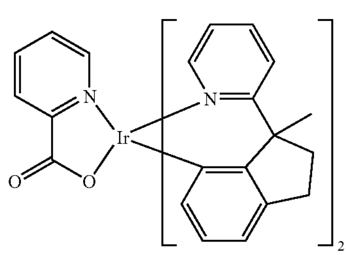
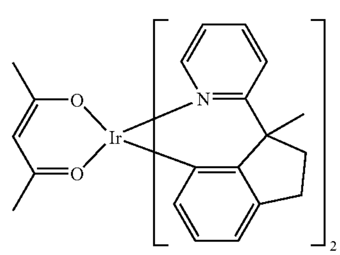
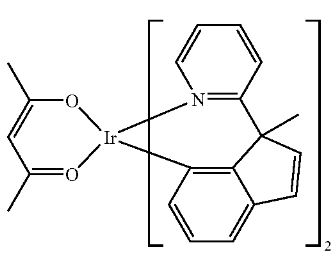
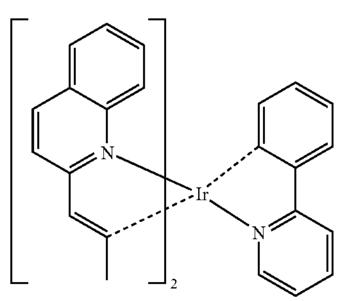
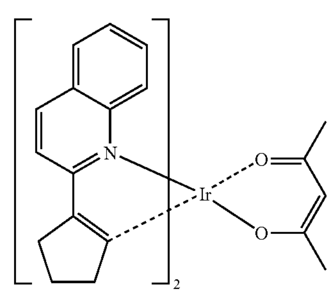

-continued
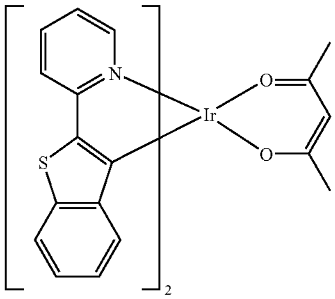
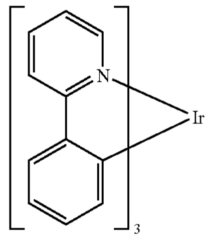
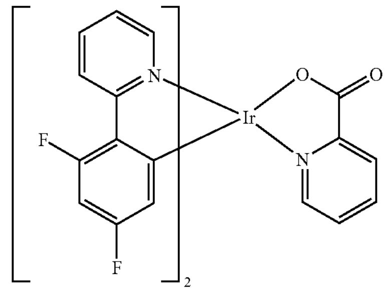
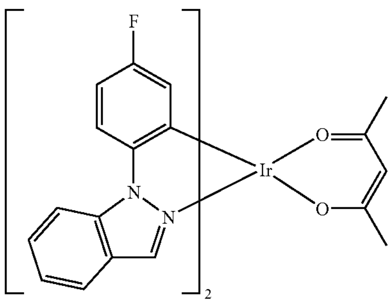
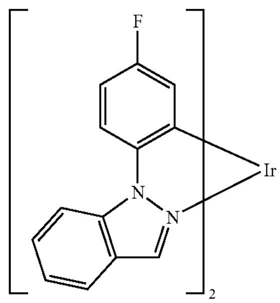
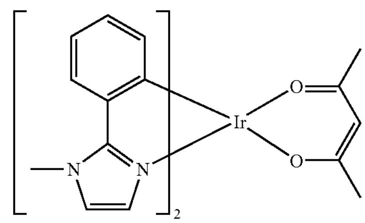
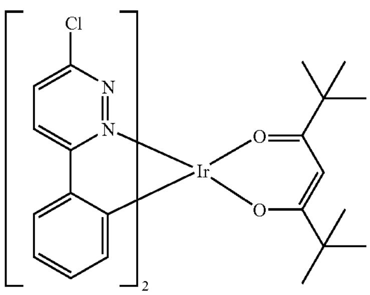
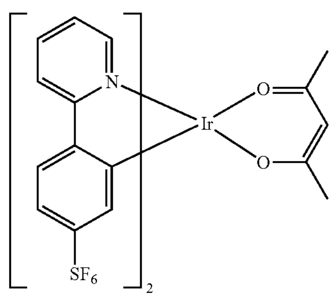
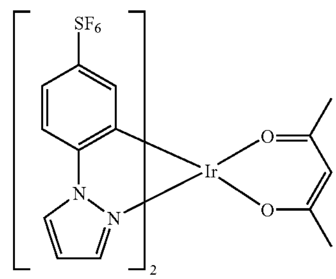
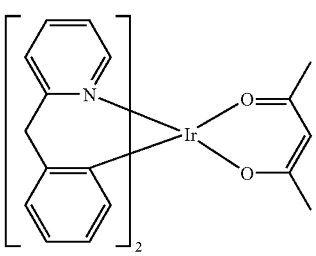
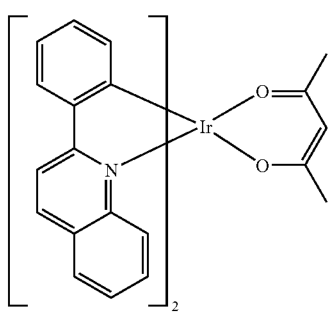
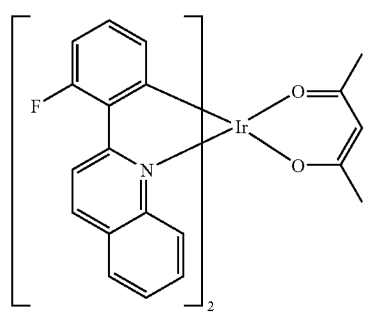
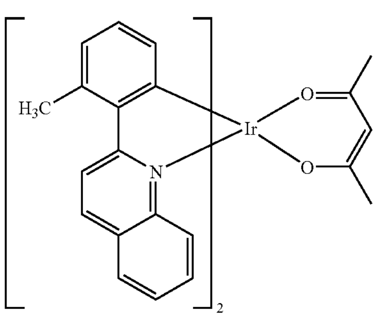
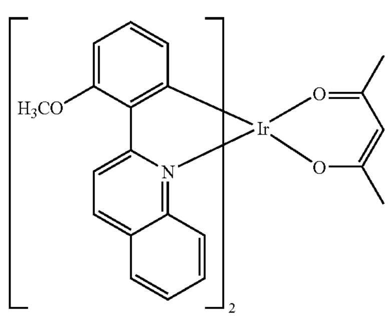
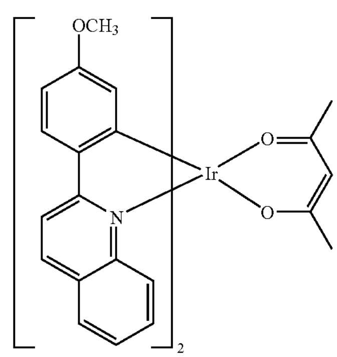

-continued
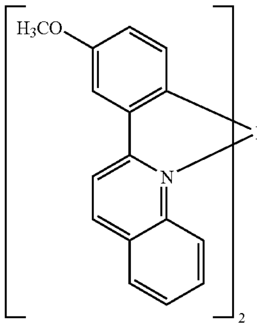
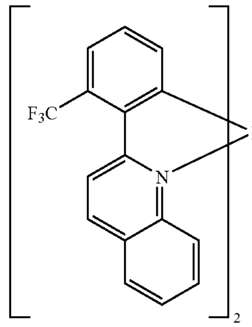
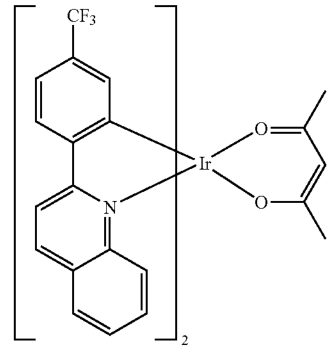
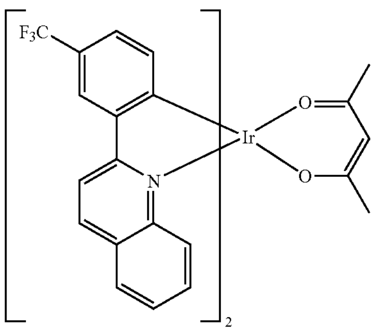
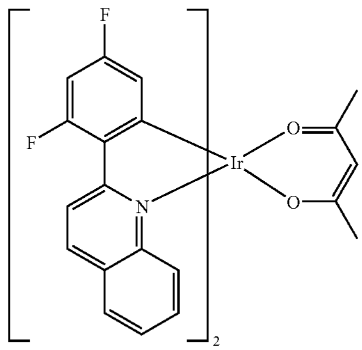
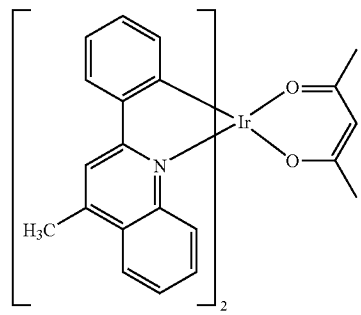
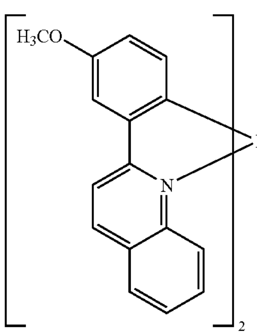
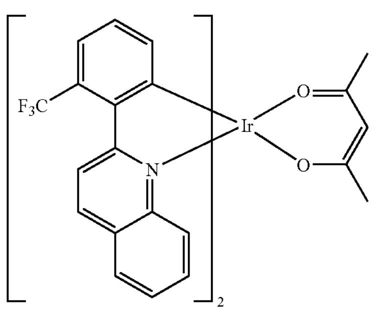
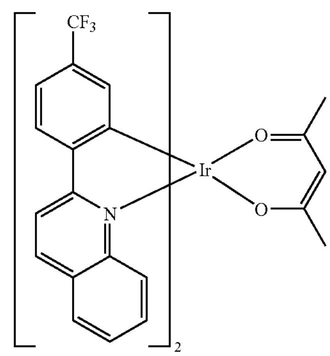
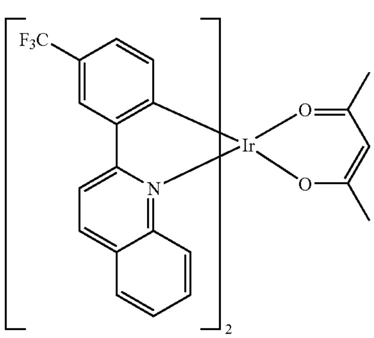
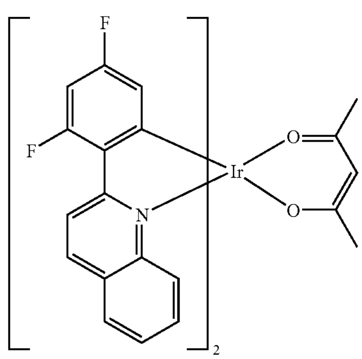
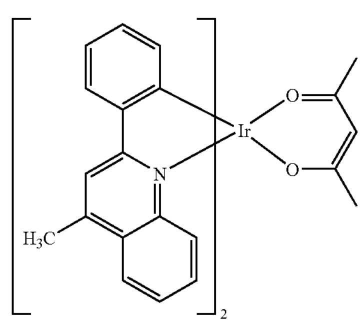

-continued
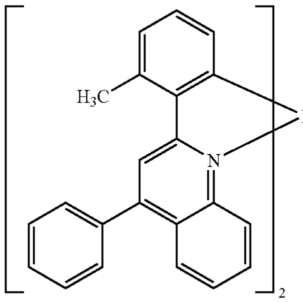
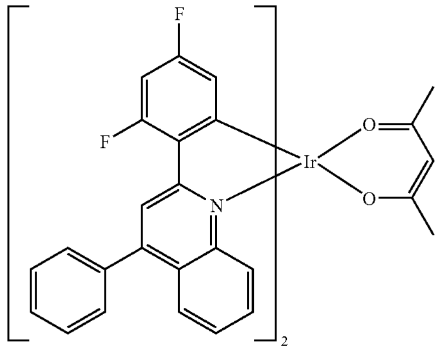
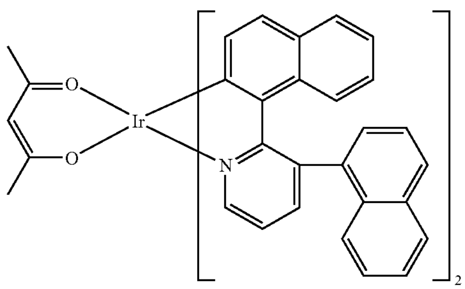
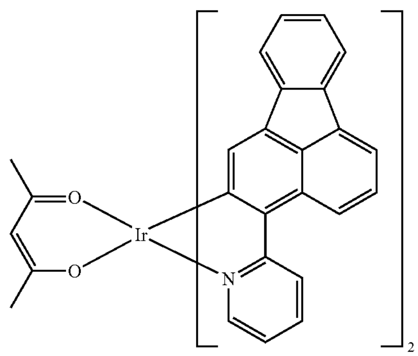
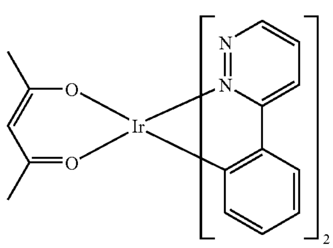
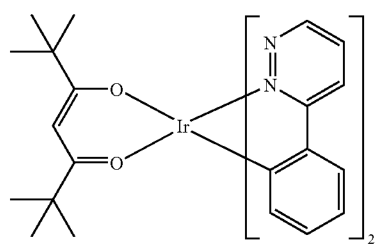
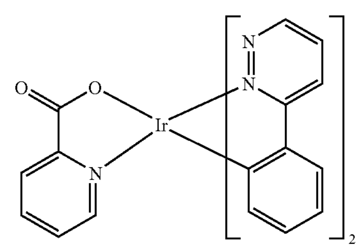
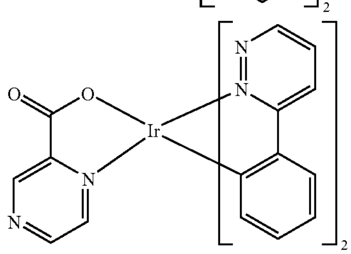
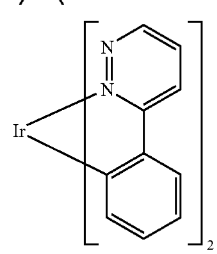
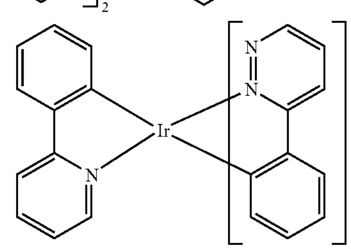
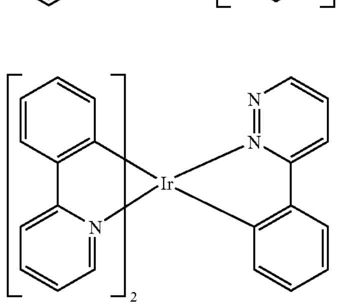
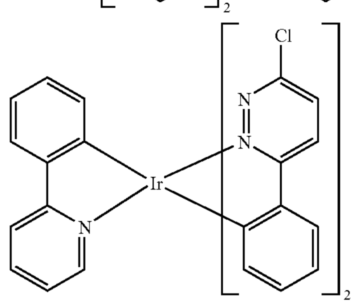

-continued
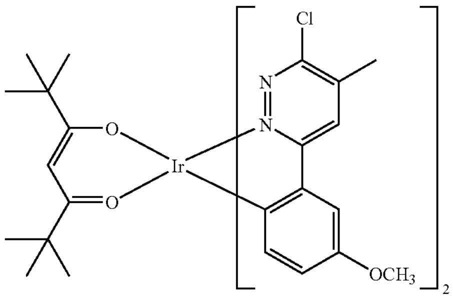
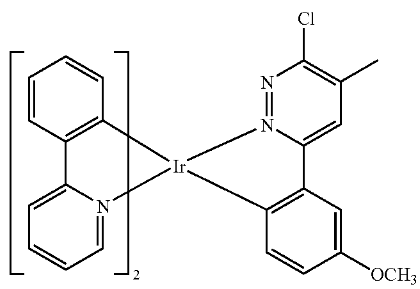
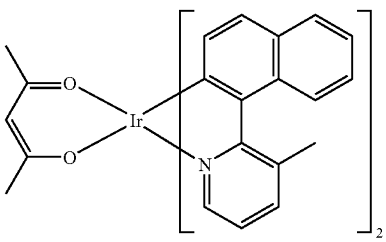
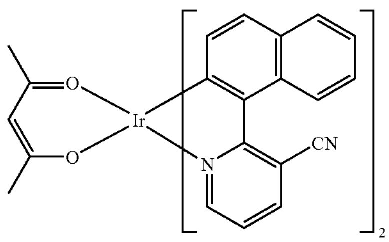
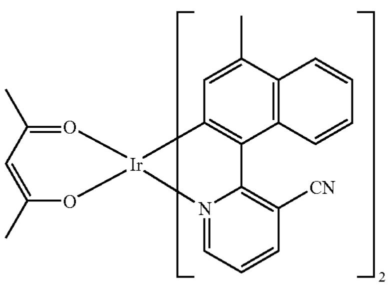
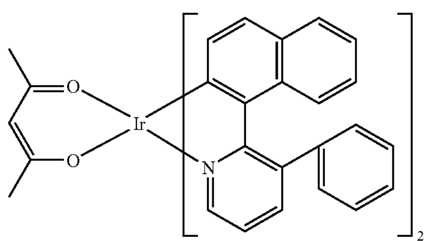
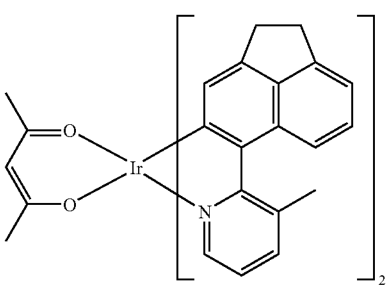
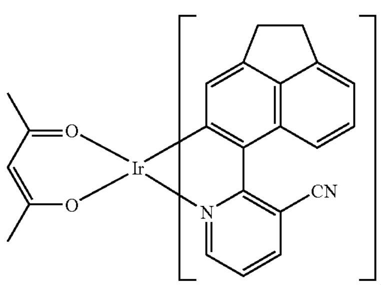
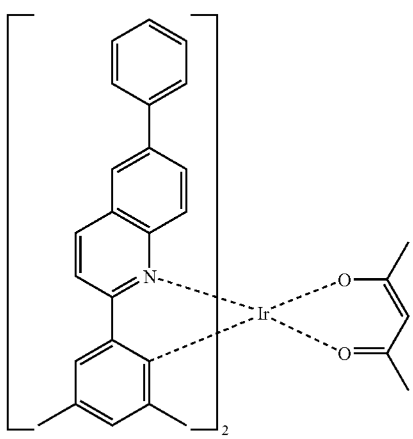
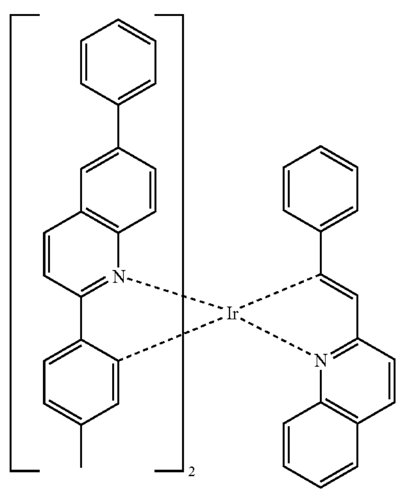

-continued
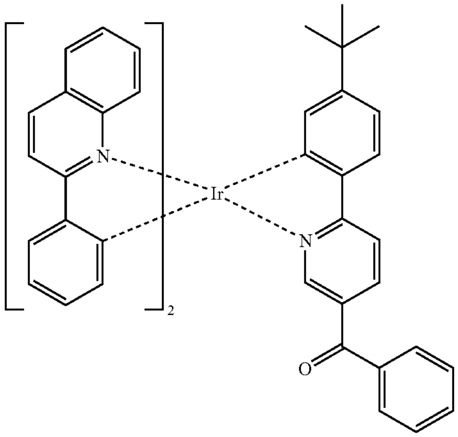
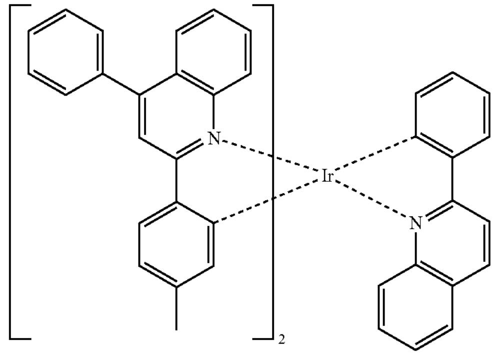
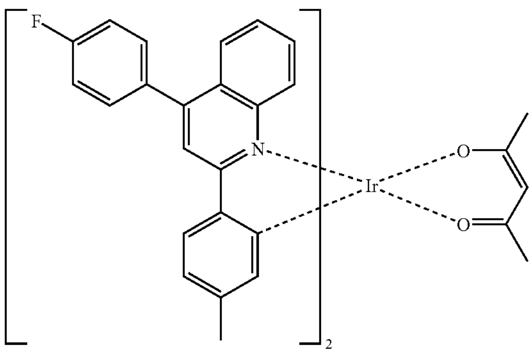
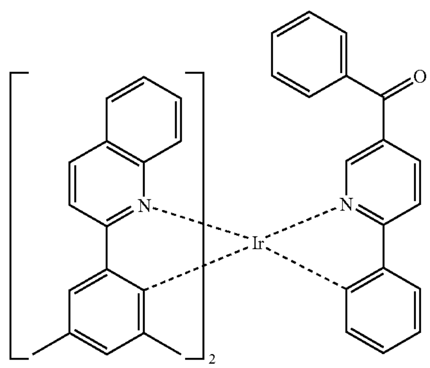
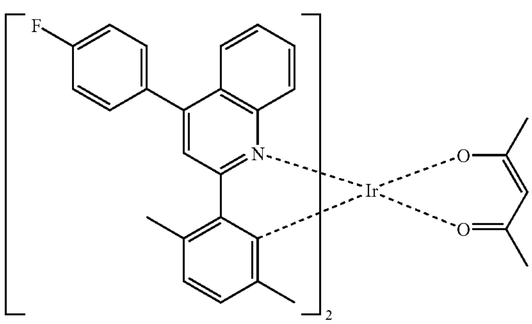
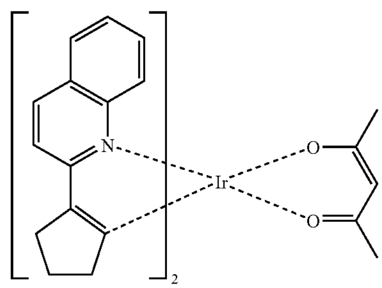
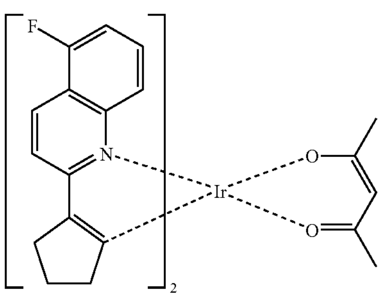
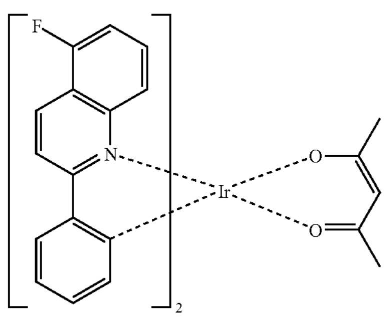
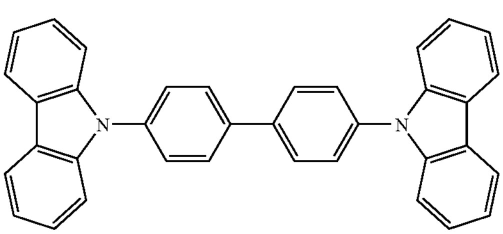
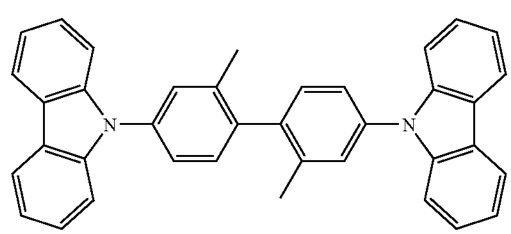

-continued
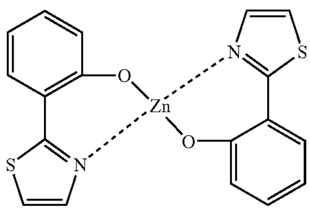
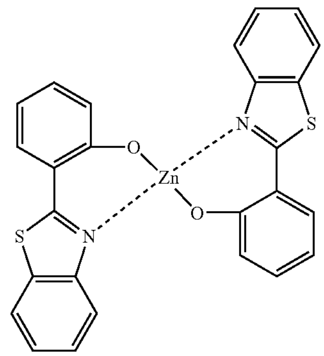
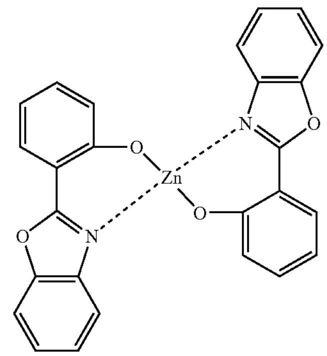
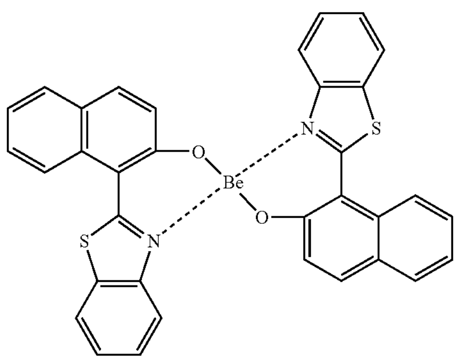
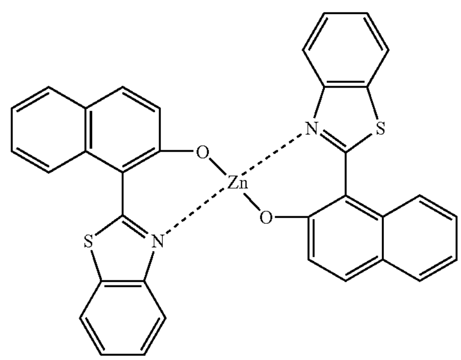
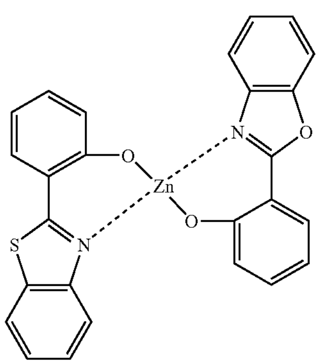
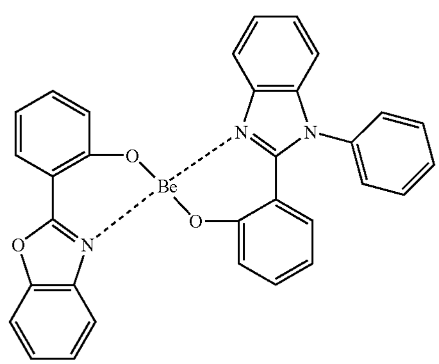
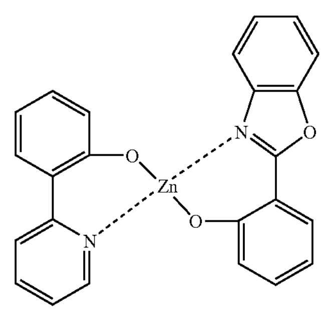
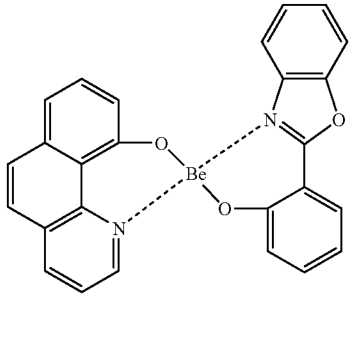
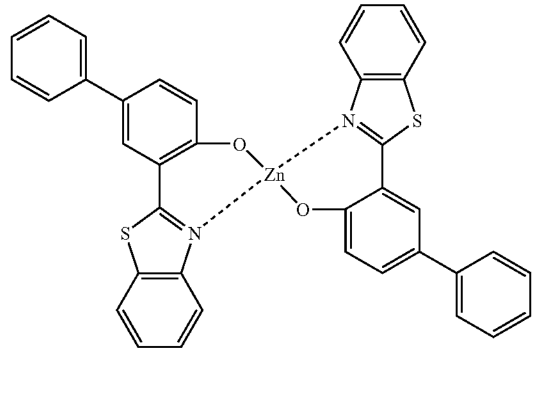

-continued
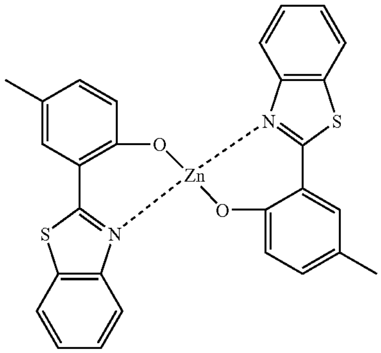
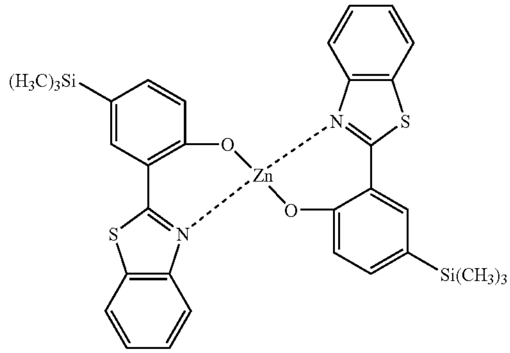
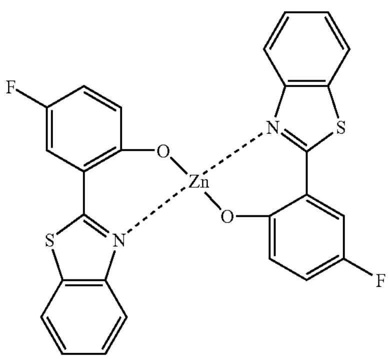
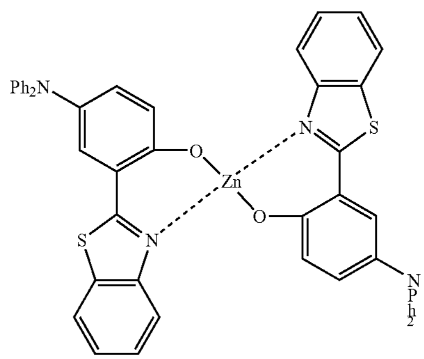
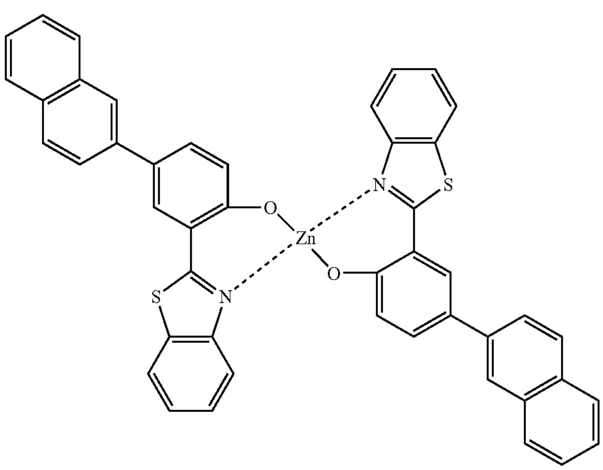
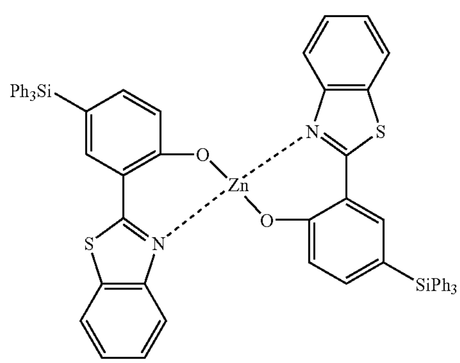
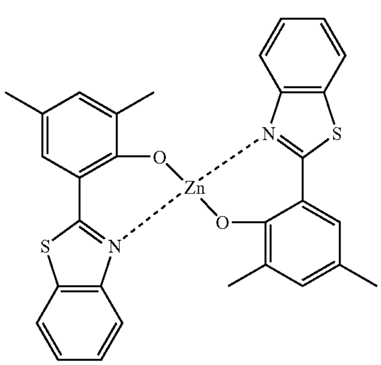
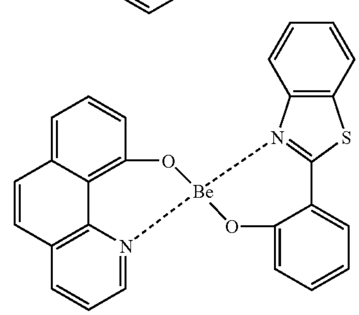

-continued
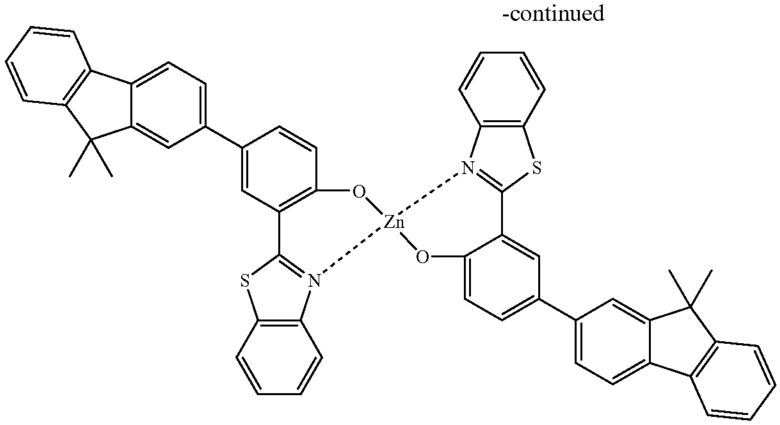
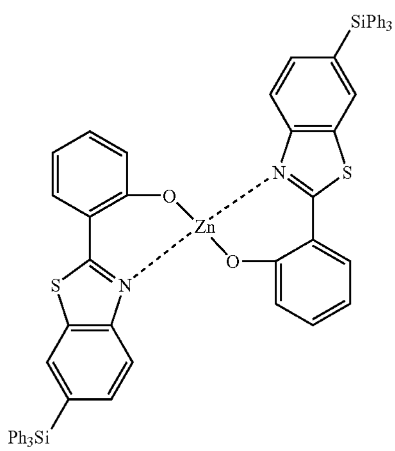
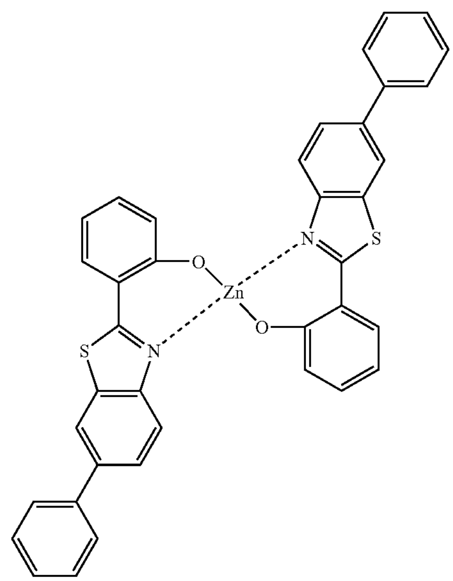
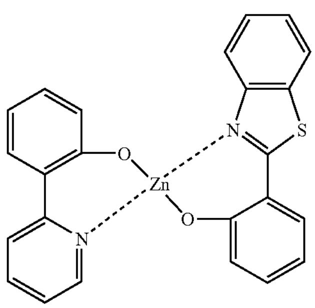
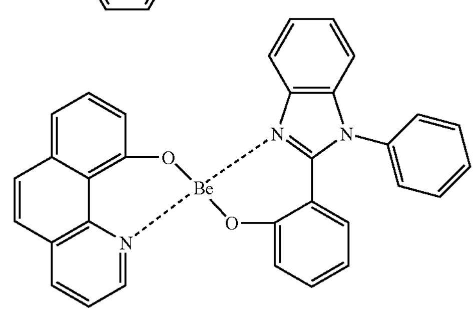
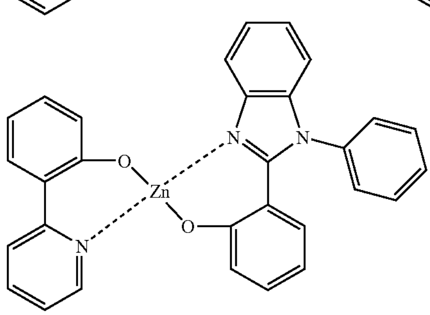
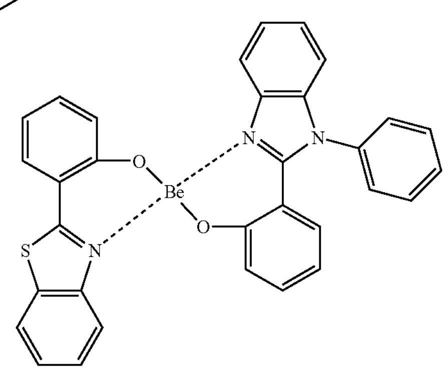

-continued
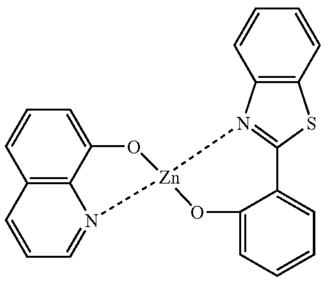
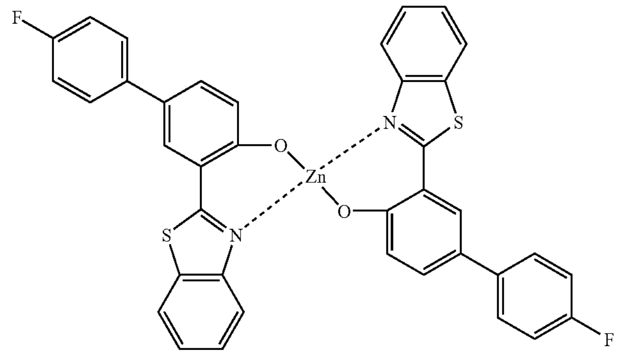
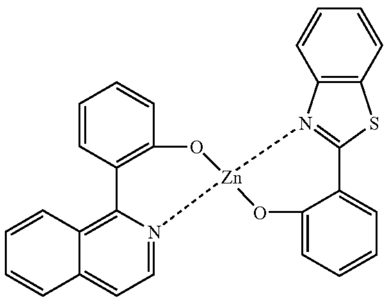
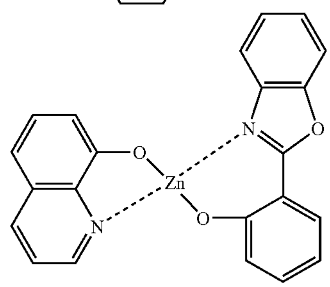
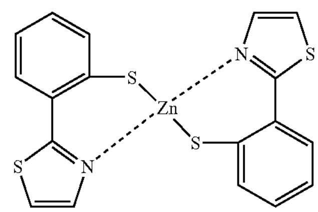
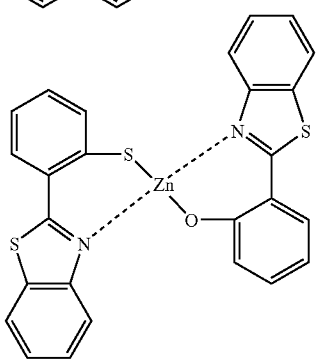
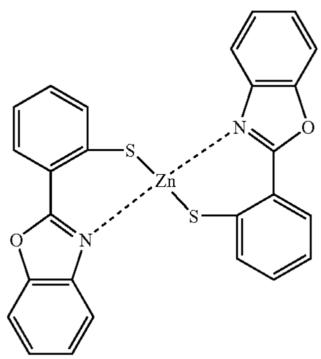
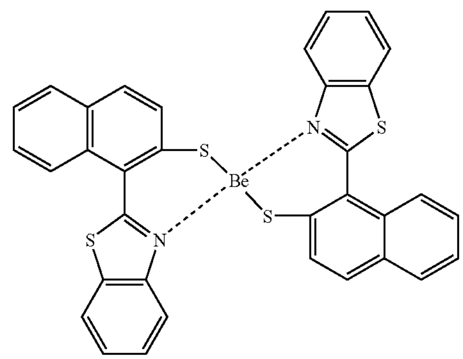
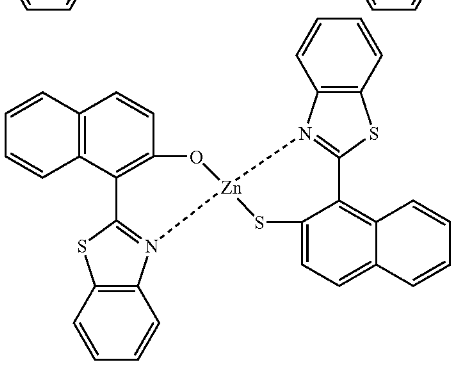
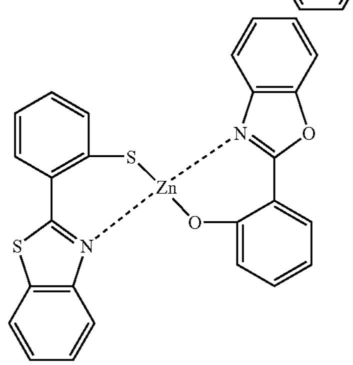
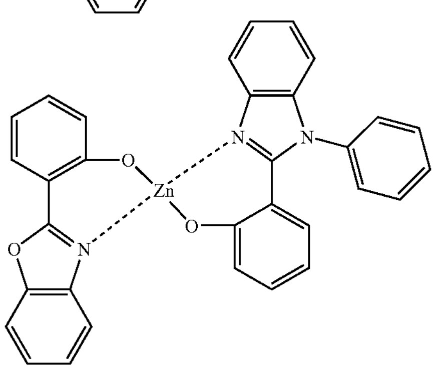
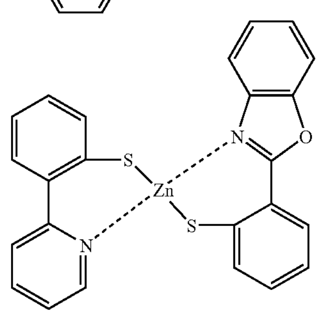
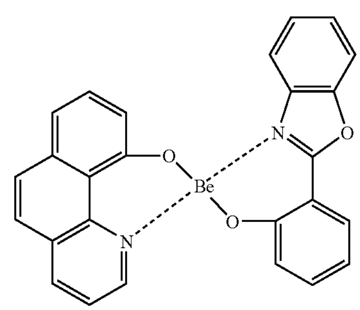

-continued
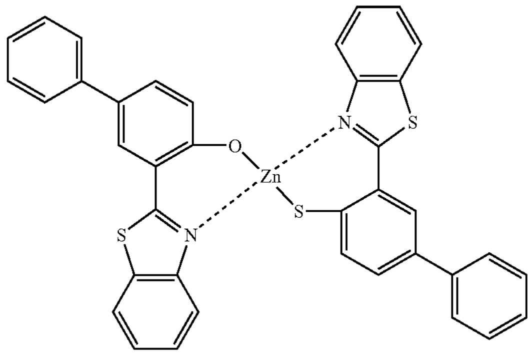
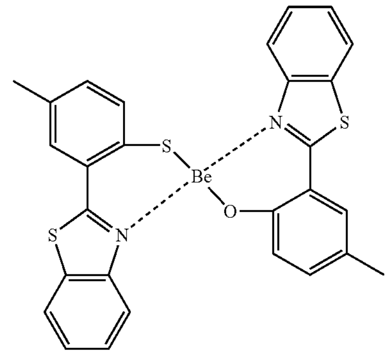
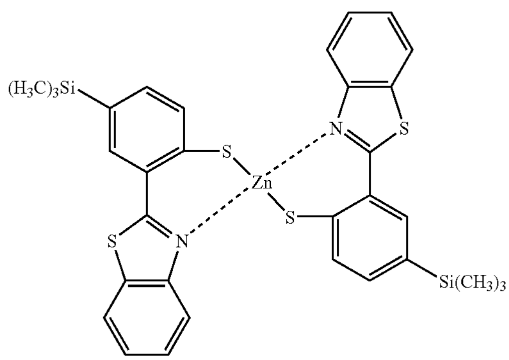
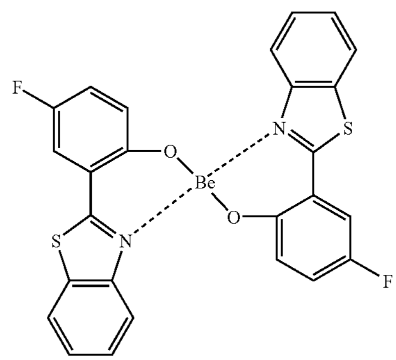
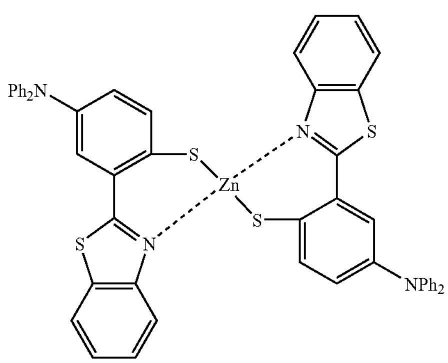
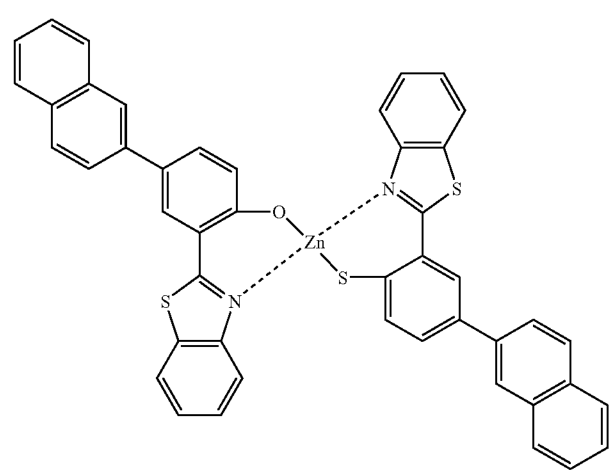
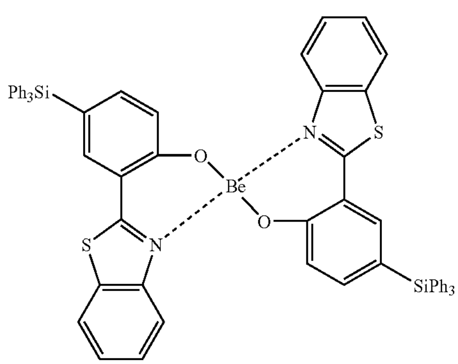
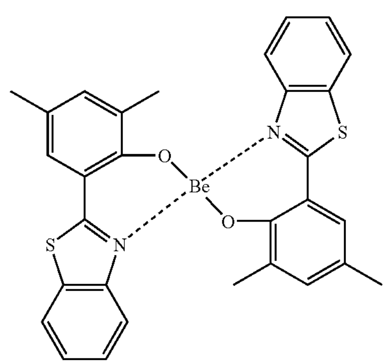

-continued
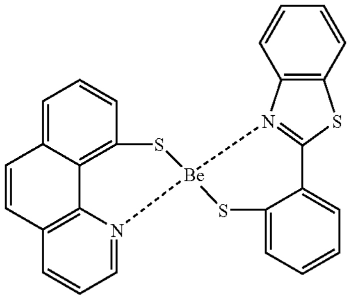
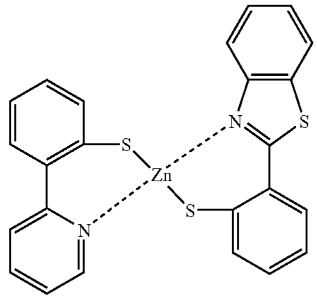
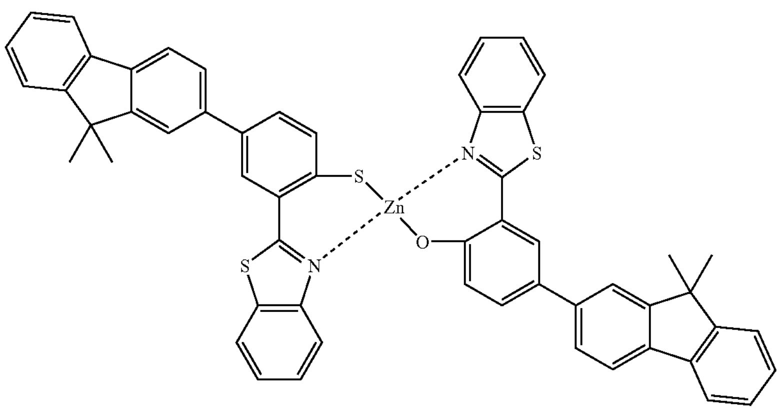
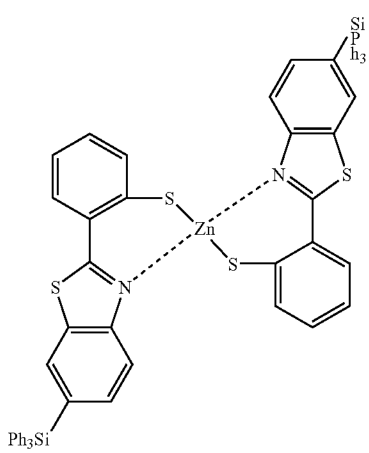
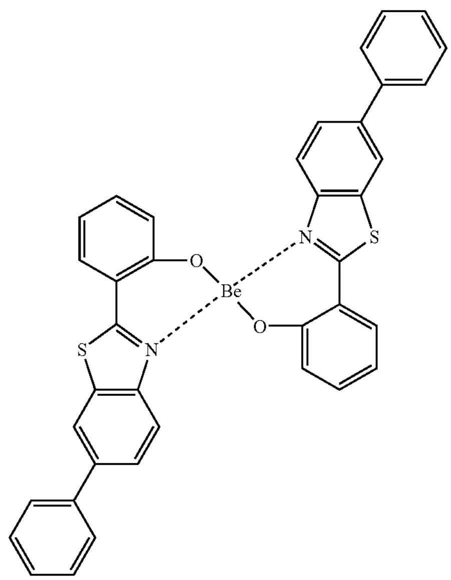
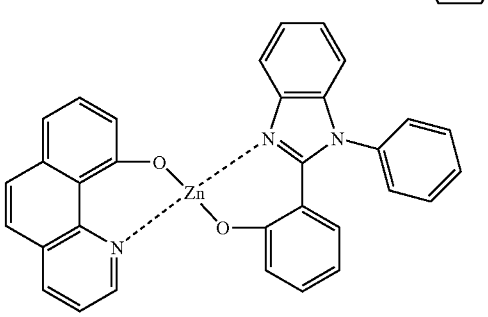
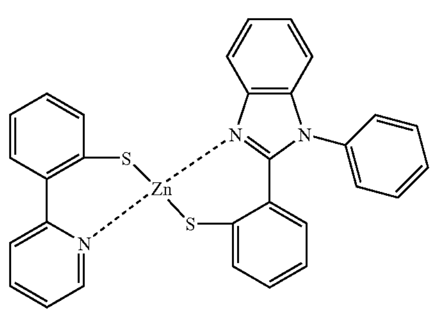

-continued
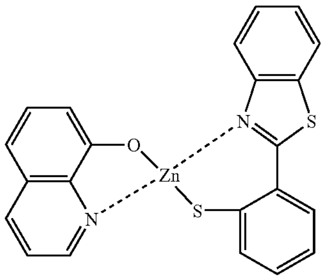
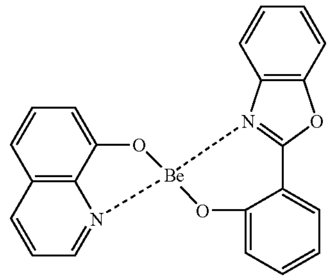
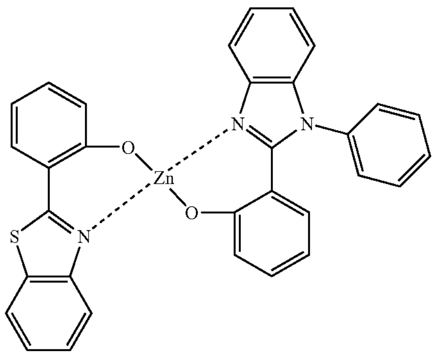
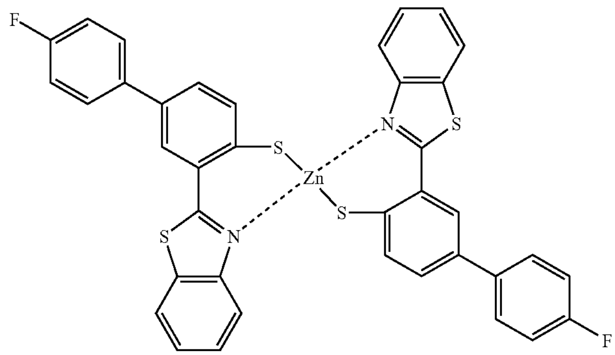
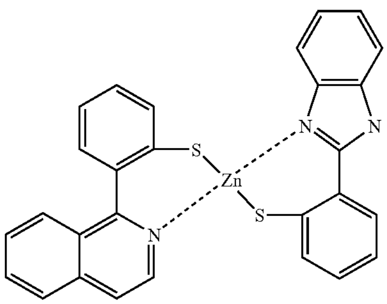
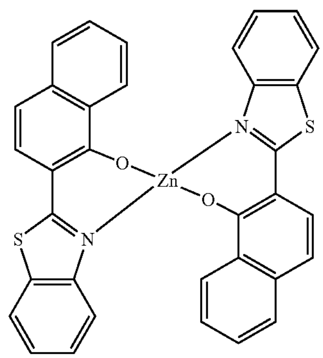
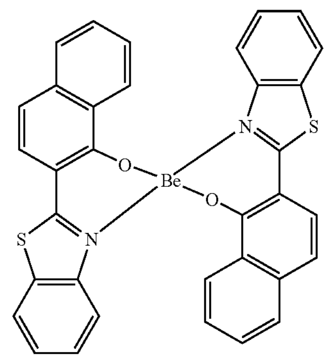
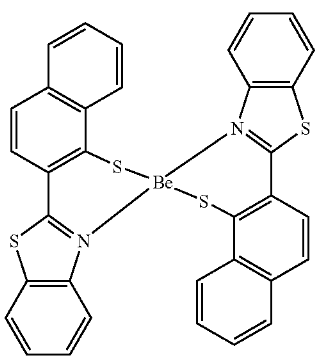
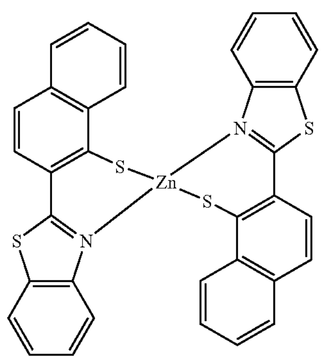
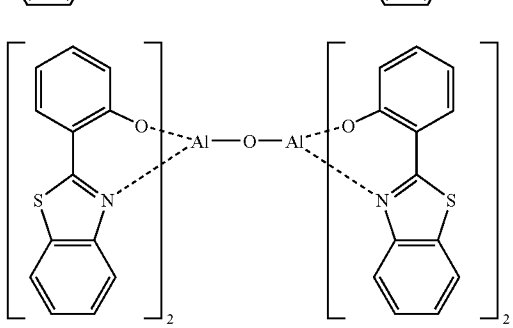
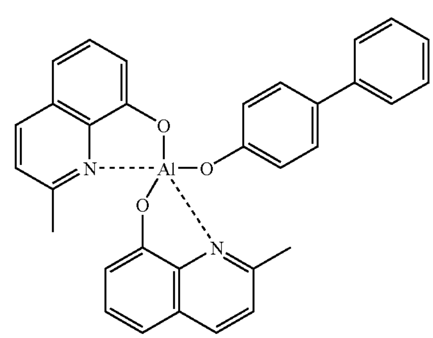

-continued
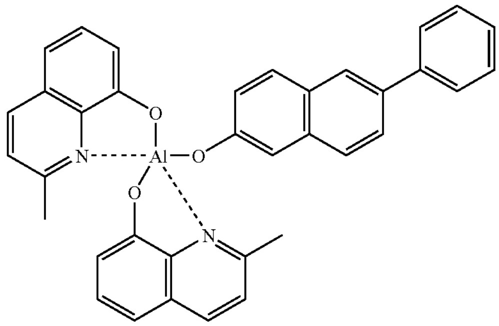
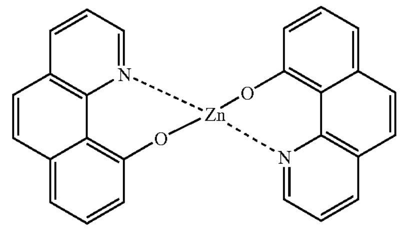
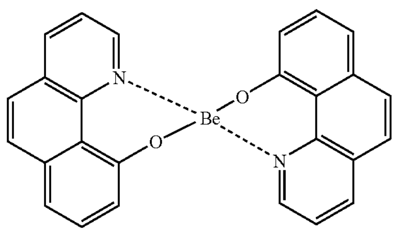
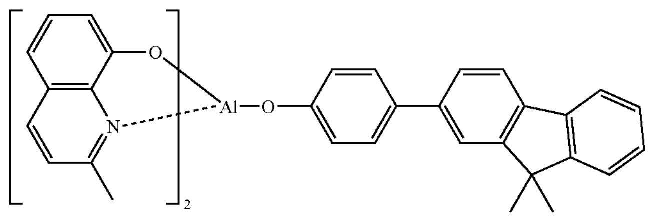
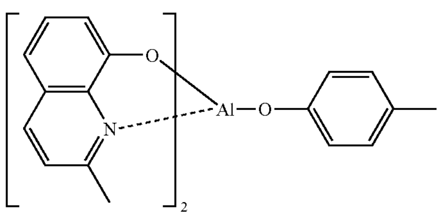
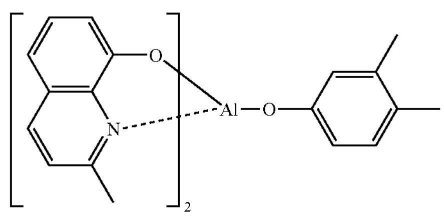
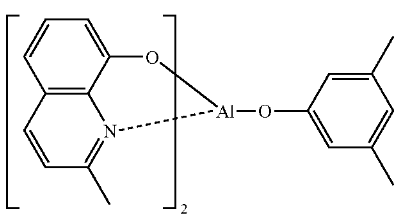
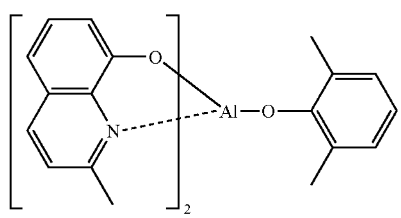
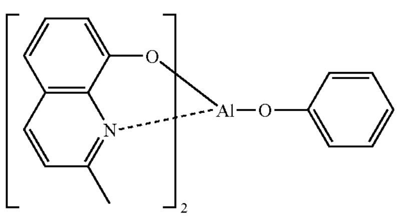
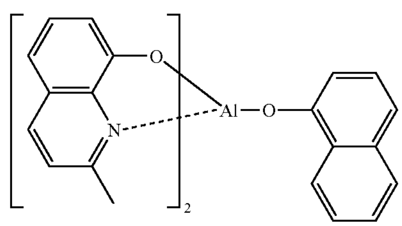
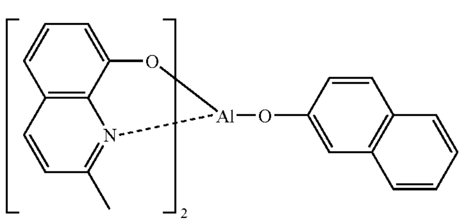
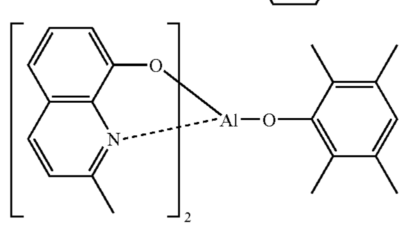

-continued

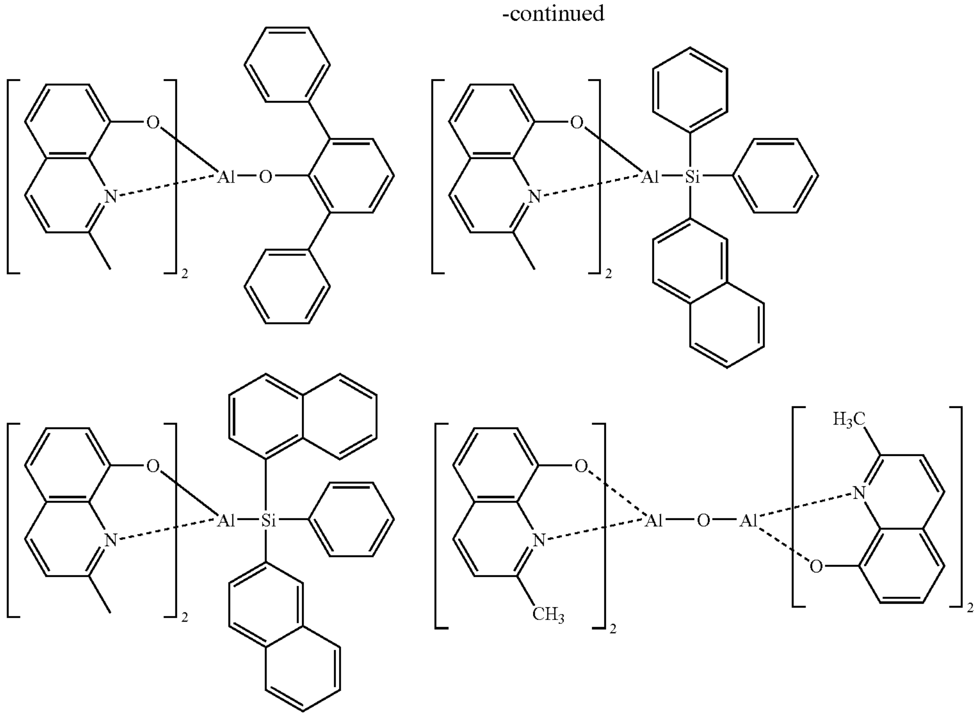

In an organic electroluminescent device according to the present invention, it is preferable to place one or more layer(s) (here-in-below, referred to as the "surface layer") selected from chalcogenide layers, metal halide layers and metal oxide layers, on the inner surface of at least one side of the pair of electrodes. Specifically, it is preferable to arrange a chalcogenide layer of silicon and aluminum metal (including oxides) on the anode surface of the EL medium layer, and a metal halide layer or a metal oxide layer on the cathode surface of the EL medium layer. As the result, stability in operation can be obtained.

Examples of chalcogenides preferably include $SiO_x$ ($1 \leqq x \leqq 2$), $AlO_x$ ($1 \leqq x \leqq 1.5$), SiON, SiAlON, or the like. Examples of metal halides preferably include LiF, $MgF_2$, $CaF_2$, fluorides of rare earth metal, or the like. Examples of metal oxides preferably include $Cs_2O$, $Li_2O$, MgO, SrO, BaO, CaO, or the like.

In an organic electroluminescent device according to the present invention, it is also preferable to arrange, on at least one surface of the pair of electrodes thus manufactured, a mixed region of electron transport compound and a reductive dopant, or a mixed region of a hole transport compound with an oxidative dopant. Accordingly, the electron transport compound is reduced to an anion, so that injection and transportation of electrons from the mixed region to an EL medium are facilitated. In addition, since the hole transport compound is oxidized to form a cation, injection and transportation of holes from the mixed region to an EL medium are facilitated. Preferable oxidative dopants include various Lewis acids and acceptor compounds. Preferable reductive dopants include alkali metals, alkali metal compounds, alkaline earth metals, rare-earth metals, and mixtures thereof.

The organic compounds according to the invention, having excellent luminous efficiency and life property of material, can be advantageously employed for manufacturing OLED's having very good operation life.

Best Mode

The present invention is further described with respect to the representative compounds of the invention, by describing the organic electroluminescent compounds, the processes for preparing the same, and luminescent properties of the device manufactured therefrom in the Examples below, which are provided for illustration of the embodiments only but are not intended to limit the scope of the invention by any means.

PREPARATION EXAMPLES

Preparation Example 1

Preparation of Compound (1)

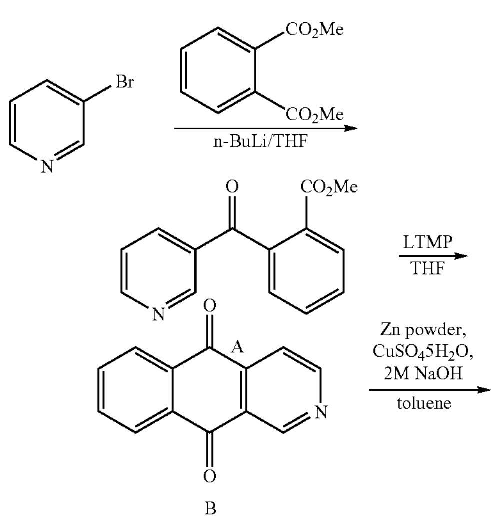

-continued

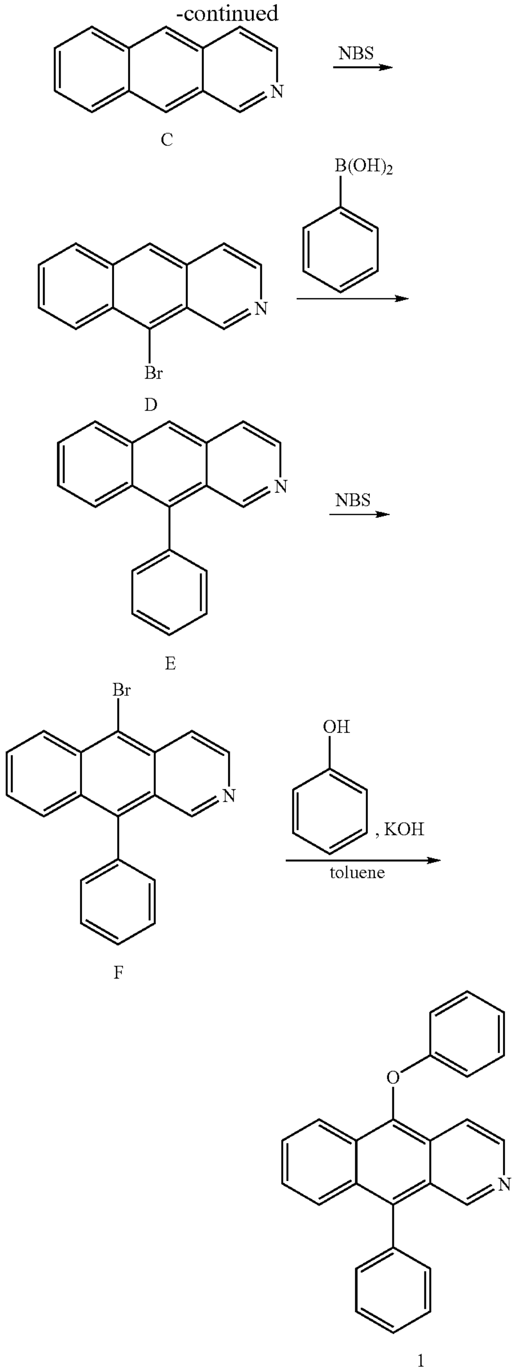

Preparation of Compound (A)

Under nitrogen atmosphere, a 50 mL round-bottomed flask was charged with 3-bromopyridine (96 μL, 1 mmol) and diethyl ether (10 mL), and the mixture was stirred. After chilling to −78° C., butyllithium (2.5 mL, 1 mmol, 2.5 M in hexane) was slowly added thereto. The resultant mixture was stirred at −78° C. for 1 hour, and dimethyl phthalate (0.17 mL, 1 mmol) was slowly added at −78° C. After stirring at the same temperature for 2 hours, the temperature was slowly raised to room temperature, and water (5 mL) was added to the reaction mixture to carry out hydrolysis. Organic layers obtained from ether extraction were combined, and dried to remove the solvent. Purification via column chromatography gave Compound (A) (0.14 g, 56%) as solid product.

Preparation of Compound (B)

Under nitrogen atmosphere, a 50 mL round-bottomed flask was charged with Compound (A) (0.11 g, 0.44 mmol) and THF (5 mL), and the mixture was stirred. At 0° C., LTMP solution (10 mL) was added thereto, and the resultant mixture was stirred at the same temperature for 2 hours. Then, the temperature was slowly raised to room temperature, and water (5 mL) was added to the mixture to carry out hydrolysis. Organic layers obtained from ethyl acetate extraction were combined, and dried to remove the solvent. Purification via column chromatography gave Compound (B) (41 mg, 44%) as solid product.

Preparation of Compound (C)

In a flask, $CuSO_4.5H_2O$ (2.4 g, 9.56 mmol) was dissolved in water (30 mL), and Zn (11.7 g, 179.25 mmol) was added thereto. After sequentially adding aqueous 2M NaOH solution (50 mL), toluene (50 mL) and Compound (B) (5 g, 23.9 mmol), the mixture was stirred for about 10 minutes, and then stirred under reflux at 110° C. for one day. When the reaction was completed, the reaction mixture was extracted with water (200 mL) and dichloromethane (150 mL), and the extract was dried under reduced pressure. Purification via column chromatography gave Compound (C) (3.9 g, 21.8 mmol).

Preparation of Compound (D)

Compound (C) (3.9 g, 21.8 mmol) and N-bromosuccinimide (4.7 g, 26.2 mmol) were dissolved in dichloromethane (100 mL) under nitrogen atmosphere, and stirred at 25° C. for one day. Then, the reaction was quenched by adding distilled water (200 mL), and the mixture was extracted with dichloromethane (250 mL). After drying the extract under reduced pressure, the residue was purified via column chromatography to obtain Compound (D) (4.8 g, 18.45 mmol).

Preparation of Compound (E)

Compound (D) (4.8 g, 18.45 mmol), phenylboronic acid (2.4 g, 22.14 mmol) and tetrakispalladium (0) triphenylphosphine ($Pd(PPh_3)_4$) (2.8 g, 1.8 mmol) were dissolved in toluene (150 mL) and ethanol (80 mL), and aqueous 2 M sodium carbonate solution (80 mL) was added thereto. After stirring under reflux at 120° C. for 4 hours, the temperature was lowered to 25° C. Then, the reaction was quenched by adding distilled water (200 mL), and the mixture was extracted with ethyl acetate (150 mL). After drying the extract under reduced pressure, the residue was purified via column chromatography to obtain Compound (E) (4.3 g, 16.84 mmol).

Preparation of Compound (F)

Compound (E) (4.3 g, 16.84 mmol) and N-bromosuccinimide (3.6 g, 20.20 mmol) were dissolved in dichloromethane (100 mL) under nitrogen atmosphere, and the solution was stirred at 25° C. for one day. Then, the reaction was quenched by adding distilled water (200 mL), and the mixture was extracted with dichloromethane (250 mL). After drying under reduced pressure, the residue was purified via column chromatography to obtain Compound (F) (4.7 g, 14.06 mmol).

Preparation of Compound (1)

A reaction vessel was charged with Compound (F) (4.7 g, 14.06 mmol), phenol (4.0 g, 42.18 mmol) and potassium hydroxide (2.4 g, 42.18 mmol), and the mixture was stirred with heating at 230° C. for 6 hours. When the reaction was completed, the mixture was cooled to room temperature. After adding sodium hydroxide and toluene, the resultant mixture was extracted. Toluene was removed by vacuum sublimation, and the filtrate was purified via column chromatography to obtain Compound (I) (2.73 g, 7.9 mmol).

According to the procedure of Preparation Example 1, organic electroluminescent compounds (Compounds 1 to 657) were prepared, and the $^1H$ NMR and MS/FAB data are shown in Table 1.

TABLE 1

| Compound No. | $^1H$ NMR($CDCl_3$, 200 MHz) | MS/FAB found | MS/FAB calculated |
|---|---|---|---|
| 1 | δ = 7.14~7.17(3H, m), 7.41(3H, m), 7.51~7.52(4H, m), 7.67(2H, m), 7.91(1H, m), 8.16(1H, m), 8.51~8.54(2H, m), 8.92(1H, m) | 347.41 | 347.13 |
| 2 | δ = 7.16(1H, m), 7.4~7.41(2H, m), 7.48~7.57(6H, m), 7.67(2H, m), 7.86~7.96(4H, m), 8.16(1H, m), 8.51~8.54(2H, m), 8.92(1H, m) | 397.47 | 397.15 |
| 3 | δ = 6.65(1H, m), 7.4~7.41(2H, m), 7.51~7.52(4H, m), 7.58~7.72(5H, m), 7.91(1H, m), 8.09(1H, m), 8.16(1H, m), 8.22(1H, m), 8.51~8.54(2H, m), 8.92(1H, m) | 397.47 | 397.15 |
| 4 | δ = 1.72(6H, s), 7.04(1H, m), 7.21(1H, m), 7.28(1H, m), 7.38~7.41(2H, m), 7.51~7.55(5H, m), 7.67(2H, m), 7.83~7.91(3H, m), 8.16(1H, m), 8.51~8.54(2H, m), 8.92(1H, m) | 463.57 | 463.19 |
| 5 | δ = 7.2(2H, m), 7.41(2H, m), 7.51~7.52(8H, m), 7.67(2H, m), 7.75(2H, m), 7.91(1H, m), 8.16(1H, m), 8.51~8.54(2H, m), 8.92(1H, m) | 423.50 | 423.16 |
| 7 | δ = 2.34(6H, s), 6.97(2H, m), 7.07(1H, m), 7.41(1H, m), 7.51~7.52(4H, m), 7.67(2H, m), 7.91(1H, m), 8.16(1H, m), 8.51~8.54(2H, m), 8.92(1H, m) | 375.46 | 375.16 |
| 11 | δ = 7.41~7.52(18H, m), 7.67(2H, m), 7.91(1H, m), 8.16(1H, m), 8.51~8.54(2H, m), 8.92(1H, m) | 499.60 | 499.19 |
| 15 | δ = 7.18(1H, m), 7.34(1H, m), 7.41~7.52(6H, m), 7.67(2H, m), 7.91(1H, m), 8.01(1H, m), 8.16(1H, m), 8.34(1H, m), 8.51~8.54(2H, m), 8.81(1H, m), 8.92(1H, m) | 398.46 | 398.14 |
| 19 | δ = 7.1(1H, m), 7.24(1H, m), 7.41~7.52(12H, m), 7.67(2H, m), 7.91(1H, m), 8.16(1H, m), 8.51~8.54(2H, m), 8.92(1H, m) | 423.50 | 423.16 |
| 27 | δ = 7.26(1H, m), 7.37~7.41(2H, m), 7.5~7.52(6H, m), 7.67(2H, m), 7.91(1H, m), 7.98(1H, m), 8.16~8.17(2H, m), 8.45(1H, m), 8.51~8.54(2H, m), 8.92(1H, m) | 453.55 | 453.12 |
| 35 | δ = 7.25(1H, m), 7.33~7.35(2H, m), 7.41~7.52(8H, m), 7.58~7.59(3H, m), 7.67(2H, m), 7.84(1H, m), 7.91~7.94(2H, m), 8.16(1H, m), 8.51~8.55(3H, m), 8.92(1H, m) | 512.60 | 512.19 |
| 37 | δ = 7.36~7.43(6H, m), 7.51~7.52(4H, m), 7.67(2H, m), 7.74~7.84(6H, m), 7.91(1H, m), 8.12~8.16(2H, m), 8.51~8.54(2H, m), 8.92(1H, m) | 529.57 | 529.16 |
| 39 | δ = 7.2(2H, m), 7.41(1H, m), 7.51~7.55(6H, m), 7.61~7.67(3H, m), 7.75(2H, m), 7.91(1H, m), 8.04~8.08(2H, m), 8.16(1H, m), 8.42(1H, m), 8.51~8.55(3H, m), 8.92(1H, m) | 473.56 | 473.18 |
| 42 | δ = 7.1(1H, m), 7.24(1H, m), 7.41~7.52(7H, m), 7.58~7.59(3H, m), 7.67(2H, m), 7.73(1H, m), 7.91~7.92(2H, m), 8(2H, m), 8.16(1H, m), 8.51~8.54(2H, m), 8.92(1H, m) | 473.56 | 473.18 |
| 55 | δ = 1.72(6H, s), 7.04(1H, m), 7.21(1H, m), 7.28(1H, m), 7.38(1H, m), 7.55~7.59(4H, m), 7.67(2H, m), 7.73(1H, m), 7.83~7.92(4H, m), 8(2H, m), 8.16(1H, m), 8.51~8.54(2H, m), 8.92(1H, m) | 513.63 | 513.21 |
| 62 | δ = 7.41~7.52(13H, m), 7.58~7.59(3H, m), 7.67(2H, m), 7.73(1H, m), 7.91~7.92(2H, m), 8(2H, m), 8.16(1H, m), 8.51~8.54(2H, m), 8.92(1H, m) | 549.66 | 549.21 |
| 77 | δ = 0.66(6H, s), 7.2(1H, m), 7.33(1H, m), 7.48~7.52(2H, m), 7.58~7.67(7H, m), 7.73(1H, m), 7.89~7.92(3H, m), 8(2H, m), 8.16(1H, m), 8.51~8.54(2H, m), 8.92(1H, m) | 529.70 | 529.19 |
| 93 | δ = 6.71(1H, m), 7.41(1H, m), 7.51(2H, m), 7.58~7.67(7H, m), 7.73~7.8(4H, m), 7.91~7.92(2H, m), 8(2H, m), 8.16(1H, m), 8.22(1H, m), 8.51~8.56(3H, m), 8.92(1H, m) | 523.62 | 523.19 |
| 114 | δ = 7.37(1H, m), 7.55(2H, m), 7.61~7.67(3H, m), 7.82~7.91(5H, m), 8.04~8.16(5H, m), 8.42(1H, m), 8.51~8.55(3H, m), 8.92~8.93(3H, m) | 497.58 | 497.18 |
| 124 | δ = 7.41(1H, m), 7.46~7.52(12H, m), 7.86~7.96(3H, m), 8.04~8.08(2H, m), 8.16(1H, m), 8.29(1H, m), 8.42(1H, m), 8.51~8.55(3H, m), 8.92(1H, m) | 523.62 | 523.19 |
| 130 | δ = 7.04(1H, m), 7.16~7.28(7H, m), 7.35~7.38(3H, m), 7.55(3H, m), 7.61~7.67(3H, m), 7.75(2H, m), 7.87~7.91(2H, m), 8.04~8.08(2H, m), 8.16(1H, m), 8.42(1H, m), 8.51~8.55(3H, m), 8.92(1H, m) | 635.75 | 635.22 |

TABLE 1-continued

| Compound No. | $^1$H NMR($CDCl_3$, 200 MHz) | MS/FAB found | MS/FAB calculated |
|---|---|---|---|
| 143 | δ = 7.1(1H, m), 7.24(1H, m), 7.47~7.67(10H, m), 7.73(1H, m), 7.91~7.92(2H, m), 8~8.08(4H, m), 8.16(1H, m), 8.42(1H, m), 8.51~8.55(3H, m), 8.92(1H, m) | 523.62 | 523.19 |
| 153 | δ = 7.14~7.17(3H, m). 7.41(2H, m), 7.67(2H, m), 7.82~7.93(6H, m), 8.12~8.16(3H, m), 8.51~8.54(2H, m), 8.92~8.93(3H, m) | 447.53 | 447.16 |
| 154 | δ = 7.16(1H, m), 7.4(1H, m), 7.48(1H, m), 7.57(1H, m), 7.67(2H, m), 7.82~7.96(9H, m), 8.12~8.16(3H, m), 8.51~8.54(2H, m), 8.92~8.93(3H, m) | 497.58 | 497.18 |
| 155 | δ = 6.65(1H, m), 7.4(1H, m), 7.58~7.72(5H, m), 7.82~7.93(6H, m), 8.09~8.16(4H, m), 8.22(1H, m), 8.51~8.54(2H, m), 8.92~8.93(3H, m) | 497.58 | 497.18 |
| 178 | δ = 7.26(1H, m), 7.37(1H, m), 7.5~7.52(2H, m), 7.67(2H, m), 7.82~7.98(7H, m), 8.12~8.17(4H, m), 8.45(1H, m), 8.51~8.54(2H, m), 8.92~8.93(3H, m) | 553.67 | 553.15 |
| 191 | δ = 7.2(2H, m), 7.55(2H, m), 7.61~7.67(3H, m), 7.75(2H, m), 7.82~7.93(6H, m), 8.04~8.16(5H, m), 8.42(1H, m), 8.51~8.55(3H, m), 8.92~8.93(3H, m) | 573.68 | 573.21 |
| 194 | δ = 7.1(1H, m), 7.24(1H, m), 7.47~7.51(2H, m), 7.58~7.59(3H, m), 7.67(2H, m), 7.73(1H, m), 7.82~7.93(7H, m), 8(2H, m), 8.12~8.16(3H, m), 8.51~8.54(2H, m), 8.92~8.93(3H, m) | 573.68 | 573.21 |
| 210 | δ = 2.34(6H, s), 6.97(2H, m), 7.07(1H, m), 7.67~7.71(6H, m), 7.82~7.91(3H, m), 8.04(1H, m), 8.12~8.18(3H, m), 8.51~8.54(2H, m), 8.92(1H, m) | 499.60 | 499.19 |
| 218 | δ = 1.72(12H, s), 7.04(1H, m), 7.21(1H, m), 7.28(2H, m), 7.38(2H, m), 7.55(2H, m), 7.63~7.67(3H, m), 7.77(1H, m), 7.83~7.93(5H, m), 8.16(1H, m), 8.51~8.54(2H, m), 8.92(1H, m) | 579.73 | 579.26 |
| 225 | δ = 1.72(6H, s), 7.28(1H, m), 7.38~7.55(15H, m), 7.63~7.67(3H, m), 7.77(1H, m), 7.87~7.93(3H, m), 8.16(1H, m), 8.51~8.54(2H, m), 8.92(1H, m) | 615.76 | 615.26 |
| 229 | δ = 7.16(1H, m), 7.4~7.41(3H, m), 7.48~7.57(10H, m), 7.66~7.67(5H, m), 7.86~7.96(4H, m), 8.16(1H, m), 8.51~8.54(2H, m), 8.92(1H, m) | 549.66 | 549.21 |
| 232 | δ = 7.14~7.17(3H, m), 7.35(1H, m), 7.41(2H, m), 7.6(1H, m), 7.67(2H, m), 7.78(1H, m), 7.91(1H, m), 7.98(1H, m), 8.06~8.1(2H, m), 8.16(1H, m), 8.51~8.54(2H, m), 8.92(1H, m) | 398.46 | 398.14 |
| 239 | δ = 2.34(6H, s), 7.14~7.17(3H, m), 7.31(1H, m), 7.41(2H, m), 7.6(2H, m), 7.67(2H, m), 7.91(1H, m), 8.16(1H, m), 8.51~8.54(2H, m), 8.92(1H, m) | 375.46 | 375.16 |
| 241 | δ = 7.14~7.17(3H, m), 7.41~7.51(7H, m), 7.67(2H, m), 7.79~7.85(4H, m), 7.91(1H, m), 8.16(1H, m), 8.51~8.54(2H, m), 8.92(1H, m) | 423.50 | 423.16 |
| 243 | δ = 7.14~7.17(3H, m), 7.41(3H, m), 7.51(2H, m), 7.59(2H, m), 7.67(2H, m), 7.79(2H, m), 7.91(1H, m), 8(2H, m), 8.16(1H, m), 8.4(2H, m), 8.51~8.54(2H, m), 8.92(1H, m) | 473.56 | 473.18 |
| 251 | δ = 7.14~7.17(3H, m), 7.25(4H, m), 7.41(2H, m), 7.58~7.59(3H, m), 7.67(2H, m), 7.73(1H, m), 7.91~7.92(2H, m), 8(2H, m), 8.16(1H, m), 8.51~8.54(2H, m), 8.92(1H, m) | 473.56 | 473.18 |
| 255 | δ = 1.72(6H, s), 7.14~7.17(3H, m), 7.25~7.28(5H, m), 7.38~7.41(3H, m), 7.55(1H, m), 7.63~7.67(3H, m), 7.77(1H, m), 7.87~7.93(3H, m), 8.16(1H, m), 8.51~8.54(2H, m), 8.92(1H, m) | 539.66 | 539.22 |
| 256 | δ = 6.59~6.63(6H, m), 6.76~6.81(4H, m), 7.2(4H, m), 7.58~7.59(3H, m), 7.67(2H, m), 7.73(1H, m), 7.91~7.92(2H, m), 8(2H, m), 8.16(1H, m), 8.51~8.54(2H, m), 8.92(1H, m) | 564.67 | 564.22 |
| 258 | δ = 7.14~7.17(3H, m), 7.41(3H, m), 7.51~7.52(4H, m), 7.58~7.59(3H, m), 7.73(2H, m), 7.91~7.92(2H, m), 8(2H, m), 8.06(1H, m), 8.34(1H, m), 8.51(1H, m), 8.92(1H, m) | 473.56 | 473.18 |
| 259 | δ = 7.14~7.17(3H, m), 7.41(3H, m), 7.51(2H, m), 7.58~7.61(4H, m), 7.73~7.79(4H, m), 7.91~7.92(2H, m), 8(2H, m), 8.42(1H, m), 8.51(1H, m), 8.92(1H, m) | 473.56 | 473.18 |
| 260 | δ = 2.45(6H, s), 7.14~7.17(3H, m), 7.4(2H, s), 7.41(2H, m), 7.58~7.59(3H, m), 7.73(1H, m), 7.91~7.92(2H, m), 8(2H, m), 8.51(1H, m), 8.92(1H, m) | 425.52 | 425.18 |
| 261 | δ = 2.89(3H, m), 7(1H, m), 7.14~7.17(3H, m), 7.41~7.42(3H, m), 7.58~7.59(3H, m), 7.65(1H, m), 7.73(1H, m), 7.91~7.92(2H, m), 8(2H, m), 8.51(1H, m), 8.92(1H, m) | 411.49 | 411.16 |

TABLE 1-continued

| Compound No. | $^1$H NMR($CDCl_3$, 200 MHz) | MS/FAB found | MS/FAB calculated |
|---|---|---|---|
| 262 | δ = 1.41(9H, s), 7.14~7.18(4H, m), 7.41~7.46(3H, m), 7.58~7.59(3H, m), 7.73(1H, m), 7.91~8(5H, m), 8.51(1H, m), 8.92(1H, m) | 453.57 | 453.21 |
| 263 | δ = 7.14~7.17(3H, m), 7.41~7.47(3H, m), 7.54~7.59(5H, m), 7.67(2H, m), 7.73(1H, m), 7.92(1H, m), 8(2H, m), 8.07(1H, s), 8.16(1H, m), 8.3(2H, m), 8.54(1H, m), 8.89(1H, s) | 473.56 | 473.18 |
| 264 | δ = 7.14~7.17(3H, m), 7.41~7.59(13H, m), 7.73(2H, m), 7.92(1H, m), 8(2H, m), 8.06(1H, m), 8.07(1H, s), 8.3~8.34(3H, m), 8.89(1H, s) | 549.66 | 549.21 |
| 285 | δ = 7.21~7.25(2H, m), 7.41~7.52(12H, m), 7.59(1H, m), 7.67(2H, m), 8.16(1H, m), 8.45(1H, m), 8.54(1H, m), 8.91(1H, m) | 439.57 | 439.14 |
| 300 | δ = 7.21~7.25(2H, m), 7.41(1H, m), 7.47~7.52(12H, m), 8.04~8.08(2H, m), 8.16(1H, m), 8.42~8.45(2H, m), 8.54~8.55(2H, m), 8.91(1H, m) | 489.63 | 489.16 |
| 305 | δ = 7.41~7.52(8H, m), 7.58~7.59(5H, m), 7.67(2H, m), 7.73(1H, m), 7.92(1H, m), 8(2H, m), 8.16(1H, m), 8.45(1H, m), 8.54(1H, m), 8.91(1H, m) | 489.63 | 489.16 |
| 307 | δ = 7.32(1H, m), 7.41(2H, m), 7.5~7.55(9H, m), 7.67(2H, m), 7.75~7.79(3H, m), 8.08(1H, m), 8.16(1H, m), 8.45(1H, m), 8.54~8.55(2H, m), 8.91(1H, m) | 489.63 | 489.16 |
| 319 | δ = 1.72(6H, s), 7.28~7.38(3H, m), 7.49~7.59(6H, m), 7.67(3H, m), 7.73(1H, m), 7.87~7.92(2H, m), 8(2H, m), 8.16(1H, m), 8.45(1H, m), 8.54(1H, m), 8.91(1H, m) | 529.69 | 529.19 |
| 320 | δ = 7.41~7.52(8H, m), 7.58~7.59(5H, m), 7.67(2H, m), 7.73(1H, m), 7.92(1H, m), 8(2H, m), 8.16(1H, m), 8.45(1H, m), 8.54(1H, m), 8.91(1H, m) | 489.63 | 489.16 |
| 339 | δ = 7.41(1H, m), 7.5~7.59(10H, m), 7.67(2H, m), 7.73~7.75(2H, m), 7.88~7.92(2H, m), 8(2H, m), 8.08(2H, m), 8.16(1H, m), 8.45(1H, m), 8.54(1H, m), 8.91(1H, m) | 539.69 | 539.17 |
| 345 | δ = 1.48(6H, m), 2.02(4H, m), 7.08(1H, m), 7.28~7.38(4H, m), 7.5~7.59(5H, m), 7.67(2H, m), 7.73(1H, m), 7.87~7.92(2H, m), 8(2H, m), 8.16(1H, m), 8.45(1H, m), 8.54(1H, m), 8.91(1H, m) | 569.76 | 569.22 |
| 350 | δ = 7.21~7.25(2H, m), 7.47~7.67(11H, m), 7.73(1H, m), 7.92(1H, m), 8~8.08(4H, m), 8.16(1H, m), 8.42~8.45(2H, m), 8.54~8.55(2H, m), 8.91(1H, m) | 539.69 | 539.17 |
| 370 | δ = 7.41(1H, m), 7.47~7.52(14H, m), 8.04~8.08(2H, m), 8.16(1H, m), 8.42~8.45(2H, m), 8.54~8.55(2H, m), 8.91(1H, m) | 489.63 | 489.16 |
| 377 | δ = 7.38~7.55(16H, m), 7.61~7.67(3H, m), 8.04~8.08(2H, m), 8.16(1H, m), 8.42~8.45(2H, m), 8.54~8.55(2H, m), 8.91(1H, m) | 565.72 | 565.19 |
| 406 | δ = 7.47~7.67(13H, m), 7.73(1H, m), 7.92(1H, m), 8~8.08(4H, m), 8.16(1H, m), 8.42~8.45(2H, m), 8.54~8.55(2H, m), 8.91(1H, m) | 539.69 | 539.17 |
| 509 | δ = 7.26(1H, m), 7.35(1H, m), 7.5~7.55(3H, m), 7.67(2H, m), 7.82~7.93(6H, m), 8.08~8.16(5H, m), 8.45(1H, m), 8.54(1H, m), 8.91~8.93(3H, m) | 513.65 | 513.16 |
| 527 | δ = 7.26~7.31(2H, m), 7.37~7.42(3H, m), 7.5~7.52(5H, m), 7.67(2H, m), 7.82~7.93(5H, m), 8.12~8.16(3H, m), 8.45(1H, m), 8.54(1H, m), 8.91~8.93(3H, m) | 539.69 | 539.17 |
| 554 | δ = 7.41~7.51(9H, m), 7.65~7.67(3H, m), 7.79~7.93(9H, m), 8.12~8.16(3H, m), 8.45(1H, m), 8.54(1H, m), 8.91~8.93(3H, m) | 615.78 | 615.20 |
| 567 | δ = 7.38~7.52(14H, m), 7.67~7.71(6H, m), 7.82~7.88(2H, m), 8.04(1H, m), 8.12~8.18(3H, m), 8.45(1H, m), 8.54(1H, m), 8.91(1H, m) | 639.80 | 639.20 |
| 571 | δ = 1.72(6H, s), 7.26~7.28(2H, m), 7.35~7.38(2H, m), 7.5~7.55(4H, m), 7.63~7.67(3H, m), 7.77~7.93(4H, m), 8.08(2H, m), 8.16(1H, m), 8.45(1H, m), 8.54(1H, m), 8.91(1H, m) | 529.69 | 529.19 |
| 573 | δ = 1.72(6H, s), 7.28(1H, m), 7.38(1H, m), 7.41(1H, m), 7.47~7.52(13H, m), 7.77(1H, m), 7.87~7.93(2H, m), 8.16(1H, m), 8.45(1H, m), 8.54(1H, m), 8.91(1H, m) | 555.73 | 555.20 |
| 583 | δ = 7.26(1H, m), 7.41(2H, m), 7.5~7.52(9H, m), 7.59~7.67(8H, m), 7.8(1H, m), 8(2H, m), 8.16(1H, m), 8.45(1H, m), 8.54(1H, m), 8.91(1H, m) | 565.72 | 565.19 |
| 601 | δ = 1.72(6H, s), 7.04(1H, m), 7.21(1H, m), 7.28(1H, m), 7.38~7.41(2H, m), 7.51~7.55(5H, m), 7.64~7.67(3H, m), 7.83~7.87(2H, m), 8.16(1H, m), 8.54(1H, m), 8.79(1H, m), 8.86(1H, m) | 463.57 | 463.19 |

TABLE 1-continued

| Compound No. | $^1$H NMR($CDCl_3$, 200 MHz) | MS/FAB found | MS/FAB calculated |
|---|---|---|---|
| 604 | δ = 2.34(6H, s), 6.97(2H, m), 7.07(1H, m), 7.41(1H, m), 7.51~7.52(4H, m), 7.64~7.67(3H, m), 8.16(1H, m), 8.54(1H, m), 8.79(1H, m), 8.86(1H, m) | 375.46 | 375.16 |
| 613 | δ = 7.14~7.17(3H, m), 7.41(3H, m), 7.51~7.52(4H, m), 7.6(1H, m), 7.67(2H, m), 7.78(1H, m), 7.98(1H, m), 8.06(1H, m), 8.16(1H, m), 8.35(1H, s), 8.54(1H, m) | 397.47 | 397.15 |
| 615 | δ = 6.65(1H, m), 7.4~7.41(2H, m), 7.51~7.52(4H, m), 7.58~7.72(6H, m), 7.78(1H, m), 7.98(1H, m), 8.06~8.09(2H, m), 8.16(1H, m), 8.22(1H, m), 8.35(1H, s), 8.54(1H, m) | 447.53 | 447.16 |
| 618 | δ = 7.2(2H, m), 7.41(2H, m), 7.51~7.52(8H, m), 7.6(1H, m), 7.67(2H, m), 7.75~7.78(3H, m), 7.98(1H, m), 8.06(1H, m), 8.16(1H, m), 8.35(1H, s), 8.54(1H, m) | 473.56 | 473.18 |
| 623 | δ = 7.41~7.52(18H, m), 7.6(1H, m), 7.67(2H, m), 7.78(1H, m), 7.98(1H, m), 8.06(1H, m), 8.16(1H, m), 8.35(1H, s), 8.54(1H, m) | 549.66 | 549.21 |
| 631 | δ = 1.72(6H, s), 7.28~7.41(4H, m), 7.49~7.58(7H, m), 7.67(3H, m), 7.87(1H, m), 8.16(1H, m), 8.38(1H, m), 8.54(1H, m), 8.83(1H, m) | 479.63 | 479.17 |
| 638 | δ = 7.38~7.44(6H, m), 7.51~7.52(12H, m), 7.58(1H, m), 7.67(2H, m), 8.16(1H, m), 8.38(1H, m), 8.54(1H, m), 8.83(1H, m) | 515.67 | 515.17 |
| 639 | δ = 1.48(6H, m), 1.73(4H, m), 2.72(1H, m), 7.1(2H, m), 7.41(1H, m), 7.51~7.52(6H, m), 7.58(1H, m), 7.67(2H, m), 8.16(1H, m), 8.38(1H, m), 8.54(1H, m), 8.83(1H, m) | 445.62 | 445.19 |
| 640 | δ = 7.41(1H, m), 7.51~7.52(4H, m), 7.58(1H, m), 7.65~7.67(3H, m), 7.82~7.88(4H, m), 8.12~8.16(3H, m), 8.38(1H, m), 8.54(1H, m), 8.83(1H, m), 8.93(2H, m) | 463.59 | 463.14 |
| 641 | δ = 7.14(1H, m), 7.29(1H, m), 7.41(1H, m), 7.51~7.52(4H, m), 7.58~7.59(2H, m), 7.67(2H, m), 8.16~8.21(2H, m), 8.38(1H, m), 8.54(1H, m), 8.83(1H, m) | 364.46 | 364.10 |
| 644 | δ = 7.26(1H, m), 7.41(1H, m), 7.51~7.52(4H, m), 7.59~7.67(6H, m), 7.78~7.8(2H, m), 7.98~8(3H, m), 8.06(1H, m), 8.16(1H, m), 8.35(1H, s), 8.54(1H, m) | 463.59 | 463.14 |
| 647 | δ = 7.41~7.52(12H, m), 7.59~7.6(3H, m), 7.67(2H, m), 7.78(1H, m), 7.98(1H, m), 8.06(1H, m), 8.16(1H, m), 8.35(1H, s), 8.54(1H, m) | 489.63 | 489.16 |
| 653 | δ = 7.38~7.44(6H, m), 7.51~7.52(12H, m), 7.6(1H, m), 7.67(2H, m), 7.78(1H, m), 7.98(1H, m), 8.06(1H, m), 8.16(1H, m), 8.35(1H, s), 8.54(1H, m) | 565.72 | 565.19 |
| 656 | δ = 7.14(1H, m), 7.29(1H, m), 7.41(1H, m), 7.51~7.52(4H, m), 7.59~7.6(2H, m), 7.67(2H, m), 7.78(1H, m), 7.98(1H, m), 8.06(1H, m), 8.16~8.21(2H, m), 8.35(1H, s), 8.54(1H, m) | 414.52 | 414.12 |
| 657 | δ = 7.37~7.41(2H, m), 7.51~7.52(4H, m), 7.58~7.6(2H, m), 7.67(2H, m), 7.78(1H, m), 7.86(1H, m), 7.98~7.99(2H, m), 8.06(1H, m), 8.16(1H, m), 8.35(1H, s), 8.38(1H, m), 8.54(1H, m), 8.83(1H, m) | 464.58 | 464.13 |

Example 1

Manufacture of an OLED Employing Organic Electroluminescent Compound According to the Invention An OLED device was manufactured by using an electroluminescent material according to the invention.

First, a transparent electrode ITO thin film (15Ω/□) (2) prepared from glass for OLED (produced by Samsung Corning) (1) was subjected to ultrasonic washing with trichloroethylene, acetone, ethanol and distilled water, sequentially, and stored in isopropanol before use.

Then, an ITO substrate was equipped in a substrate folder of a vacuum vapor-deposit device, and 4,4',4"-tris(N,N-(2-naphthyl)-phenylamino)triphenylamine (2-TNATA) was placed in a cell of the vacuum vapor-deposit device, which was then ventilated up to $10^{-6}$ torr of vacuum in the chamber. Electric current was applied to the cell to evaporate 2-TNATA, thereby providing vapor-deposit of a hole injecting layer (3) having 60 nm of thickness on the ITO substrate.

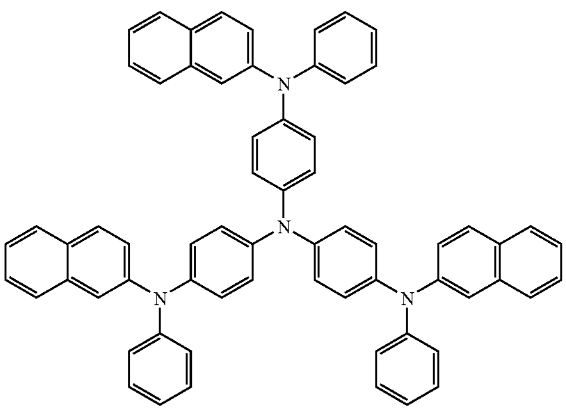

2-TNATA

Then, to another cell of the vacuum vapor-deposit device, charged was N,N'-bis(α-naphthyl)-N,N'-diphenyl-4,4'-diamine (NPB) (of which the structure is shown below), and electric current was applied to the cell to evaporate NPB, thereby providing vapor-deposit of a hole transport layer (4) of 20 nm of thickness on the hole injecting layer.

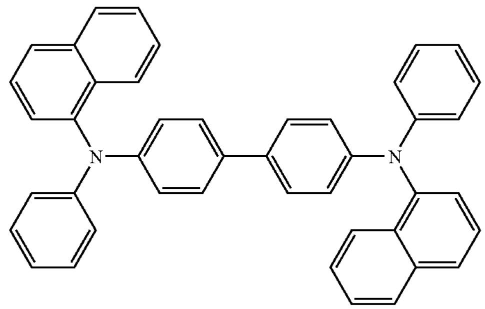

NPB

After forming the hole injecting layer and the hole transport layer, an electroluminescent layer was vapor-deposited according to the following procedure. To one cell of a vacuum vapor-deposit device, charged was a compound according to the present invention (e.g. Compound 5) as an electroluminescent host material, while DSA-Ph (of which the structure is shown below) was charged to another cell. The two cells were simultaneously heated to carry out vapor-deposition of DSA-Ph at 2 to 5% by weight of vapor-deposition rate, to vapor-deposit an electroluminescent layer (5) having 30 nm of thickness on the hole transport layer.

5

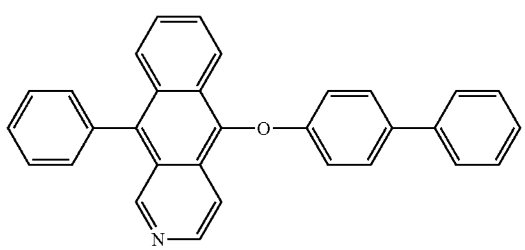

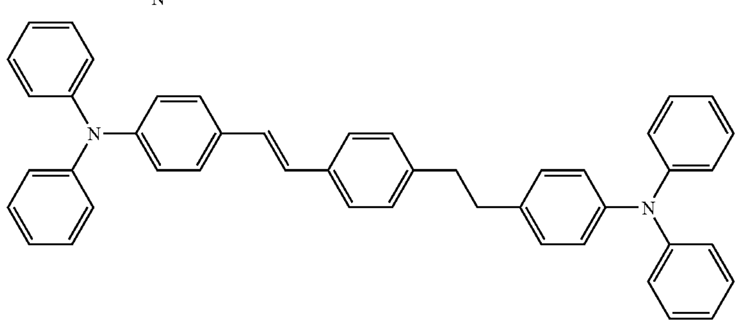

DSA-Ph

Then, tris(8-hydroxyquinoline)aluminum (III) (Alq) was vapor-deposited as an electron transport layer (6) in a thickness of 20 nm, and then lithium quinolate (Liq) was vapor-deposited as an electron injecting layer (7) in a thickness of 1 to 2 nm. Thereafter, an Al cathode (8) was vapor-deposited in a thickness of 150 nm by using another vacuum vapor-deposit device to manufacture an OLED.

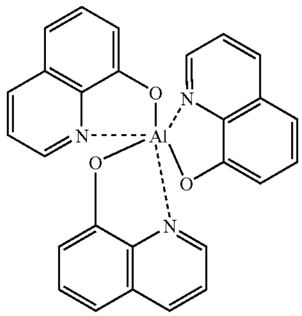

Alq

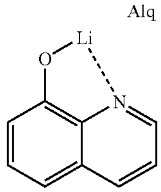

Liq

Each compound was employed as electroluminescent material for an OLED after purifying via vacuum sublimation at $10^{-6}$ torr.

Comparative Example 1

Manufacture of an OLED by Using Conventional Electroluminescent Material

After forming a hole injecting layer (3) and hole transport layer (4) according to the same procedure as described in Example 1, dinaphthylanthracene (DNA) was charged to another cell of said vacuum vapor-deposit device as electroluminescent host material, and DSA-Ph (as in Example 1) was charged to still another cell. At a vapor-deposition rate of 100:3, an electroluminescent layer (5) having 30 nm of thickness was vapor-deposited on the hole transport layer.

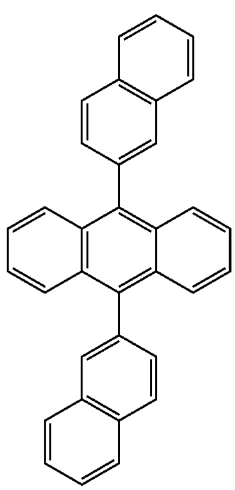

DNA

Then, an electron transport layer (6) and electron injecting layer (7) were vapor-deposited according to the same procedure as in Example 1, and an Al cathode (8) was vapor-deposited thereon with a thickness of 150 nm by using another vacuum vapor-deposit device to manufacture an OLED.

Example 2

Manufacture of an OLED by Using a Compound According to the Present Invention

After forming a hole injecting layer and a hole transport layer according to the same procedure as described in Example 1, a compound according to the present invention (e.g. Compound 5) was charged to one cell of said vacuum vapor-deposit device as electroluminescent material, and Compound (E) (of which the structure is shown below) was charged to another cell. Then the two materials were evaporated at different rates to carry out doping at a concentration of 2 to 5% by weight on the basis of the host, thereby providing an electroluminescent layer having 30 nm of thickness vapor-deposited on the hole transport layer.

Compound E

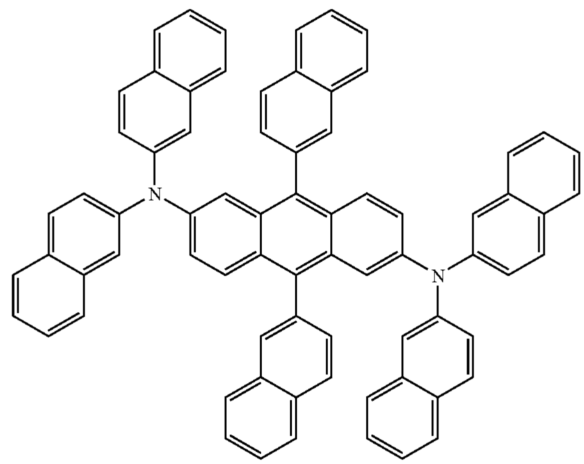

Then, an electron transport layer and electron injecting layer were vapor-deposited according to the same procedure as in Example 1, and an Al cathode was vapor-deposited thereon with a thickness of 150 nm by using another vacuum vapor-deposit device to manufacture an OLED.

Comparative Example 2

Manufacture of an OLED by Using Conventional Electroluminescent Material

After forming a hole injecting layer and a hole transport layer according to the same procedure as described in Example 1, tris(8-hydroxyquinoline)-aluminum (III) (Alq) was charged to another cell of said vacuum vapor-deposit device as electroluminescent host material, and Coumarin 545T (C545T) (of which the structure is shown below) was charged to still another cell. Then the two materials were evaporated at different rates to carry out doping, and thus providing an electroluminescent layer having 30 nm of thickness vapor-deposited on the hole transport layer. The doping concentration was preferably from 1 to 3% by weight on the basis of Alq.

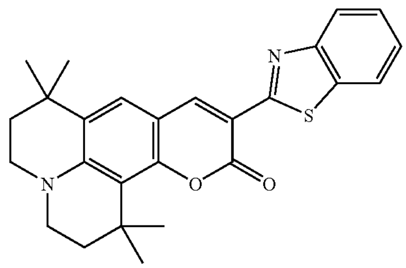

C545T

Then, an electron transport layer and electron injecting layer were vapor-deposited according to the same procedure as Example 1, and an Al cathode was vapor-deposited thereon with a thickness of 150 nm by using another vacuum vapor-deposit device to manufacture an OLED.

Example 3

Electroluminescent Properties of OLED's Manufactured

The luminous efficiencies of the OLED's comprising the organic electroluminescent compounds according to the present invention (Examples 1 and 2) or conventional EL compound (Comparative Example 1 and 2) were measured at 5,000 cd/$m^2$, respectively, and the results are shown in Table 2.

TABLE 2

| No. | Host | Dopant | Doping concentration (wt %) | Luminous efficiency (cd/A) @5000 cd/$m^2$ | Color |
|---|---|---|---|---|---|
| 1 | 20 | DSA-Ph | 3 | 8.5 | Blue |
| 2 | 62 | DSA-Ph | 3 | 8.2 | Blue |
| 3 | 122 | DSA-Ph | 3 | 7.6 | Blue |
| 4 | 156 | DSA-Ph | 3 | 7.4 | Blue |
| 5 | 178 | DSA-Ph | 3 | 7.6 | Blue |
| 6 | 251 | DSA-Ph | 3 | 7.8 | Blue |
| 7 | 610 | DSA-Ph | 3 | 8.2 | Blue |
| 8 | 618 | DSA-Ph | 3 | 8.1 | Blue |
| 9 | 638 | DSA-Ph | 3 | 8.0 | Blue |
| 10 | 25 | Compound E | 3 | 18.3 | Green |
| 11 | 117 | Compound E | 3 | 19.2 | Green |
| 12 | 218 | Compound E | 3 | 20.2 | Green |
| 13 | 257 | Compound E | 3 | 21.6 | Green |
| 14 | 262 | Compound E | 3 | 18.1 | Green |
| 15 | 264 | Compound E | 3 | 19.6 | Green |
| 16 | 406 | Compound E | 3 | 18.7 | Green |
| Comp. 1 | DNA | DSA-Ph | 3 | 7.3 | Jade green |
| Comp. 2 | Alq | Compound C545T | 1 | 10.3 | Green |

As can be seen from Table 2, when the material according to the invention was applied to a blue electroluminescent device, commonly with DSA-Ph doping to the organic electroluminescent compound of the invention, the device showed comparable luminous efficiency but far higher color purity as compared to the device employing DNA as conventional electroluminescent material according to Comparative Example 1.

Furthermore, it is found from Table 2 that, when the material according to the invention (Compound 257 as organic electroluminescent compound) was applied to a green electroluminescent device, with doping of Compound (E) at a concentration of 3.0 wt %, the device showed more than twice of luminous efficiency as compared to the conventional electroluminescent device employing Alq:C545T (Comparative Example 2).

Accordingly, the organic electroluminescent compounds according to the present invention can be used as blue or green electroluminescent material of high efficiency. Moreover, the device, to which the host material according to the invention was applied, showed noticeable improvement in view of color purity. The improvement in both color purity and luminous efficiency proves that the materials of the present invention have excellent properties.

The invention claimed is:

1. An organic electroluminescent compound represented by Chemical Formula (1):

Chemical Formula 1

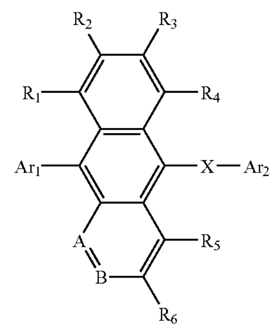

In Chemical Formula (1), A and B independently represent $CR_7$ or N, provided that both A and B cannot be $CR_7$ or N at the same time;

X is O or S;

$R_1$ through $R_7$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_3$ and $R_4$ or $R_5$ and $R_6$ may be linked via (C3-C60)alkylene or (C3-C60)alkenylene to form a fused ring; the alkylene or alkenylene may be further substituted by one or more substituent(s) selected from deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro and hydroxyl;

$Ar_1$ and $Ar_2$ independently represent (C6-C60)aryl, (C3-C60)heteroaryl, 5- or 6-membered heterocycloalkyl containing one or more heteroatom(s) selected from N, O and S, (C3-C60)cycloalkyl, adamantyl, (C7-C60)bicycloalkyl, or a substituent selected from the following structures:

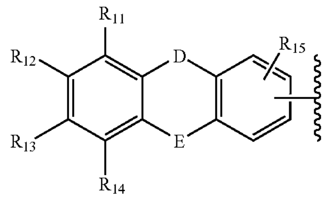

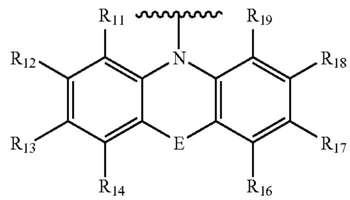

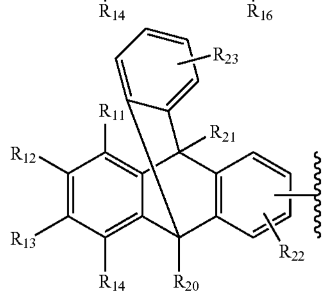

wherein, $R_{11}$ through $R_{23}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, or a monocyclic or polycyclic aromatic ring;

D and E independently represent a chemical bond, —$(CR_{31}R_{32})_a$—, —$N(R_{33})$—, —S—, —O—, —$Si(R_{34})(R_{35})$—, —$P(R_{36})$—, —C(=O)—, —$B(R_{37})$—, —$In(R_{38})$—, —Se—, —$Ge(R_{39})(R_{40})$—, —$Sn(R_{41})(R_{42})$—, —$Ga(R_{43})$— or —$(R_{44})C{=}C(R_{45})$—;

$R_{31}$ through $R_{45}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_{31}$ and $R_{32}$, $R_{34}$ and $R_{35}$, $R_{39}$ and $R_{40}$, $R_{41}$ and $R_{42}$ or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_1$ through $R_7$, $Ar_1$, $Ar_2$, $R_{11}$ through $R_{23}$ and $R_{31}$ through $R_{45}$ may be further substituted by deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; and a is an integer from 1 to 4.

2. The organic electroluminescent compound according to claim 1, which is selected from the compounds represented by one of Chemical Formulas (2) to (4):

Chemical Formula 2

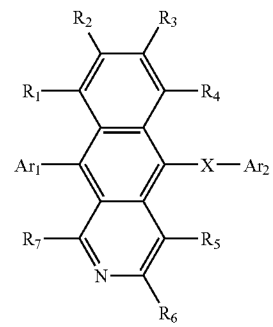

Chemical Formula 3

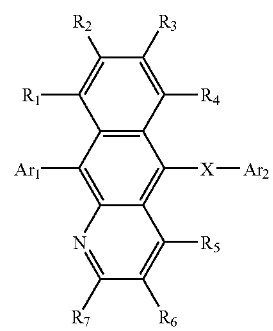

Chemical Formula 4

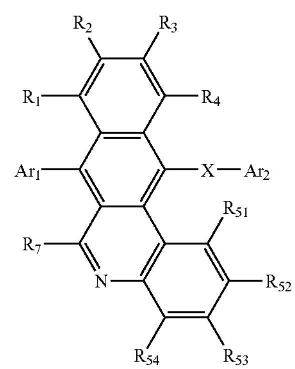

wherein, $Ar_1$, $Ar_2$, X and $R_1$ through $R_7$ are defined as in Chemical Formula (1) of claim 1; and $R_{51}$ through $R_{54}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_{52}$ and $R_{53}$ may be linked via (C3-C60)alkylene or (C3-C60)alkenylene with or without a fused ring to form an alicyclic ring, or a monocyclic or polycyclic aromatic ring.

3. The organic electroluminescent compound according to claim 2, wherein $Ar_1$ and $Ar_2$ are independently selected from the following structures:

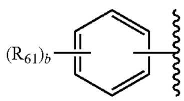
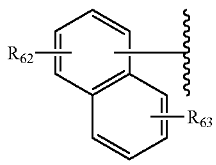
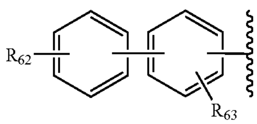
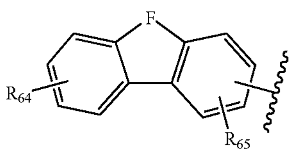
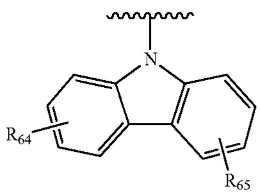
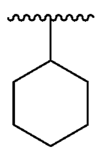
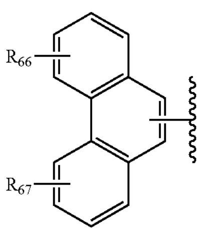
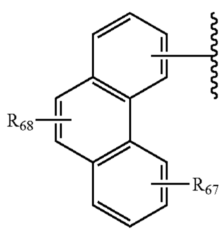
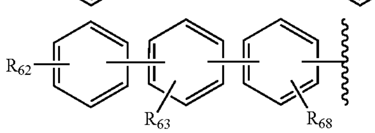
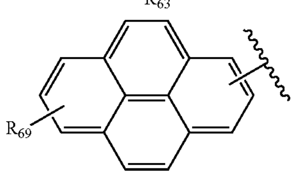
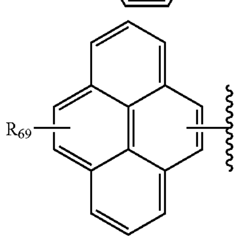
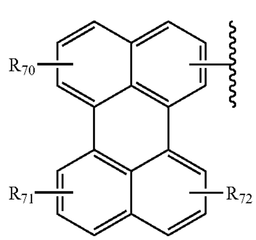

-continued

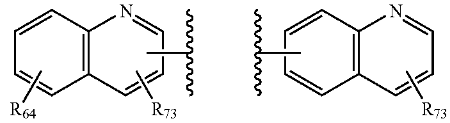
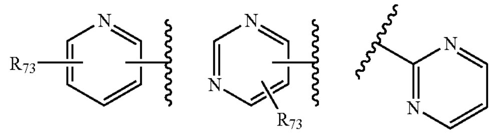
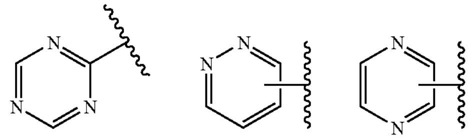
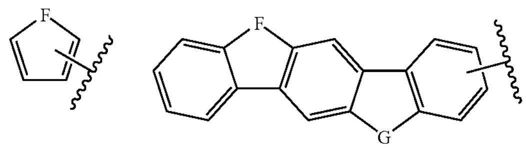
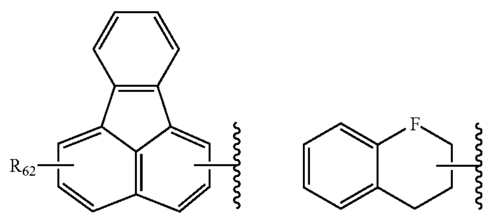
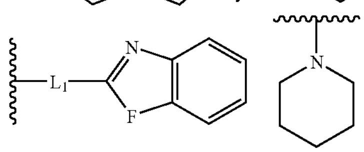
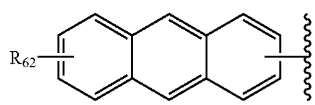
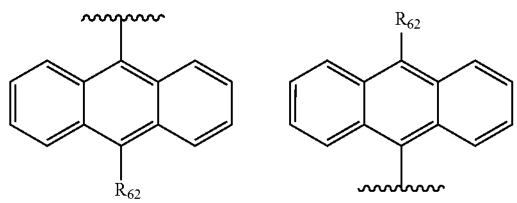
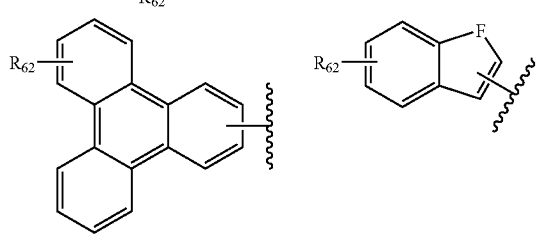
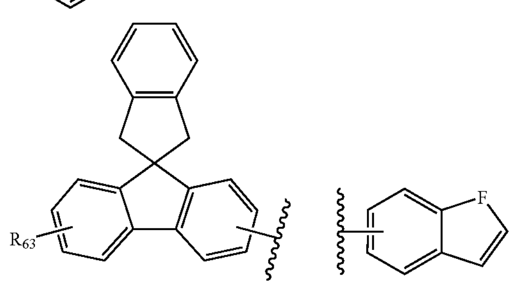

-continued

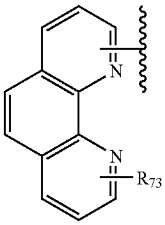
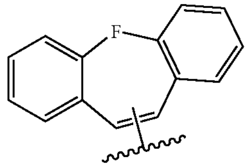
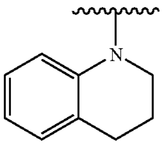
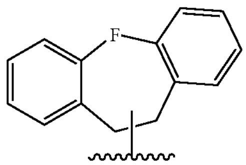
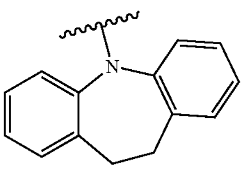
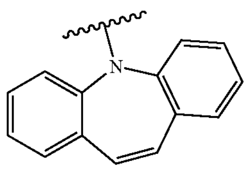
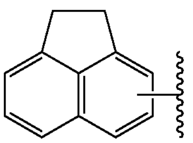
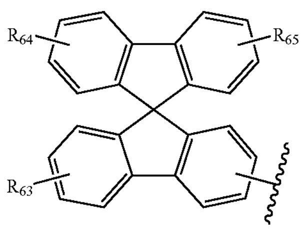
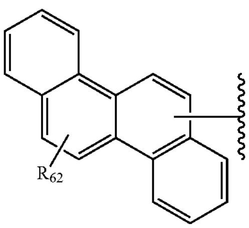
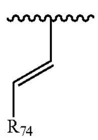
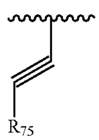
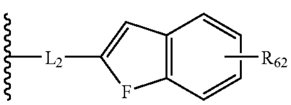
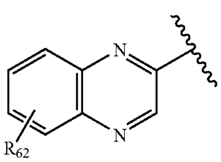
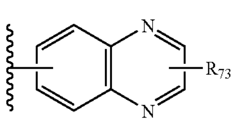
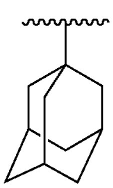
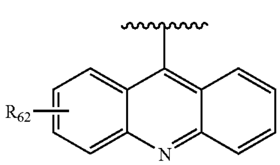
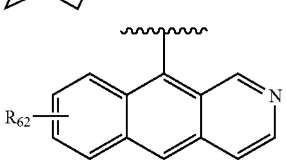

-continued

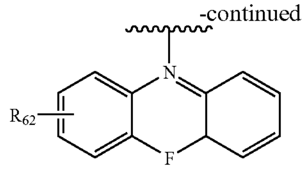
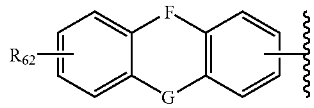
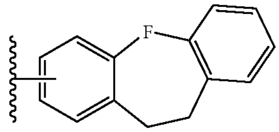
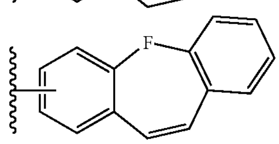

wherein, $R_{61}$ through $R_{75}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_{61}$ through $R_{75}$ may be further substituted by deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl;

$L_1$ and $L_2$ independently represent a chemical bond, (C6-C60)arylene or (C3-C60)heteroarylene; the arylene or heteroarylene of $L_1$ and $L_2$ may be further substituted by one or more substituent(s) selected from deuterium, (C1-C60)alkyl, halogen, cyano, (C1-C60)alkoxy, (C3-C60)cycloalkyl, (C6-C60)aryl, (C3-C60)heteroaryl, adamantyl, (C7-C60)bicycloalkyl, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro, hydroxyl, tri(C1-C30)alkylsilyl, di(C1-C30)alkyl(C6-C30)arylsilyl and tri(C6-C30)arylsilyl;

F and G independently represent a chemical bond, —$(CR_{81})(R_{82})$—, —$N(R_{83})$—, —S—, —O—, —Si$(R_{84})(R_{85})$—, —$P(R_{86})$—, —C(═O)—, —$B(R_{87})$—, —$In(R_{88})$—, —Se—, —$Ge(R_{89})(R_{90})$—, —$Sn(R_{91})(R_{92})$— or —$Ga(R_{93})$—;

$R_{81}$ through $R_{93}$ independently represent hydrogen, deuterium, halogen, (C1-C60)alkyl, (C6-C60)aryl, (C3-C60) heteroaryl, 5- or 6-membered heterocycloalkyl containing one or more heteroatom(s) selected from N, O and S, (C3-C60)cycloalkyl, tri(C1-C60)alkylsilyl, di(C1-C60) alkyl(C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; or $R_{81}$ and $R_{82}$, $R_{84}$ and $R_{85}$, $R_{89}$ and $R_{90}$, or $R_{91}$ and $R_{92}$ may be linked via (C3-C60)alkylene or (C3-C60)alkenylene with or without a fused ring to form an alicyclic ring, or a monocyclic or polycyclic aromatic ring; and b is an integer from 1 to 5.

4. The organic electroluminescent device which is comprised of a first electrode; a second electrode; and at least one organic layer(s) interposed between the first electrode and the second electrode; wherein the organic layer comprises an organic electroluminescent compound represented by Chemical Formula (1):

Chemical Formula 1

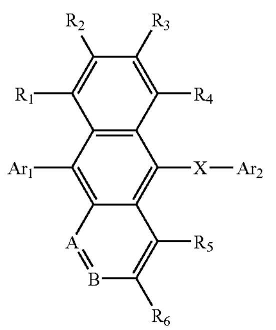

In Chemical Formula (1), A and B independently represent $CR_7$ or N, provided that both A and B cannot be $CR_7$ or N at the same time;

X is O or S;

$R_1$ through $R_7$ independently represent hydrogen, deuterium, halogen, (C1-C60)alkyl, (C6-C60)aryl, (C3-C60) heteroaryl, 5- or 6-membered heterocycloalkyl containing one or more heteroatom(s) selected from N, O and S, (C3-C60)cycloalkyl, tri(C1-C60)alkylsilyl, di(C1-C60) alkyl(C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_3$ and $R_4$ or $R_5$ and $R_6$ may be linked via (C3-C60)alkylene or (C3-C60) alkenylene to form a fused ring; the alkylene or alkenylene may be further substituted by one or more substituent(s) selected from deuterium, halogen, (C1-C60) alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C6-C60)arylthio, (C1-C60)alkoxycarbonyl, carboxyl, nitro and hydroxyl;

$Ar_1$ and $Ar_2$ independently represent (C6-C60)aryl, (C3-C60)heteroaryl, 5- or 6-membered heterocycloalkyl containing one or more heteroatom(s) selected from N, O and S, (C3-C60)cycloalkyl, adamantyl, (C7-C60)bicycloalkyl, or a substituent selected from the following structures:

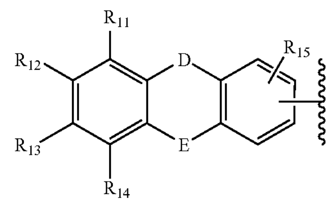

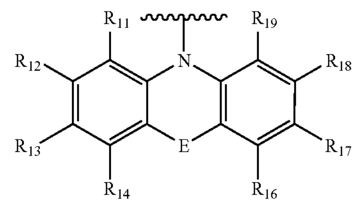

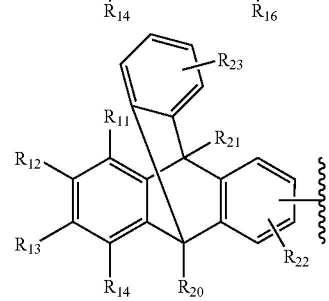

wherein, $R_{11}$ through $R_{23}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60) alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkoxycarbonyl, carboxyl, nitro or hydroxyl; or each of $R_{11}$ through $R_{23}$ may be linked to an adjacent substituent via (C3-C60)alkylene or (C3-C60) alkenylene with or without a fused ring to form an alicyclic ring, or a monocyclic or polycyclic aromatic ring;

D and E independently represent a chemical bond, —$(CR_{31}R_{32})_a$—, —$N(R_{33})$—, —S—, —O—, —$Si(R_{34})(R_{35})$—, —$P(R_{36})$—, —C(=O)—, —$B(R_{37})$—, —$In(R_{38})$—, —Se—, —$Ge(R_{39})(R_{40})$—, —$Sn(R_{41})(R_{42})$—, —$Ga(R_{43})$— or —$(R_{44})C{=}C(R_{45})$—;

$R_{31}$ through $R_{45}$ independently represent hydrogen, deuterium, halogen, (C1-C60)alkyl, (C6-C60)aryl, (C3-C60) heteroaryl, 5- or 6-membered heterocycloalkyl containing one or more heteroatom(s) selected from N, O and S, (C3-C60)cycloalkyl, tri(C1-C60)alkylsilyl, di(C1-C60) alkyl(C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_{31}$ and $R_{32}$, $R_{34}$ and $R_{35}$, $R_{39}$ and $R_{40}$, $R_{41}$ and $R_{42}$ or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_1$ through $R_7$, $Ar_1$, $Ar_2$, $R_{11}$ through $R_{23}$ and $R_{31}$ through $R_{45}$ may be further substituted by deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; and a is an integer from 1 to 4 and one or more dopant(s) selected from compounds represented by one of Chemical Formulas (5) to (7):

Chemical Formula 5

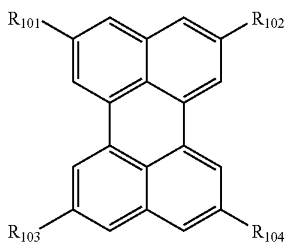

In Chemical Formula (5), $R_{101}$ through $R_{104}$ independently represent hydrogen, deuterium, halogen, (C1-C60) alkyl, (C6-C60)aryl, (C4-C60)heteroaryl, a 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro or hydroxyl, or each of $R_{101}$ through $R_{104}$ may be linked to an adjacent substituent via (C3-C60)alkylene or (C3-C60)alkenylene with or without a fused ring to form an alicyclic ring, or a monocyclic or polycyclic aromatic ring; and the alkyl, alkenyl, alkynyl, cycloalkyl, heterocycloalkyl, aryl, heteroaryl, arylsilyl, alkylsilyl, alkoxy, aryloxy, arylthio, alkylamino, or arylamino of $R_{101}$ through $R_{104}$, or the alicyclic ring, or the monocyclic or polycyclic aromatic ring formed therefrom by linkage to an adjacent substituent via (C3-C60)alkylene or (C3-C60)alkenylene with or without a fused ring may be further substituted by one or more substituent(s) selected from halogen, deuterium, (C1-C60)alkyl, (C6-C60)aryl, (C4-C60)heteroaryl, a 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60) alkylcarbonyl, (C6-C60)arylcarbonyl, carboxyl, nitro and hydroxyl Chemical Formula 6

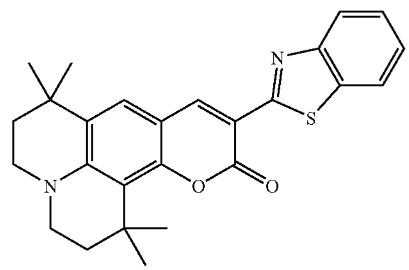

Chemical Formula 7

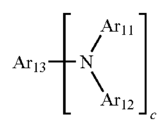

In Chemical Formula (7), $Ar_{11}$ and $Ar_{12}$ independently represent (C1-C60)alkyl, (C6-C60)aryl, (C4-C60)heteroaryl, (C6-C60)arylamino, (C1-C60)alkylamino, a 5- or 6-membered heterocycloalkyl containing one or more heteroatom(s) selected from N, O and S, or (C3-C60) cycloalkyl, or $Ar_{11}$ and $Ar_{12}$ may be linked via (C3-C60) alkylene or (C3-C60)alkenylene with or without a fused ring to form an alicyclic ring, or a monocyclic or polycyclic aromatic ring;

when c is 1, $Ar_{13}$ represents (C6-C60)arylamino, (C6-C60) aryl, (C4-C60)heteroaryl, or a substituent represented by one of the following structural formulas:

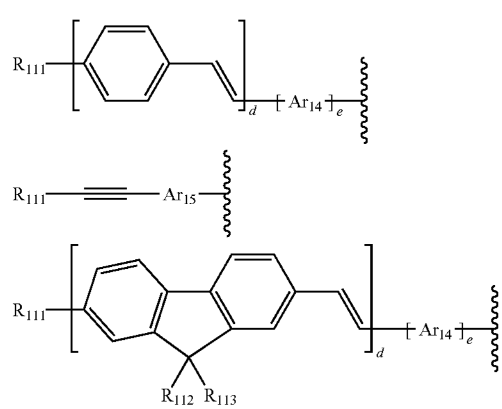

when c is 2, $Ar_{13}$ represents (C6-C60)arylene, (C4-C60) heteroarylene, or a substituent represented by one of the following structural formulas:

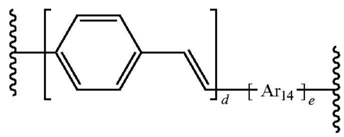

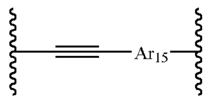

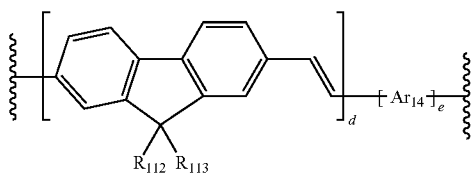

wherein $Ar_{14}$ and $Ar_{15}$ independently represent (C6-C60) arylene or (C4-C60)heteroarylene;

$R_{111}$ through $R_{113}$ independently represent hydrogen, deuterium, (C1-C60)alkyl or (C6-C60)aryl;

d is an integer from 1 to 4, e is an integer of 0 or 1; and the alkyl, aryl, heteroaryl, arylamino, alkylamino, cycloalkyl or heterocycloalkyl of $Ar_{11}$ and $Ar_{12}$; the arylamino, aryl, heteroaryl, arylene or heteroarylene of $Ar_{13}$; the arylene or heteroarylene of $Ar_{14}$ and $Ar_{15}$; or the alkyl or aryl of $R_{111}$ through $R_{113}$ may be further substituted by one or more substituent(s) selected from a group consisting of deuterium, halogen, (C1-C60)alkyl, (C6-C60)aryl, (C4-C60)heteroaryl, a 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri (C6-C60)arylsilyl, adamantyl, (C7-C60)bicycloalkyl, (C2-C60)alkenyl, (C2-C60)alkynyl, cyano, (C1-C60) alkylamino, (C6-C60)arylamino, (C6-C60)ar(C1-C60) alkyl, (C6-C60)aryloxy, (C1-C60)alkyloxy, (C6-C60) arylthio, (C1-C60)alkylthio, (C1-C60)alkoxycarbonyl, (C1-C60)alkylcarbonyl, (C6-C60)arylcarbonyl, carboxyl, nitro and hydroxyl.

5. The organic electroluminescent device according to claim 4, wherein the organic layer comprises one or more compound(s) selected from a group consisting of arylamine compounds and styrylarylamine compounds.

6. The organic electroluminescent device according to claim 4, wherein the organic layer comprises one or more metal(s) selected from a group consisting of organic metals of Group 1, Group 2, $4^{th}$ period and $5^{th}$ period transition metals, lanthanide metals and d-transition elements.

7. The organic electroluminescent device according to claim 4, wherein the organic layer comprises a charge generating layer as well as an electroluminescent layer.

8. A white electroluminescent device comprising an organic electroluminescent compound represented by Chemical Formula (1):

Chemical Formula 1

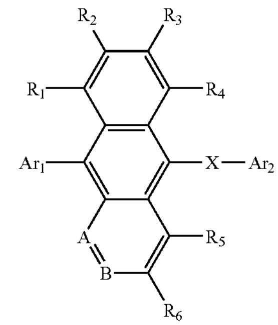

In Chemical Formula (1), A and B independently represent $CR_7$ or N, provided that both A and B cannot be $CR_7$ or N at the same time;

X is O or S;

$R_1$ through $R_7$ independently represent hydrogen, deuterium, halogen, (C1-C60)alkyl, (C6-C60)aryl, (C3-C60) heteroaryl, 5- or 6-membered heterocycloalkyl containing one or more heteroatom(s) selected from N, O and S, (C3-C60)cycloalkyl, tri(C1-C60)alkylsilyl, di(C1-C60) alkyl(C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_3$ and $R_4$ or $R_5$ and $R_6$ may be linked via (C3-C60)alkylene or (C3-C60) alkenylene to form a fused ring; the alkylene or alkenylene may be further substituted by one or more substituent(s) selected from deuterium, halogen, (C1-C60) alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C6-C60)arylthio, (C1-C60)alkoxycarbonyl, carboxyl, nitro and hydroxyl;

$Ar_1$ and $Ar_2$ independently represent (C6-C60)aryl, (C3-C60)heteroaryl, 5- or 6-membered heterocycloalkyl containing one or more heteroatom(s) selected from N, O and S, (C3-C60)cycloalkyl, adamantyl, (C7-C60)bicycloalkyl, or a substituent selected from the following structures:

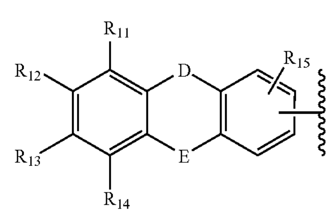

-continued

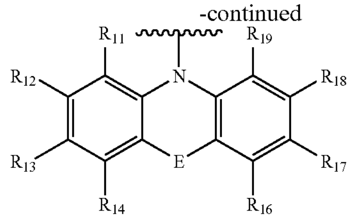

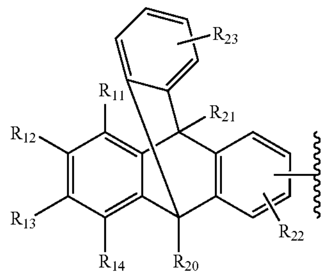

wherein, $R_{11}$ through $R_{23}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, or a monocyclic or polycyclic aromatic ring;

D and E independently represent a chemical bond, $—(CR_{31}R_{32})_a—$, $—N(R_{33})—$, —S—, —O—, $—Si(R_{34})(R_{35})—$, $—P(R_{36})—$, —C(═O)—, $—B(R_{37})—$, $—In(R_{38})—$, —Se—, $—Ge(R_{39})(R_{40})—$, $—Sn(R_{41})(R_{42})—$, $—Ga(R_{43})—$ or $—(R_{44})C═C(R_{45})—$;

$R_{31}$ through $R_{45}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_{31}$ and $R_{32}$, $R_{34}$ and $R_{35}$, $R_{39}$ and $R_{40}$, $R_{41}$ and $R_{42}$ or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_1$ through $R_7$, $Ar_1$, $Ar_2$, $R_{11}$ through $R_{23}$ and $R_{31}$ through $R_{45}$ may be further substituted by deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; and a is an integer from 1 to 4.

9. An organic solar cell which comprises an organic electroluminescent compound represented by Chemical Formula (1):

Chemical Formula 1

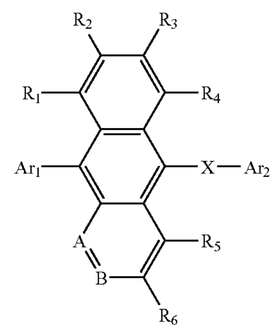

In Chemical Formula (1), A and B independently represent $CR_7$ or N, provided that both A and B cannot be $CR_7$ or N at the same time;

X is O or S;

$R_1$ through $R_7$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_3$ and $R_4$ or $R_5$ and $R_6$ may be linked via (C3-C60)alkylene or (C3-C60)alkenylene to form a fused ring; the alkylene or alkenylene may be further substituted by one or more substituent(s) selected from deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro and hydroxyl;

$Ar_1$ and $Ar_2$ independently represent (C6-C60)aryl, (C3-C60)heteroaryl, 5- or 6-membered heterocycloalkyl containing one or more heteroatom(s) selected from N, O and S, (C3-C60)cycloalkyl, adamantyl, (C7-C60)bicycloalkyl, or a substituent selected from the following structures:

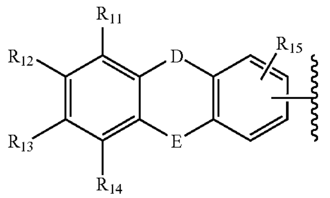

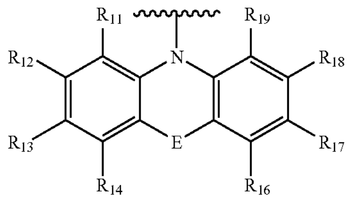

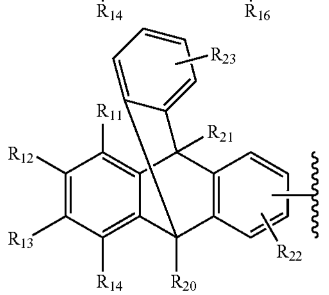

wherein, $R_{11}$ through $R_{23}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, or a monocyclic or polycyclic aromatic ring;

D and E independently represent a chemical bond, —$(CR_{31}R_{32})_a$—, —$N(R_{33})$—, —S—, —O—, —$Si(R_{34})(R_{35})$—, —$P(R_{36})$—, —C(=O)—, —$B(R_{37})$—, —$In(R_{38})$—, —Se—, —$Ge(R_{39})(R_{40})$—, —$Sn(R_{41})(R_{42})$—, —$Ga(R_{43})$— or —$(R_{44})C{=}C(R_{45})$—;

$R_{31}$ through $R_{45}$ independently represent hydrogen, deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl, or $R_{31}$ and $R_{32}$, $R_{34}$ and $R_{35}$, $R_{39}$ and $R_{40}$, $R_{41}$ and $R_{42}$ or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino or arylamino of $R_1$ through $R_7$, $Ar_1$, $Ar_2$, $R_{11}$ through $R_{23}$ and $R_{31}$ through $R_{45}$ may be further substituted by deuterium, halogen, (C1-C60)alkyl, (C6-C60)aryl, (C3-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkoxycarbonyl, carboxyl, nitro or hydroxyl; and a is an integer from 1 to 4.

* * * * *